US012413506B2

(12) United States Patent
Wouhaybi et al.

(10) Patent No.: US 12,413,506 B2
(45) Date of Patent: Sep. 9, 2025

(54) SYSTEMS, APPARATUS, ARTICLES OF MANUFACTURE, AND METHODS FOR PROACTIVE DATA ROUTING

(71) Applicant: Intel Corporation, Santa Clara, CA (US)

(72) Inventors: Rita Wouhaybi, Portland, OR (US); Stanley Mo, Portland, OR (US); Hassnaa Moustafa, San Jose, CA (US); Greeshma Pisharody, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 17/947,009

(22) Filed: Sep. 16, 2022

(65) Prior Publication Data

US 2023/0016946 A1   Jan. 19, 2023

Related U.S. Application Data

(63) Continuation-in-part of application No. PCT/US2021/065156, filed on Dec. 23, 2021.
(Continued)

(51) Int. Cl.
*H04L 45/00* (2022.01)
*G06F 16/901* (2019.01)
(Continued)

(52) U.S. Cl.
CPC .......... *H04L 45/22* (2013.01); *G06F 16/9024* (2019.01); *G06F 16/908* (2019.01); *G06F 21/6209* (2013.01); *H04L 45/16* (2013.01)

(58) Field of Classification Search
CPC ..... H04L 45/22; H04L 45/16; G06F 16/9024; G06F 16/908; G06F 21/6209; G06F 16/901; G06F 16/907
See application file for complete search history.

(56) References Cited

U.S. PATENT DOCUMENTS

2008/0226046 A1   9/2008  Shaffer et al.
2015/0186635 A1   7/2015  Nakhjiri et al.
(Continued)

FOREIGN PATENT DOCUMENTS

WO   2017035536 A1   3/2017
WO   2023048770 A1   3/2023

OTHER PUBLICATIONS

International Searching Authority, "International Search Report and Written Opinion," issued in connection with International Application No. PCT/US2021/065156, Jul. 1, 2022, 16 pages.
(Continued)

*Primary Examiner* — Walli Z Butt
(74) *Attorney, Agent, or Firm* — Hanley, Flight & Zimmerman, LLC

(57) ABSTRACT

Methods, apparatus, systems, and articles of manufacture are disclosed for proactive data routing. An example apparatus includes at least one memory, machine-readable instructions, and processor circuitry to execute the machine-readable instructions to at least execute a machine-learning model to output a first data routing path in a network environment based on metadata associated with an event in the network environment. The processor circuitry is further to, after a detection of a change of the first data routing path to a second data routing path, retrain the machine-learning model to output a third data routing path based on the second data routing path. The processor circuitry is additionally to cause transmission of a second message to a first node based on the third data routing path after an identification of the event.

24 Claims, 45 Drawing Sheets

Related U.S. Application Data

(60) Provisional application No. 63/248,312, filed on Sep. 24, 2021.

(51) Int. Cl.
*G06F 16/908* (2019.01)
*G06F 21/62* (2013.01)
*H04L 45/16* (2022.01)

(56) References Cited

U.S. PATENT DOCUMENTS

| | | | |
|---|---|---|---|
| 2018/0300124 A1 | 10/2018 | Malladi et al. | |
| 2019/0364130 A1 | 11/2019 | Rogynskyy | |
| 2019/0370089 A1* | 12/2019 | Patton | G06F 9/542 |
| 2020/0134423 A1 | 4/2020 | Shinde et al. | |
| 2020/0167205 A1 | 5/2020 | Guim Bernat et al. | |
| 2020/0267110 A1 | 8/2020 | Nolan et al. | |
| 2020/0372016 A1* | 11/2020 | Rogynskyy | H04L 67/1095 |
| 2021/0004265 A1 | 1/2021 | Guim Bernat et al. | |
| 2021/0011765 A1 | 1/2021 | Doshi et al. | |
| 2021/0014113 A1 | 1/2021 | Guim Bernat et al. | |
| 2021/0125083 A1 | 4/2021 | Ogawa et al. | |
| 2021/0203739 A1 | 7/2021 | Calegari et al. | |
| 2022/0198562 A1* | 6/2022 | Cella | G06Q 40/04 |
| 2022/0303828 A1 | 9/2022 | Gamage et al. | |
| 2022/0335340 A1 | 10/2022 | Moustafa et al. | |
| 2024/0386054 A1 | 11/2024 | Wouhaybi et al. | |
| 2024/0386442 A1 | 11/2024 | Mo et al. | |

OTHER PUBLICATIONS

Song et al., "Practical Techniques for Searches on Encrypted Data," In the Proceedings of the IEEE Symposium on Security and Privacy, May 14-17, 2000, 12 pages.
Gentry, "Fully Homomorphic Encryption Using Ideal Lattices," In Proceedings of the Annual ACM Symposium on Theory of Computing, May 31 through Jun. 2, 2009, 10 pages.
Kamara et al., "Dynamic Searchable Symmetric Encryption," Proceedings of the 2012 ACM Conference on Computer and Communications Security, Oct. 2012, 24 pages.
Garg et al., "Candidate Indistinguishability Obfuscation and Functional Encryption for all circuits," In the Proceedings of the IEEE Symposium on Theory of Computing Science, Oct. 2013, 46 pages.
International Searching Authority, "Written Opinion," issued in connection with International Application No. PCT/US2022/023107, Jul. 1, 2022, 7 pages.
International Searching Authority, "International Search Report," issued in connection with International Application No. PCT/US2022/023107, Jul. 1, 2022, 3 pages.
Netherlands Patent Office, "Search Report," issued in connection with Netherlands Application No. NL2032844, Jun. 5, 2023, 28 pages, with machine English translation.
Netherlands Patent Office, "Notice of Grant," issued in connection with Netherlands Application No. NL2032844, Aug. 11, 2023, 4 pages, with machine English translation.
International Searching Authority, "International Preliminary Report on Patentability," issued in connection with International Application No. PCT/US2021/065156, Mar. 26, 2024, 11 pages.
International Searching Authority, "International Preliminary Report on Patentability," issued in connection with International Application No. PCT/US2022/023107, Mar. 26, 2024, 8 pages.
United States Patent and Trademark Office, "Requirement for Restriction/Election," issued in connection with U.S. Appl. No. 18/571,142, dated Sep. 29, 2024, 10 pages.
United States Patent and Trademark Office, "Non-Final Office Action," issued in connection with U.S. Appl. No. 18/571,142, dated Mar. 21, 2025, 33 pages.
Ismail, "A Machine Learning Approach for Energy-Efficient IoT Systems," Journal of Intelligent Systems and Internet of Things (JISIoT), vol. 01, No. 02, 2020, 10 pages.
United States Patent and Trademark Office, "Non-Final Office Action," issued in connection with U.S. Appl. No. 18/571,149, dated Jun. 5, 2025, 18 pages.

* cited by examiner

- USER IDENTIFICATION (NAME, DEMOGRAPHICS, HUMAN RESOURCES FILE INFORMATION, ETC.) - PRIVATE

- USER ORGANIZATION (JOB TITLE, ROLE, RESPONSIBILITIES, ETC.)

- USER DISCIPLINE – PRIMARY AND SECONDARIES

- DISCIPLINES CATEGORY – EXPERT LEAD PUBLISHER <<>> STAKEHOLDER / ACTUATOR

- COMPARABLE DISCIPLINES (SECONDARY CONTEXT – GRAPH BASED)

- USER ORGANIZATION LEVEL OF RESPONSIBILITY / RANKING (DIRECT REPORTS, LIST OF SUPERVISOR(S) TO REPORT TO, ETC.)

- USER EVENT CYCLES – PERSONAL - DAILY, WEEKLY, ANNUALLY

- USER EVENT CYCLES – ORGANIZATIONAL – MONTHLY, QUARTERLY, ANNUALLY

- USER TOPICS OF INTEREST (GRAPH BASED, LINKED LIST, ETC.)

- USER SECONDARY TOPICS LIST (BASED ON CRITICAL PATH PEERS IN AND OUTSIDE ORGANIZATION, COMMON TEAMS, MISSIONS, ACROSS SYSTEMS, ETC.)

. . .

-USER COMMON FORMAT PREFERENCE (LOCAL NODE CUSTOMIZATION DATA TO GENERATE AUGMENTED DATA OBJECTS FOR PRESENTATION, WEIGHTING VALUES, ETC.)

FIG. 10

SYSTEMS, APPARATUS, ARTICLES OF MANUFACTURE, AND METHODS FOR PROACTIVE DATA ROUTING

RELATED APPLICATIONS

This patent arises from a continuation-in part of International Patent Application PCT/US21/65156, which was filed on Dec. 23, 2021, which claims the benefit of U.S. Provisional Patent Application No. 63/248,312, which was filed on Sep. 24, 2021. International Patent Application PCT/US21/65156 and U.S. Provisional Patent Application No. 63/248,312 are hereby incorporated herein by reference in their entireties. Priority to International Patent Application PCT/US21/65156 and U.S. Provisional Patent Application No. 63/248,312 is hereby claimed.

FIELD OF THE DISCLOSURE

This disclosure relates generally to data management and, more particularly, to systems, apparatus, articles of manufacture, and methods for proactive data routing.

BACKGROUND

Data management systems gather data and/or otherwise monitor many different complex activities and processes. The gathering of sufficient and relevant data to verify that a specific activity, tool, or task is performing as expected (or identifying a problem with the activity, tool, or task) can be intensive. As analytics efforts within data management systems increase, the need to quickly verify the state and/or sequence of complex actions or processes will increase as well.

BRIEF DESCRIPTION OF THE DRAWINGS

FIG. 10 depicts an example dataset including example metadata for proactive data routing in a network environment.

DETAILED DESCRIPTION

Figure 1:
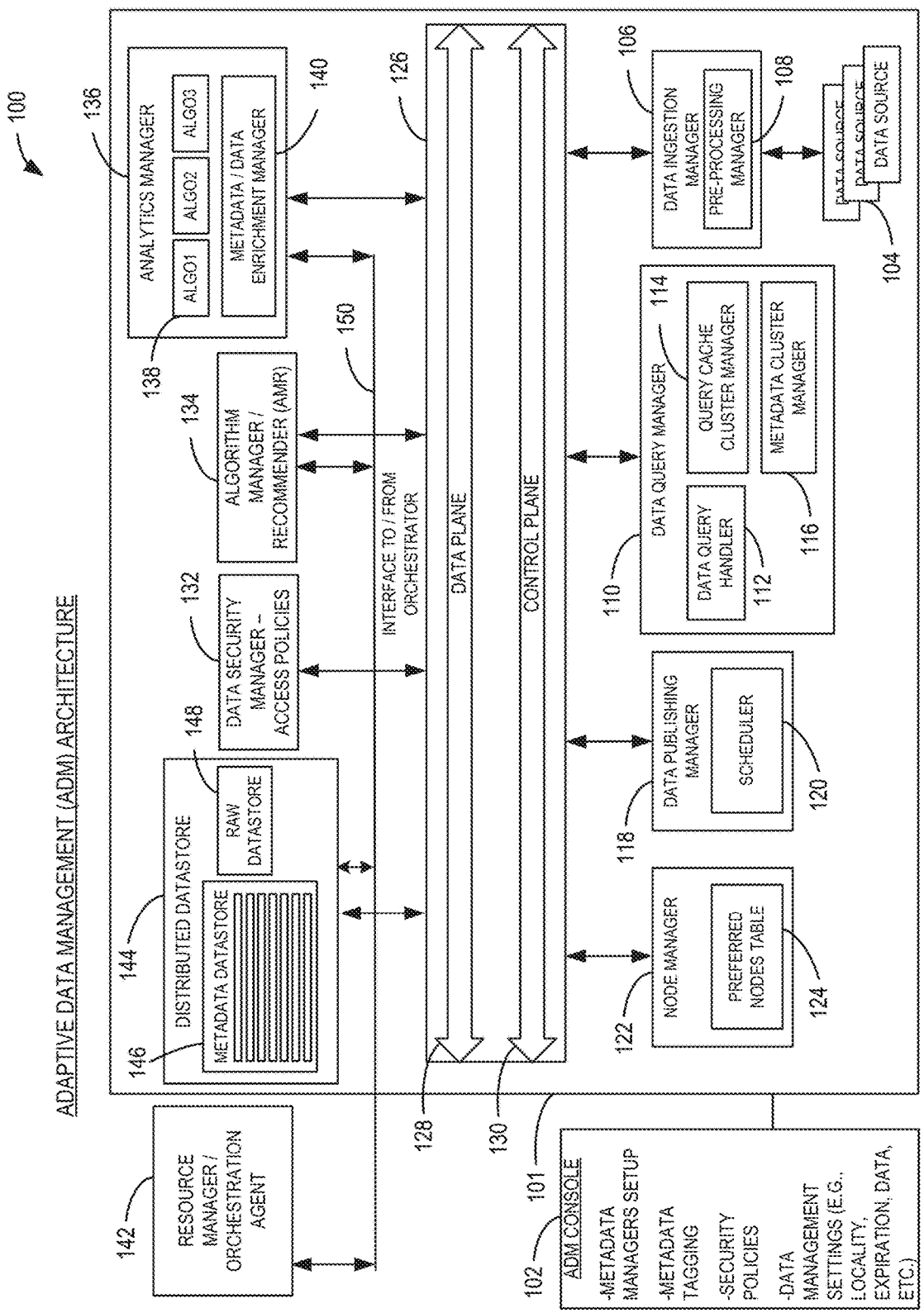
FIG. 1 is a block diagram of an example adaptive data management (ADM) system to implement adaptive data management in a network environment.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" and "substantially-real time" refer to occurrence in a near instantaneous manner recognizing there may be real-world delays for computing time, transmission, etc. Thus, unless otherwise specified, "substantially real time" and "substantially-real time" refer to being within a 1-second time frame of real time. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Network environments today have many different complex activities and processes, and the gathering of sufficient and relevant data to verify that a specific activity, tool, or task is performing as expected (or identifying a problem with the activity, tool, or task) can be intensive. As Edge analytics efforts increase, the need to quickly verify the state and/or sequence of complex actions or processes will increase as well. This will enable faster and more effective decisions and actions an organization can make in their complex environments.

Examples disclosed herein include systems, apparatus, articles of manufacture, and methods for proactive and/or adaptive data management and analytics. In some disclosed examples, proactive and/or otherwise adaptive data management is implemented by an example proactive and/or otherwise adaptive data management system. Advantageously, an example proactive and/or otherwise adaptive data management and analytics system as disclosed herein is an improvement over conventional, static data management systems that may require constant adjustments and modifications to satisfy complex and diverse network workloads.

Examples disclosed herein include proactive and/or adaptive data retention in an automated and contextual manner as a part of proactive and/or otherwise adaptive data management for a network environment. Examples disclosed herein retain, analyze, and/or store ingested data. Once data is retained, analyzed, and/or stored, examples disclosed herein include presenting relevant information to a user, which can be a human or device. In some disclosed examples, presenting the relevant information to a user can be implemented by determining an optimum representation of data for the user through customization and creation of a network of subject matter experts and stakeholders. In some disclosed examples, the network of the subject matter experts and/or the stakeholders can be implemented by users whom the data could be sent for supervisory inputs, timeliness, addition of relevant information, and the like. In some disclosed examples, the data itself and/or associated metadata can provide guidance to whom or what (e.g., an application or service) the data should be provided based on the context and urgency of the data.

FIG. 1 is a block diagram of an example adaptive data management (ADM) system 100 to implement adaptive data management in a network environment. In some examples, the ADM system 100 can effectuate and/or otherwise implement proactive data management in the network environment. The ADM system 100 of FIG. 1 may be instantiated (e.g., creating an instance of, bring into being for any length of time, materialize, implement, etc.) by processor circuitry such as a central processing unit (CPU) executing instructions. Additionally or alternatively, the ADM system 100 of FIG. 1 may be instantiated by an ASIC or an FPGA structured to perform operations corresponding to the instructions. It should be understood that some or all of the ADM system 100 of FIG. 1 may, thus, be instantiated at the same or different times. Some or all of the ADM system 100 of FIG. 1 may be instantiated, for example, in one or more threads executing concurrently on hardware and/or in series on hardware. Moreover, in some examples, some or all of the ADM system 100 of FIG. 1 may be implemented by microprocessor circuitry executing instructions to implement one or more virtual machines and/or containers.

In some examples, the ADM system 100 is implemented using an example logical entity 101. For example, the logical entity 101 can be implemented using a client compute node, such as any type of endpoint component, device, appliance, or other tangible element capable of communicating as a producer or consumer of data. In some examples, the logical entity 101 can be implemented by, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a sensor, a personal video recorder, a headset (e.g., an augmented reality (AR) headset, a virtual reality (VR) headset, etc.) or other wearable device, or any other type of computing and/or electronic device. In some examples, the logical entity 101 can be implemented using one or more compute nodes (e.g., client compute nodes), one or more servers, one or more personal computers, etc., and/or any combination(s) thereof. For example, a first portion of the logical entity 101 can be implemented using a first client compute node and a second portion of the logical entity 101 can be implemented using a second client compute node. Any other combinations are contemplated.

In the illustrated example of FIG. 1, the ADM system 100 includes an example ADM console 102, example data sources 104, and an example data ingestion manager 106, which includes an example pre-processing manager 108. The ADM system 100 includes an example data query manager 110, which includes an example data query handler 112, an example query cache cluster manager 114, and an example metadata cluster manager 116. The ADM system 100 includes an example data publishing manager 118, which includes an example scheduler 120. The ADM system 100 includes an example node manager 122, which includes an example preferred nodes table 124. The ADM system 100 includes an example network plane 126, which includes an example data plane 128 and an example control plane 130. The ADM system 100 includes an example data security manager 132, an example algorithm manager and/or recommender (AMR) 134, and an example analytics manager 136, which includes example algorithms 138 (identified by ALGO1, ALGO2, ALGO3), and an example metadata and/or data enrichment manager 140. The ADM system 100 includes an example resource manager and/or orchestration agent 142. The ADM system 100 includes an example distributed datastore 144, which includes an example metadata datastore 146 and an example raw datastore 148.

In the illustrated example, the ADM system 100 includes the ADM console 102 to instantiate, setup, and/or configure portion(s) of the ADM system 100 (e.g., the data ingestion manager 106, the node manager 122, etc.). For example, the ADM console 102 can configure the metadata/data enrichment manager 140. In some examples, the ADM console 102 can effectuate and/or otherwise execute metadata tagging by adding, removing, and/or modifying metadata. In some examples, the ADM console 102 can enforce and/or otherwise implement security policies. For example, the ADM console 102 can add, remove, and/or modify access policies generated, managed, and/or otherwise handled by the data security manager 132. In some examples, the ADM console 102 can configure data management settings (e.g., locality, expiration date, etc., of data) associated with data that is generated, accessed, and/or stored by the ADM system 100. In some examples, the ADM console 102 can be implemented using one or more user experience (UX) and/or user interface (UI) (e.g., graphical user interface (GUI)) consoles, displays, interfaces, etc.

In the illustrated example, the ADM system 100 includes the data ingestion manager 106 to ingest, receive, and/or otherwise obtain data from one(s) of the data sources 104. For example, the data sources 104 can be implemented using hardware alone, and/or any combination of hardware, software, and/or firmware as disclosed herein (e.g., hardware, software, and/or firmware of an autonomous guided vehicle (AGV), a server, an IoT device, an Edge appliance, a robot, etc.). In some examples, the data ingestion manager 106 includes the pre-processing manager 108 to pre-process data obtained from the data sources 104. For example, the data ingestion manager 106 can extract portion(s) of the data, convert portion(s) of the data from a first data format to a second data format, compress or decompress the data, decrypt or encrypt the data, etc., and/or any combination(s) thereof.

In the illustrated example, the ADM system 100 includes the data query manager 110 to queue and/or otherwise process data search requests from users and/or applications. For example, the data query handler 112 can queue and/or otherwise process the data search requests. In some examples, the data query handler 112 can generate and/or return results associated with the data search results to the requester (e.g., the requesting user, the requesting device, the requesting application/service, etc.). In some examples, the data query manager 110 can utilize the existence of metadata tables extracted from data files (e.g., media (e.g., multimedia, audio, video, text, image, etc.), alphanumeric, spatial, etc., data files) that have been pre-generated by the metadata/data enrichment manager 140. In some examples, the data query manager 110 can be implemented using a search and match of topical terms to metadata tags. In some examples, the data query manager 110 can be implemented using a search and match of weighted topics and phrases with Boolean operations to perform complex contextual matches, prioritizations, and sequences of topics mapping.

In some examples, the data query manager 110 manages multiple metadata context, which can result from metadata generating engines, sub-metadata tables specific to user/applications with unique context, permissions, etc., etc. In some examples, the data query manager 110 can inspect and/or scan a metadata file (e.g., a metadata array, data structure, data graph or data graph model, table, etc.), for primary search and recommendation of most appropriate data file links associated with portion(s) of the metadata file. For example, the data query manager 110 can include the metadata cluster manager 116 to scan the metadata file and/or return a number of excerpts (e.g., a user selectable number of excerpts, portions, etc.) for final selection and output. In some examples, the data query manager 110 can check selections for permission level appropriateness. For example, different departments, regions, sections, sectors, zones, etc., of an environment can have security and access control. In some examples, the data query manager 110 can cross-reference the selections with the security and access control to determine whether a requester has access to the selections. In some examples, the data query manager 110 can link a user/application to a returned and/or otherwise identified data source file. In some examples, the data query manager 110 and a metadata database (e.g., the metadata datastore 146) need not be co-resident.

In some examples, the data query manager 110 can include the query cache cluster manager 114 to effectuate and/or otherwise execute selective caching. For example, the query cache cluster manager 114 can activate and/or otherwise enable caching for frequently requested and/or accessed topics, most recently used search terms with user selected and preferred data source file links, data source file linkages that have a high correlation to one another (e.g., occurs frequently), etc., and/or any combination(s) thereof.

In some examples, the data query manager 110 facilitates capacity scaling for data and/or resource demand volume and for serving local organizations, personnel, teams, etc. For example, the data query manager 110 can instantiate and/or otherwise launch additional instances of the data query manager 110 proximate and/or otherwise near to demand sources (e.g., a department server, an individual personal computer, etc.) that may be associated with the data sources 104.

Advantageously, in some examples, a locality of the metadata datastore 146 to the data query manager 110 can reduce network traffic and latency to ensure that even if a file (e.g., a data file) is unavailable, the existence of the file can be confirmed. In some examples, the data query manager 110 can effectuate and/or otherwise enable synchronization with other components of the ADM system 100 more frequently for metadata (e.g., metadata files, tables, etc.) of the metadata datastore 146 that is/are accessed most frequently or undergo significant changes (e.g., usually another feature of frequent use or recent capture). In some examples, the data query manager 110 can achieve interactive and/or programmatic access to portion(s) of the ADM system 100.

In the illustrated example, the ADM system 100 includes the data publishing manager 118 to implement publish-subscribe messaging. For example, a subscriber (e.g., a data subscriber, a device or user subscriber, etc.) can coordinate with the scheduler 120 to subscribe to alerts, changes, updates, etc., of data of the metadata datastore 146, the raw datastore 148, and/or data generated by one(s) of the data sources 104. In some examples, the data publishing manager 118 can publish data of interest to the appropriate subscribers.

In the illustrated example, the ADM system 100 includes the node manager 122 to enable nodes (e.g., edge nodes) to maintain lists (e.g., a friends list, a neighboring nodes list, a trusted or verified node list, etc.) on the network. In some examples, the list(s) can include(s) the preferred nodes table 124. For example, the preferred nodes table 124 can be implemented using a routing table in networking examples. In some examples, the node manager 122 can maintain the table/list/index as a dynamic and/or evolving table/list/index by considering previous interactions and/or transactions between neighboring nodes. For example, the node manager 122 can control the table/list/index to rate neighboring nodes based on the context of data requested, the frequency of data requested, the Quality-of-Service (QoS) of past interactions, etc., and/or any combination(s) thereof. In some examples, the table/list/index can exist in the distributed datastore 144, which can be quickly accessible upon a request from the data query manager 110.

In the illustrated example, the ADM system 100 includes the network plane 126 to facilitate the transmission, distribution, and/or propagation of data within a network environment. In some examples, the network plane 126 can be implemented by one or more networks. For example, the network plane 126 can be implemented by the Internet. However, the network plane 126 can be implemented using any suitable wired and/or wireless network(s) including, for example, one or more data buses, one or more Local Area Networks (LANs), one or more wireless Local Area Networks (WLANs), one or more cellular networks (e.g., fifth generation cellular (5G), sixth generation cellular (6G), etc., networks), one or more private networks, one or more public networks, one or more fiber networks, one or more satellite networks, one or more terrestrial networks, one or more non-terrestrial networks, etc., and/or any combination(s) thereof. In the illustrated example, component(s) of the ADM system 100 can provide, deliver, propagate, etc., data in the ADM system 100 by way of the data plane 128. In the illustrated example, component(s) of the ADM system 100 can provide, deliver, propagate, etc., controls, commands, directions, instructions, etc., in the ADM system 100 via the control plane 130.

In the illustrated example, the ADM system 100 includes the data security manager 132 to control (e.g., add, create, change, delete, remove, modify, etc.) one(s) of the access policies. For example, the data security manager 132 can control the access policies rather than the node/platform level security components and/or a user who may be authenticated to access the network. In some examples, the data security manager 132 can be accessed through the ADM console 102.

In some examples, the data security manager 132 assigns initial security/access levels to data files, data streams, etc., based on user provided policy or explicit settings. In some examples, the data security manager 132 can facilitate autonomous control of access policies. For example, an access policy can define and/or stipulate that content can inherit security levels from other similar data files based on metadata, data topics, etc. In some examples, the data security manager 132 can ensure compatible security level data match for the user/application/service level security with appropriate data levels. In some examples, the data security manager 132 can define the scope of data availability (e.g., geographic, topical, personnel, security level, etc.). In some examples, the data security manager 132 can log audits for a query log (e.g., requests, copies, moves, successes/fails, reasons for the requests, successes, fails, etc., etc.) maintained by the data query manager 110. In some examples, the data security manager 132 can ensure data/metadata from high security areas are not copied/moved to lower-level security environments. In some examples, the data security manager 132 can enforce top secret level access to confidential areas or non-top secret level access to unsecured servers. In some examples, the data security manager 132 can monitor with the data query manager 110 the data request traffic for potential irregularities. In some examples, the data security manager 132 can provide and/or implement encryption services, keys-as-a service (KaaS), etc., and/or any combination(s) thereof for improved security of the ADM system 100.

In the illustrated example, the ADM system 100 includes the AMR 134 to monitor the data on the data plane 128 and/or in the distributed datastore 144 (e.g., when invoked or triggered to run analytics) and/or after a detection of a gap in the existing algorithms 138 of the analytics manager 136. In some examples, the AMR 134 can interface with the resource manager 142 by using an example interface 150. For example, the resource manager 142 can include and/or implement an orchestration agent that receives a request for new one(s) of the algorithms 138 to act on of data of interest. For example, if a node that was previously monitoring a video stream and now has some additional time series data, the AMR 134 can request the resource manager/orchestrator agent 142 for a new one of the algorithms 138 to update the analytics manager 136 to run insights on both modalities.

In some examples, the analytics manager 136 includes a metadata and/or data agent (e.g., a metadata and/or data agent that can be implemented by the metadata/data enrichment manager 140) that can request analytics to be executed by the AMR 134 for generating metadata from source streams/files. In some examples, the AMR 134 can instantiate one(s) of the algorithms 138 to generate the analytics. For example, one or more of the algorithms 138 can be implemented as microservice(s). For example, ALGO1 can be compiled, executed, run, and/or implemented as a microservice. In some examples, the microservice, when accessed and/or instantiated, can execute an application, a container, a service, a virtual machine, etc., to implement ALGO1. In some examples, a combination of the algorithms 138 can be implemented as microservice(s). For example, ALGO1 and ALGO2 can be compiled, executed, run, and/or implemented as a single microservice or multiple microservices. In some examples, the microservice(s), when accessed and/or instantiated, can execute an application, a container, a service, a virtual machine, etc., to implement ALGO1 and ALGO2. In some examples, the analytics can be generated by an Artificial Intelligence/Machine Learning (AI/ML) model (e.g., a neural network (NN)) for classification, a neural natural language processing (NNLP) network or model to parse documentation, etc., and/or any combination(s) thereof.

In some examples, in the data or user domain, an application or a direct user request can request an analytics container (e.g., an analytics container, microservice, etc., that can be instantiated and/or implemented by the analytics manager 136) with appropriate configuration(s) and optimization(s) for the requested task. In some examples, certain one(s) of the algorithms 138 or AI/ML models may be preferred over time as a function of accuracy and performance and priorities may be assigned to the one(s) of the algorithms 138 for utilization in the ADM system 100.

In some examples, the resource manager/orchestration agent 142 can orchestrate new one(s) of the algorithms 138 either from a centralized algorithm library based on example algorithm ratings, scores, etc., if available, or through a pointer or other reference to a local datastore (e.g., if available in a library) of the analytics manager 136 for faster access or the distributed datastore 144.

Artificial intelligence (AI), including machine-learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, one(s) of the algorithms 138 may be trained with data to recognize patterns and/or associations and follow such patterns and/or associations when processing input data such that other input(s) result in output(s) consistent with the recognized patterns and/or associations. In some examples, an association can be implemented using a data association. For example, the association may itself be data. For example, the association can be implemented using an address (e.g., a storage or memory address), a pointer, a reference, etc., or any other data connection or linkage that may be stored in a mass storage device, memory, etc.

Many different types of machine-learning models and/or machine-learning architectures exist. In some examples, the analytics manager 136 may generate one(s) of the algorithms 138 as neural network model(s). In some examples, the resource manager/orchestration agent 142 may obtain and/or generate one(s) of the algorithms 138. Using a neural network model enables the analytics manager 136 to execute AI/ML workload(s). In general, machine-learning models/architectures that are suitable to use in the example approaches disclosed herein include recurrent neural networks. However, other types of machine-learning models could additionally or alternatively be used such as supervised learning ANN models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the analytics manager 136 may compile and/or otherwise generate one(s) of the algorithm(s) 138 as lightweight machine-learning models.

In general, implementing an ML/AI system involves two phases, a learning/training phase and an inference phase. In the learning/training phase, a training algorithm is used to train the one(s) of the algorithms 138 to operate in accordance with patterns and/or associations based on, for example, training data. In general, the one(s) of the algorithms 138 include(s) internal parameters (e.g., indices, raw data, metadata, insights, models, weights, etc.) that guide how input data is transformed into output data, such as through a series of nodes and connections within the one(s) of the algorithms 138 to transform input data into output data. Additionally, hyperparameters are used as part of the training process to control how the learning is performed (e.g., a learning rate, a number of layers to be used in the machine-learning model, etc.). Hyperparameters are defined to be training parameters that are determined prior to initiating the training process.

Different types of training may be performed based on the type of ML/AI model and/or the expected output. For example, the analytics manager 136 may invoke supervised training to use inputs and corresponding expected (e.g., labeled) outputs to select parameters (e.g., by iterating over combinations of select parameters) for the one(s) of the algorithms 138 that reduce model error. As used herein, "labeling" refers to an expected output of the machine-learning model (e.g., a classification, an expected output value, etc.). Alternatively, the analytics manager 136 may invoke unsupervised training (e.g., used in deep learning, a subset of machine-learning, etc.) that involves inferring patterns from inputs to select parameters for the one(s) of the algorithms 138 (e.g., without the benefit of expected (e.g., labeled) outputs).

In some examples, the analytics manager 136 trains the one(s) of the algorithms 138 using unsupervised clustering of operating observables. For example, the operating observables may include data from the data sources 104, metadata in the metadata datastore 146, data in the raw datastore 148, etc., and/or combination(s) thereof. However, the analytics manager 136 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the analytics manager 136 may train the one(s) of the algorithms 138 until the level of error is no longer reducing. In some examples, the analytics manager 136 may train the one(s) of the algorithms 138 locally on the analytics manager 136 and/or remotely at an external computing system (e.g., on external computing device(s) in communication with the resource manager/orchestration agent 142) communicatively coupled to the analytics manager 136. In some examples, the analytics manager 136 trains the one(s) of the algorithms 138 using hyperparameters that control how the learning is performed (e.g., a learning rate, a number of layers to be used in the machine-learning model, etc.). In some examples, the analytics manager 136 may use hyperparameters that control model performance and training speed such as the learning rate and regularization parameter(s). The analytics manager 136 may select such hyperparameters by, for example, trial and error to reach an optimal model performance. In some examples, the analytics manager 136 Bayesian hyperparameter optimization to determine an optimal and/or otherwise improved or more efficient network architecture to avoid model over-fitting and improve the overall applicability of the one(s) of the algorithms 138. Alternatively, the analytics manager 136 may use any other type of optimization. In some examples, the analytics manager 136 may perform re-training. The analytics manager 136 may execute such re-training in response to override(s) by a user of the ADM system 100, a receipt of new training data, change(s) to node(s), change(s) observed and/or otherwise identified by node(s), etc.

In some examples, the analytics manager 136 facilitates the training of the one(s) of the algorithms 138 using training data. In some examples, the analytics manager 136 utilizes training data that originates from locally generated data, such as one(s) of the data from the data sources 104, metadata in the metadata datastore 146, data in the raw datastore 148, etc., and/or combination(s) thereof. In some examples, the analytics manager 136 utilizes training data that originates from externally generated data, such as data from the data sources 104, data from the resource manager/orchestration agent 142, etc., and/or combination(s) thereof. In some examples where supervised training is used, the analytics manager 136 may label the training data (e.g., label training data or portion(s) thereof with appropriate metadata). Labeling is applied to the training data by a user manually or by an automated data pre-processing system. In some examples, the analytics manager 136 may pre-process the training data. In some examples, the analytics manager 136 sub-divides the training data into a first portion of data for training the one(s) of the algorithms 138, and a second portion of data for validating the one(s) of the algorithms 138.

Once training is complete, the analytics manager 136 may deploy the one(s) of the algorithms 138 for use as an executable construct that processes an input and provides an output based on the network of nodes and connections defined in the one(s) of the algorithms 138. The analytics manager 136 may store the one(s) of the algorithms 138 in the analytics manager 136. In some examples, the analytics manager 136 may invoke the interface 150 to transmit the one(s) of the algorithms 138 to one(s) of the external computing systems in communication with the resource manager/orchestration agent 142. In some examples, in response to transmitting the one(s) of the algorithms 138 to the one(s) of the external computing systems, the one(s) of the external computing systems may execute the one(s) of the algorithms 138 to execute AI/ML workloads with at least one of improved efficiency or performance.

Once trained, the deployed one(s) of the algorithms 138 may be operated in an inference phase to process data. In the inference phase, data to be analyzed (e.g., live data) is input to the one(s) of the algorithms 138, and the one(s) of the algorithms 138 execute(s) to create an output. This inference phase can be thought of as the AI "thinking" to generate the output based on what it learned from the training (e.g., by executing the one(s) of the algorithms 138 to apply the learned patterns and/or associations to the live data). In some examples, input data undergoes pre-processing before being used as an input to the one(s) of the algorithms 138. Moreover, in some examples, the output data may undergo post-processing after it is generated by the one(s) of the algorithms 138 to transform the output into a useful result (e.g., a display of data, a detection and/or identification of an object, an instruction to be executed by a machine, etc.).

In some examples, output of the deployed one(s) of the algorithms 138 may be captured and provided as feedback. By analyzing the feedback, an accuracy of the deployed one(s) of the algorithm(s) 138 can be determined. If the feedback indicates that the accuracy of the deployed model is less than a threshold or other criterion, training of an updated model can be triggered using the feedback and an updated training data set, hyperparameters, etc., to generate an updated, deployed model.

In the illustrated example, the ADM system 100 includes the metadata/data enrichment manager 140 to schedule and/or execute metadata creation and/or post-processing routines intended to extract context and meaning from the source data stream/data files to enhance source data files to decrease noise and/or clarify/focus subjects or topics of interest. In some examples, the metadata/data enrichment manager 140 includes a metadata and/or enhancement request routine, an online metadata agent, and/or an offline metadata agent. In some examples, the metadata/enhancement request routine can be configured and/or otherwise instantiated to take inputs from a user or process/application to articulate the types of metadata/enhancement and determine what operations can be done in real time and what can be done offline based on a complexity of the request, type of data, available processing resources, priority/urgency of the operation, and the like. In some examples, the metadata/data enrichment manager 140 can augment, enhance, and/or otherwise enrich metadata by adding and/or otherwise including new metadata after ingesting data from an environment. In some examples, the metadata/data enrichment manager 140 can enrich metadata by deleting and/or otherwise removing portion(s) of the metadata that is/are determined to be irrelevant (or not as relevant as once determined) or not useful for determining output(s) with a high likelihood of accuracy, relevancy, etc., and/or any combination(s) thereof.

In some examples, the online metadata agent can access existing metadata or enhancement functionality within a node or launch a selected algorithm package to perform real time metadata/enhancement actions on the data stream and create a source-file linked metadata record that may be passed to the data query manager 110 for incorporation and synchronization with other authorized and/or relevant instances of the data query manager 110. In the example of source file enhancement, the original file may be archived and linked with appropriate metadata record while the modified file is returned to the requestor.

In some examples, the offline metadata agent can be implemented as the real time agent instantiated on the server/file storage that runs metadata/enhancement routines offline due to resource availability, complexity of operations, and/or lower priority setting. Subsequent behavior may be similar to the online metadata once post-processing has been completed.

In some examples, the metadata/data enrichment manager 140 evaluates metadata/enhancement requests and priority. In some examples, the metadata/data enrichment manager 140 can select appropriate operations for base metadata and enhancement operations. In some examples, the metadata/ data enrichment manager 140 can invoke and/or otherwise provoke the AMR 134 to heuristically suggest proper algorithm(s) for advanced data operations and/or recommend algorithm combinations (e.g., algorithm recipes) from prior operations that may be preferred by different customers or observed to operate best on certain hardware.

In some examples, the metadata/data enrichment manager 140 can identify real-time operations from post-processed operations and confirm with the user allowing the user to modify. In some examples, the metadata/data enrichment manager 140 can launch modules (e.g., AI, NNLP, analytics, statistics, etc.) to generate metadata (e.g., generate association(s) of data portion(s) and metadata) and/or enhance existing data (e.g., hyper-resolution or false image enhancements) on local node or supporting compute platform(s). In some examples, the metadata/data enrichment manager 140 can manage archiving of sources, appending metadata records requested or provided by the data query manager 110 (with source links), etc. In some examples, a single instance of the metadata/data enrichment manager 140 can manage multiple metadata/enhancement operations.

In the illustrated example, the ADM system 100 includes the distributed datastore 144 to record data. For example, the distributed datastore 144 can include the metadata datastore 146 to record and/or otherwise store metadata. In some examples, the distributed datastore 144 can include the raw datastore 148 to record raw and/or otherwise unprocessed data. The distributed datastore 144 can be implemented by one or more volatile memories (e.g., a Synchronous Dynamic Random Access Memory (SDRAM), Dynamic Random Access Memory (DRAM), RAMBUS Dynamic Random Access Memory (RDRAM), etc.), one or more non-volatile memories (e.g., flash memory), and/or combination(s) thereof. The distributed datastore 144 may additionally or alternatively be implemented by one or more double data rate (DDR) memories, such as DDR, DDR2, DDR3, DDR4, DDR5, mobile DDR (mDDR), etc. The distributed datastore 144 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the distributed datastore 144 is illustrated as a single datastore, the distributed datastore 144 may be implemented by any number and/or type(s) of datastores. For example, the distributed datastore 144 can be implemented by a plurality of one or more types of mass storage devices. In some examples, the one or more types of mass storage devices can be spread or distributed across one or more devices, logical entities, etc. In some examples, the one or more devices, logical entities, etc., need not be co-resident, located in the same geographical location (e.g., same mailing address, city, state, country, continent, etc.). Furthermore, the data stored in the distributed datastore 144 may be in any data format such as, for example, binary data, comma delimited data, tab delimited data, structured query language (SQL) structures, etc.

In some examples, the metadata datastore 146, the raw datastore 148, and/or, more generally, the distributed datastore 144, can implement and/or include one or more databases. The term "database" as used herein means an organized body of related data, regardless of the manner in which the data or the organized body thereof is represented.

For example, the organized body of related data may be in the form of one or more of a table, a map, a grid, a packet, a datagram, a frame, a model (e.g., an AI/ML model, a data graph model, etc.), a file, an e-mail, a message, a document, a report, a spreadsheet, a business-related document (e.g., an invoice, a shipping manifest, etc.), a user manual or guide, a maintenance manual or guide, an installation manual or guide, a workflow manual or guide, a media file, an audio file, an image file, a video file, a list, or in any other form.

As used herein, "data" is information in any form that may be ingested, processed, interpreted and/or otherwise manipulated by processor circuitry to produce a result. The produced result may itself be data.

As used herein, "metadata" is information in any form that may be ingested, processed, interpreted and/or otherwise manipulated by processor circuitry to produce a result. The produced result may itself be data.

As used herein, a "threshold" is expressed as data such as a numerical value represented in any form, that may be used by processor circuitry as a reference for a comparison operation.

As used herein, a "model" is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data.

The terms "media data" and "media" as used herein refer to data that is accessible, whether over-the-air, or via cable, satellite, network, internetwork (including the Internet), print, displayed, distributed on storage media, or by any other technique that is humanly perceptible, without regard to the form or content of such data, and include but are not limited to audio, video, audio/video, text, images, advertisements, animations, databases, broadcasts, content, displays (including but not limited to video displays, posters and billboards), signs, signals, web pages, print media, streaming media data, etc. For example, "media data" and "media" can be information in any form (e.g., alphanumeric characters, bits, bytes, etc.) that can be ingested, processed, interpreted and/or otherwise manipulated by processor circuitry to produce a result. The produced result may itself be data. In some examples, the result can be the presentation of audio, image, text, and/or video data on one or more display devices or playback devices (e.g., a monitor, a display panel, a television, a display wall, a touchscreen, a wearable device, a printer, a plotter, a speaker, a projector, headphones (e.g., wireless or wired headphones), an audio amplifier, a stereo, etc.).

As used herein, "multimedia" refers to two or more types of media combined in order to convey information. For example, a video can be multimedia by including audio, text, and/or video data in the video. In some examples, a request for media can be a request for multimedia. For example, a request for a web site can be a multimedia request, which can include requesting a video and/or an accompanying video advertisement, each of which can include more than one type of media such as audio, text, and/or video. For example, "multimedia" can be information in any form (e.g., alphanumeric characters, bits, bytes, etc.) that can be ingested, processed, interpreted and/or otherwise manipulated by processor circuitry to produce a result. The produced result may itself be data. In some examples, the result can be the presentation of audio, image, text, and/or video data on one or more display devices or playback devices (e.g., a monitor, a display panel, a television, a display wall, a touchscreen, a wearable device, a printer, a plotter, a speaker, a projector, headphones (e.g., wireless or wired headphones), an audio amplifier, a stereo, etc.).

In some examples, data from the data sources 104 and/or data output from the ADM system 100 can be data in and/or based on any type of data representation. For example, the data can have and/or include a data type, an object type, a data object type, a sub-object type, a data sub-object type, etc. In some examples, data ingested from the data sources 104 and/or data output from the ADM system 100 can include one or more different types of data objects, such as an audio object, an image object, a text object, or a video object, and/or, more generally, a media object or a multimedia object. An object (e.g., a data object, an image object, a media object, a text object, a video object, etc.), such as an audio object, an image object, a text object, a video object, etc., can be information in any form (e.g., alphanumeric characters, bits, bytes, etc.) that can be ingested, processed, interpreted and/or otherwise manipulated by processor circuitry to produce a result. The produced result may itself be data. In some examples, the result can be the presentation of audio, image, text, and/or video data on one or more display devices of an electronic and/or computing system.

In some examples, video objects can include different types of video data. For example, a video object (e.g., a video data object) can be an MP4 video object (e.g., video data in an MP4 or MPEG-4 Part 14 video format), a MOV video object (e.g., video data in a MOV video format), a WMV video object (e.g., video data in a WMV video format), an AVI video object (e.g., video data in an AVI video format), etc. In some examples, the video object can be video data in any other video format such as AVCHD, FLV, F4V, SWF, etc.

In some examples, audio objects can include different types of audio data. For example, an audio object (e.g., an audio data object) can be an MP3 audio object (e.g., audio data in an MP3 or MPEG-1 Audio Layer 3 audio format), an AAC audio object (e.g., audio data in an AAC audio format), a FLAC audio object (e.g., audio data in a FLAC audio format), an ALAC audio object (e.g., audio data in an ALAC audio format), etc. In some examples, the audio object can be audio data in any other audio format such as Ogg Vorbis, WAV, AIFF, DSD, etc.

In some examples, image objects can include different types of image data. For example, an image object (e.g., an image data object) can be a Bitmap (BMP) object or file, a Graphics Interchange Format (GIF) object or file, a Joint Photographic Experts Group (JPEG) object or file, a Portable Document Format (PDF) object or file, a Portable Network Graphic (PNG) object or file, etc. In some examples, the image object can be image data in any other image format such as a RAW object or file, a Tag Image File Format (TIFF) object or file, etc.

In some examples, text objects can include different types of text data. For example, a text object (e.g., a text data object) can be a character or CHAR text object (e.g., text data in character text format), a string or STR text object (e.g., text data in string text format), an ASCII text object (e.g., text data in ASCII text format), etc. In some examples, the text object can be text data in any other text format such as DAT, TXT, CSV, etc.

While an example manner of implementing the ADM system 100 is illustrated in FIG. 1, one or more of the elements, processes, and/or devices illustrated in FIG. 1 may be combined, divided, re-arranged, omitted, eliminated, and/or implemented in any other way. Further, the logical entity 101, the ADM console 102, the data sources 104, the data ingestion manager 106, the pre-processing manager 108, the data query manager 110, the data query handler 112, the query cache cluster manager 114, the metadata cluster manager 116, the data publishing manager 118, the scheduler 120, the node manager 122, the preferred nodes table 124, the network plane 126, the data plane 128, the control plane 130, the data security manager 132, the AMR 134, the analytics manager 136, the algorithms 138, the metadata/data enrichment manager 140, the resource manager 142, the distributed datastore 144, the metadata datastore 146, the raw datastore 148, the interface 150, and/or, more generally, the ADM system 100 of FIG. 1, may be implemented by hardware alone or by hardware in combination with software and/or firmware. Thus, for example, any of the logical entity 101, the ADM console 102, the data sources 104, the data ingestion manager 106, the pre-processing manager 108, the data query manager 110, the data query handler 112, the query cache cluster manager 114, the metadata cluster manager 116, the data publishing manager 118, the scheduler 120, the node manager 122, the preferred nodes table 124, the network plane 126, the data plane 128, the control plane 130, the data security manager 132, the AMR 134, the analytics manager 136, the algorithms 138, the metadata/data enrichment manager 140, the resource manager 142, the distributed datastore 144, the metadata datastore 146, the raw datastore 148, the interface 150, and/or, more generally, the ADM system 100, could be implemented by processor circuitry, analog circuit(s), digital circuit(s), logic circuit(s), programmable processor(s), programmable microcontroller(s), GPU(s), DSP(s), ASIC(s), programmable logic device(s) (PLD(s)), and/or field programmable logic device(s) (FPLD(s)) such as Field Programmable Gate Arrays (FPGAs). Further still, the ADM system 100 of FIG. 1 may include one or more elements, processes, and/or devices in addition to, or instead of, those illustrated in FIG. 1, and/or may include more than one of any or all of the illustrated elements, processes and devices.

Figure 2:
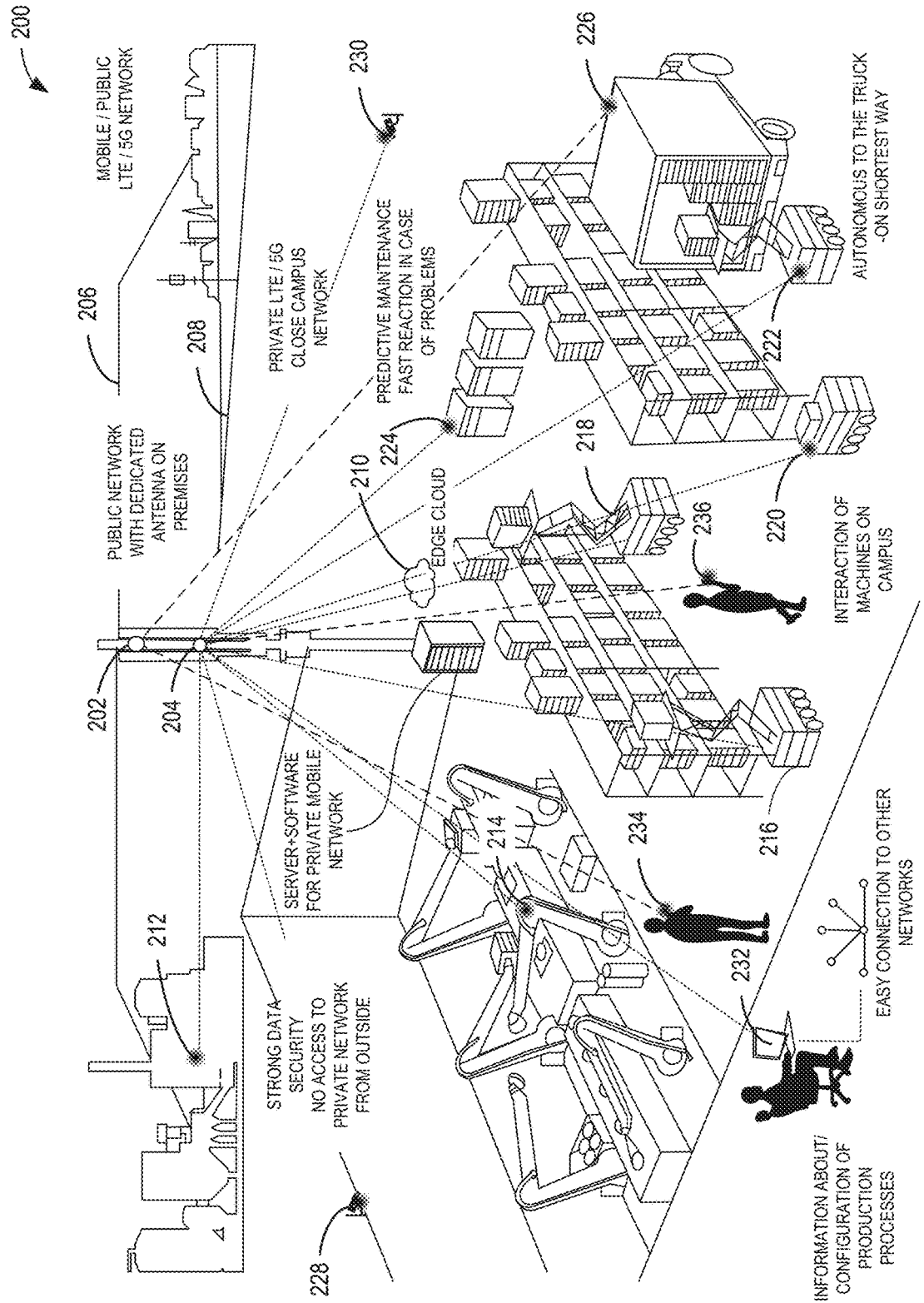
FIG. 2 is an illustration of an example edge network environment including an example edge gateway and an example edge switch that may implement the example ADM system of FIG. 1.

FIG. 2 is an illustration of an example environment 200 including an example gateway 202 and an example switch 204 that may implement the ADM system 100 of FIG. 1 and/or otherwise as disclosed herein. In some examples, the environment 200 is a network environment, an edge network environment, etc. In some examples, the gateway 202 is an edge gateway. In some examples, the switch 204 is an edge switch. In some examples, the gateway 202 and/or the switch 204 may implement resources of the edge devices layer 1310 of FIG. 13 as disclosed below. In some examples the gateway 202 and/or the switch 204 may implement the access point or base station 1240 of FIG. 12, the local processing hub 1250 of FIG. 12, and/or the nodes 1315 of FIG. 13 as disclosed below. For example, the gateway 202 and/or the switch 204 may implement the edge devices layer 1310 of FIG. 13 as disclosed below.

The environment 200 of the illustrated example includes an example public network 206, an example private network 208, and an example edge cloud 210. In this example, the public network 206 can implement and/or include a telephone service provider (TSP) network (e.g., a Long-Term Evolution (LTE) network, a 5G network, a 6G network, a telecommunications (telco) network, etc.). For example, the public network 206 can implement and/or include the network access layer 1320 of FIG. 13, the core network 1330 of FIG. 13, and/or the cloud data center layer 1340 of FIG. 13 as disclosed below. In this example, the private network 208 can implement and/or include an enterprise network (e.g., a close campus network, a closed network, a private LTE network, a private 5G network, a private 6G network, etc.). For example, the private network 208 can implement and/or include the endpoint layer 1300 of FIG. 13 and/or the edge devices layer 1310 of FIG. 13. In some examples, the edge cloud 210 can be implemented by hardware alone, or by any of combination of hardware, software, and/or firmware resources. For example, the edge cloud 210 can be implemented by one or more servers (e.g., computer and/or electronic servers, rack-mounted servers, blade servers, etc.). In this example, the edge cloud 210 can implement and/or include an enterprise edge cloud. For example, the edge cloud 210 can implement and/or include the edge cloud 1210 of FIGS. 12, 13, and/or 14.

In the illustrated example of FIG. 2, the environment 200 can be and/or implement a smart factory (e.g., a smart industrial factory), a process control environment, a smart warehouse, etc. For example, the environment 200 can implement one(s) of the computational use cases 1305 of FIG. 13, such as a manufacturing, smart building, logistics, vehicle, and/or video computational use cases. Additionally or alternatively, the environment 200 may be an office building, a commercial building, a hospital or other medical facility, a research facility, a school or other education facility, an airport, a rail or railway station, a bus depot or station, a government services building or campus, etc., and/or any combination(s) thereof.

The environment 200 of the illustrated example includes an example process control system 212, example robots (e.g., collaborative robots, robot arms, etc.) 214, a first example industrial machine (e.g., an autonomous industrial machine) 216, a second example industrial machine 218, a third example industrial machine 220, a fourth example industrial machine 222, an example predictive maintenance system 224, an example vehicle (e.g., a truck, an autonomous truck, an autonomous vehicle, etc.) 226, a first example monitoring sensor 228, a second example monitoring sensor 230, and example endpoint devices 232, 234, 236. In some examples, the process control system 212 can include one or more industrial machines such as a silo, a smokestack, a conveyor belt, a mixer, a pump, etc., and/or any combination(s) thereof. For example, the process control system 212 can implement and/or include the business and industrial equipment 1263 of FIG. 12, the smart cities and building devices 1266 of FIG. 12, etc., as disclosed below.

In some examples, the robots 214 can be hydraulic and/or electromechanical robots, which can be configured to execute and/or otherwise carry out or perform manufacturing tasks (e.g., lifting equipment or components, assembling components, disassembling components, etc.), industrial tasks, etc. For example, the robots 214 can implement and/or include the business and industrial equipment 1263 of FIG. 12, the smart cities and building devices 1266 of FIG. 12, etc., as disclosed below. In some examples, the industrial machines 216, 218, 220, 222 are autonomous machines, such as AGVs, autonomous forklifts, scissor lifts, etc. For example, the industrial machines 216, 218, 220 can implement and/or include the business and industrial equipment 1263 of FIG. 12, the drones 1265 of FIG. 12, the smart cities and building devices 1266 of FIG. 12, etc., as disclosed below. In some examples, the predictive maintenance system 224 can implement and/or include one or more computing devices, servers, etc., that identify maintenance alerts, fault predictions, etc., associated with equipment of the environment 200 based on sensor data (e.g., prognostic health data, sensor measurements, raw and/or processed sensor data or measurements, etc.). For example, the predictive maintenance system 224 can implement and/or include the business and industrial equipment 1263 of FIG. 12, the smart cities and building devices 1266 of FIG. 12, the sensors and IoT devices 1267 of FIG. 12, etc., as disclosed below.

In some examples, the vehicle 226 can be one of the autonomous vehicles 1261 of FIG. 12 as disclosed below. In some examples, the first monitoring sensor 228 and/or the second monitoring sensor 230 is/are video cameras, video sensors, etc. For example, the first monitoring sensor 228 and/or the second monitoring sensor 230 can implement and/or include the business and industrial equipment 1263 of FIG. 12, the video capture devices 1264 of FIG. 12, the smart cities and building devices 1266 of FIG. 12, the sensors and IoT devices 1267 of FIG. 12, etc., as disclosed below. Alternatively, the first monitoring sensor 228 and/or the second monitoring sensor 230 may be an environmental sensor, such as an air pollution sensor, an air pressure sensor, a carbon dioxide sensor, a carbon monoxide sensor, a humidity sensor, a light sensor, a temperature sensor, a water sensor, a wind speed sensor, etc., or any other type of sensor. Any other type and/or quantity of sensors are contemplated. For example, accelerometers, audio sensors, biometric sensors (e.g., facial recognition detectors, fingerprint sensors, heartbeat sensors, iris recognition sensors, speech recognition sensors, etc.), capacitive sensors (e.g., fingerprint sensors, floor-based sensors to detect when a device and/or an object is on a portion of a floor, etc.), chemical and/or gas sensors, direction sensors (e.g., radio direction finders), electro-optical sensors, encoders (e.g., rotary encoders), geophones, gyroscopes, harmonic sensors, hydrophones, infrared sensors (e.g., infrared position sensors, infrared temperature sensors, etc.), laser rangefinders, laser surface velocimeters, map sensors, microphones, millimeter wave scanners, nanosensors, optical position sensors, photodetectors, pickup sensors, pressure sensors (e.g., floor-based and/or wall-based pressure sensors to detect when a device and/or an object is on a portion of a floor or in contact with a portion of a wall), position sensors, proximity sensors, radar systems (e.g., doppler, ground speed radar ultra-wideband radar), seismometers, shock detectors, sound locators, strain gauges (e.g., floor-based and/or wall-based strain gauges to detect when a device and/or an object is on a portion of a floor or in contact with a portion of a wall), time-of-flight sensors (e.g., time-of-flight cameras), triangulation and LIDAR Automated Rendezvous and Docking (TriDAR), tilt sensors, vibration sensors, etc., and/or any combination(s) thereof, can be included in the ADM system 100 of FIG. 1 (e.g., can be one(s) of the data sources 104 of FIG. 1), and/or the environment 200 of FIG. 2, generate and/or output data to be ingested by the data ingestion manager 106 of FIG. 1, etc., (e.g., utilized as input(s) to an AI/ML model, microservice, algorithm, etc., as disclosed herein).

Examples disclosed herein can utilize any type of wireless communication, technology, technique, or schema. For example, data routing determination techniques as disclosed herein can utilize and/or be based on ANT®, ANT+®, Dash 7, DigiMesh, EnOcean®, Global System for Mobile Communication (GSM), third generation cellular (i.e., 3G), Long-Term Evolution (e.g., LTE Category or Cat 0, LTE Cat 1, LTE Cat 3, LTE-M1, 4G LTE, etc.), 5G, 6G, Bluetooth®, Bluetooth Low-Energy (LE) (or also referred to as BLE), code division multiple access (CDMA), IPv6 over Low-Power Wireless Personal Area Networks (6LoWPAN), LoRaWAN™ (Long Range Wide Area Network), infrared, Narrowband IoT (NB-IoT®), near field communication (NFC®), radiofrequency identification (RFID), random phase multiple access (RPMA), satellite communication (e.g., GPS, a satellite communication protocol based on L-Band, S-Band, C-Band, Ka-Band, Ku-Band, Very High Frequency (VHF), Ultra High Frequency (UHF), etc.) SigFox®, Thread®, Weightless-N, Weightless-P, Weightless-W, Wi-Fi®, Wi-Fi® Direct, WiFi-ah (HaLow), WirelessHART, Zigbee®, Z-Wave®, etc. For example, the terms "wireless," "wireless connection," "wireless communication," wireless data," and/or the like as used herein can refer to one(s) of the above list. For example, "wireless communication" as used herein can be Wi-Fi® communication, Zigbee® communication, etc. The aforementioned list is not exhaustive but provided as an illustrative range of wireless technologies, techniques, or schemas that are contemplated to effectuate example data routing determination techniques as disclosed herein. Furthermore, the aforementioned list may be used to implement unicast and/or multicast data routing to cause the routing of data between nodes in an adaptive and/or proactive manner.

Turning back to the illustrated example of FIG. 2, the endpoint devices 232, 234, 236 include a first example endpoint device 232, a second example endpoint device 234, and a third example endpoint device 236. In some examples, one(s) of the endpoint devices 232, 234, 236 can be and/or implement consumer computing and/or electronic devices, user equipment, etc. For example, one or more of the endpoint devices 232, 234, 236 can implement and/or include the user equipment 1262 of FIG. 12 as disclosed below. In some examples, one or more of the endpoint devices 232, 234, 236 can be and/or be implemented by a smartphone, a tablet computer, a desktop computer, a laptop computer, a wearable device (e.g., a biometric device or sensor, a headset or headset display, an AR headset, a VR headset, a smartwatch, smart glasses, etc.), etc.

In the illustrated example of FIG. 2, the gateway 202 can facilitate communication, data transfers, data routing, etc., between different networks, such as communication from a source service, a source appliance, etc., of the public network 206 to a target service, a target appliance, etc., of the private network 208. For example, the gateway 202 can receive a data stream including one or more data packets (or messages) from a source (e.g., a data source), a producer (e.g., a data producer), etc. In some examples, the gateway 202 can receive the data stream from the vehicle 226, the second endpoint device 234, the third endpoint device 236, etc., to be transmitted to a target service, a target appliance, etc., which can be implemented by the cloud data center 1230 of FIG. 12, the cloud data center 1345 of FIG. 13, the cloud or data center 1460 of FIG. 14, etc., as disclosed below. In some examples, the gateway 202 can effectuate unicast and/or multicast data routing. By way of example, a message that is applicable and/or relevant to multiple electronic devices can be multicast to the multiple electronic devices. For example, a message indicative of a finished end product assembled by one of the robots 214 can be multicast to multiples ones of the industrial machines 216, 218, 220, 222 to cause one(s) of the industrial machines 216, 218, 220, 222 to transport and/or move the finished end product from the one of the robots 214 to elsewhere (e.g., one of the shelves, onto the vehicle 226, etc.).

In some examples, the gateway 202 can facilitate communication, data transfers, data routing, etc., between a source service, a source appliance, etc., of the private network 208 to a target service, a target appliance, etc., of the public network 206. For example, the gateway 202 can receive a data stream, a packet stream, a data packet stream, a message stream, a data message stream, etc., including one or more data packets (or messages) from a source (e.g., a data source), a producer (e.g., a data producer), etc., which can be implemented by the cloud data center 1230 of FIG. 12, the cloud data center 1345 of FIG. 13, the cloud or data center 1460 of FIG. 14, etc., as disclosed below. In some examples, the gateway 202 can receive the data stream from the cloud data center 1230 of FIG. 12, the cloud data center 1345 of FIG. 13, the cloud or data center 1460 of FIG. 14, etc., to be transmitted to the vehicle 226, the second endpoint device 234, the third endpoint device 236, etc.

In the illustrated example of FIG. 2, the switch 204 can facilitate communication, data transfers, data routing, etc., between different sources and targets within a network, such as communication from a source service, a source appliance, etc., of the private network 208 to a target service, a target appliance, etc., of the private network 208. For example, the switch 204 can receive a data stream from the gateway 202, the edge cloud 210, the process control system 212, one(s) of the robots 214, one(s) of the industrial machines 216, 218, 220, 222, the predictive maintenance system 224 (or sensor(s) thereof), the first monitoring sensor 228, the second monitoring sensor 230, the first endpoint device 232, the second endpoint device 234, the third endpoint device 236, etc. In some examples, the switch 204 can transmit or cause transmission of the data stream to a destination within the private network 208. For example, the switch 204 can transmit or cause transmission of the data stream to at least one of the gateway 202, the edge cloud 210, the process control system 212, one(s) of the robots 214, one(s) of the industrial machines 216, 218, 220, 222, the predictive maintenance system 224 (or sensor(s) thereof), the vehicle 226, the first monitoring sensor 228, the second monitoring sensor 230, the first endpoint device 232, the second endpoint device 234, or the third endpoint device 236.

In some examples, the gateway 202 and/or the switch 204 can implement and/or effectuate adaptive data management based on global observability at the edge, which can be implemented by the environment 200 or portion(s) thereof. In some examples, the environment 200 can implement a large number and/or different types of applications, such as machine vision applications implemented by the robots 214, autonomous driving applications implemented by the vehicle 226, etc. In some examples, the data generated by the private network 208 is relatively diverse because of the vast range of data sources, such as sensors, controllers, services (e.g., applications, microservices, virtual machines, containers, etc.), and/or user input (e.g., input from a human user or a device user, such as a robot) that can be processed and analyzed to identify anomalies and trends in the data. For example, the gateway 202 and/or the switch 204 can facilitate the transmission and/or routing of data, which can include sensor data or measurements, alerts, steps or operations of a workflow (e.g., a maintenance workflow to repair the robots 214, an installation workflow to install the robots 214, etc.), video feeds, still images, predictive maintenance alerts or control commands, robotic control commands, etc., and/or any combination(s) thereof.

In some examples, the gateway 202 and/or the switch 204 can transfer and/or route data to components of the ADM system 100 of FIG. 1 to execute one(s) of the algorithms 138 to implement adaptive and/or proactive data routing and/or, more generally, ADM as disclosed herein. In some examples, the gateway 202 and/or the switch 204 can execute and/or instantiate the one(s) of the algorithms 138 to implement adaptive and/or proactive data routing, and/or, more generally, ADM as disclosed herein. In some examples, there are a plurality of the gateways 202 and/or a plurality of the switches 204 in the environment 200. The algorithms 138 of FIG. 1 can be executed and/or instantiated in multiple places of the environment 200 (e.g., by ones of the gateways 202, the switches 204, etc., or by any other device(s)). In some examples, the different ones of the edge gateways 202, the edge switches 204, etc., may have more or less observability based on the data that they process, ingest, and/or otherwise encounter. Accordingly, two different ones of the devices of FIG. 2 can develop, train (or retrain), and/or generate different one(s) of the algorithms 138 based on the data (and/or metadata) processed by each of the different ones of the devices. For example, a first one of the switches 204 may observe 10% of the environment 200 and a second one of the switches 204 may observe 90% of the environment 200, which may become the basis for the differences in data outputs generated by the algorithms 138 executed and/or instantiated by the first and second one of the devices. In some examples, the first one of the devices may transmit and/or cause routing of model outputs (e.g., data outputs, AI/ML model outputs, etc.) from its execution and/or instantiation of the algorithms 138 to the second one of the devices. In some examples, the second one of the devices may transmit and/or cause routing of model outputs (e.g., data outputs, AI/ML model outputs, etc.) from its execution and/or instantiation of the algorithms 138 to the first one of the devices for cross-training and/or cross-correlation of the algorithms 138.

In some examples, data (and/or metadata) generated by the private network 208 may be immense. In some examples, a data source, such as the process control system 212, one(s) of the robots 214, one(s) of the industrial machines 216, 218, 220, 222, the predictive maintenance system 224 (or sensor(s) thereof), the vehicle 226, the first monitoring sensor 228, the second monitoring sensor 230, the first endpoint device 232, the second endpoint device 234, and/or the third endpoint device 236, may have insufficient computing resources (e.g., one or more processors, one or more accelerators, one or more memories, one or more mass storage discs, etc.) to analyze the data (and/or metadata) generated by the data source. In some examples, the data source may be unable to identify redundant data, less important or less significant data, etc., due to insufficient computing resources and therefore may flood the private network 208 with a significant quantity of data at relatively short intervals. Advantageously, the gateway 202, the switch 204, and/or, more generally, the ADM system 100 of FIG. 1, may implement ADM as disclosed herein to process data based on at least one of a content and/or a context of the data to effectuate adaptive and/or proactive data routing to appropriate and/or optimal end users.

Figure 3:
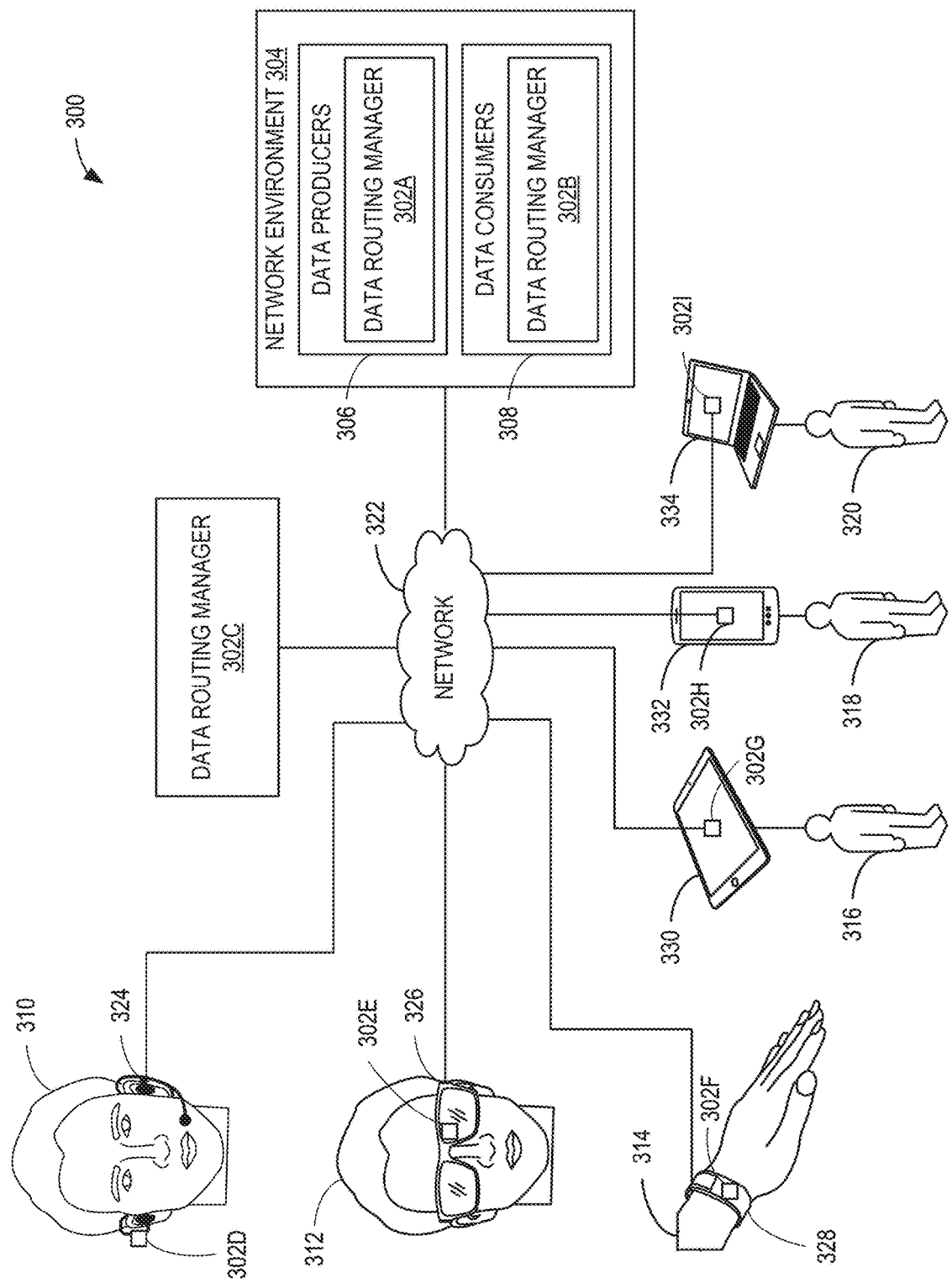
FIG. 3 is a block diagram of an example data routing management system including an example data routing manager to implement proactive data routing in a network environment.

FIG. 3 is a block diagram of an example data routing management system 300 including an example data routing manager 302A-I to implement proactive data routing in a network environment, which can be implemented by an example network environment 304. In some examples, the network environment 304 can be implemented by one of the computational use cases 1305 of FIG. 13. For example, the network environment 304 can be implemented by a manufacturing plant, a healthcare facility (e.g., a hospital), a smart building, a smart city, a transportation logistics system, a retail store, etc. The network environment 304 of the illustrated example includes example data producers 306 and example data consumers 308. In some examples, the data producers 306 can be implemented using one(s) of the data sources 104 of FIG. 1, one(s) of the data sources 1260 of FIG. 12, etc. For example, the data producers 306 can be implemented using a sensor, a vehicle, a mobile or handheld electronic device (e.g., a smartphone, a tablet computer, etc.), an IoT device, etc. In some examples, the data consumers 308 can be implemented using one(s) of the central office 1220, the cloud data center 1230, the access point or base station 1240, the local processing hub 1250, etc., of FIG. 12, the nodes 1315, the local network equipment 1325, the core network data center 1335, the cloud data center 1345, etc., or any other type of electronic device such as a server, an infrastructure processing unit (IPU), etc.

The data producers 306 include a first example data routing manager 302A and the data consumers 308 include a second example data routing manager 302B. A third example data routing manager 302C, a fourth example data routing manager 302D, a fifth example data routing manager 302E, a sixth example data routing manager 302F, a seventh example data routing manager 302G, an eighth example data routing manager 302H, and a ninth example data routing manager 302I are also depicted in the illustrated example. The first through ninth data routing managers 302A-I are collectively referred to as the data routing manager 302A-I. For example, each of the data routing managers 302A-I can have the same functionality. In some examples, one(s) of the data routing managers 302A-I can have first functionality that is the same across the data routing managers 302A-I and second functionality that is different from other one(s) of the data routing managers 302A-I.

In example operation, the data producers 306 can generate and/or otherwise produce data for consumption by the data consumers 308. For example, the data producers 306 can generate data, which can include one or more data objects and/or associated metadata. In some examples, the data producers 306 can generate data (and/or metadata) formatted as an Internet message (e.g., a Hypertext Transfer Protocol (HTTP) message). However, the data producers 306 can generate data based on any other message format and/or protocol such as, for example, file transfer protocol (FTP), simple message transfer protocol (SMTP), HTTP secure (HTTPS), JavaScript Object Notation (JSON), Abstract Syntax Notation One (ASN.1), eXtensible Markup Language (XML), etc., and/or any Information-centric networking protocol/format/scheme, etc.

In example operation, the data routing manager 302A-I can cause propagation of and/or route data generated by the data producers 306 to example users 310, 312, 314, 316, 318, 320 by way of an example network 322. In some examples, the data can be unicast to one of the users 310, 312, 314, 316, 318, 320. In some examples, the data can be multicast to one(s) of the users 310, 312, 314, 316, 318, 320. For example, if a message is relevant and/or associated with more than one of the users 310, 312, 314, 316, 318, 320, then the message can be multicast to the multiple users 310, 312, 314, 316, 318, 320. The network 322 of the illustrated example is the Internet. However, the network 322 may be implemented using any suitable wired and/or wireless network(s) including, for example, one or more data buses, one or more LANs, one or more WLANs, one or more cellular networks, one or more satellite networks, one or more private networks, one or more public networks, one or more terrestrial networks, one or more non-terrestrial networks, one or more beyond-line-of-site (BLOS) networks, one or more line-of-site (LOS) networks, etc. In some examples, one(s) of the users 310, 312, 314, 316, 318, 320 can be associated with a node (e.g., a logical node or entity) of the data routing management system 300.

The network 322 enables the data routing manager 302A-I to be in communication with one(s) of the users 310, 312, 314, 316, 318, 320 by way of a respective example electronic device 324, 326, 328, 330, 332, 334. The users 310, 312, 314, 316, 318, 320 are associated with the network environment 304. For example, the users 310, 312, 314, 316, 318, 320 can be supervisors and/or technicians in a manufacturing plant of factory, medical personnel (e.g., a doctor, nurse, orderly, administrator, maintenance personnel, etc.) in a healthcare facility, office workers (e.g., engineers and/or project managers in a technology company, accountants and/or lawyers in an accounting or consulting firm, etc.) in an office or commercial building, etc. The users 310, 312, 314, 316, 318, 320 include a first example user 310, a second example user 312, a third example user 314, a fourth example user 316, a fifth example user 318, and a sixth example user 320.

In some examples, one(s) of the users 310, 312, 314, 316, 318, 320 can be human users, such as a human user associated with a computing and/or electronic device. For example, the first user 310 can be a maintenance technician associated with one of the robots 214. In some examples, the fourth user 316 can be a magnetic resonance imaging (MRI) technician associated with an MII machine. In some examples, one(s) of the users 310, 312, 314, 316, 318, 320 can be non-human users, such as the robots 214, the first industrial machine 216, the second industrial machine 218, the third industrial machine 220, the fourth industrial machine 222, the predictive maintenance system 224, the vehicle 226, the first monitoring sensor 228, the second monitoring sensor 230, and/or one(s) of the endpoint devices 232, 234, 236 of FIG. 2. In some examples, the users can be a combination of a human user and a computing/electronic device. For example, the first user 310 can be the vehicle 226, which can provide automated or autonomous outputs to control the vehicle 226, and an associated driver, which can provide manual and/or override outputs to control the vehicle 226.

The electronic devices 324, 326, 328, 330, 332, 334 of the illustrated example of FIG. 3 include a first example electronic device 324, a second example electronic device 326, a third example electronic device 328, a fourth example electronic device 330, a fifth example electronic device 332, and a sixth example electronic device 334. In this example, the first electronic device 324 is a headset electronic device associated with the first user 310. The second electronic device 326 is a pair of smart glasses (or a headset or headset display, an AR headset, a VR headset, etc.) associated with the second user 312. The third electronic device 328 is a smartwatch (or other type of wearable device such as a smart band or smart wristband, a fitness tracker, a biometric sensor/tracker/device, etc.) associated with the third user 314. The fourth electronic device 330 is a tablet computer associated with the fourth user 316. The fifth electronic device 332 is a handheld mobile device (e.g., a smartphone, a personal digital assistant (PDA), etc.) associated with the fifth user 318. The sixth electronic device 334 is a laptop computer (or a desktop computer, workstation, computing terminal, etc.) associated with the sixth user 320. A different quantity and/or different type(s) of electronic device(s) may additionally and/or alternatively be included in the data routing management system 300.

In the illustrated example, the data routing manager 302A-I can be executed and/or instantiated by respective ones of the data producers 306, the data consumers 308, and the electronic devices 324, 326, 328, 330, 332, 334. For example, the fourth electronic device 330 can execute and/or instantiate the seventh data routing manager 302G on the fourth electronic device 330. In some examples, one(s) of the electronic devices 324, 326, 328, 330, 332, 334 can execute and/or instantiate portion(s) of the data routing manager 302A-I. In some examples, the data routing manager 302A-I can be implemented by hardware alone, and/or by using any combination of hardware, software (e.g., one or more software applications, one or more services, one or more microservices, etc.), and/or firmware. The third data routing manager 302C can be executed and/or instantiated by a central or centralized node. For example, the third data routing manager 302C can be executed and/or instantiated by processor circuitry separate from the data producers 306, the data consumers 308, and the electronic devices 324, 326, 328, 330, 332, 334.

In example operation, the data producers 306 and/or one(s) of the electronic devices 324, 326, 328, 330, 332, 334 can generate data (and/or metadata) associated with the network environment 304. For example, one(s) of the data producers 306 can generate data (and/or metadata) associated with a completion and/or operation of a vehicle manufacturing stage (e.g., assembling a vehicle door, painting a vehicle body, etc.). In some examples, the one(s) of the data producers 306 can transmit the data to one(s) of the electronic devices 324, 326, 328, 330, 332, 334. For example, the first data routing manager 302A can transmit and/or route the data to the second electronic device 326 via the network 322 and/or one or more intervening device(s) (e.g., a gateway, a switch, a router, one(s) of the electronic devices 324, 326, 328, 330, 332, 334, etc.). The following description is in connection with the first data routing manager 302A of the data producers 306 (e.g., one or more of the data producers 306), but is applicable to any other one(s) of the data routing manager 302A-I.

In example operation, the first data routing manager 302A can determine that the data (and/or metadata) is to be published, routed, and/or propagated to other one(s) of the users 310, 312, 314, 316, 318, 320. In some examples, the first data routing manager 302A can generate a list of the users 310, 312, 314, 316, 318, 320 associated with a first node of the data routing management system 300. In some examples, the first data routing manager 302A can query one or more second nodes (e.g., neighboring nodes, trusted or authorized nodes, relevant nodes, etc.) for their respective lists of users. In some examples, the first data routing manager 302A can generate a list (e.g., a primary list) of first user(s) (e.g., one(s) of the users 310, 312, 314, 316, 318, 320 associated with the first node) and/or second user(s) (e.g., users associated with the one or more neighboring nodes).

In example operation, the first data routing manager 302A can execute and/or instantiate an AI/ML model (e.g., a classification model, a neural network model, etc.) with the data (and/or metadata) as model input(s) to generate model output(s), which can include a relevancy score for respective one(s) of the first user(s) and/or the second user(s). For example, the relevancy score can refer to a representation of a relevancy or strength of association of data, or portion(s) thereof, with a user and/or metadata associated with the user. In some examples, the first data routing manager 302A can identify one(s) of the first user(s) and/or the second user(s) whose relevancy score satisfies a threshold (e.g., a relevancy score threshold). In some examples, the first data routing manager 302A can deliver, provide, and/or otherwise cause transmission of a data message including the data (or portion(s) thereof) and/or associated metadata to the one(s) of the first user(s) and/or the second user(s) whose relevancy score satisfies the threshold.

Advantageously, the first data routing manager 302A can surface the data message, which can implement an alert or urgent notification, to appropriate one(s) of the users 310, 312, 314, 316, 318, 320 to ensure an appropriate action, operation, task, etc., is executed to address and/or mitigate the alert or the urgent notification. Advantageously, the first data routing manager 302A can continuously learn (e.g., by training/retraining the AI/ML model) which one(s) of the users 310, 312, 314, 316, 318, 320 is/are associated with different types of data (and/or metadata). For example, the first data routing manager 302A can update (e.g., add, change, remove, modify, etc.) metadata associated with user(s) who respond and/or user(s) who do not respond to the data message to improve future routing of data (and/or metadata) to the appropriate and/or necessary user. In some examples, the first data routing manager 302A can propagate the metadata to one(s) of the data consumers 308, one(s) of the electronic devices 324, 326, 328, 330, 332, 334, etc., and/or any combination(s) thereof, to improve their respective learning associated with future routing of data in the data routing management system 300. Advantageously, by improving their respective learning associated with future routing of data, reduced latency can be achieved in the data routing management system 300 by routing data to appropriate one(s) of the users 310, 312, 314, 316, 318, 320, one(s) of the electronic devices 324, 326, 328, 330, 332, 334, etc., with reduced time compared to previous iterations, instantiations, etc., of the data routing management system 300.

Figure 4:
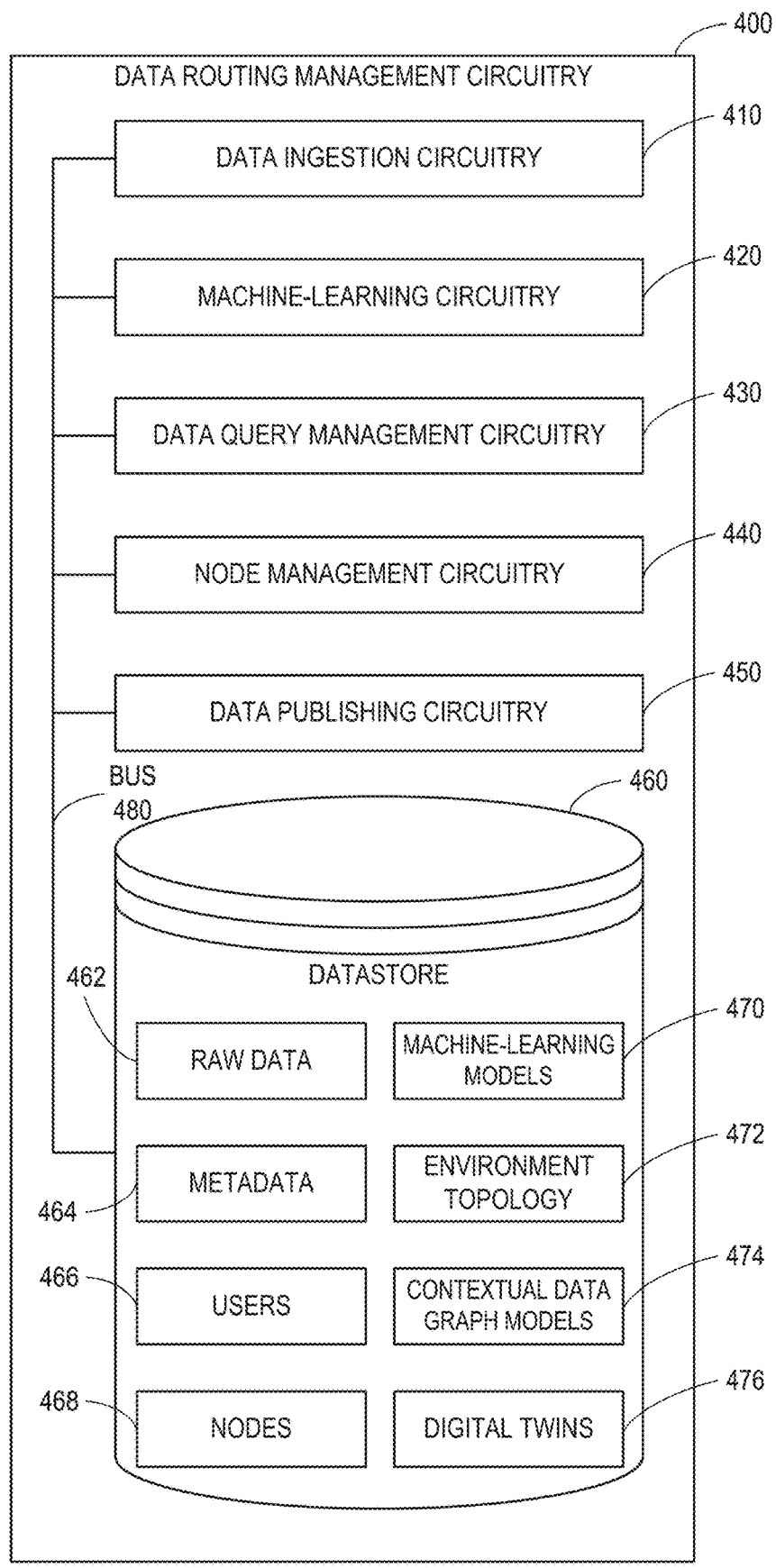
FIG. 4 is a block diagram of an example implementation of the data routing manager of FIG. 3.

FIG. 4 is a block diagram of example data routing management circuitry 400. In some examples, the data routing management circuitry 400 can implement the data routing manager 302A-I of FIG. 3. In some examples, the data routing management circuitry 400 can implement portion(s) of the ADM system 100 of FIG. 1, such as the data ingestion manager 106, the data query manager 110, the data publishing manager 118, the node manager 122, the data security manager 132, the AMR 134, the analytics manager 136, the distributed datastore 144, etc. The data routing management circuitry 400 of FIG. 4 may be instantiated (e.g., creating an instance of, bring into being for any length of time, materialize, implement, etc.) by processor circuitry such as a central processing unit executing instructions. Additionally or alternatively, the data routing management circuitry 400 of FIG. 4 may be instantiated (e.g., creating an instance of, bring into being for any length of time, materialize, implement, etc.) by an ASIC or an FPGA structured to perform operations corresponding to the instructions. It should be understood that some or all of the data routing management circuitry 400 of FIG. 4 may, thus, be instantiated at the same or different times. Some or all of the data routing management circuitry 400 may be instantiated, for example, in one or more threads executing concurrently on hardware and/or in series on hardware. Moreover, in some examples, some or all of the data routing management circuitry 400 of FIG. 4 may be implemented by microprocessor circuitry executing instructions to implement one or more virtual machines and/or containers.

The data routing management circuitry 400 of the illustrated example includes example data ingestion circuitry 410, example machine-learning circuitry 420, example data query management circuitry 430, example node management circuitry 440, example data publishing circuitry 450, an example datastore 460, and an example bus 480. The datastore 460 of the illustrated example includes example raw data 462, example metadata 464, example users 466, example nodes 468, example machine-learning models 470, an example environment topology 472, example contextual data graph models 474, and example digital twins 476.

In the illustrated example, the data ingestion circuitry 410, the machine-learning circuitry 420, the data query manage-ment circuitry 430, the node management circuitry 440, the data publishing circuitry 450, and the example datastore 460 are in communication with one(s) of each other by way of the bus 480. For example, the bus 480 can be implemented using at least one of an I2C bus, a SPI bus, a PCI bus, or a PCIe or PCIE bus. Additionally or alternatively, the bus 480 can be implemented by any other type of computing or electrical bus. In some examples, the bus 480 can implement the data plane 128, the control plane 130, and/or, more generally, the network plane 126 of FIG. 1, or portion(s) thereof.

The data routing management circuitry 400 of the illustrated example includes the data ingestion circuitry 410 to receive data (e.g., one or more messages), determine whether new data is received and/or otherwise ready to be ingested, etc. In some examples, the data ingestion circuitry 410 can implement the data ingestion manager 106 of FIG. 1, or portion(s) thereof. In some examples, the data ingestion circuitry 410 is instantiated by processor circuitry executing data ingestion instructions and/or configured to perform operations such as those represented by one(s) of the flowcharts of FIGS. 17-40.

In some examples, the data ingestion circuitry 410 extracts data object(s) from data, message(s), etc., and/or pre-processes the data object(s). In some examples, the data ingestion circuitry 410 obtains metadata associated with an environment, such as the environment 200 of FIG. 2. For example, the data ingestion circuitry 410 can obtain the metadata 464 from the datastore 460, or metadata from one or more nodes of the environment 200.

In some examples, the data ingestion circuitry 410 tracks and/or identifies a routing of data, metadata, etc., in an environment, such as the environment 200. For example, the data ingestion circuitry 410 can obtain telemetry data associated with data as the data is transmitted from node-to-node in the environment 200. In some examples, node(s) of the environment 200 can execute a telemetry microservice to transmit telemetry data associated with data the node(s) receive to other node(s) (e.g., neighboring nodes, a central or centralized node, an orchestrator, etc.). For example, at each hop (e.g., node hop) in the routing of data from a first node to a second node via one or more third nodes, the data ingestion circuitry 410 can determine which of the one or more third nodes the data is routed through and/or a timestamp at which the one or more third nodes received the data. In some examples, the data routing is based on the environment topology 472. Advantageously, the data ingestion circuitry 410 can determine an actual data routing path of data, a message, etc., in an environment, such as the environment 200.

In some examples, the data ingestion circuitry 410 can determine whether a message is associated with a user. In some examples, the data ingestion circuitry 410 can determine whether the message indicates that the user initiated an action in response to receiving a different message. In some examples, the data ingestion circuitry 410 can determine whether a user acknowledged that a portion of a data object (e.g., an augmented data object) is relevant to a user. For example, the second user 312 can receive a message, which includes an augmented and/or otherwise modified data object. In some examples, the second user 312 can generate a message (e.g., by using the second electronic device 326) that indicates that one or more portions of the augmented data object is relevant to the user 312 and/or one or more portions of the augmented data object are not relevant to the user 312. In some examples, the data ingestion circuitry 410 can determine whether a received message is indicative of a user affirming a relevancy, an association, etc., of a message that was presented to the user.

In some examples, the data ingestion circuitry 410 can receive and/or otherwise ingest sensor and/or location data. For example, the data ingestion circuitry 410 can receive video data from a video camera, a beacon signal from a radio frequency identification device (RFID) terminal, a use of login credentials (e.g., a username or user identifier, a password, biometric data such as an eye scan or fingerprint, etc.) at an electronic terminal (e.g., a laptop computer, a desktop computer, a control station, etc.), etc. In some examples, the data ingestion circuitry 410 can determine whether a location of a user changed based on the ingested sensor and/or location data. For example, the data ingestion circuitry 410 can receive first sensor data that locates and/or places the first user 310 in a first location at a first time and receive second sensor data that locates the first user 310 in a second location at a second time after the first time.

In some examples, the data ingestion circuitry 410 determines whether an event associated with an environment has occurred. For example, the data ingestion circuitry 410 can obtain and/or ingest data that has been transmitted and/or routed over one or more nodes of one or more networks. In some examples, the data includes metadata. In some examples, the data ingestion circuitry 410 can determine that the metadata includes a first tag associated with one of the robots 214 and a second tag associated with an alert, error code, and/or fault code associated with the one of the robots 214. For example, the data ingestion circuitry 410 can detect an event, which can be an error, fault, and/or maintenance condition, associated with the one of the robots 214 based on the ingested data. In some examples, the data ingestion circuitry 410 determines whether to continue monitoring an environment, such as the environment 200 of FIG. 2, for events or event generation. In some examples, the data ingestion circuitry 410 determines whether to continue monitoring an environment, such as the environment 200 of FIG. 2, for received data, metadata, messages, etc.

The data routing management circuitry 400 of the illustrated example includes the machine-learning circuitry 420 to execute a machine-learning model (e.g., the machine-learning model 470) to generate output(s) (e.g., model output(s)), which can include an authorization score, a confidence score, and/or a relevancy score associated with a user. In some examples, the output(s) can include the users 466, the nodes 468, etc. In some examples, the output(s) can include a data routing path associated with the environment topology 472. For example, the output(s) can include a data routing path representative of transmission of data from a first node to a second node either directly (e.g., without intervening node(s)) or indirectly (e.g., via one or more third nodes).

As used herein, the terms "data routing path," "message routing path," "metadata routing path," "message data routing path," and "network routing path" are used interchangeably and refer to the delivery, transmission, provisioning, and/or propagation of data, messages, metadata, etc., and/or any combination(s) thereof from a source (e.g., a source node, a source computing and/or electronic device, etc.) to a destination (e.g., a destination node, a destination computing and/or electronic device, etc.) either directly (e.g., via direct and/or point-to-point transmission, via zero intervening nodes, via zero intervening computing/electronic devices, etc.) or indirectly (e.g., via a network, via one or more intervening nodes, via one or more intervening computing/electronic devices, etc.). For example, a data routing path from a first node to a second node can be implemented by transmission of data from the first node to one or more third nodes and finally to the second node. In some examples, a data routing path from a first node to a second node can be implemented by transmission of data from the first node to the second node via a direct wired or wireless connection.

In some examples, the machine-learning circuitry 420 can implement the algorithms 138, and/or, more generally, the analytics manager 136 of FIG. 1, or portion(s) thereof. In some examples, the machine-learning circuitry 420 executes and/or instantiates a machine-learning microservice to generate machine-learning output(s) based on machine-learning input(s). In some examples, the machine-learning circuitry 420 determines whether a machine-learning microservice is deployed. For example, the machine-learning circuitry 420 can determine that a trained on one of the machine-learning models 470 is deployed for use as a microservice. In some examples, the determination can be based on whether the microservice is accessible for use by a node, such as by being stored as one of the algorithms 138 of FIG. 1. In some examples, the machine-learning circuitry 420 is instantiated by processor circuitry executing machine-learning instructions and/or configured to perform operations such as those represented by one(s) of the flowcharts of FIGS. 17-40.

In some examples, the machine-learning circuitry 420 executes and/or instantiates a machine-learning microservice to generate the machine-learning model 470 based on data associated with an environment, such as the network environment 304. In some examples, the machine-learning circuitry 420 executes and/or instantiates a machine-learning microservice to analyze received data, such as data ingested by the data ingestion circuitry 410. In some examples, the machine-learning circuitry 420 executes and/or instantiates the machine-learning model 470 to generate data graphs (or data graph models) corresponding to respective portions of the environment. In some examples, the machine-learning circuitry 420 executes and/or instantiates the machine-learning model 470 to identify hotspots of at least one of expert nodes or stakeholder nodes.

In some examples, the machine-learning model 470 updates metadata associated with response(s) and/or non-response(s) by user(s) to data traffic (e.g., one or more messages). In some examples, the machine-learning model 470 updates metadata associated with cause(s) of action(s) and effect(s) of the action(s) based on the data traffic. In some examples, the machine-learning model 470 updates at least one of the data graphs (or data graph models) or the hotspots based on a routing of the data traffic. In some examples, the machine-learning model 470 identifies a stratification of nodes and super nodes based on the routing of the data traffic. In some examples, the machine-learning model 470 retrains the machine-learning model 470 based on at least one of the update(s) or other data, which can include activity information, sensor data, etc.

As used herein, the term "authorization score" refers to a value (e.g., a data value) that represents a likelihood or probability that a user has access (e.g., is authorized to access) to specific data. For example, an authorization score for a user can be based on an organization structure to which the user belongs. In some examples, the authorization score can be based on organizational data associated with the user, which can include a name, a job description or role, technical expertise or knowledge, a level of organizational seniority, a level of an organization hierarchy to which the user belongs (e.g., a manager that the user reports to, direct report(s) of the user or those that report to the user, etc.), security credentials, and the like.

As used herein, the term "confidence score" refers to a likelihood or probability that an output from the machine-learning model 470 is accurate, appropriate, and/or otherwise useful. In some examples, the confidence score can refer to a representation of accuracy or a level of error of the machine-learning model 470. For example, the machine-learning model 470 can generate an output, which can be an identification of the first user 310 as being associated with data, and a corresponding confidence score. In some examples, the machine-learning model 470 can generate a confidence score of 0.8, which can be representative of an 80% likelihood that the data is relevant to the first user 310.

As used herein, the term "relevancy score" refers to a value that represents a likelihood or probability that data, or portion(s) thereof, is relevant to a user. In some examples, the relevancy score can refer to a representation of a relevancy or strength of association of data, or portion(s) thereof, with a user and/or metadata associated with the user. In some examples, metadata can have a direct association, such as by being directly associated with a user, a node, a device, an event (e.g., a physical or actual event in a physical or actual environment, a virtual or simulated event in a virtual or simulated environment, event data, etc.), etc., and/or any combination(s) thereof. For example, metadata can have a first-order or primary-order relationship with a user, a node, a device, an event, etc., in which the metadata corresponds to the user, the node, the device, the event, etc. By way of example, metadata can include a first serial number of a first one of the robots 214. In this example, the metadata can be directly associated with the first one of the robots 214 based on a determination that the first one of the robots 214 has the first serial number.

In some examples, metadata can have an indirect association, such as by being indirectly associated with a user, a node, a device, an event (e.g., a physical or actual event in a physical or actual environment, a virtual or simulated event in a virtual or simulated environment, event data, etc.), etc., and/or any combination(s) thereof. For example, metadata can have a second-order, third-order, etc., or secondary-order relationship with a user, a node, a device, an event, etc., in which the metadata indirectly corresponds to the user, the node, the device, the event, etc. By way of example, metadata can include a first serial number of a first one of the robots 214 and a manufacturer identifier that identifies a manufacturer of the first one of the robots 214. In this example, the metadata can be indirectly associated with a second one of the robots 214 based on a determination that the first and second one of the robots 214 have different serial numbers and the same manufacturer identifier (e.g., they have the same manufacturer).

In some examples, the machine-learning circuitry 420 can determine whether the authorizations score, the confidence score, and/or the relevancy score satisfies a respective one of a first threshold (e.g., an authorization score threshold), a second threshold (e.g., a confidence score threshold), or a third threshold (e.g., a relevancy score threshold). In some examples, the machine-learning circuitry 420 can update metadata associated with a user, such as the first user 310, in response to a determination whether the user responded to a message or did not respond to the message. For example, the machine-learning circuitry 420 can determine that the first user 310 may find a message relevant because first metadata associated with the first user 310 can be associated with second metadata associated with the message. In some examples, in response to the first user 310 ignoring and/or otherwise not responding to the message, the machine-learning circuitry 420 can penalize the first metadata by reducing a relevancy score corresponding to the first metadata, removing portion(s) of the first metadata that matched and/or otherwise corresponded to the second metadata, and/or any combination(s) thereof. In some examples, the machine-learning circuitry 420 can penalize the first metadata in response to the first user 310 responding to the message by acknowledging that one or more portions of the message are not relevant to the first user 310. In some examples, in response to the first user 310 responding to the message by performing an action in connection with the message, acknowledging that the message is relevant to the first user 310, etc., the machine-learning circuitry 420 can reward the first metadata. For example, the machine-learning circuitry 420 can reward the first metadata by increasing a relevancy score corresponding to the first metadata. In some examples, by increasing the relevancy score of the first metadata, future or subsequent messages that have metadata corresponding to the first metadata may be prioritized to be routed to the first user 310.

In some examples, the machine-learning circuitry 420 penalizes metadata associated with a non-responsive user based on a level of busyness or lack of availability of the non-responsive user based on activity information (e.g., electronic activity information), sensor data, etc. For example, the fourth user 316 can receive a message associated with an event (e.g., a manufacturing operation has been completed, halted due to a failure or fault, etc.) in the network environment 304 and the fourth user 316 may ignore the message. In some examples, the machine-learning circuitry 420 can analyze sensor data associated with the first user 310. For example, the machine-learning circuitry 420 can determine, based on video data that includes the fourth user 316, that the fourth user 316 picked up the fourth electronic device 330 at approximately the time the message is transmitted to the fourth electronic device 330, but the fourth user 316 did not acknowledge the message or respond to the message. In some examples, the machine-learning circuitry 420 can penalize the metadata associated with the fourth user 316 because the fourth user 316 appeared to not find the message relevant. By way of another example, the machine-learning circuitry 420 can determine, based on utilization data of the fourth electronic device 330, that the fourth user 316 ignored the message because the fourth user 316 is executing a time-sensitive task (e.g., a time-sensitive task indicated by increased levels of applications or services in operation, increased levels of computational, storage, or memory resources indicative of heavy utilization, etc.). In some examples, the machine-learning circuitry 420 may not penalize the metadata associated with the fourth user 316 because the fourth user 316 is identified as busy or not available to respond to the message. In some examples, the machine-learning circuitry 420 can determine that the message is to be presented to the fourth user 316 again in response to determining that the fourth user 316 completed the time-sensitive task.

By way of example, if a user dismisses a message, then the machine-learning circuitry 420 can generate an updated relevancy score that penalizes the metadata that matched this user to the message. The machine-learning circuitry 420 can determine how much to penalize by attempting to quantify how busy is this user at that point in time. The machine-learning circuitry 420 can determine a level of busyness using sensors (e.g., a video camera) in the network environment 304, behavior on all electronic devices that the user can engage with, and, if approved, biometric sensors that are embedded in wearable devices that the user can engage with such as smartwatches, smart glasses, etc. Examples of collected data can include gaze (e.g., using a laptop camera), heart rate from a smartwatch, and emotional status from a video camera in the network environment 304. In some examples, the machine-learning circuitry 420 can generate and maintain a baseline for each user to determine a deviation from the baseline. For example, the deviation can be interpreted as an increase in busyness of the user, a distraction level of the user, a level of engagement of the user with an electronic device or other type of machinery or equipment in the network environment 304, etc.

In some examples, the machine-learning circuitry 420 determines to update a relevancy score of a location associated with a user based on sensor data. For example, the machine-learning circuitry 420 can increase a relevancy score of a location for a user in response to determining that the user is at the location. In some examples, the machine-learning circuitry 420 can decrease a relevancy score of a location for a user in response to determining that the user is not at the location or has not been at the location longer than a specified time duration.

In some examples, the machine-learning circuitry 420 determines that data received at a node indicates that an action is required by a user. For example, the machine-learning circuitry 420 can determine that data indicates a message is to be provided to a user based on the context and/or content of the data. In some examples, the machine-learning circuitry 420 can determine that the message is to be an alert that requires immediate attention (e.g., to avert, avoid, and/or mitigate a potential or predicted failure).

In some examples, the machine-learning circuitry 420 determines that data received at a node indicates that feedback is requested from one or more users (e.g., technical or subject matter experts, management personnel, technicians, financial or other administrative personnel, etc.). In some examples, the machine-learning circuitry 420 can update metadata associated with the one or more users based on received feedback.

In some examples, the machine-learning circuitry 420 can determine that a user acknowledged that a first portion of a data object (e.g., an augmented data object) is relevant to a user and a second portion of the data object is not relevant to the user. In some examples, the machine-learning circuitry 420 can modify metadata associated with the user to associate the first portion with the user and disassociate the second portion from the user.

In some examples, the machine-learning circuitry 420 can determine to increase a relevancy score of a topic associated with a user in response to the user responding to a message having the topic. In some examples, the machine-learning circuitry 420 can determine to decrease a relevancy score of a topic associated with a user in response to the user ignoring a message having the topic. In some examples, the machine-learning circuitry 420 can determine whether a relevancy score of a topic associated with a user satisfies a threshold. For example, in response to determining that the topic relevancy score is greater than the threshold, the user may be identified as an expert, a stakeholder, etc., in connection with the topic.

In some examples, the machine-learning circuitry 420 can execute the machine-learning models 470 to output a first data routing path in an environment, such as the environment 200 and/or the network environment 304, based on first metadata associated with an event in the environment. For example, the machine-learning circuitry 420 can execute and/or instantiate the machine-learning models 470 as microservice(s) to generate output(s), which can be representative of, indicative of, and/or correspond to a data routing path of a data message from the first data routing manager 302A to the fifth data routing manager 302E via one or more nodes, such as gateways, switches, other data routing managers, etc., and/or any combination(s) thereof. In some examples, the machine-learning circuitry 420 can execute and/or instantiate the machine-learning models 470 to detect a pattern of data routing paths associated with event(s) and/or associated metadata. For example, output(s) from the machine-learning models 470 can be representative of a detection of a pattern of a recurring or similarly recurring data routing path in response to an event associated with particular metadata. In some examples, the machine-learning circuitry 420 can train (or retrain) the machine-learning models 470 based on the detection of the pattern to strengthen, reinforce, and/or emphasize the generation of the data routing path in response to an event associated with the particular metadata (or partial metadata). In some examples, the machine-learning circuitry 420 can deploy the trained (or retrained) machine-learning models 470 as microservices to be executed and/or instantiated by node(s) in an environment.

In some examples, the machine-learning models 470 can output a data routing path as a predicted data routing path. For example, one(s) of the machine-learning models 470 can be digital twin(s) of an environment including the users 466, the nodes 468, etc. Digital twin is an emerging technology and is a key enabler for a range of advanced applications. Examples disclosed herein utilize digital twin to enable a range of data routing efficiency related applications. As such, digital twin technology can be deployed in Multi-access Edge Computing (MEC) systems alongside the next generation wireless networks to effectuate adaptive and/or proactive data routing.

In some examples, the machine-learning models 470 can be executed and/or instantiated to create a digital twin of an environment. The digital twin of an environment can be a virtual environment of a physical scenario in which the physical entities in the real scenario (e.g., vehicles, pedestrians, buildings, road infrastructure, etc.) are represented as digital actors (e.g., models) in the virtual environment. The machine-learning circuitry 420 can obtain actual and/or live information of the semantic and kinematic parameters of the physical entities in the environment. The semantic parameters provide information about the type of an entity such as person, car, bicyclist, building, road, AGV, industrial machine, etc., while the kinematic parameters provide information about the mobility of an entity that include position, velocity, heading direction, etc. The machine-learning circuitry 420 can obtain data and/or metadata that propagate through a network to obtain information about connected devices, users, etc.

The machine-learning circuitry 420 can synchronize (e.g., continuously synchronize) the digital models (actors) in a virtual environment with their respective physical entities through the live information obtained from data sources. Then, the machine-learning circuitry 420 can perform analytics and simulations (and/or emulations) using the digital models to generate future predictions (e.g., in real-time) of the parameters of interest such as future positions of actors, optimal and/or improved data routing, predicted user responses or feedback to messages, etc. For example, the machine-learning circuitry 420 can execute and/or instantiate one(s) of the machine-learning models 470 to effectuate simulation(s) and/or emulation(s) of how data may be routed in a network environment in response to action(s), feedback, etc., from user(s), node(s), etc., as the user(s), the node(s), etc., interact and/or is/are presented with the data. The scope of the simulations, the emulations, etc., covers the parameters of interest like locations and velocities of users, predicted user activity, etc. The simulations, the emulations, etc., in the machine-learning circuitry 420 can be based on deterministic and/or AI based algorithms to generate the future predictions, such as by execution and/or instantiation of the machine-learning models 470. The live measured parameters, such as user or device locations, actual data routing paths, user provided feedback to messages, etc., received by the machine-learning circuitry 420 can be used as ground truth data to continuously train (or retrain) the machine-learning models 470 and improve the prediction accuracies.

Based on the insights obtained from future predictions, the machine-learning circuitry 420 can implement a digital twin (e.g., by executing and/or instantiating the machine-learning models 470) to generate and/or output recommendation data routing paths that can be used to improve and/or optimize the routing of data in an environment. The recommended data routing paths generated by the machine-learning circuitry 420 can include identifications of network hops, relevant nodes to which data is to be routed, communications and compute resource allocations of nodes, etc. The machine-learning circuitry 420 can send and/or output the recommended data routing paths to the data publishing circuitry 450 to cause transmission of data from a first node to a second node.

In some examples, the machine-learning circuitry 420 retrains the machine-learning models 470 to output a third data routing path based on the second data routing path. For example, after a detection of a change of a first data routing path (e.g., a predicted data routing path output from the machine-learning models 470) to a second data routing path (e.g., an actual data routing path taken by a message from a first node to a second node), the machine-learning circuitry 420 can provide the second data routing path (and/or associated metadata) to the machine-learning models 470 as feedback to improve future predictions of data routing paths by the machine-learning models 470.

In some examples, the machine-learning circuitry 420 can generate digital twin representations of nodes in an environment. For example, the machine-learning circuitry 420 can generate a digital twin representation (e.g., a model) for respective ones of the process control system 212, the robots 214, the first industrial machine 216, the second industrial machine 218, the third industrial machine 220, the fourth industrial machine 222, the predictive maintenance system 224, the vehicle 226, the first monitoring sensor 228, the second monitoring sensor 230, the endpoint devices 232, 234, 236, etc., and/or any combination(s) thereof, of FIG. 2. In some examples, the machine-learning circuitry 420 can generate a digital twin representation (e.g., a model) for respective ones of the users 310, 312, 314, 316, 318, 320 of FIG. 3. In some examples, the machine-learning circuitry 420 can generate a digital twin representation (e.g., a model) for respective ones of the data routing managers 302A-I of FIG. 3. In some examples, the machine-learning circuitry 420 can generate a digital twin representation (e.g., a model) for respective ones of the devices 324, 326, 328, 330, 332, 334 of FIG. 3.

In some examples, the machine-learning circuitry 420 generates a machine-learning model, such as one(s) of the machine-learning models 470, to utilize digital twin representations of node(s) in an environment as machine-learning input(s). For example, after a determination that an event associated with an environment has occurred, the machine-learning circuitry 420 can execute and/or instantiate the one(s) of the machine-learning models 470 to utilize digital twin representations of node(s) in the environment. For example, the event can have associated metadata, and the machine-learning circuitry 420 can provide the metadata to the one(s) of the machine-learning models 470 as machine-learning input(s) to generate machine-learning output(s), which can be representative of data routing path(s) for message(s) associated with the event. In some examples, the data routing path(s) can be predicted or estimated data routing path(s) that the message(s) should take, but may be changed in transit due to user feedback or action.

The data routing management circuitry 400 of the illustrated example includes the data query management circuitry 430 to generate a message with metadata based on data received at a first node. For example, in response to an ingestion of data, the data query management circuitry 430 can determine to generate a message based on the data. In some examples, the data query management circuitry 430 can generate the message by embedding and/or otherwise including the metadata 464 in the message. In some examples, the data query management circuitry 430 can implement the data query handler 112, the data cache cluster manager 114, the metadata cluster manager 116, and/or, more generally, the data query manager 110 of FIG. 1, or portion(s) thereof. In some examples, the data query management circuitry 430 is instantiated by processor circuitry executing data query management instructions and/or configured to perform operations such as those represented by one(s) of the flowcharts of FIGS. 17-40.

In some examples, the data query management circuitry 430 generates the message to solicit feedback from a user. In some examples, the data query management circuitry 430 generates the message to solicit an action from a user. In some examples, the data query management circuitry 430 determines whether another message is to be generated.

In some examples, the data query management circuitry 430 requests data to process, such as sensor data from a data producer, activity information associated with one(s) of the electronic devices 324, 326, 328, 330, 332, 334, etc. For example, the data query management circuitry 430 can request and/or otherwise retrieve the raw data 462, or portion(s) thereof, to process.

In some examples, the data query management circuitry 430 applies local node customization data to a data object to generate an augmented data object. For example, the local node customization data can be based on the metadata 464 associated with a user. In some examples, the local node customization data can include a technique of data presentation (e.g., a text-based message, a graphic based message, an auditory or verbal message via a speaker, etc.), an amount of data to convey (e.g., present a portion of data rather than an entirety of the data), a time at which to present data to a user and/or interrupt the user, etc., and/or any combination(s) thereof.

In some examples, the data query management circuitry 430 determines whether to age ingested data. For example, the data query management circuitry 430 can determine whether there is a difference between first data to be included in a message and second data stored in the raw data 462. In some examples, the data query management circuitry 430 can determine to age the second data in response to determining that the difference does not satisfy a threshold because the first data and the second data are the same or substantially similar. For example, the data query management circuitry 430 can age the second data by deleting or removing the second data from the raw data 462, moving the second data to a lower level of storage (e.g., from cache storage to mass storage), reducing a level of redundancy of the second data (e.g., remove the second data from one or more storage discs or devices), etc., and/or any combination(s) thereof.

In some examples, the data query management circuitry 430 obtains metadata associated with a data routing path taken or used by a message associated with an event. For example, the data query management circuitry 430 can obtain telemetry data, which can include metadata, associated with transmission of a message from node-to-node, network hop-to-network hop, etc., from a node, a network hop, etc., that received the message. In some examples, the data query management circuitry 430 can provide the telemetry data and/or the metadata to a machine-learning microservice as input(s) to generate output(s), which can include a classification of the data routing path taken by the message, a pattern detection associated with the data routing path, etc.

In some examples, the data query management circuitry 430 determines that a first device is to execute a task with second device(s) based on received and/or ingested data. For example, the data query management circuitry 430 can determine that ingested data has associated metadata (e.g., a robot identifier, a manufacturer identifier of a manufacturer that manufactures robots, an identifier of a step of a workflow, etc.) that identifies an operation, a task, etc., to be completed by one or more robots, such as the robots 214 of FIG. 2. In some examples, the data query management circuitry 430 can cause propagation of and/or cause transmission of the ingested data and/or the associated metadata to a first one of the robots 214.

In some examples, the data query management circuitry 430 can identify the first one of the robots 214 based on the contextual data graph models 474 to which the ingested data and/or associated metadata is to be routed. In some examples, the node management circuitry 440 can select one(s) of the robots 214, such as the first one of the robots 214, to execute the operation, the task, etc. For example, after receiving the ingested data and/or associated metadata, the node management circuitry 440 can determine whether the first one of the robots 214, or a neighboring or proximate robot to the first one of the robots 214, is the appropriate selection to carry out the operation, the task, etc. In some examples, the node management circuitry 440 can make the determination based on which one(s) of the robots 214 are in an environment based on the environment topology 472 and/or which one(s) of the robots 214 is/are relevant to the operation, the task, etc., based on the contextual data graph models 474. In some examples, the node management circuitry 440 can make the determination based on whether one(s) of the robots 214 have historical metadata associated with the operation, the task, etc. For example, the node management circuitry 440 can determine that the first one of the robots 214 has a history or previous experience of completing operation(s)/task(s) that is/are either the same or substantially similar to the instant operation/task. In some examples, the node management circuitry 440 can determine that the first one of the robots 214 has the requisite history based on the metadata 464 associated with the first one of the robots 214. For example, the metadata 464 can include tags, data entries, etc., which can be indicative of identifiers corresponding to the operation(s)/task(s), timestamps at which the operation(s)/task(s) was/were completed, etc.

In some examples, the data query management circuitry 430 can receive a request from the first one of the robots 214 for metadata associated with the operation, the task, etc., from a machine-learning microservice to improve execution of the operation, the task, etc. For example, the machine-learning circuitry 420 can execute and/or instantiate the contextual data graph models 474 to generate output(s), which can include identification(s) of relevant data, metadata, etc., associated with the operation, the task, etc. For example, the relevant data, metadata, etc., can include a step-by-step or process-by-process workflow to complete the operation, the task, etc. In some examples, the step-by-step workflow can be implemented by machine-readable instructions (e.g., software and/or firmware, an application, a service, a microservice, a robot configuration, etc.), a maintenance manual, a user guide, or other technical documentation on how to complete the operation, the task, etc. In some examples, the step-by-step workflow can be representative of data that can be ingested by the requesting one of the robots 214 to complete the operation, the task, etc. In some examples, after the identification(s), the data query management circuitry 430 can return the identified relevant data, metadata, etc., to the requesting one of the robots 214. Advantageously, the requesting one of the robots 214 can execute the operation, the task, etc., with improved efficiency and/or accuracy by utilizing the relevant data, metadata, etc. Advantageously, the data query management circuitry 430 can provide feedback to the machine-learning microservice to improve selection of device(s) in connection with completing subsequent operation(s), task(s), etc. For example, the feedback can include a determination of whether the operation, the task, etc., is completed, an accuracy of the operation/task output, a time-to-completion of the operation/task, an identification of one(s) of the robots 214 that completed the operation/task, etc., and/or any combination(s) thereof.

The data routing management circuitry 400 of the illustrated example includes the node management circuitry 440 to generate a list of users of which to provide a message based on relevancy of the data to one(s) of the list. In some examples, the node management circuitry 440 can implement the node manager 122 of FIG. 1, or portion(s) thereof. In some examples, the node management circuitry 440 is instantiated by processor circuitry executing node management instructions and/or configured to perform operations such as those represented by one(s) of the flowcharts of FIGS. 17-40.

In some examples, the node management circuitry 440 can generate the list of users based on user(s) associated with a first node or one or more second nodes. For example, the node management circuitry 440 can compile a list of users based on first user(s) associated with a first one of the data producers 306 (and/or a first one of the data consumers 308) and second user(s) associated with a second one of the data producers 306 (and/or a second one of the data consumers 308). In some examples, the node management circuitry 440 ranks the list based on a relevancy score of respective ones of the list. In some examples, the node management circuitry 440 identifies a set of users of the list as having a relevancy score that satisfies a threshold. For example, the node management circuitry 440 can select a user in the list to process. The node management circuitry 440 can determine whether a relevancy score associated with the user for a particular data item is greater than a threshold. In response to determining that the relevancy score is greater than the threshold (and thereby satisfies the threshold in this example), the node management circuitry 440 can identify the user as likely finding the specific data item relevant to the user. In some examples, the node management circuitry 440 identifies a user as an expert associated with a topic in response to determining that a relevancy score for the user in connection with the topic satisfies a threshold (e.g., a relevancy score threshold, a topic relevancy score threshold, etc.).

In some examples, the node management circuitry 440 identifies a node at which to route a message associated with received and/or ingested data. For example, the node management circuitry 440 can identify the fourth data routing manager 302D, and/or, more generally, the first electronic device 324, and/or, more generally, the first user 310 of FIG. 3, as a node at which to route a data message from one of the data producers 306.

In some examples, the node management circuitry 440 can determine whether a user associated with a node is able to hear audio and view video (and/or image(s)) and text. For example, the node management circuitry 440 can obtain utilization data associated with the first electronic device 324 and determine, based the utilization data, that the first user 310 is wearing a headset audio device and is unable to view a video and/or text-based message (e.g., unable to view video data, unable to view text data, etc.). In some examples, the node management circuitry 440 can determine to generate an audio message and cause presentation of the audio message to the first user 310 via a speaker of the first electronic device 324.

In some examples, the node management circuitry 440 can determine whether a user associated with a node is able to hear audio and view video (and/or image(s)) and text. For example, the node management circuitry 440 can obtain utilization data associated with the second device 326 and determine, based on the utilization data, that the second user 312 is wearing a pair of smart glasses and is able to view a video, audio, and/or text-based message. In some examples, the node management circuitry 440 can determine to generate data message(s) including video, audio, and/or text data (or data objects) and cause presentation of the video, audio, and/or text data to the second user 312 via at least one of a display device or a speaker of the second device 326.

In some example, the node management circuitry 440 can obtain utilization data associated with the first electronic device 324 and determine, based the utilization data, that the first user 310 is wearing a headset audio device and is unable to view a video and/or text-based message. In some examples, the node management circuitry 440 can determine to generate an audio message and cause presentation of the audio message to the first user 310 via a speaker of the first electronic device 324.

In some example, the node management circuitry 440 can obtain utilization data associated with the fourth device 330 and determine, based the utilization data, that the fourth user 316 is unable to hear audio via a speaker (e.g., the fourth user 316 has accessibility settings enabled on the fourth device 330 indicating that the fourth user 316 is hearing impaired, the fourth user 316 is located in an area with high-decibel sound (e.g., a manufacturing plant, an airport, an electricity plant, etc.). In some examples, the node management circuitry 440 can cause the data publishing circuitry 450 to generate a video and/or text-based message and cause presentation of the video and/or text-based message to the fourth user 316 via a display device of the fourth device 330. In some examples, the node management circuitry 440 can cause the data publishing circuitry 450 to include metadata in the video and/or text-based message that, when read or evaluated by the fourth device 330, can cause the fourth device 330 to vibrate and/or otherwise physically alert the fourth user 316 regarding the video and/or text-based message.

In some example, the node management circuitry 440 can obtain utilization data associated with the fourth device 330 and determine, based the utilization data, that the fourth user 316 is not attentive to the fourth device 330. For example, the utilization data can include and/or be associated with biometric data generated from an eye-tracking sensor of the fourth device 330. In some examples, the biometric data can be representative of the fourth user 316 not looking at a display of the fourth device 330. In some examples, the node management circuitry 440 can cause the data publishing circuitry 450 to generate an audio message and cause presentation of the audio message to the fourth user 316 via a speaker device of the fourth device 330, which can audibly alert the fourth user 316 that an event requires attention from the fourth user 316.

In some examples, the node management circuitry 440 can determine a bandwidth associated with a device based on utilization data associated with the device. In some examples, the node management circuitry 440 can cause the data publishing circuitry 450 to change a format, delivery, and/or presentation of a message to a user based on the bandwidth. For example, after a determination that the fourth device 330 has relatively low bandwidth (e.g., the fourth device 330 has a poor or reduced speed network connection, the fourth device 330 is utilizing a substantial portion of its network interface resources, etc.), the node management circuitry 440 can cause the data publishing circuitry 450 to output a message, or portion(s) thereof, in reduced data formats, such as audio data, image data, and/or text data. In some examples, after a determination that the fourth device 330 has relatively high bandwidth (e.g., the fourth device 330 has a strong or high speed network connection, the fourth device 330 is utilizing a relatively low portion of its network interface resources, etc.), the node management circuitry 440 can cause the data publishing circuitry 450 to output a message, or portion(s) thereof, in data formats that have higher data usage requirements, such as video data or high-quality audio data.

In some examples, the node management circuitry 440 can determine whether a user associated with a node is ready and/or available to access a message, or portion(s) thereof. For example, the node management circuitry 440 can determine that the fourth user 316 is attentive to the fourth device 330 based on biometric data generated by the fourth device 330. In some examples, the node management circuitry 440 can determine that the fourth user 316 is ready to consume and/or be presented with a second portion of a message after consuming and/or being presented with a first portion of the message. For example, the message can include three audible operations of a maintenance workflow to repair and/or perform maintenance on a first one of the robots 214. In some examples, each of the audible operations can be associated with metadata that is representative of expected time durations for the respective audible operations to be completed. In some examples, the fourth device 330 can audibly present the first audible operation via a speaker of the fourth device 330. In some examples, after a first time duration (as indicated by metadata associated with the first audible operation) has elapsed, the node management circuitry 440 can determine that the fourth user 316 is ready to be presented with the second audible operation via the speaker. In some examples, the node management circuitry 440 can determine that the fourth user 316 is ready to be presented with the second audible operation in response to an audible command or instruction from the fourth user 316. For example, the audible command/instruction can be the fourth user 316 speaking "first operation complete," "start second operation," "present next operation," etc. In some examples, the fourth device 330 can execute a natural language processing (NLP) model, such as one of the machine-learning models 470, to translate the audible command/instruction into a machine-executable operation, such as to present the second audible operation to the fourth user 316 via the speaker of the fourth device 330.

In some examples, the node management circuitry 440 can determine whether a node is equipped with different network interfaces (e.g., a Bluetooth interface, a Wi-Fi interface, a cellular network interface, etc.). For example, the node management circuitry 440 can obtain configuration data associated with a device, and determine, based on the configuration data, that the device includes one or more types of network interfaces, network interface circuitry, etc. For example, the configuration data can include an inventory or listing of hardware (e.g., a Wi-Fi network interface card, a Bluetooth network interface card, a cellular radio unit, etc.), software (e.g., software drivers), and/or firmware (e.g., Basic Input/Output System (BIOS), Wi-Fi network interface firmware, Bluetooth firmware, cellular network firmware, etc.) of a device.

The data routing management circuitry 400 of the illustrated example includes the data publishing circuitry 450 to publish a message for presentation to a user. In some examples, the data publishing circuitry 450 can publish the message to one or more data subscribers, consumers, etc. In some examples, the data publishing circuitry 450 can implement the scheduler 120, and/or, more generally, the data publishing manager 118 of FIG. 1, or portion(s) thereof. In some examples, the data publishing circuitry 450 is instantiated by processor circuitry executing data publishing instructions and/or configured to perform operations such as those represented by one(s) of the flowcharts of FIGS. 17-40.

In some examples, the data publishing circuitry 450 queries neighboring nodes to a local node for user(s) associated with metadata. For example, a neighboring node can inform the data ingestion circuitry 410 that the first user 310 is associated with the metadata. In some examples, the data publishing circuitry 450 can deliver the message to the first user 310 via the network 322. In some examples, the data publishing circuitry 450 can publish a message that references or points to portion(s) of the raw data 462 to the network 322. In some examples, the message, when received by the fourth data routing manager 302D, can cause the fourth data routing manager 302D to determine that the raw data 462 is relevant to the first user 310. In response to the determination, the fourth data routing manager 302D can retrieve (or request to retrieve) the referenced portion(s) of the raw data 462 for presentation to the first user 310.

In some examples, the data publishing circuitry 450 delivers a message, which includes portion(s) of the metadata 464, to a set of users. In some examples, the data publishing circuitry 450 delivers the message, which can include an augmented data object, to a user to cause a presentation of the augmented data object to the user. In some examples, the data publishing circuitry 450 provides updated portion(s) of the metadata 464 to one or more neighboring or associated nodes.

In some examples, the data publishing circuitry 450 causes transmission of message(s) to node(s) based on a data routing path. For example, the data publishing circuitry 450 can transmit a message from a first node, such as the predictive maintenance system 224 of FIG. 2, to a second node, such as one of the endpoint devices 232, 234, 236 of FIG. 2, based on a data routing path, which can include one or more nodes of the environment 200 of FIG. 2. For example, the one or more nodes can include one(s) of the endpoint devices 232, 234, 236 to implement peer-to-peer transmission of the message. In some examples, the one or more nodes can include the gateway 202, the switch 204, the edge cloud 210, etc., and/or any combination(s) thereof.

In some examples, the data publishing circuitry 450 generates a message based on at least one of audio, image, text, or video data. For example, the data publishing circuitry 450 can generate a video-based message (e.g., a video file, streaming video data, an HTTP message including a hyperlink to access a video file, etc.) and cause presentation of the video-based message to one(s) of the users 310, 312, 314, 316, 318, 320 via display device(s) of corresponding devices. In some examples, the data publishing circuitry 450 can cause presentation of the video-based message by transmitting the video-based message to one(s) of the corresponding devices associated with the users 310, 312, 314, 316, 318, 320. In some examples, the data publishing circuitry 450 can cause presentation of the video-based message by accessing the video-based message. For example, the data publishing circuitry 450 can be executed and/or instantiated by the second device 326 to access the video-based message and display the video-based message on one or both display lenses of the second device 326.

In some examples, the data publishing circuitry 450 can generate an image and/or text-based message and cause presentation of the image and/or text-based message to one(s) of the users 310, 312, 314, 316, 318, 320 via display device(s) of corresponding devices. In some examples, the data publishing circuitry 450 can generate an audio-based message and cause presentation of the audio-based message to one(s) of the users 310, 312, 314, 316, 318, 320 via speaker(s) of corresponding devices. In some examples, the data publishing circuitry 450 generates an alert in response to a determination that a user is unable to be presented with a message.

In some examples, the data publishing circuitry 450 can transmit a message over one or more network interfaces. For example, the data publishing circuitry 450 can cleave, divide, split, and/or otherwise separate a message into multiple message portions, slices, segments, etc. In some examples, the data publishing circuitry 450 can transmit one or more message portions via a first network interface, such as Bluetooth, one or more message portions via a second network interface, such as Wi-Fi, one or more message portions via a third network interface, such as a cellular radio, and so forth.

In some examples, the data publishing circuitry 450 can unicast message portions to a node via one or more network interfaces. For example, the data publishing circuitry 450 can unicast a first message portion of a message to the second electronic device 326 via a first network interface and a second message portion of the message to the second electronic device via a second network interface.

In some examples, the data publishing circuitry 450 can multicast messages to multiple nodes via one or more network interfaces. For example, the data publishing circuitry 450 can multicast a first message to multiple ones of the electronic devices 324, 326, 328, 330, 332, 334 of FIG. 3. In some examples, the data publishing circuitry 450 can multicast the first message via the same network interface. For example, the data publishing circuitry 450 can multicast the first message to ones of the electronic devices 324, 326, 328, 330, 332, 334 of FIG. 3 via Wi-Fi, or a different network interface, communication medium, connection technology, etc. In some examples, the data publishing circuitry 450 can multicast the first message via different network interfaces. For example, the data publishing circuitry 450 can multicast the first message to first ones of the electronic devices 324, 326, 328, 330, 332, 334 of FIG. 3 via Wi-Fi and second ones of the electronic devices 324, 326, 328, 330, 332, 334 of FIG. 3 via 5G cellular, or a different network interface, communication medium, connection technology, etc. Advantageously, the data publishing circuitry 450 can multicast messages to ones of the electronic devices 324, 326, 328, 330, 332, 334 based on what type(s) of network interface(s), communication medium(s), connection technologies, etc., that the ones of the electronic devices 324, 326, 328, 330, 332, 334 are adapted to, configured to, and/or otherwise capable of using to receive and/or transmit data.

In some examples, the data publishing circuitry 450 can multicast data portions, message portions, etc., to multiple nodes via one or more network interfaces. For example, the data publishing circuitry 450 can multicast a first message portion (e.g., video data) of a first message to multiple ones of the electronic devices 324, 326, 328, 330, 332, 334 of FIG. 3. In some examples, the data publishing circuitry 450 can multicast the first message portion via the same network interface. For example, the data publishing circuitry 450 can multicast the first message portion to ones of the electronic devices 324, 326, 328, 330, 332, 334 of FIG. 3 via Wi-Fi, or a different network interface, communication medium, connection technology, etc. In some examples, the data publishing circuitry 450 can multicast a second message portion (e.g., audio data, image data, text data, etc.) of the message via the same network interface (e.g., Wi-Fi) or a different network interface, communication medium, connection technology, etc.

In some examples, the data publishing circuitry 450 can multicast data portions, message portions, etc., via different network interfaces. For example, the data publishing circuitry 450 can multicast a first message portion of a first message to first ones of the electronic devices 324, 326, 328, 330, 332, 334 of FIG. 3 via Wi-Fi and second ones of the electronic devices 324, 326, 328, 330, 332, 334 of FIG. 3 via 5G cellular, or a different network interface, communication medium, connection technology, etc. Advantageously, the data publishing circuitry 450 can multicast message portion(s) to ones of the electronic devices 324, 326, 328, 330, 332, 334 based on what type(s) of network interface(s), communication medium(s), connection technologies, etc., that the ones of the electronic devices 324, 326, 328, 330, 332, 334 are adapted to, configured to, and/or otherwise capable of using to receive and/or transmit data.

In some examples, the data publishing circuitry 450 can multicast data portions, message portions, etc., via different network interfaces during the same communication session. For example, the data publishing circuitry 450 can multicast a first message portion of a first message to first ones of the electronic devices 324, 326, 328, 330, 332, 334 of FIG. 3 via Wi-Fi and second ones of the electronic devices 324, 326, 328, 330, 332, 334 of FIG. 3 via 5G cellular, or a different network interface, communication medium, connection technology, etc. In some examples, the data publishing circuitry 450 can multicast a second message portion of the first message to the first ones of the electronic devices 324, 326, 328, 330, 332, 334 of FIG. 3 via Bluetooth and second ones of the electronic devices 324, 326, 328, 330, 332, 334 of FIG. 3 via Wi-Fi, or a different network interface, communication medium, connection technology, etc. Advantageously, the data publishing circuitry 450 can multicast and/or otherwise cause transmission of data to node(s) based on a bandwidth associated with the node(s), identification(s) of what network interface(s)/communication medium(s)/connection technologies/etc., the node(s) is/are equipped with, utilization data associated with the network interface(s)/communication medium(s)/connection technologies/etc., etc., and/or any combination(s) thereof.

In some examples, the data publishing circuitry 450 can output the message portions, and/or, more generally, the message, to a user based on a bandwidth of a device associated with the user. For example, the data publishing circuitry 450 can transmit data to the first electronic device 324 via Wi-Fi after a determination that the first electronic device 324 has available Wi-Fi bandwidth. In some examples, the data publishing circuitry 450 can transmit data to the first electronic device 324 via a cellular connection after a determination that the first electronic device 324 has relatively low or no available Wi-Fi bandwidth. In some examples, the data ingestion circuitry 410 can reassemble and/or recompile the message portions at a receiving node. In some examples, the data publishing circuitry 450 can cause an action to occur and/or otherwise be carried out based on the reassembled message. For example, the data publishing circuitry 450 can cause the first user 310 to execute a maintenance operation associated with a first one of the robots 214 in response to receiving a message indicative of a maintenance alert in connection with the first one of the robots 214.

In some examples, the data publishing circuitry 450 propagates ingested and/or received data to a first node, a first device, etc. In some examples, the data publishing circuitry 450 can determine that the first node is associated with a second node based on one of the contextual data graph models 474. In some examples, the data publishing circuitry 450 can determine to route the ingested and/or received data from the first node to the second node, which can cause the second node to execute an operation, a task, etc., associated with metadata of the ingested and/or received data.

The data routing management circuitry 400 of the illustrated example includes the datastore 460 to record data, such as the raw data 462, the metadata 464, the users 466, the nodes 468, the machine-learning models 470, the environment topology 472, the contextual data graph models 474, and the digital twins 476. In some examples, the datastore 460 can implement the metadata datastore 146, the raw datastore 148, and/or, more generally, the distributed datastore 144 of FIG. 1, or portion(s) thereof.

In some examples, the raw data 462 is raw and/or otherwise unprocessed data. In some examples, the raw data 462 can be sensor data, location data, activity information, electronic device utilization data, etc.

In some examples, the metadata 464 is data that provides information about one or more aspects of other data. For example, the metadata 464 can include descriptive information associated with the raw data 462, the users 466, the nodes 468, etc., and/or any combination(s) thereof.

In some examples, the users 466 are implemented using data that describes, represents, and/or otherwise corresponds to the users 310, 312, 314, 316, 318, 320 of FIG. 3. For example, the users 466 can be implemented with user data, such as user data corresponding to the first user 310, which can include a name, a job description or role, technical expertise or knowledge, a level of organizational seniority, a level of an organization hierarchy to which the user belongs (e.g., a manager that the user reports to, direct report(s) of the user or those that report to the user, etc.), security credentials, and the like. In some examples, the users 466 are human users, such as one(s) of the users 310, 312, 314, 316, 318, 320. In some examples, the users 466 are not human or biological. For example, the users 466 can be electronic and/or computing devices, such as one(s) of the industrial machines 218, 220, 222, the predictive maintenance system 224, the vehicle 226, etc., of FIG. 2. In some examples, the users 466 can be electronic and/or computing devices, such as one(s) of the devices 324, 326, 328, 330, 332, 334 of FIG. 3.

In some examples, the nodes 468 are implemented using data that describes, represents, and/or otherwise corresponds to nodes of the network environment 304. For example, the nodes 468 can be implemented using node data, which can include identification(s) of user(s) of the node, identification(s) of electronic device(s) of the node, electronic device information (e.g., an Internet Protocol (IP) address, a Media Access Control (MAC) number, quantity and/or type of hardware resource of the electronic device, a version of firmware and/or software of the electronic device, etc.), etc., and/or any combination(s) thereof.

In some examples, the machine-learning models 470 are and/or include neural network(s). In some examples, the machine-learning models 470 are and/or include NLP model(s). Additionally or alternatively, the machine-learning models 470 may be implemented using any other type of AWL model described herein. In some examples, the machine-learning models 470 can be implemented using more than one type and/or quantity of AI/ML models. For example, the machine-learning models 470 can include a neural network (or portion(s), layer(s), or slice(s) thereof) and a reinforcement learning network (or portion(s), layer(s), or slice(s) thereof). In some examples, output(s) of the neural network can be coupled and/or otherwise provided to input(s) of the reinforcement learning network.

In some examples, the environment topology 472 is implemented using data that describes, represents, and/or otherwise corresponds to environment 200 of FIG. 2, the data routing management system 300 of FIG. 3, the network environment 304 of FIG. 3, etc. For example, the environment topology 472 can be implemented with data that describes an architecture, an order, an organization of levels or tiers, etc., of the environment 200. In some examples, the environment topology 472 can be implemented with data that describes that first component(s), equipment, device(s), user(s), etc., is/are topologically coupled to second component(s), equipment, device(s), user(s), etc. In some examples, the environment topology 472 can be implemented with data that describes that the environment 200 is topologically coupled to another environment. In some examples, the environment topology 472 can be implemented using data that describes, represents, and/or otherwise corresponds to the environment 200 of FIG. 2, the data routing management system 300 of FIG. 3, and/or the network environment 304 of FIG. 3. For example, the environment topology 472 can be implemented using node data, which can include identification(s) of user(s) of the node, identification(s) of electronic device(s) of the node, electronic device information (e.g., an Internet Protocol (IP) address, a Media Access Control (MAC) number, quantity and/or type of hardware resource of an electronic device such as the first soldering station, a version of firmware and/or software of the electronic device, etc.), etc., and/or any combination(s) thereof. In some examples, the environment topology 472 is implemented using data in any data format such as, for example, binary data, comma delimited data, tab delimited data, SQL structures, a table, a map, a graph (e.g., a data graph, a data graph structure, a contextual data graph model, etc.), a grid, a packet, a datagram, a frame, a file, an e-mail, a message, a document, a report, a list, etc.

In some examples, the contextual data graph models 474 are models that represent relationships of data with respect to other related data. For example, the contextual data graph models 474 can include a model with a plurality of nodes that are connected to one(s) of each other based on their affiliation, relatedness, and/or similarity with respect to each other. In some examples, a first node may be connected to a second node with a vector having an angle with respect to a reference axis and a length. The angle may be representative of a likelihood that the first node may cause an event that affects the second node. The length may be representative of a similarity of the first node and the second node. For example, if the first node is a first lexical term and the second node is a second lexical term, the length of a vector that connects the first node and the second node may be based on a cosine similarity (or any other NLP or text similarity measure or metric) between the first and second lexical terms.

The datastore 460 of the illustrated example can be implemented by one or more volatile memories (e.g., an SDRAM), DRAM, RDRAM, etc.), one or more non-volatile memories (e.g., flash memory), and/or any combination(s) thereof. In some examples, the datastore 460 is instantiated by processor circuitry executing datastore instructions and/or configured to perform operations such as those represented by one(s) of the flowcharts of FIGS. 17-40. The datastore 460 may additionally or alternatively be implemented by one or more DDR memories, such as DDR, DDR2, DDR3, DDR4, DDR5, mDDR, etc. The datastore 460 may additionally or alternatively be implemented by one or more mass storage devices such as HDD(s), CD drive(s), DVD drive(s), SSD drive(s), etc. While in the illustrated example the datastore 460 is illustrated as a single datastore, the datastore 460 may be implemented by any number and/or type(s) of datastores. Furthermore, the data stored in the datastore 460 may be in any data format such as, for example, binary data, comma delimited data, tab delimited data, SQL structures, a table, a map, a graph (e.g., a data graph, a graph data structure, etc.), a grid, a packet, a datagram, a frame, a file, an e-mail, a message, a document, a report, a list, etc. In some examples, the datastore 460 can implement one or more databases.

In some examples, the data routing management circuitry 400 includes means for ingesting data and/or metadata. For example, the means for ingesting may be implemented by data ingestion circuitry 410. In some examples, means for detecting a change of a data routing path may be implemented by the data ingestion circuitry 410. In some examples, the data ingestion circuitry 410 may be instantiated by processor circuitry such as the example processor circuitry 4112 of FIG. 41 and/or the example processor circuitry 4212 of FIG. 42. For instance, the data ingestion circuitry 410 may be instantiated by the example microprocessor 4300 of FIG. 43 executing machine executable instructions such as those implemented by block(s) of one(s) of FIGS. 17-40. In some examples, the data ingestion circuitry 410 may be instantiated by hardware logic circuitry, which may be implemented by an ASIC, XPU, or the FPGA circuitry 4400 of FIG. 44 structured to perform operations corresponding to the machine-readable instructions. Additionally or alternatively, the data ingestion circuitry 410 may be instantiated by any other combination of hardware, software, and/or firmware. For example, the data ingestion circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the data routing management circuitry 400 includes means for executing and/or instantiating a machine-learning model. For example, the means for executing and/or instantiating may be implemented by the machine-learning circuitry 420. In some examples, means for determining and/or generating a data routing path may be implemented by the machine-learning circuitry 420. In some examples, means for detecting a change of a data routing path may be implemented by the machine-learning circuitry 420. In some examples, the machine-learning circuitry 420 may be instantiated by processor circuitry such as the example processor circuitry 4112 of FIG. 41 and/or the example processor circuitry 4212 of FIG. 42. For instance, the machine-learning circuitry 420 may be instantiated by the example microprocessor 4300 of FIG. 43 executing machine executable instructions such as those implemented by block(s) of one(s) of FIGS. 17-40. In some examples, the machine-learning circuitry 420 may be instantiated by hardware logic circuitry, which may be implemented by an ASIC, XPU, or the FPGA circuitry 4400 of FIG. 44 structured to perform operations corresponding to the machine-readable instructions. Additionally or alternatively, the machine-learning circuitry 420 may be instantiated by any other combination of hardware, software, and/or firmware. For example, the machine-learning circuitry 420 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the data routing management circuitry 400 includes means for obtaining metadata. For example, the means for obtaining metadata may be implemented by the data query management circuitry 430. In some examples, means for retrieving metadata may be implemented by the data query management circuitry 430. In some examples, means for providing metadata may be implemented by the data query management circuitry 430. In some examples, the data query management circuitry 430 may be instantiated by processor circuitry such as the example processor circuitry 4112 of FIG. 41 and/or the example processor circuitry 4212 of FIG. 42. For instance, the data query management circuitry 430 may be instantiated by the example microprocessor 4300 of FIG. 43 executing machine executable instructions such as those implemented by block(s) of one(s) of FIGS. 17-40. In some examples, the data query management circuitry 430 may be instantiated by hardware logic circuitry, which may be implemented by an ASIC, XPU, or the FPGA circuitry 4400 of FIG. 44 structured to perform operations corresponding to the machine-readable instructions. Additionally or alternatively, the data query management circuitry 430 may be instantiated by any other combination of hardware, software, and/or firmware. For example, the data query management circuitry 430 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the data routing management circuitry 400 includes means for managing a node. For example, the means for managing a node may be implemented by the node management circuitry 440. In some examples, means for determining a configuration of a node may be implemented by the node management circuitry 440. In some examples, the node management circuitry 440 may be instantiated by processor circuitry such as the example processor circuitry 4112 of FIG. 41 and/or the example processor circuitry 4212 of FIG. 42. For instance, the node management circuitry 440 may be instantiated by the example microprocessor 4300 of FIG. 43 executing machine executable instructions such as those implemented by block(s) of one(s) of FIGS. 17-40. In some examples, the node management circuitry 440 may be instantiated by hardware logic circuitry, which may be implemented by an ASIC, XPU, or the FPGA circuitry 4400 of FIG. 44 structured to perform operations corresponding to the machine-readable instructions. Additionally or alternatively, the node management circuitry 440 may be instantiated by any other combination of hardware, software, and/or firmware. For example, the node management circuitry 440 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the data routing management circuitry 400 includes means for transmitting data. For example, the means for transmitting data may be implemented by the data publishing circuitry 450. In some examples, means for causing transmission of data may be implemented by the data publishing circuitry 450. In some examples, means for publishing data may be implemented by the data publishing circuitry 450. In some examples, the data publishing circuitry 450 may be instantiated by processor circuitry such as the example processor circuitry 4112 of FIG. 41 and/or the example processor circuitry 4212 of FIG. 42. For instance, the data publishing circuitry 450 may be instantiated by the example microprocessor 4300 of FIG. 43 executing machine executable instructions such as those implemented by block(s) of one(s) of FIGS. 17-40. In some examples, the data publishing circuitry 450 may be instantiated by hardware logic circuitry, which may be implemented by an ASIC, XPU, or the FPGA circuitry 4400 of FIG. 44 structured to perform operations corresponding to the machine-readable instructions. Additionally or alternatively, the data publishing circuitry 450 may be instantiated by any other combination of hardware, software, and/or firmware. For example, the data publishing circuitry 450 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the data routing management circuitry 400 includes means for storing data and/or metadata. For example, the means for storing may be implemented by the datastore 460. In some examples, the datastore 460 may be instantiated by processor circuitry such as the example processor circuitry 4112 of FIG. 41 and/or the example processor circuitry 4212 of FIG. 42. For instance, the datastore 460 may be instantiated by the example microprocessor 4300 of FIG. 43 executing machine executable instructions such as those implemented by block(s) of one(s) of FIGS. 17-40. In some examples, the datastore 460 may be instantiated by hardware logic circuitry, which may be implemented by an ASIC, XPU, or the FPGA circuitry 4400 of FIG. 44 structured to perform operations corresponding to the machine-readable instructions. Additionally or alternatively, the datastore 460 may be instantiated by any other combination of hardware, software, and/or firmware. For example, the datastore 460 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, mass storage, memory, etc.) structured to execute some or all of the machine-readable instructions and/or to perform some or all of the operations corresponding to the machine-readable instructions without executing software or firmware, but other structures are likewise appropriate.

While an example manner of implementing the data routing manager 302A-I of FIG. 3 is illustrated in FIG. 4, one or more of the elements, processes, and/or devices illustrated in FIG. 4 may be combined, divided, re-arranged, omitted, eliminated, and/or implemented in any other way. Further, the example data ingestion circuitry 410, the example machine-learning circuitry 420, the example data query management circuitry 430, the example node management circuitry 440, the example data publishing circuitry 450, the example datastore 460, the example raw data 462, the example metadata 464, the example users 466, the example nodes 468, the example machine-learning models 470, the example environment topology 472, the example contextual data graph models 474, the example digital twins 476, the example bus 480, and/or, more generally, the example data routing manager 302A-I of FIG. 3, may be implemented by hardware alone or by hardware in combination with software and/or firmware. Thus, for example, any of the example data ingestion circuitry 410, the example machine-learning circuitry 420, the example data query management circuitry 430, the example node management circuitry 440, the example data publishing circuitry 450, the example datastore 460, the example raw data 462, the example metadata 464, the example users 466, the example nodes 468, the example machine-learning models 470, the example environment topology 472, the example contextual data graph models 474, the example digital twins 476, the example bus 480, and/or, more generally, the example data routing manager 302A-I, could be implemented by processor circuitry, analog circuit(s), digital circuit(s), logic circuit(s), programmable processor(s), programmable microcontroller(s), GPU(s), DSP(s), ASIC(s), PLD(s), and/or FPLD (s) such as FPGAs. Further still, the example data routing manager 302A-I of FIG. 3 may include one or more elements, processes, and/or devices in addition to, or instead of, those illustrated in FIG. 4, and/or may include more than one of any or all of the illustrated elements, processes and devices.

Figure 5:
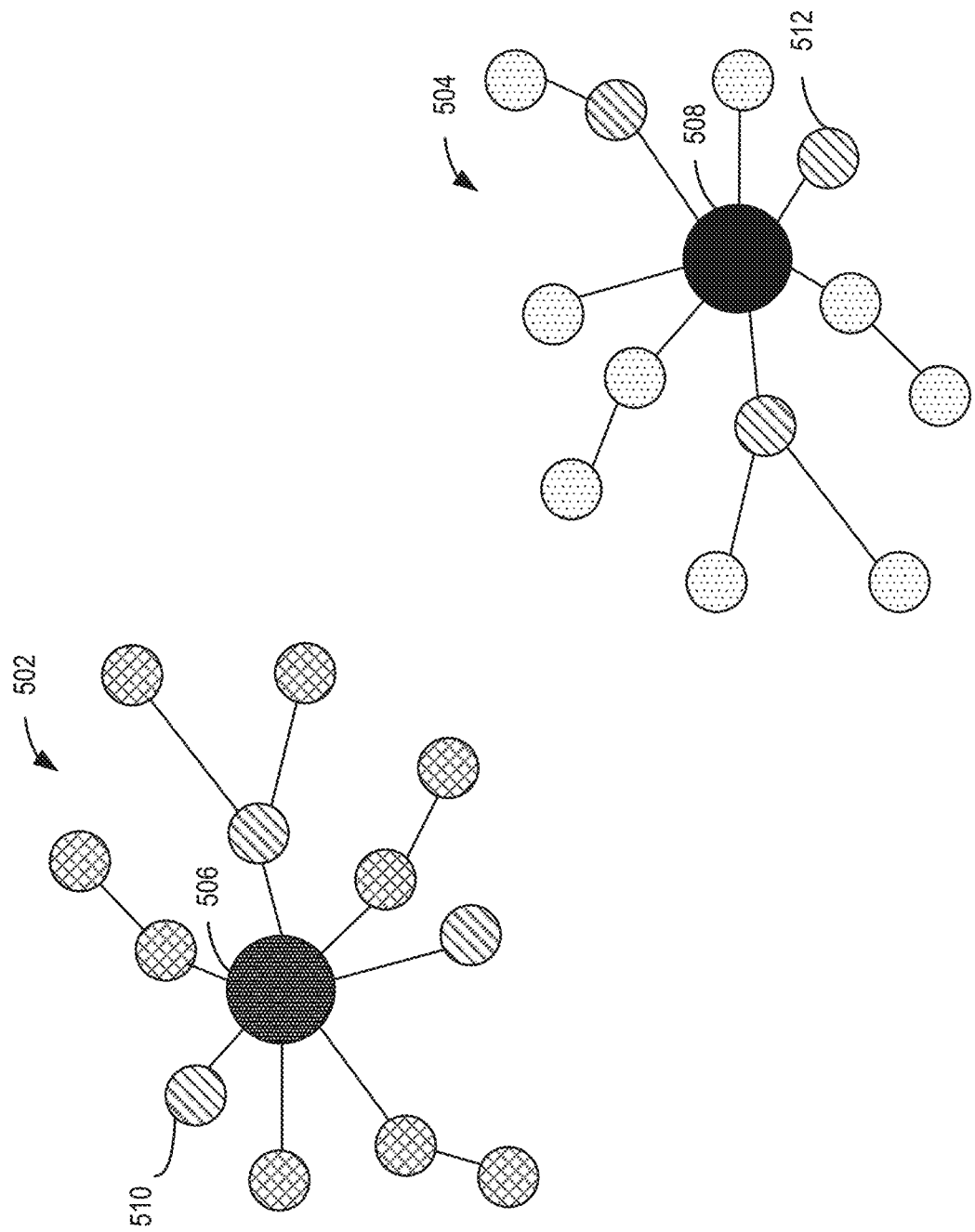
FIG. 5 is an illustration of example data graph models to facilitate proactive data routing in a network environment.

FIG. 5 is an illustration of example contextual data graph models 502, 504, which include a first example contextual data graph model 502 and a second example contextual data graph model 504, to achieve adaptive and/or proactive data routing in network environment. In some examples, the first contextual data graph model 502 and/or the second contextual data graph model 504 can implement the contextual data graph models 474 of FIG. 4. The first contextual data graph model 502 has a first example primary or major node 506 and the second contextual data graph model 504 has a second example primary or major node 508. The first contextual data graph model 502 has a plurality of example adjacent nodes including a first example adjacent node 510. For example, the first adjacent node 510 is connected to the first primary node 506 by a vector having an angle (relative to a reference axis), a length, an orientation, and a position with respect to the first primary node 506. The second contextual data graph model 504 has a plurality of example adjacent nodes including a second example adjacent node 512. For example, the second adjacent node 512 is connected to the second primary node 508 by a vector having an angle (relative to a reference axis), a length, an orientation, and a position with respect to the second primary node 508.

In some examples, if the primary nodes 506, 508 are the same, then the weighting of adjacent nodes 510, 512 may provide context and associated terms that may be customized and/or otherwise coopted for a particular department or discipline of an environment (e.g., an industrial, commercial, or office environment, etc.), such as the environment 200 of FIG. 2. In some examples, if the primary nodes 506, 508 are different, but are connected to similar adjacent nodes 510, 512, then it would imply the primary nodes 506, 508 have the same contextual definition. In some examples, establishing the initial definitions (e.g., vector lengths, angles, orientations, spacings, etc.) may be done prescriptively by a person or inductively if it was an event, task, or object in common between the contextual data graph models 502, 504. In some examples, the machine-learning circuitry 420 of FIG. 4 can execute, instantiate, and/or otherwise cause the machine-learning models 470 of FIG. 4 to establish the initial definitions by analyzing, inspecting, and/or otherwise evaluating data passing through a network in an environment to identify causes/events, correlations, patterns, etc., observed in the data with respect to previously observed data.

In some examples, correlation of the primary nodes 506, 508 to one another may be calculated based on similarity in the depicted nodes (common adjacent terms) and strength of connection, which may be implemented by a vector length. In this example, cross hatched nodes and dotted nodes of the contextual data graphs models 502, 504 may constitute differentials that highlight differences between use/definition of same terms (e.g., lexical terms, data terms, etc.) in different disciplines, processes, departments, environments, etc.

Figure 6:
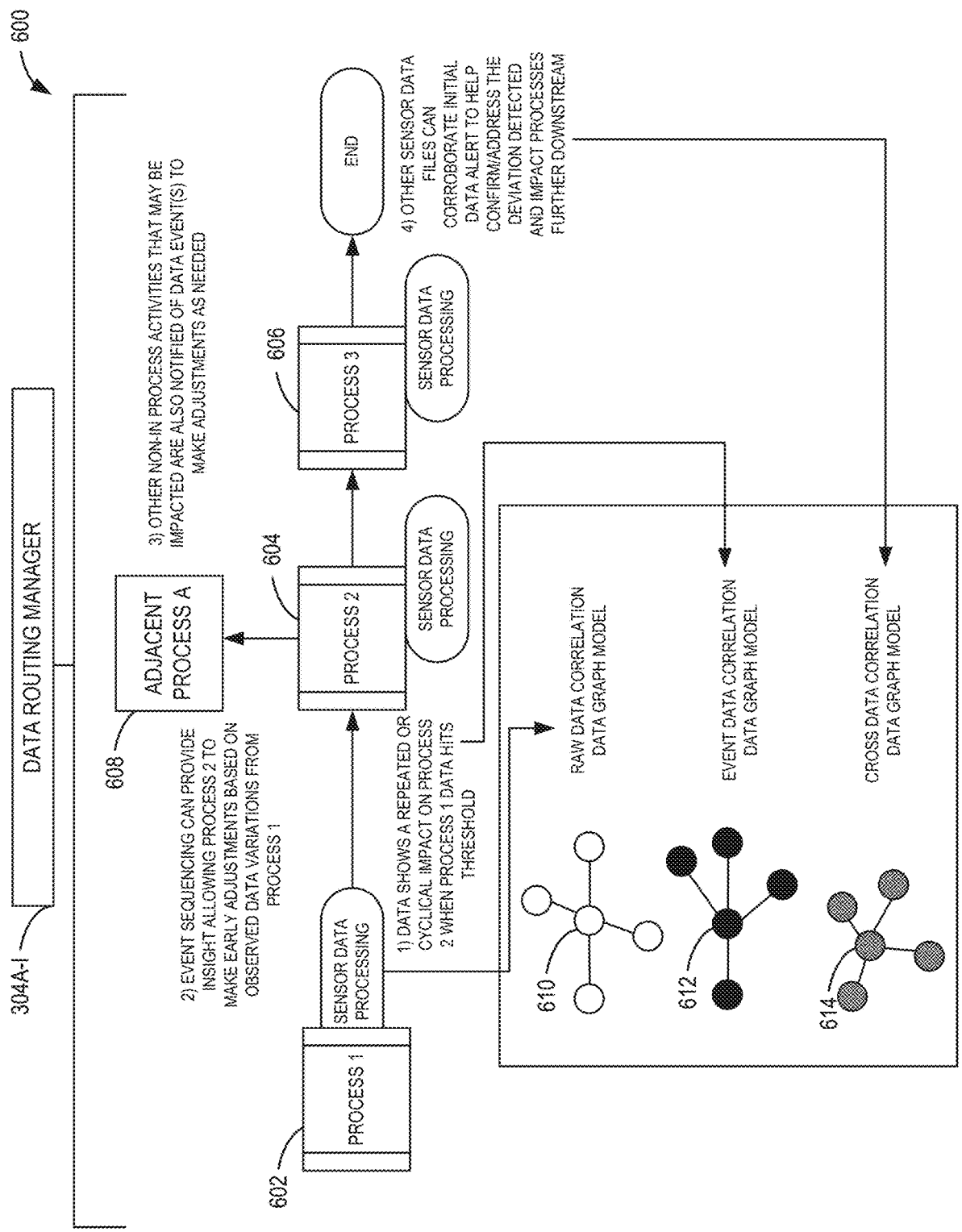
FIG. 6 is an illustration of an example event chain.

FIG. 6 is an illustration of an example event chain 600. For example, the data routing manager 302A-I can intervene in and/or monitor and/or control the event chain 600. The event chain 600 includes a first example process 602 (identified by PROCESS 1), a second example process 604 (identified by PROCESS 2), a third example process 606 (identified by PROCESS 3), and an example adjacent process 608 (identified by ADJACENT PROCESS A). In some examples, the event chain 600 can be implemented by a workflow including one or more activities, operations, tasks, etc., associated with an environment. For example the event chain 600 can be implemented by warehouse operations of the environment 200 of FIG. 2. Alternatively, the event chain 600 may be any other process, such as operations associated with manufacturing a product (e.g., a vehicle assembly line, a semiconductor manufacturing workflow, an autonomous vehicle infrastructure (e.g., coordinating autonomous vehicles on a roadway), etc.). For example, the first process 602 can be carried out and/or otherwise implemented by the robots 214 completing actions, operations, procedures, workflows, etc. In some examples, the first process 602 can be carried out and/or otherwise implemented by one(s) of the robots 214 performing one or more assembly and/or manufacturing actions, operations, procedures, workflows, etc., followed by (e.g., followed by in sequence) the second process 604, which can be one(s) of the industrial machines 216, 218, 220, 222 moving assembled and/or manufactured products from the robots 214 to a storage area (e.g., shelves). In some examples, the second process 604 can be carried out and/or otherwise implemented by the industrial machines 216, 218, 220, 222 performing one or more actions, operations, procedures, workflows, etc., followed by (e.g., followed by in sequence) the third process 606, which can be the fourth industrial machine 222 loading the assembled and/or manufactured products from storage to the vehicle 226.

In some examples, the event chain 600 implements a model (e.g., a contextual model) that is representative of an event-sequence dataset. Each of the processes 602, 604, 606, 608 can have a data model (e.g., a contextual data graph model) generated continuously from control and/or sensor data inputs which, ordinarily, show little change under nominal conditions. In some examples, a significant change from the normal model (e.g., detection of a deviation from a baseline or nominal condition or value(s)) may result in a response/adjustment in the subsequent process to address the change identified in the prior process. For example, recent correlated raw control and/or sensor data can provide indicators to which of the identified events has a high likelihood of occurrence based on which specific elements of the data have changed significantly. In some examples, the detection of the deviation can trigger a proposed adjustment and forwarding of supporting cross-data to increase confidence (or not) to assist autonomous and/or human supervised decision-making.

In example operation, the first process 602 can execute a first operation and generate sensor data associated with the first operation. For example, the first process 602 can include a first one of the robots 214 executing and/or performing a first assembly action (e.g., coupling a first component to a second component). In some examples, the data can show a repeated or cyclical impact on the second process 604 when the first process 602 satisfies a threshold (e.g., sensor data values of sensors monitoring the first one of the robots 214 have stabilized within a tolerance range (e.g., a torque associated with the coupling has reached a threshold) or indicated that the coupling is complete). For example, the second process 604 can include the first industrial machine 216 executing and/or performing a transportation action (e.g., moving the newly coupled first and second components to one of the shelves). In some examples, the data from the first process 602 can have a cyclical impact on the second process 604 because the second process 604 can be initiated in response to a completion of the first process 602.

Advantageously, the data routing manager 302A-I can monitor event sequencing of the event chain 600 to identify insight and/or pattern(s) allowing connected one(s) of the processes 602, 604, 606, 608 to make early adjustments based on data variation. For example, in response to detecting that an electrical power source powering the first one of the robots 214 has overheated and been turned off (e.g., turned off in response to a temperature sensor measurement exceeding a temperature threshold), the data routing manager 302A-I can generate an alert and transmit the alert to the second process 604 to indicate the failure (or halting of the first process 602) due to the detection of the failure of the electrical power source. In some examples, the data routing manager 302A-I can cause the second process 604 (e.g., the first industrial machine 216) to take mitigation measures (e.g., disable power to the first industrial machine 216 to conserve power or other resources, divert the first industrial machine 216 to a different one of the robots 214, etc.) and/or alert a subsequent process (e.g., the third process 606) of the alert.

In some examples, the data routing manager 302A-I can also identify non-in process activities, such as the adjacent process 608, that may be impacted of a data event (e.g., the disabling of the electrical power source of the first one of the robots 214). In some examples, the adjacent process 608 can be implemented using a marketing process, an inventory process, a warehouse process, a transportation process, or the like. For example, the data routing manager 302A-I can provide the alert to the adjacent process 608 to adjust as needed, such as changes in materials (e.g., material ordering, procurement, storing, etc.), changes in availability of a product, etc., and/or any combination(s) thereof.

In the illustrated example, the data routing manager 302A-I can generate example contextual data graph models 610, 612, 614 based on the event chain 600. In some examples, the contextual data graph models 610, 612, 614 can implement the contextual data graph models 474 of FIG. 4. The contextual data graph models 610, 612, 614 include a first example contextual data graph model 610, a second example contextual data graph model 612, and a third example contextual data graph model 614. In some examples, the first contextual data graph model 610 can be based on raw data correlations. For example, the first contextual data graph model 610 can be generated, curated, etc., based on standalone data analysis of sensor input related directly to a corresponding inline process. For example, the first process 602 can have a corresponding one of the first contextual data graph model 610, which can be generated based on control and/or sensor data generated by the first process 602. In some examples, the first contextual data graph model 610 may not have correlation to other data sets, events, or processes.

In some examples, the second contextual data graph model 612 can be based on event data correlations. For example, the second contextual data graph model 612 can be generated, adapted, constructed, etc., based on captures of event sequences surrounding processes that the second contextual data graph model 612 is associated with. For example, the second contextual data graph model 612 can include data based on the second process 604 and associated processes (e.g., the first process 602, the third process 606, the adjacent process 608, etc.). In some examples, the second contextual data graph model 612 can represent impact(s) of subsequent inline processes (e.g., an impact of an output of the second process 604 to an input of the third process 606). In some examples, a length of a vector connecting two nodes in the second contextual data graph model 612 can define and/or otherwise be representative of a likelihood of event sequence (e.g., how probable, often, likely, etc., does the third process 606 follows the second process 604). In some examples, angles of deviation (e.g., an angle of a connecting vector with respect to a reference axis) can define and/or otherwise be representative of a degree of similarity of adjacent events that appear to be impacted (e.g., if not in a direct line of process events). For example, the third process 606 is a direct inline process with respect to the second process 604 while the adjacent process 608 is an indirect or adjacent process with respect to the second process 604.

In some examples, the third contextual data graph model 614 can be based on cross data correlations. For example, the third contextual data graph model 614 can be created, generated, modified, etc., based on a first data object. In some examples, the third contextual data graph model 614 can be created, generated, modified, etc., based on captures or ingestions of other second data objects (e.g., documents, data files, etc.) that are frequently associated with or used in conjunction with the first data object. In some examples, a length of a vector of connecting nodes can define and/or otherwise be representative of a strength of association of the connected nodes. For example, the strength of association can be quantified based on a strength or high likelihood of connection and/or co-utilization (e.g., a frequency or likelihood that two data objects are used in tandem, combination, or sequence) of the first data object and one of the second data objects.

In some examples, the first contextual data graph model 610 can be based on raw data correlations. For example, the first contextual data graph model 610 can be generated, curated, etc., based on standalone data analysis of sensor input related directly to a corresponding inline process. For example, the first process 602 can have a corresponding one of the first contextual data graph model 610, which can be generated based on control and/or sensor data generated by the first process 602. In some examples, the first contextual data graph model 610 may not have correlation to other data sets, events, or processes.

In some examples, local contextual data graph models and associated data can be cached together, where analytics (e.g., execution of analytics by executing and/or instantiating the machine-learning models 470 of FIG. 4) is performed to weigh the strength of various graph node combinations between datasets being correlated and over extended periods of time gaining additional insights based on event chaining from one dataset which influences/impacts another. In some examples, each of the contextual data graph models 610, 612, 614 can be tagged with metadata such as system vendor, sensor type, unit, resolution, location zones (e.g., a zone or segment of the environment 200 of FIG. 2), alerts, past alerts, provenance, relevance to a fault, user access etc.

In some examples, the contextual data graph models 610, 612, 614 and/or the event chain 600 can be persisted to the data routing manager 302A-I of FIG. 3, which can enable shared access to the contextually correlated datasets. Advantageously, the data routing manager 302A-I can send the contextual data graph models 610, 612, 614, the event chain 600, and/or associated data to other parts of the environment 200 (e.g., sent from the first industrial machine 216 to the predictive maintenance system 224) to provide improved insights and correlation of cross-operations data and a means to quickly bootstrap information and data services operations. In some examples, security of data stored by the data routing manager 302A-I can be ensured with access rights. In some examples, raw data can be hidden, while just surfacing the translated alert or context of the alert, which can then be used in a different zone on the floor of the environment 200 of FIG. 2.

Advantageously, the deployment of the contextual data graph models 610, 612, 614 and/or the event chain 600 between different data managers of the environment 200 can enable each data routing manager 302A-I to learn, understand, and potentially align the vocabulary of other teams that may be requesting data (e.g., requesting an access of data, requesting a search for the data, etc.), the relationship between different data/information sources, and the importance of data and adjacent datasets when viewed from an end-to-end process standpoint, which is depicted by the event chain 600.

Figure 7:
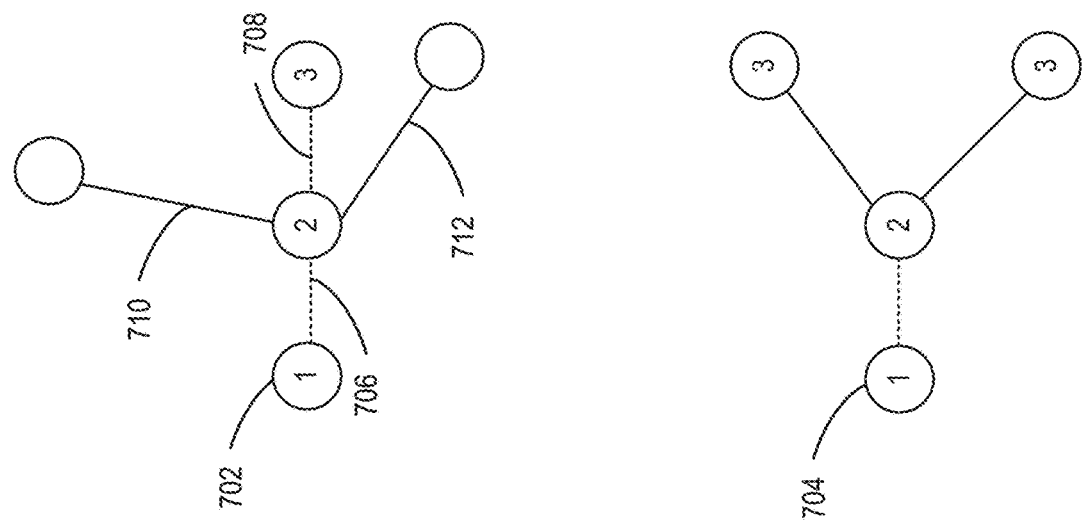
FIG. 7 is an illustration of example implementations of the event chain of FIG. 6.

FIG. 7 is an illustration of a first example contextual data graph model 702 and a second example contextual data graph model 704. In some examples, the contextual data graph models 702, 704 can implement the contextual data graph models 474 of FIG. 4 and/or the second contextual data graph model 612 of FIG. 6. In some examples, the contextual data graph models 702, 704 can be implemented using data that defines, represents, and/or otherwise implements the event chain 600 of FIG. 6. In some examples, the data routing manager 302A-I can generate the first contextual data graph model 702 and/or the second contextual data graph model 704.

In the illustrated example, the first contextual data graph model 702 is an event sequence graph. Inline direct events of the first contextual data graph model 702 are identified as nodes 1, 2, and 3. Such inline direct events represent events that are expected to be or have been observed in sequence, frequently. Example inline direct vectors 706, 708 have lengths (e.g., a length of the vector connecting node 1 and node 2, node 2 and node 3, etc.) that are relatively short, which can represent the events to be, apparently, closely coupled and/or otherwise tightly correlated. Example adjacent vectors 710, 712 are representative of connected events that have been observed to occur with lower frequency (as illustrated with longer vectors than the inline direct vectors 706, 708) with respect to the inline direct events. Although the adjacent vectors 710, 712 are representative of lower frequency events, the adjacent vectors 710, 712 may still represent connected events that are related in a statistically significant manner. Advantageously, the data routing manager 302A-I can dynamically generate, modify (e.g., add or remove a node, lengthen or shorten a vector, increase or decrease an angle of a vector, a change in location or connection of a vector, etc.), etc., the first contextual data graph model 702 and/or the second contextual data graph model 704 over time as events and associated data are recorded and observed.

In the illustrated example, the second contextual data graph model 704 is another event sequence graph. In some examples, an event sequence can represent multiple coincidental events (e.g., events that may have an equal or substantially equal likelihood of occurrence) as depicted by two instances of node 3. For example, depending upon the adjacency of the outcomes of the two instances of node 3, these two instances can be two different events that can occur at the same time on two different process lines (e.g., two different manufacturing lines) or two equally or substantially equal possible events on a single process line.

Figure 8:
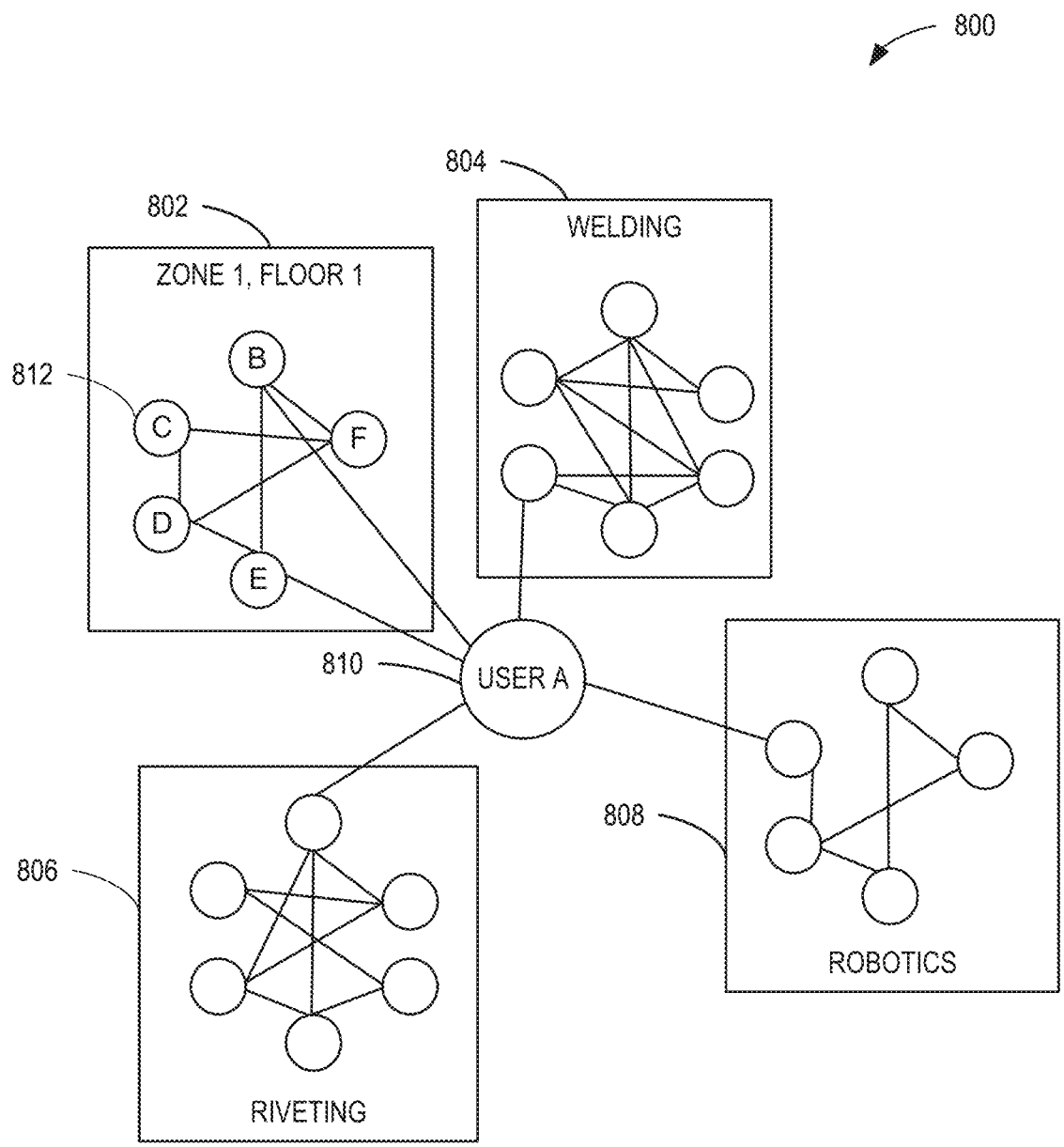
FIG. 8 is an illustration of example data graph models to facilitate proactive data routing in a network environment.

FIG. 8 is an illustration of an example user graph 800, which includes example data graphs 802, 804, 806, 808 associated with an example user 810 (identified by USER A) to facilitate proactive data routing in an example network environment (e.g., the environment 200 of FIG. 2, the network environment 304 of FIG. 3, etc.). In some examples, the machine-learning circuitry 420 can execute the machine-learning models 470 to generate one(s) of the data graphs 802, 804, 806, 808, and/or, more generally, the user graph 800. In some examples, the user 810 can be one of the users 310, 312, 314, 316, 318, 320 of FIG. 3, the users 466 of FIG. 4, etc. For example, the user 810 can be a physical person, such as one of the users 310, 312, 314, 316, 318, 320. In some examples, the user 810 can be user data, such as user data stored in the users 466 of the datastore 460. In some examples, the user 810 can be an electronic and/or computing device.

The data graphs 802, 804, 806, 808 include a first example data graph 802 (identified by ZONE 1, FLOOR 1), a second example data graph 804 (identified by WELDING), a third example data graph 806 (identified by RIVETING), and a fourth example data graph 808 (identified by ROBOTICS). The illustrated example depicts the user graph 800 and how the user graph 800 is connected to multiple metadata (and communities). For example, the first data graph 802 includes a plurality of example nodes (e.g., data graph nodes) 812. Each of the plurality of the nodes 812 represent and/or otherwise correspond to a user (e.g., one of the users 466 of FIG. 4). For example, each of the plurality of the nodes 812 can be implemented using metadata corresponding to a respective user. For example, the first data graph 802 is depicted as having 5 data graph nodes, or 5 sets of metadata corresponding to a respective one of 5 users (e.g., USER B, USER C, USER D, USER E, USER F). In this example, the user 810 is connected by way of metadata to USER B and USER D. For example, a first portion of first metadata associated with the user 810 can match, point to, reference, etc., a second portion of second metadata associated with USER B, a third portion of third metadata associated with USER D, etc. By way of another example, USER B is connected by way of metadata to USER E and USER F.

In the illustrated example, the first data graph 802 is representative of users in Zone 1, Location 1 of an environment (e.g., a factory, a warehouse, an office building, etc.). For example, the plurality of the data graph nodes 812 is coupled to one(s) of each other based on matching (or substantially matching) portion(s) of metadata (e.g., first metadata of a first user matching second metadata of a second user). In some examples, the data graph nodes 812 are included in the first data graph 802 because they share the same location. The data graph nodes 812 can be connected to one(s) of each other based on metadata relationships. For example, USER B may be a manager that supervises USER E and USER F.

In the illustrated example, the second data graph 804 is representative of users that are associated with a topic of welding. For example, data graph nodes of the second data graph 804 are likely to find data associated with welding relevant. In the illustrated example, the third data graph 806 is representative of users that are associated with a topic of riveting. For example, data graph nodes of the third data graph 806 are likely to find data associated with riveting relevant. In the illustrated example, the fourth data graph 808 is representative of users that are associated with a topic of robotics. For example, data graph nodes of the fourth data graph 808 are likely to find data associated with riveting relevant.

In the illustrated example, the user 810 represents a person and the metadata associated with the person (e.g., portion(s) of the metadata 464 corresponding to the user 810) based on the communities the person belongs to. In some examples, these communities could be based on expertise/knowledge/tasks (e.g., welding, riveting, robotics, etc.) or context (e.g., a location of Zone 1, Floor 1). In some examples in which a group of users in the same area (e.g., a location of Zone 1, Floor 1) are expected to receive the same data at the substantially same time, then multicast routing can be applied to one(s) of the users in the same area. In some examples, this metadata is collected based on activity of users as reported by sensors in the network environment (e.g., reported by video cameras on a factory floor). Additionally and/or alternatively, this metadata can be collected using passive sensing such as a wireless access point receiving a login in a particular location, a user scanning security credentials by way of RFID at a terminal, etc. In some examples, a context of a user can be collected using which applications the user uses, a role of the user in their organization, access rights of the user as determined by Information Technology (IT) personnel, internal groups (e.g., knowledge boards, message groups, special interest groups, etc.) the user is signed up to, etc. In some examples, the data routing manager 302A-I can execute NLP techniques to group words into context in the form of metadata.

Figure 9A:
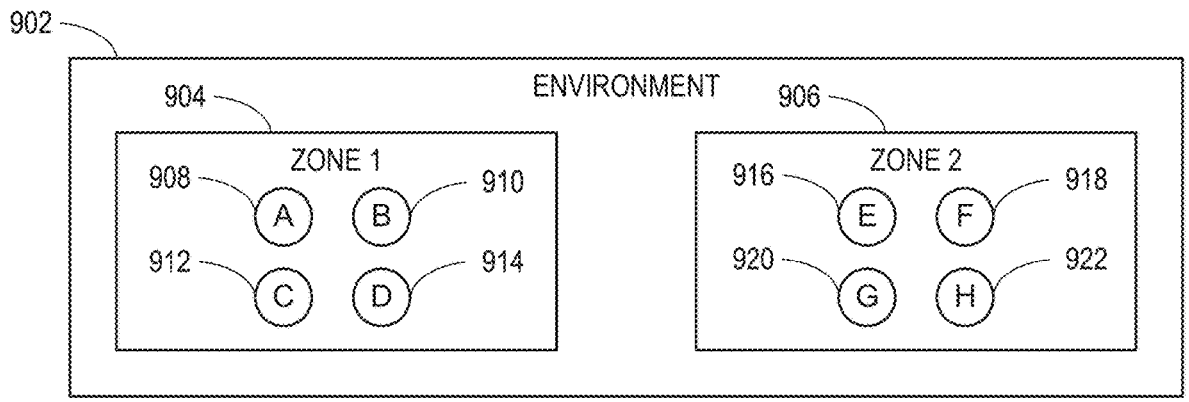
FIGS. 9A-9C are illustrations of example environments to implement examples disclosed herein.
Figure 9B:
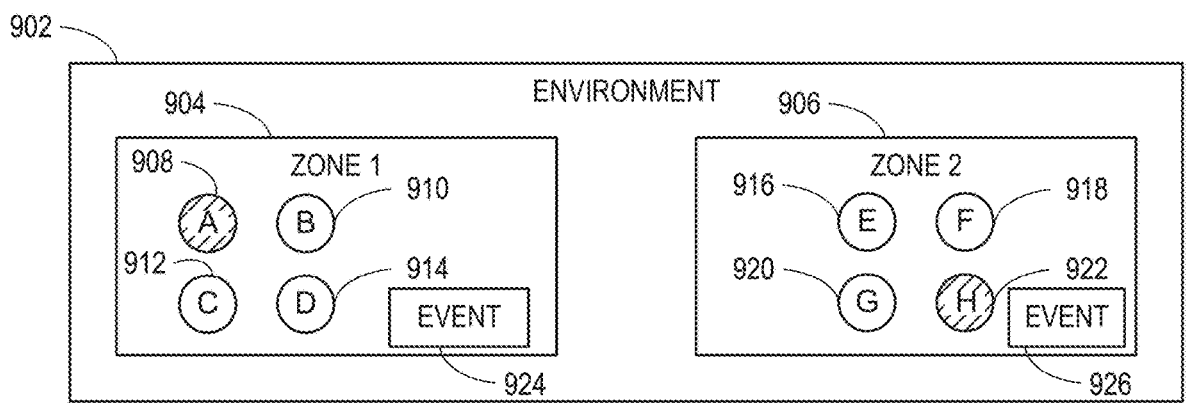
Figure 9C:
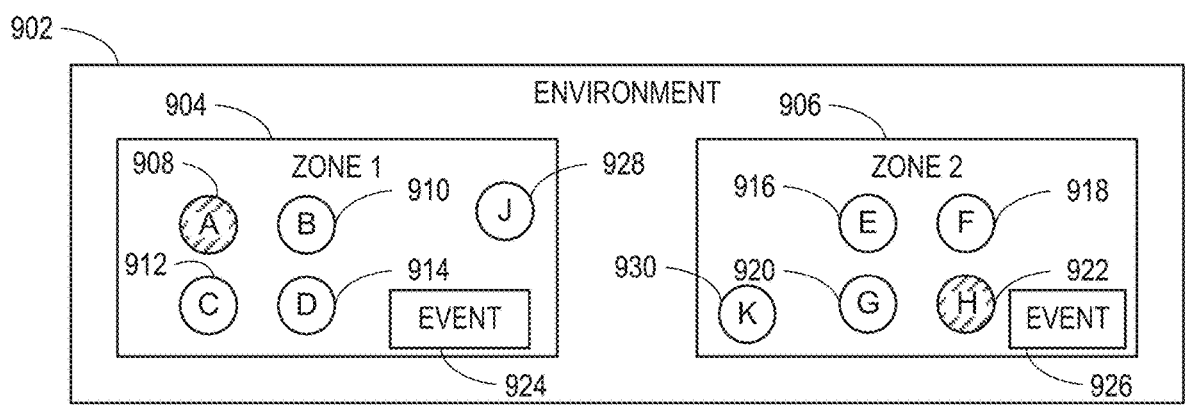

FIGS. 9A-9C are illustrations of an example environment 902 to implement examples disclosed herein. The environment 902 of the illustrated example is a physical environment, such as the environment 200 of FIG. 2. In some examples, the environment 902 is a virtual environments, such as a digital and/or virtual representation of a physical environment. For example, the environment 902 can be a digital twin of the environment 200. In some examples, the environment 902 is a network environment, such as the network environment 304 of FIG. 3. For example, the environment 902 can be representative of a network topology and interconnected nodes.

The environment 902 includes a first example zone 904 (identified by ZONE 1) and a second example zone 906 (identified by ZONE 2). The zones 904, 906 are respective portions of the environment 902. For example, the first zone 904 can be a first area that includes the robots 214 of FIG. 2 and the second zone 906 can be a second area that includes the industrial machines 216, 218, 220, 222 of FIG. 2.

The first zone 904 includes example nodes 908, 910, 912, 914 including a first example node 908 (identified by A), a second example node 910 (identified by B), a third example node 912 (identified by C), and a fourth example node 914 (identified by D). For example, the first node 908, the second node 910, the third node 912, and/or the fourth node 914 can be respective ones of the robots 214 of FIG. 2 (e.g., the first node 908 can be a first one of the robots 214, etc.).

The second zone 906 includes example nodes 916, 918, 920, 922 including a fifth example node 916 (identified by E), a sixth example node 918 (identified by F), a seventh example node 920 (identified by G), and an eighth example node 922 (identified by H). For example, the fifth node 916, the sixth node 918, the seventh node 920, and/or the eighth node 922 can be respective ones of the industrial machines 216, 218, 220, 222 of FIG. 2 (e.g., the fifth node 916 can be the first industrial machine 216, etc.).

In the illustrated example of FIG. 9B, two example events 924, 926 are generated, present, and/or otherwise have occurred. The events 924, 926 include a first example event 924 in the first zone 904 and a second example event 926 in the second zone 906. For example, the first event 924 can be the first node 908 becoming inoperable, non-responsive, etc., due to a fault and/or maintenance condition. In some examples, the first event 924 can be the first one of the robots 214 transitioning from an online state to an offline state due to a fault, an error, a mechanical and/or electrical failure, etc., and/or any combination(s) thereof. For example, the first node 908 can be offline while the second through fourth nodes 910, 912, 914 are online and/or otherwise not experiencing a fault and/or maintenance condition.

In some examples, the second event 926 can be the eighth node 922 becoming inoperable, non-responsive, etc., due to a fault and/or maintenance condition. In some examples, the second event 926 can correspond to the fourth industrial machine 222 transitioning from an online state to an offline state due to a fault, an error, a mechanical and/or electrical failure, etc., and/or any combination(s) thereof. For example, the eighth node 922 can be offline while the fifth through seventh nodes 916, 918, 920 are online and/or otherwise not experiencing a fault and/or maintenance condition.

In some examples, the events 924, 926 are generated by a node experiencing and/or associated with the events 924, 926. For example, the first event 924 can be generated by the first node 908 in response to a determination by the first node 908 that it is undergoing and/or experiencing a fault and/or maintenance condition or state. In some examples, the first event 924 can be generated by one(s) of the second through fourth nodes 910, 912, 914 after a determination by the one(s) of the second through fourth nodes 910, 912, 914 that there is an issue (e.g., a fault and/or unplanned maintenance condition) with the first node 908. In some examples, the determination can be based on sensor measurements of the second through fourth nodes 910, 912, 914 that detect the first node 908 is not moving, operating, etc. In some examples, the determination can be based on network telemetry data associated with the first node 908, such as ping requests going unanswered and/or not having associated replies, a lack of detection of a heartbeat signal, a watchdog timer not being updated, etc., is indicative of the eighth node 922 being offline.

In some examples, the second event 926 can be generated by the eighth node 922 in response to a determination by the eighth node 922 that it is undergoing and/or experiencing a fault and/or maintenance condition or state. In some examples, the second event 926 can be generated by one(s) of the fifth through seventh nodes 916, 918, 920 after a determination by the one(s) of the fifth through seventh nodes 916, 918, 920 that there is an issue (e.g., a fault and/or unplanned maintenance condition) with the eighth node 922. In some examples, the determination can be based on sensor measurements of the fifth through seventh nodes 916, 918, 920 that detect the eighth node 922 is not moving, operating, etc. In some examples, the determination can be based on network telemetry data associated with the eighth node 922, such as ping requests going unanswered and/or not having associated replies, a lack of detection of a heartbeat signal, a watchdog timer not being updated, etc., is indicative of the eighth node 922 being offline.

In some examples, the events 924, 926 can have associated metadata, such as the metadata 464 of FIG. 4. For example, the first event 924 can have metadata including and/or associated with an identifier of the first node 908, sensor data/measurements associated with the first node 908, an alarm/fault/maintenance condition identifier associated with the first node 908, a location of the first node 908 (e.g., an identifier or location of the first zone 904), characteristics associated with the first node 908 to assist in user relevancy determinations, etc., and/or any combination(s) thereof.

In the illustrated example of FIG. 9C, a ninth example node 928 (identified by J) moved (or has been moved) to the first zone 904. In some examples, the ninth node 928 can be another one of the robots 214. For example, in response to the first event 924, another one of the robots 214 can be moved to the first zone 904 to take over workloads from the first node 908. In some examples, the ninth node 928 can be a user, such as a human user (e.g., a maintenance technician, an engineer, repair personnel, etc.) and/or a non-human user (e.g., a robot technician, a repair robot, a device, etc.), that moved to the first zone 904 to address the first event 924. For example, in response to the first event 924, a human user can enter the first zone 904 to diagnose, repair, and/or replace the first node 908. In some examples, in response to the first event 924, a robot can enter the first zone 904 to diagnose, repair, and/or replace the first node 908 without human intervention (or collaboratively with human intervention, such as working with a human user).

In the illustrated example of FIG. 9C, a tenth example node 930 (identified by K) moved (or has been moved) to the second zone 906. In some examples, the tenth node 928 930 can be another one of the industrial machines 216, 218, 220, 222. For example, in response to the second event 926, another one of the industrial machines 216, 218, 220, 222 can be moved to the second zone 906 to pick up workloads in place of the eighth node 922. In some examples, the tenth node 930 can be a user, such as a human user (e.g., a maintenance technician, an engineer, repair personnel, a human forklift operator, etc.) and/or a non-human user (e.g., a robot technician, a repair robot, a device, an autonomous forklift, etc.), that moved to the second zone 906 to attend to the second event 926. For example, in response to the second event 926, a human user can enter the second zone 906 to diagnose, repair, and/or replace the eighth node 922. In some examples, in response to the second event 926, an autonomous forklift can enter the second zone 906 to diagnose, repair, take away, and/or replace the eighth node 922 without human intervention (or collaboratively with human intervention, such as working with a human user).

In some examples, metadata associated with the events 924, 926 can be augmented, changed, and/or modified in response to the addition of the ninth node 928 and/or the tenth node 930 to the zones 904, 906. For example, after the ninth node 928 is dispatched to the first zone 904, the ninth node 928 can generate metadata such as an identifier of the ninth node 928, action(s)/operation(s) carried out by the ninth node 928 after generation of the first event 924, etc., and/or any combination(s) thereof. In some examples, the metadata generated by the ninth node 928 (or different node(s) of the first zone 904) can be associated with the first event 924, one(s) of the first through fourth nodes 908, 910, 912, 914, the first zone 904, and/or, more generally, the environment 902. For example, the metadata can be stored in the metadata datastore 146 of FIG. 1, the datastore 460 as the metadata 464, etc. In some examples, the machine-learning circuitry 420 can retrain the machine-learning models 470 based on the metadata. In some examples, the machine-learning circuitry 420 can change and/or update the environment topology 472 based on the ninth node 928 entering the first zone 904. In some examples, the machine-learning circuitry 420 can change and/or update one(s) of the contextual data graph models 474 based on the metadata, such as strengthening an association between the first event 924 and the ninth node 928 (e.g., the metadata is routed to the ninth node 928 and the ninth node 928 confirmed or affirmed that the metadata is relevant to the ninth node 928). In some examples, the machine-learning circuitry 420 can change and/or update one of the digital twins 476 corresponding to the first zone 904, and/or, more generally, the environment 902, based on the ninth node 928 transitioning to the first zone 904, the first node 908 going offline, etc.

In some examples, after the tenth node 930 is dispatched to the second zone 906, the tenth node 930 can generate metadata such as an identifier of the tenth node 930, action(s)/operation(s) carried out by the tenth node 930 after generation of the second event 926, etc., and/or any combination(s) thereof. In some examples, the metadata generated by the tenth node 930 (or different node(s) of the second zone 906) can be associated with the second event 926, one(s) of the fifth through eighth nodes 916, 918, 920, 922, the second zone 906, and/or, more generally, the environment 902. For example, the metadata can be stored in the metadata datastore 146 of FIG. 1, the datastore 460 as the metadata 464, etc. In some examples, the machine-learning circuitry 420 can retrain the machine-learning models 470 based on the metadata. In some examples, the machine-learning circuitry 420 can change and/or update the environment topology 472 based on the tenth node 930 entering the second zone 906. In some examples, the machine-learning circuitry 420 can change and/or update one(s) of the contextual data graph models 474 based on the metadata, such as strengthening an association between the second event 926 and the tenth node 930 (e.g., the metadata is routed to the tenth node 930 and the tenth node 930 acknowledged that the metadata is relevant to the tenth node 930). In some examples, the machine-learning circuitry 420 can change and/or update one of the digital twins 476 corresponding to the second zone 906, and/or, more generally, the environment 902, based on the tenth node 930 moving to the second zone 906, the eighth node 922 going offline, etc.

FIG. 10 depicts an example dataset 1000, which includes example metadata 1002. In some examples, the metadata 1002, and/or, more generally, the dataset 1000, can implement the metadata 464 of FIG. 4, or portion(s) thereof, metadata stored in the metadata datastore 146 of FIG. 1, or portion(s) thereof, etc. In some examples, the data routing manager 302A-I can effectuate adaptive and/or proactive data routing in the network environment 304 of FIG. 3 based on the metadata 1002. For example, the machine-learning circuitry 420 can execute and/or instantiate one(s) of the machine-learning models 470 to carry out time based and/or content type analysis of the metadata 1002. For example, the one(s) of the machine-learning models 470 can generate model output(s), which can include individual user data traffic and content selection/preference. In some examples, the one(s) of the machine-learning models 470 can identify preference(s) for each user in private node dataset to be stored in the datastore 460.

In the illustrated example, the dataset 1000 includes data associated with a network environment, such as a user organization, user discipline(s), discipline categories, comparable disciplines, user organization level of responsibility and/or ranking, and the like. For example, the data included in the dataset 1000 can be associated with and/or otherwise correspond to a user, such as one of the users 466. In the illustrated example, the dataset 1000 can include user event cycles, which can be used to identify user(s) of interest to whom to deliver alerts. In the illustrated example, the dataset 1000 can include user topics of interest, user secondary topics, user common format preference(s), etc., from which alert(s) may be generated and/or a routing of which may be determined.

Figure 11:
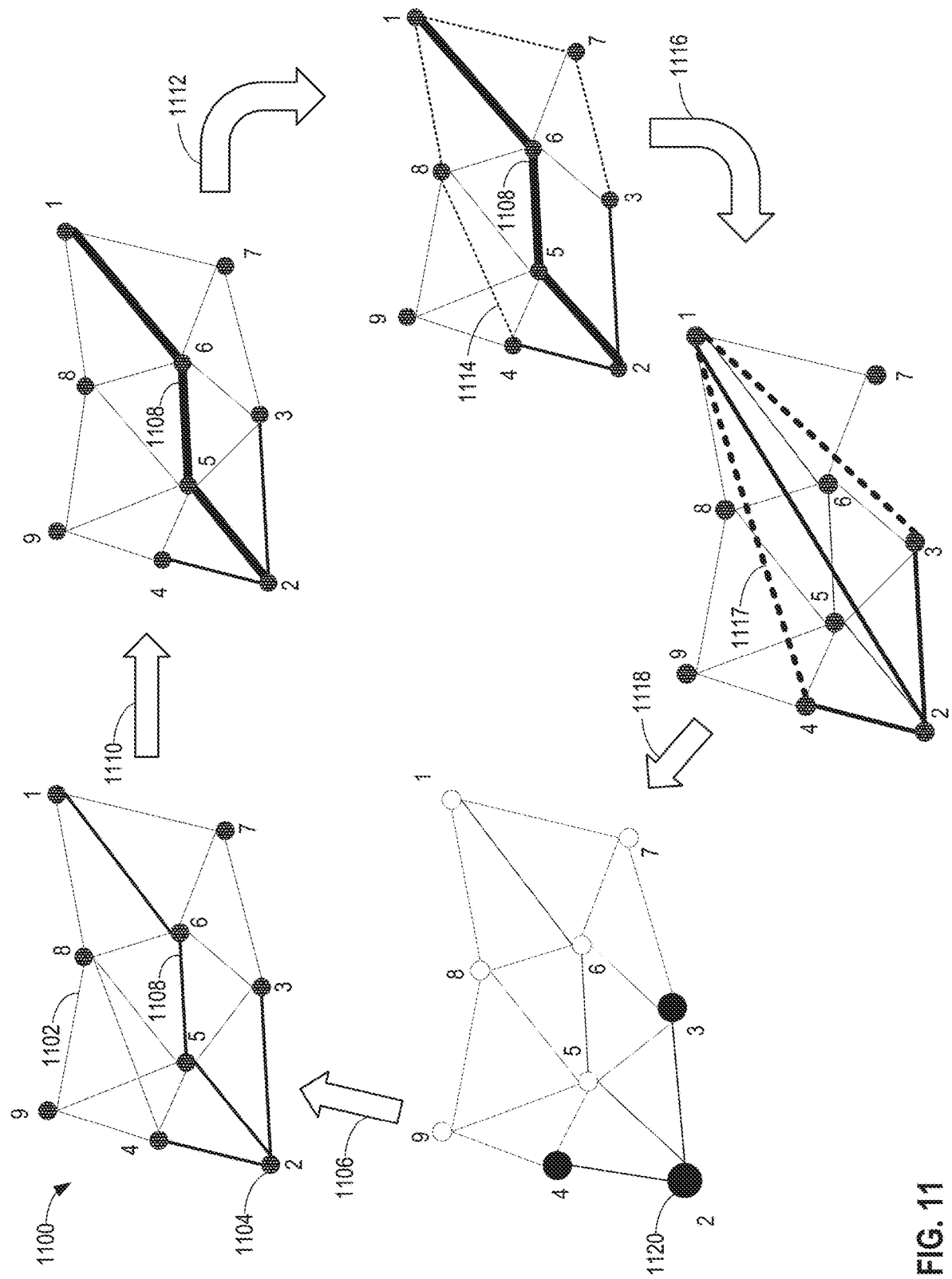
FIG. 11 depicts an example workflow to identify and/or output example data routing paths in a network environment.

FIG. 11 depicts an example workflow 1100 to identify and/or output example data routing paths in an example network environment 1102. The network environment 1102 includes a plurality of example nodes 1104 (identified by 1, 2, 3, 4, etc., and referred to herein as Node 1, Node 2, Node 3, Node 4, etc.). The workflow 1100 begins at first example operation(s) 1106 when a machine-learning model, such as one of the machine-learning models 470 of FIG. 4, is executed and/or instantiated to observe data flowing through the network environment 1102 along data routing paths (e.g., a data routing path from Node 1 to Node 2, etc.). For example, the data ingestion circuitry 410 can ingest event data associated with the network environment 1102, such as identifications of data and/or metadata transmitted and/or received at the nodes 1104; the data ingestion circuitry 410 can output the ingested event data to the machine-learning circuitry 420; and the machine-learning circuitry 420 can execute and/or instantiate the machine-learning model to build and/or output patterns (e.g., data patterns, data routing patterns, etc.) in the network environment 1102. In the illustrated example, data is routed from Node 1 to Nodes 3 and 4 via Node 2 (and intervening nodes) along a first example data routing path 1108. For example, Node 1 transmits data to Node 2, which processes the data and forwards the processed data to Nodes 3 and 4 to cause Nodes 3 and 4 to act in connection with the processed data.

During second example operation(s) 1110 of the workflow 1100, the machine-learning circuitry 420 executes and/or instantiates (e.g., repeatedly, iteratively, etc., executes and/or instantiates) the machine-learning model with observed repeated similar and/or same event data associated with the network environment 1102. For example, the machine-learning model can be trained (or retrained) to strengthen data routing paths between Nodes 1 and 2 based on historical data, such as previously ingested and/or observed routing of data with similar or the same metadata from Node 1 to Node 2.

During third example operation(s) 1112 of the workflow 1100, the machine-learning circuitry 420 executes and/or instantiates the machine-learning model to embed neural response pattern(s) or reflex(es) into the network structure of the machine-learning model (e.g., if the machine-learning model is a neural network or other type of AI/ML network-based model). For example, the recognized event data of the first data routing path 1108 can strengthen other data routing paths 1114 that may be used in connection with subsequent events having the previously ingested/observed event data.

During fourth example operation(s) 1116 of the workflow 1100, the machine-learning circuitry 420, over time, executes and/or instantiates the machine-learning model to generate outputs representative of, indicative of, and/or otherwise correspond to particular event and response pattern associations (e.g., a particular event is generated and a corresponding response pattern is detected and/or effectuated, such as a data routing path taken by data/metadata in the network environment 1102). For example, the machine-learning model can generate outputs representative of response pattern identifications, reinforcements, and strengthening of optimized data routing paths in connection with generated events. In some examples, the machine-learning model can prune and/or remove excess nodes and segments (e.g., a segment in a data routing path directly between nodes without an intervening node) from data routing paths to optimize and/or otherwise improve the responsiveness becoming reflexive in nature. In some examples, during the fourth operation(s) 1116, the machine-learning model outputs other example reflex paths 1117 (e.g., data routing paths, reflex data routing paths, etc.) for other identified repetitive events and issues. In some examples, the machine-learning model identifies unsuccessful data routing paths and cause them not to be repeated by removing them from the network structure of the machine-learning model and, thus, advantageously, leaving only successful responses, such as one(s) of the other reflex paths 1117. For example, the machine-learning model can remove the segment between Node 3 and Node 7 during the fourth operation(s) 1116 after a determination that the segment is an unsuccessful segment.

During fifth example operation(s) 1118, the machine-learning circuitry 420 can identify, based on outputs from the machine-learning model, multiple successful data routing paths (e.g., data pathways, data routing pathways, or simply pathways) through the same nodes. Advantageously, the multiple successful data routing paths can cause the creation of centers of example expertise nodes 1120 in specific types of information, technology, or issues (e.g., events). Advantageously, the data routing manager 302A-I, the data routing management circuitry 400, and/or, more generally, the ADM system 100 of FIG. 1, can use the multiple successful data routing paths to construct and test new data routing paths for issues or data input not previously encountered and learn affinities between those nodes and types of issues or problems. Such construction and testing of new data routing paths advantageously achieves a faster, proactive cycle of sense or analyze, make sense or rationalize, select an action, and perform the action, in response to a detection and/or ingesting of data/metadata associated with an event in an environment. Advantageously, the data routing manager 302A-I, the data routing management circuitry 400, and/or, more generally, the ADM system 100 of FIG. 1, can utilize the centers of expertise nodes to guide human decision-making on how to handle new events and thereby shorten the cycle for getting event data to the right person, system, device, etc., for dispositioning. After the fifth operation(s) 1118, the workflow can be repeated by returning to the first operation(s) 1106 to generate data routing paths for data/metadata after event generation.

Figure 12:
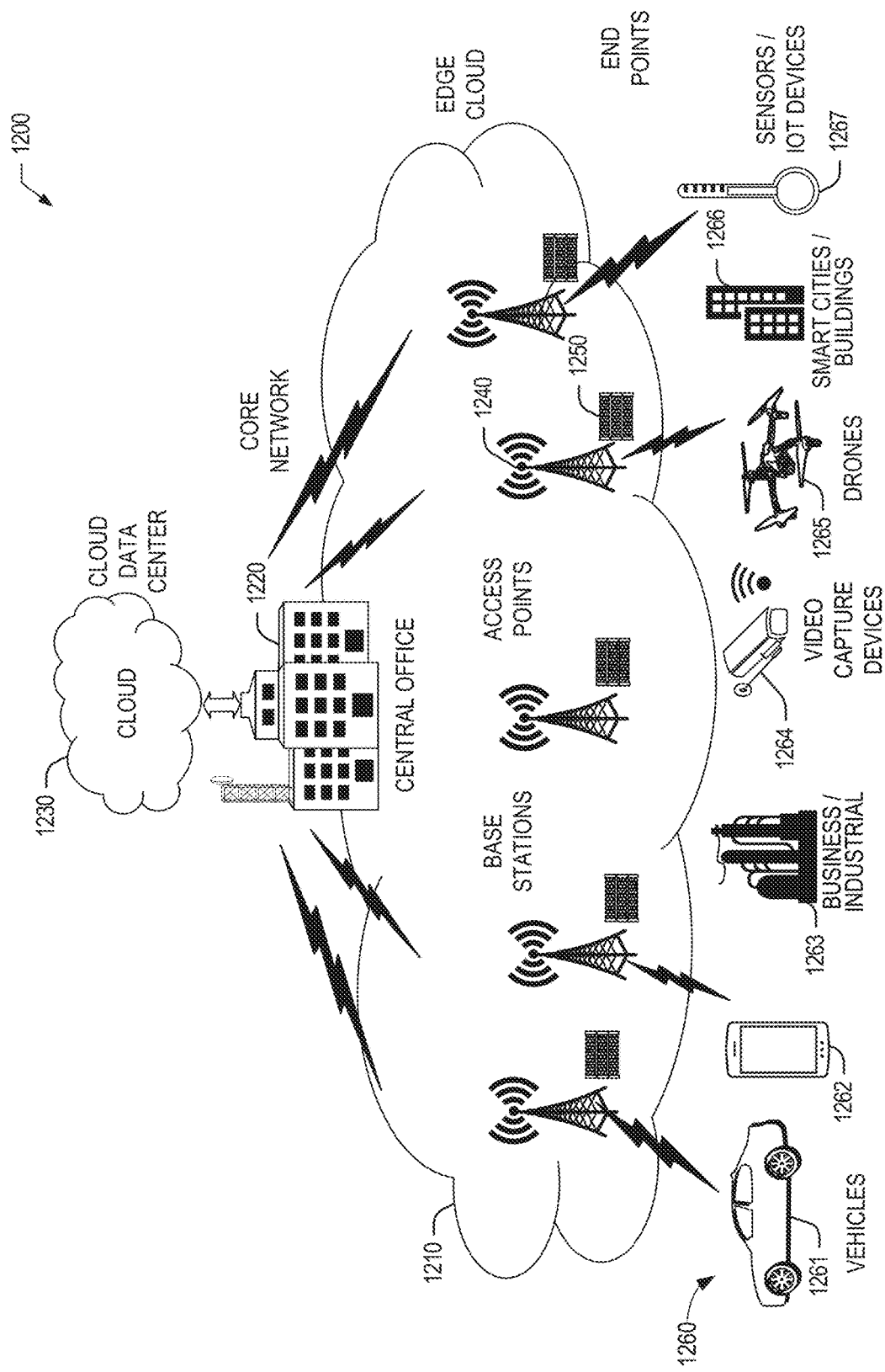
FIG. 12 illustrates an overview of an Edge cloud configuration for Edge computing.

FIG. 12 is a block diagram 1200 showing an overview of a configuration for Edge computing, which includes a layer of processing referred to in many of the following examples as an "Edge cloud". For example, the block diagram 1200 may implement an example adaptive data management system (also referred to herein as a smart data management system) as disclosed herein. As shown, the Edge cloud 1210 is co-located at an Edge location, such as an access point or base station 1240, a local processing hub 1250, or a central office 1220, and thus may include multiple entities, devices, and equipment instances. The Edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities and building devices 1266, sensors and IoT devices 1267, etc.) than the cloud data center 1230. Compute, memory, and storage resources which are offered at the edges in the Edge cloud 1210 are critical to providing ultra-low latency response times for services and functions used by the endpoint data sources 1260 as well as reduce network backhaul traffic from the Edge cloud 1210 toward cloud data center 1230 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 13:
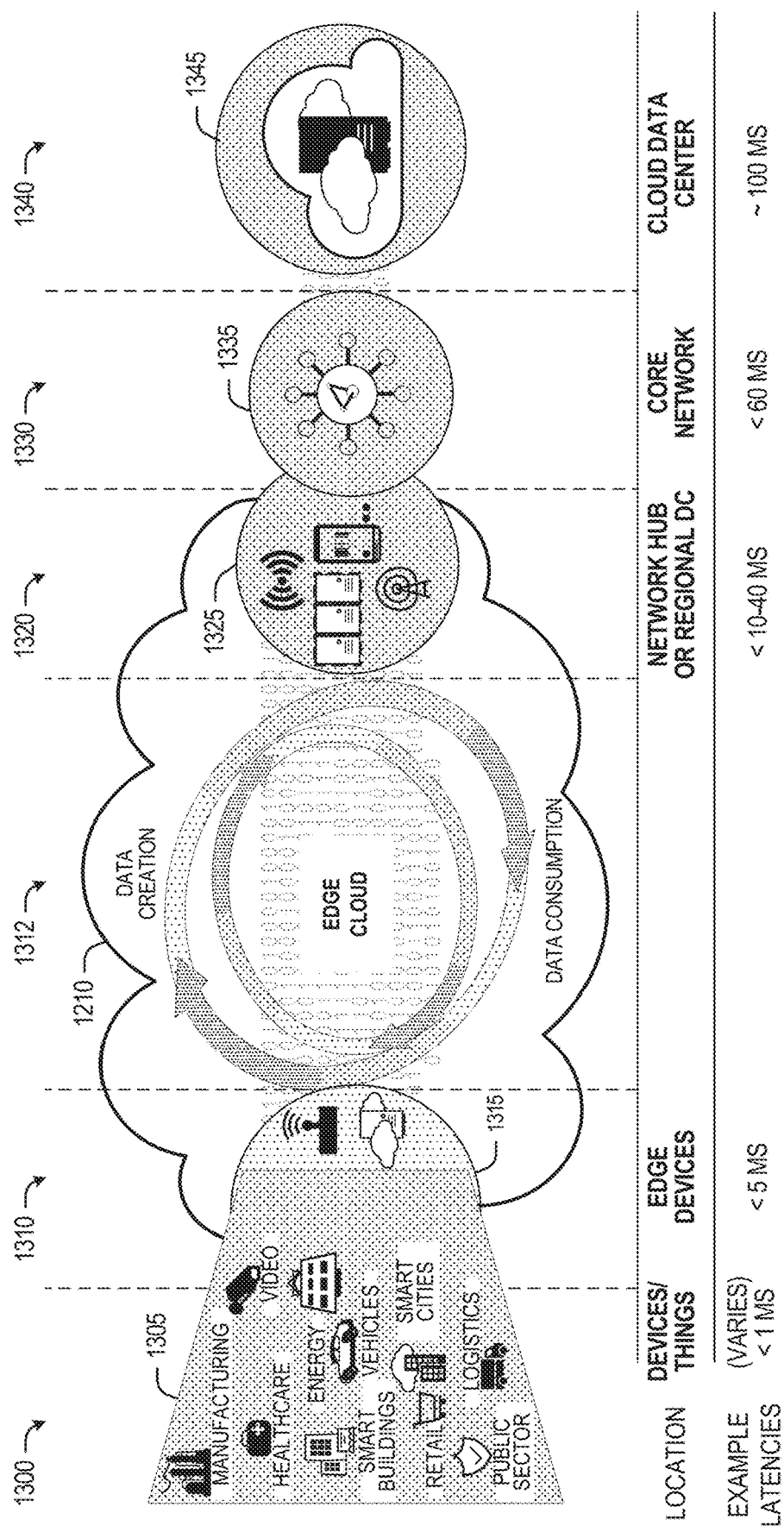
FIG. 13 illustrates operational layers among endpoints, an Edge cloud, and cloud computing environments.

FIG. 13 illustrates operational layers among endpoints, an Edge cloud, and cloud computing environments. For example, FIG. 13 may implement an example adaptive data management system as disclosed herein. Specifically, FIG. 13 depicts examples of computational use cases 1305, utilizing the Edge cloud 1210 among multiple illustrative layers of network computing. The layers begin at an endpoint (devices and things) layer 1300, which accesses the Edge cloud 1210 to conduct data creation, analysis, and data consumption activities. The Edge cloud 1210 may span multiple network layers, such as an Edge devices layer 1310 having gateways, on-premise servers, or network equipment (nodes 1315) located in physically proximate Edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the Edge cloud 1210 and among the various layers may occur via any number of wired or wireless mediums, including via connectivity architectures and technologies not depicted.

Examples of latency, resulting from network communication distance (e.g., distance between I/O interfaces such as PCIe or NICs) and processing time constraints, may range from less than a millisecond (ms) when among the endpoint layer 1300, under 5 ms at the Edge devices layer 1310, to even between 10 to 40 ms when communicating with nodes at the network access layer 1320. Beyond the Edge cloud 1210 are core network 1330 and cloud data center 1340 layers, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 1335 or a cloud data center 1345, a central office or content data network may be considered as being located within a "near Edge" layer ("near" to the cloud, having high latency values when communicating with the devices and endpoints of the use cases 1305), whereas an access point, base station, on-premise server, or network gateway may be considered as located within a "far Edge" layer ("far" from the cloud, having low latency values when communicating with the devices and endpoints of the use cases 1305). It will be understood that other categorizations of a particular network layer as constituting a "close", "local", "near", "middle", or "far" Edge may be based on latency, distance, number of network hops, or other measurable characteristics, as measured from a source in any of the network layers 1300-1340.

The various use cases 1305 may access resources under usage pressure from incoming streams, due to multiple services utilizing the Edge cloud. To achieve results with low latency, the services executed within the Edge cloud 1210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 1210 (network layers 1300-1340), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 1210.

As such, the Edge cloud 1210 is formed from network components and functional features operated by and within Edge gateway nodes, Edge aggregation nodes, or other Edge compute nodes among network layers 1310-1330. The Edge cloud 1210 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 1210 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 1210 may be servers, multi-tenant servers, appliance computing devices, and/or any other type of computing devices. For example, the Edge cloud 1210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing or electronic device is described in conjunction with FIGS. 41, 42, 43, and/or 44. The Edge cloud 1210 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines (VMs), one or more containers, etc. Such virtual computing environments provide an execution environment in which one or more applications and/or other software, code, or scripts may execute while being isolated from one or more other applications, software, code, or scripts.

Figure 14:
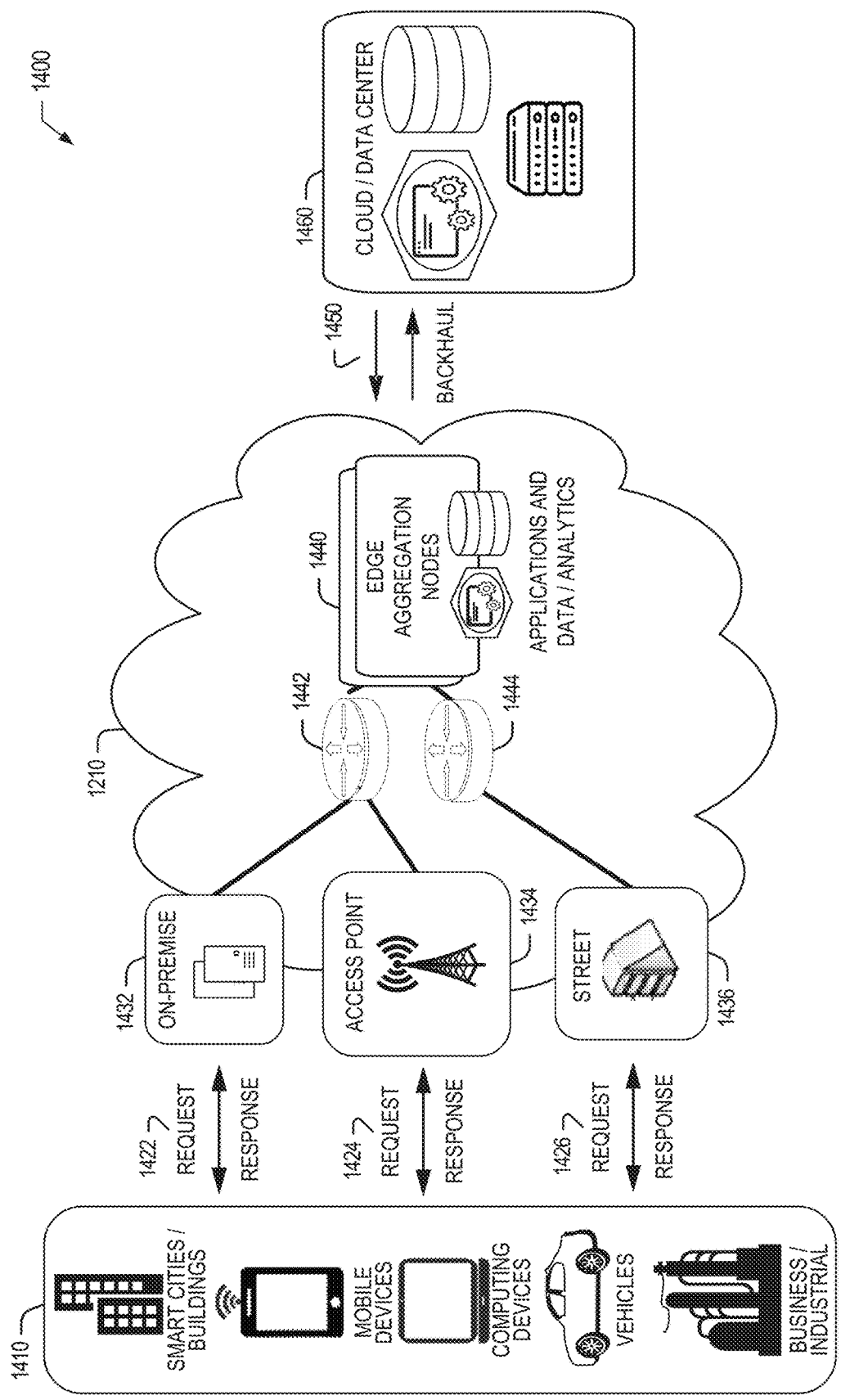
FIG. 14 illustrates an example approach for networking and services in an Edge computing system.

In FIG. 14, various client endpoints 1410 (in the form of mobile devices, computers, autonomous vehicles, business computing equipment, industrial processing equipment) exchange requests and responses that are specific to the type of endpoint network aggregation. For example, FIG. 14 may implement an example adaptive data management system as disclosed herein. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., a cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the Edge cloud 1210 to aggregate traffic and requests. Thus, within the Edge cloud 1210, the TSP may deploy various compute and storage resources, such as at Edge aggregation nodes 1440, to provide requested content. The Edge aggregation nodes 1440 and other systems of the Edge cloud 1210 are connected to a cloud or data center 1460, which uses a backhaul network 1450 to fulfill higher-latency requests from a cloud/data center for websites, applications, database servers, etc. Additional or consolidated instances of the Edge aggregation nodes 1440 and the aggregation points 1442, 1444, including those deployed on a single server framework, may also be present within the Edge cloud 1210 or other areas of the TSP infrastructure.

Figure 15:
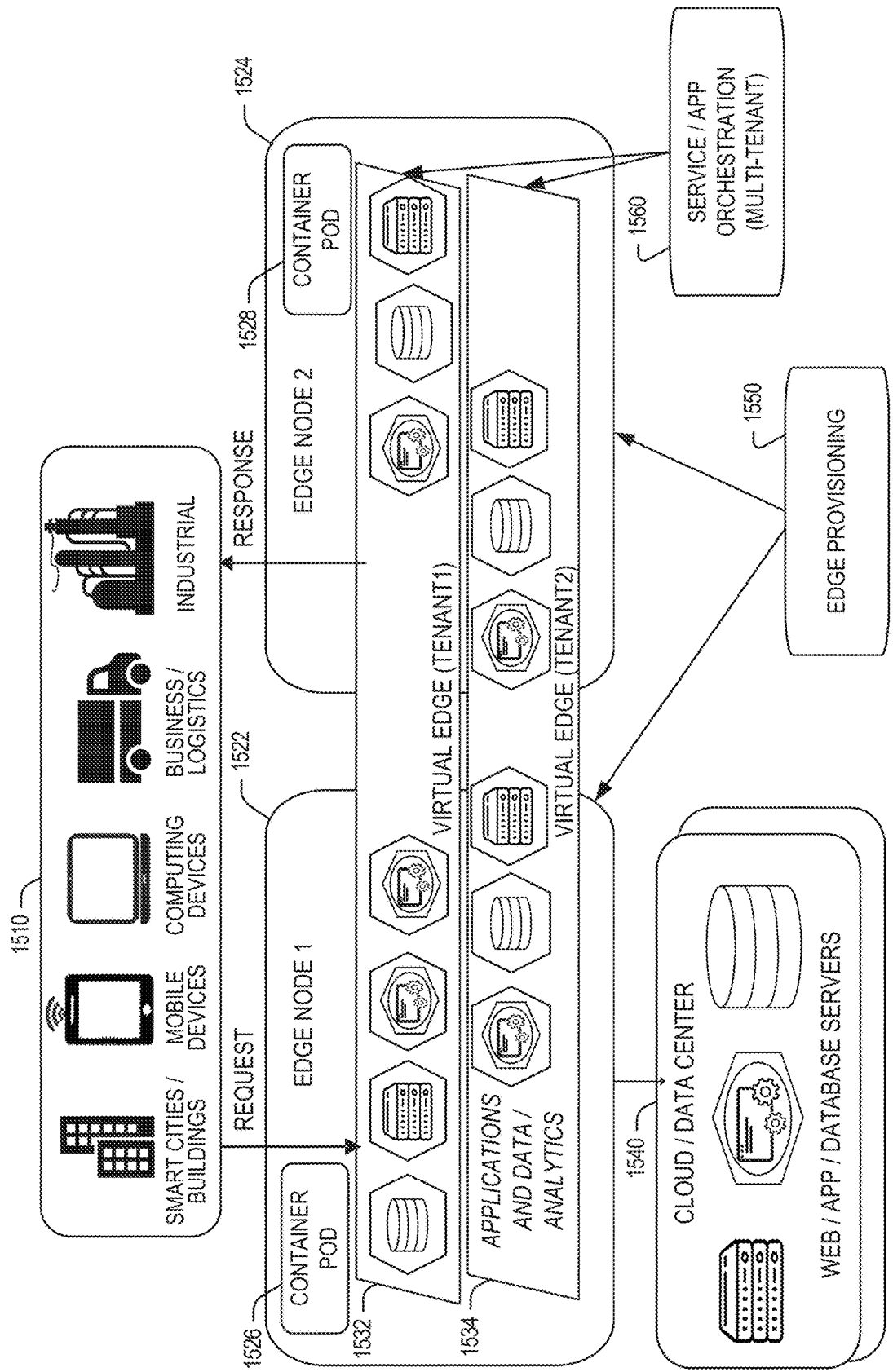
FIG. 15 illustrates deployment of a virtual Edge configuration in an Edge computing system operated among multiple Edge nodes and multiple tenants.

FIG. 15 illustrates deployment and orchestration for virtualized and container-based Edge configurations across an Edge computing system operated among multiple Edge nodes and multiple tenants (e.g., users, providers) which use such Edge nodes. For example, FIG. 15 may implement an example adaptive data management system as disclosed herein. Specifically, FIG. 15 depicts coordination of a first Edge node 1522 and a second Edge node 1524 in an Edge computing system 1500, to fulfill requests and responses for various client endpoints 1510 (e.g., smart cities/building systems, mobile devices, computing devices, business/logistics systems, industrial systems, etc.), which access various virtual Edge instances. Here, the virtual Edge instances 1532, 1534 provide Edge compute capabilities and processing in an Edge cloud, with access to a cloud/data center 1540 for higher-latency requests for websites, applications, database servers, etc. However, the Edge cloud enables coordination of processing among multiple Edge nodes for multiple tenants or entities.

In the example of FIG. 15, these virtual Edge instances include: a first virtual Edge 1532, offered to a first tenant (Tenant 1), which offers a first combination of Edge storage, computing, and services; and a second virtual Edge 1534, offered to a second tenant (Tenant 2), which offers a second combination of Edge storage, computing, and services. The virtual Edge instances 1532, 1534 are distributed among the Edge nodes 1522, 1524, and may include scenarios in which a request and response are fulfilled from the same or different Edge nodes. The configuration of the Edge nodes 1522, 1524 to operate in a distributed yet coordinated fashion occurs based on Edge provisioning functions 1550. The functionality of the Edge nodes 1522, 1524 to provide coordinated operation for applications and services, among multiple tenants, occurs based on orchestration functions 1560.

It should be understood that some of the devices in 1510 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective Edge nodes 1522, 1524 may operate as security feature enforcement points for local resources allocated to multiple tenants per node. Additionally, tenant runtime and application execution (e.g., in instances 1532, 1534) may serve as an enforcement point for a security feature that creates a virtual Edge abstraction of resources spanning potentially multiple physical hosting platforms. Finally, the orchestration functions 1560 at an orchestration entity may operate as a security feature enforcement point for marshalling resources along tenant boundaries.

Edge computing nodes may partition resources (memory, central processing unit (CPU), GPU, interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, servlets, servers, or other computation abstraction that may be partitioned according to a DICE layering and fan-out structure to support a RoT context for each. Accordingly, the respective RoTs spanning devices 1510, 1522, and 1540 may coordinate the establishment of a distributed trusted computing base (DTCB) such that a tenant-specific virtual trusted secure channel linking all elements end to end can be established.

Further, it will be understood that a container may have data or workload specific keys protecting its content from a previous Edge node. As part of migration of a container, a pod controller at a source Edge node may obtain a migration key from a target Edge node pod controller where the migration key is used to wrap the container-specific keys. When the container/pod is migrated to the target Edge node, the unwrapping key is exposed to the pod controller that then decrypts the wrapped keys. The keys may now be used to perform operations on container specific data. The migration functions may be gated by properly attested Edge nodes and pod managers (as described above).

In further examples, an Edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 15. For instance, an Edge computing system may be configured to fulfill requests and responses for various client endpoints from multiple virtual Edge instances (and, from a cloud or remote data center). The use of these virtual Edge instances may support multiple tenants and multiple applications (e.g., augmented reality (AR)/virtual reality (VR), enterprise applications, content delivery, gaming, compute offload, etc.) simultaneously. Further, there may be multiple types of applications within the virtual Edge instances (e.g., normal applications; latency sensitive applications; latency-critical applications; user plane applications; networking applications; etc.). The virtual Edge instances may also be spanned across systems of multiple owners at different geographic locations (or, respective computing systems and resources which are co-owned or co-managed by multiple owners).

For instance, each Edge node 1522, 1524 may implement the use of containers, such as with the use of a container "pod" 1526, 1528 providing a group of one or more containers. In a setting that uses one or more container pods, a pod controller or orchestrator is responsible for local control and orchestration of the containers in the pod. Various Edge node resources (e.g., storage, compute, services, depicted with hexagons) provided for the respective Edge slices 1532, 1534 are partitioned according to the needs of each container.

With the use of container pods, a pod controller oversees the partitioning and allocation of containers and resources. The pod controller receives instructions from an orchestrator (e.g., orchestrator 1560) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, the pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1560 may provision an attestation verification policy to local pod controllers that perform attestation verification. If an attestation satisfies a policy for a first tenant pod controller but not a second tenant pod controller, then the second pod could be migrated to a different Edge node that does satisfy it. Alternatively, the first pod may be allowed to execute and a different shared pod controller is installed and invoked prior to the second pod executing.

Figure 16:
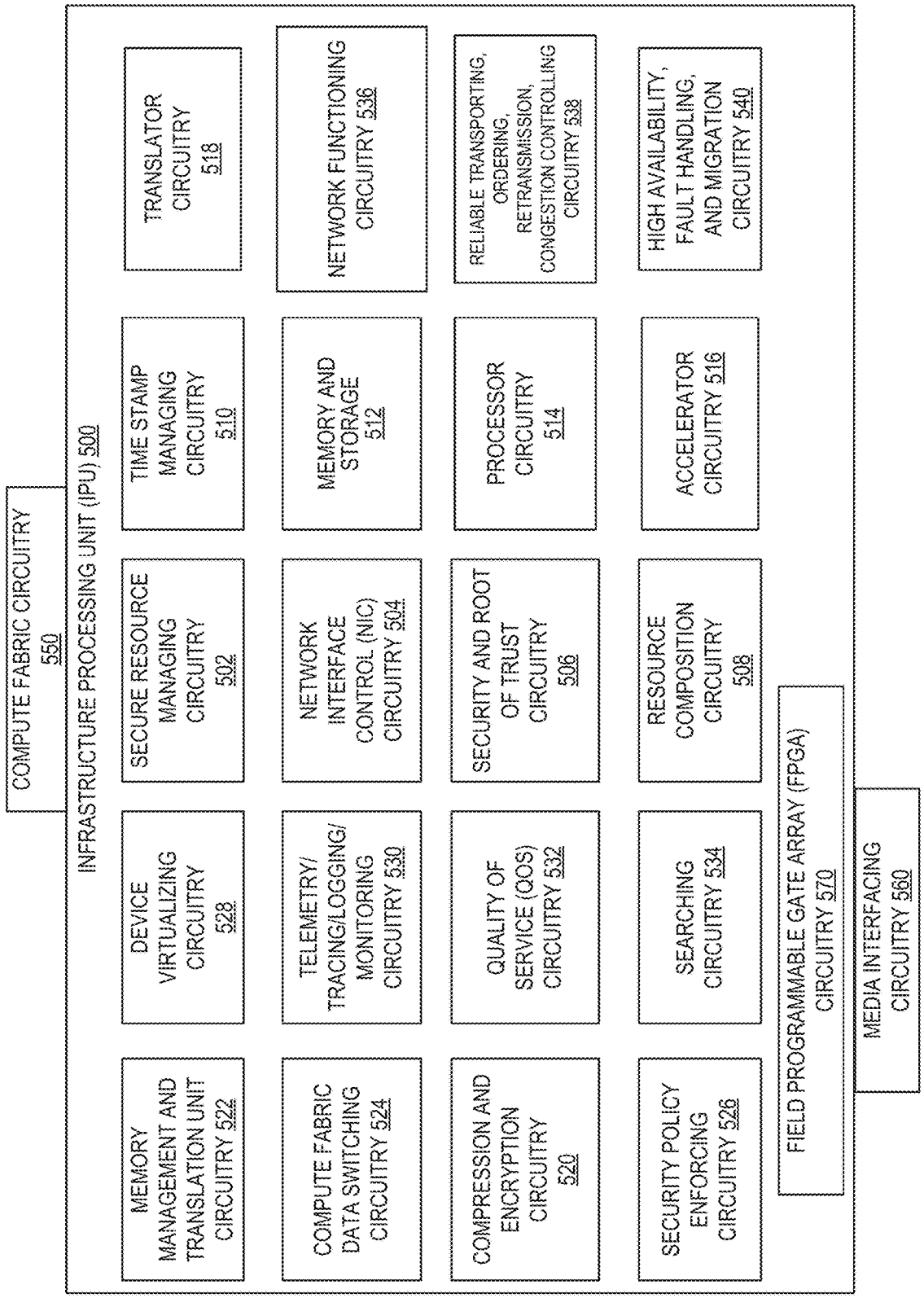
FIG. 16 is a schematic diagram of an example infrastructure processing unit (IPU).

FIG. 16 depicts an example of an infrastructure processing unit (IPU) 1600. In some examples, the IPU 1600 can effectuate and/or otherwise facilitate proactive and/or adaptive data management and analytics as described herein. Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 16, the IPU 1600 includes or otherwise accesses secure resource managing circuitry 1602, network interface controller (NIC) circuitry 1604, security and root of trust circuitry 1606, resource composition circuitry 1608, time stamp managing circuitry 1610, memory and storage 1612, processing circuitry 1614, accelerator circuitry 1616, and/or translator circuitry 1618. Any number and/or combination of other structure(s) can be used such as but not limited to compression and encryption circuitry 1620, memory management and translation unit circuitry 1622, compute fabric data switching circuitry 1624, security policy enforcing circuitry 1626, device virtualizing circuitry 1628, telemetry, tracing, logging and monitoring circuitry 1630, quality of service circuitry 1632, searching circuitry 1634, network functioning circuitry (e.g., routing, firewall, load balancing, network address translating (NAT), etc.) 1636, reliable transporting, ordering, retransmission, congestion controlling circuitry 1638, and high availability, fault handling and migration circuitry 1640 shown in FIG. 16. Different examples can use one or more structures (components) of the example IPU 1600 together or separately. For example, compression and encryption circuitry 1620 can be used as a separate service or chained as part of a data flow with vSwitch and packet encryption.

In some examples, the IPU 1600 includes a field programmable gate array (FPGA) 1670 structured to receive commands from an CPU, XPU, or application via an API and perform commands/tasks on behalf of the CPU, including workload management and offload or accelerator operations. The illustrated example of FIG. 16 may include any number of FPGAs configured and/or otherwise structured to perform any operations of any IPU described herein.

Example compute fabric circuitry 1650 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 1660 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1600, IPU 1600 is a root of a system (e.g., rack of servers or data center) and manages compute resources (e.g., CPU, xPU, storage, memory, other IPUs, and so forth) in the IPU 1600 and outside of the IPU 1600. Different operations of an IPU are described below.

In some examples, the IPU 1600 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 1600 is selected to perform a workload, secure resource managing circuitry 1602 offloads work to a CPU, xPU, or other device and the IPU 1600 accelerates connectivity of distributed runtimes, reduce latency, CPU and increases reliability.

In some examples, secure resource managing circuitry 1602 runs a service mesh to decide what resource is to execute workload, and provide for L7 (application layer) and remote procedure call (RPC) traffic to bypass kernel altogether so that a user space application can communicate directly with the example IPU 1600 (e.g., the IPU 1600 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to, iSCSI, NVMe-oF, or CXL.

In some cases, the example IPU 1600 dynamically selects itself to run a given workload (e.g., microservice) within a composable infrastructure including an IPU, xPU, CPU, storage, memory, and other devices in a node.

In some examples, communications transit through media interfacing circuitry 1660 of the example IPU 1600 through a NIC/smartNIC (for cross node communications) or loopback back to a local service on the same host. Communications through the example media interfacing circuitry 1660 of the example IPU 1600 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 1600 prioritizes its processing to minimize the stalling of the requesting application. In some examples, the IPU 1600 schedules the prioritized message request issuing the event to execute a SQL query database and the example IPU constructs microservices that issue SQL queries and the queries are sent to the appropriate devices or services.

Flowcharts representative of example hardware logic circuitry, machine-readable instructions, hardware implemented state machines, and/or any combination thereof for implementing the example ADM system 100 of FIG. 1, the example data routing manager 302A-I of FIG. 3, and/or the example data routing management circuitry 400 of FIG. 4 are shown in FIGS. 17-40. The machine-readable instructions may be one or more executable programs or portion(s) of an executable program for execution by processor circuitry, such as the processor circuitry 4112 shown in the example processor platform 4100 discussed below in connection with FIG. 41, the processor circuitry 4212 shown in the example processor platform 4200 discussed below in connection with FIG. 42, and/or the processor circuitry of FIGS. 43 and/or 44. The program may be embodied in software stored on one or more non-transitory computer readable storage media such as a CD, a floppy disk, a hard disk drive (HDD), a solid-state drive (SSD), a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 17-40, many other methods of implementing the example ADM system 100 of FIG. 1, the example data routing manager 302A-I of FIG. 3, and/or the example data routing management circuitry 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 17-40 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine-readable medium, and non-transitory machine-readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 17:
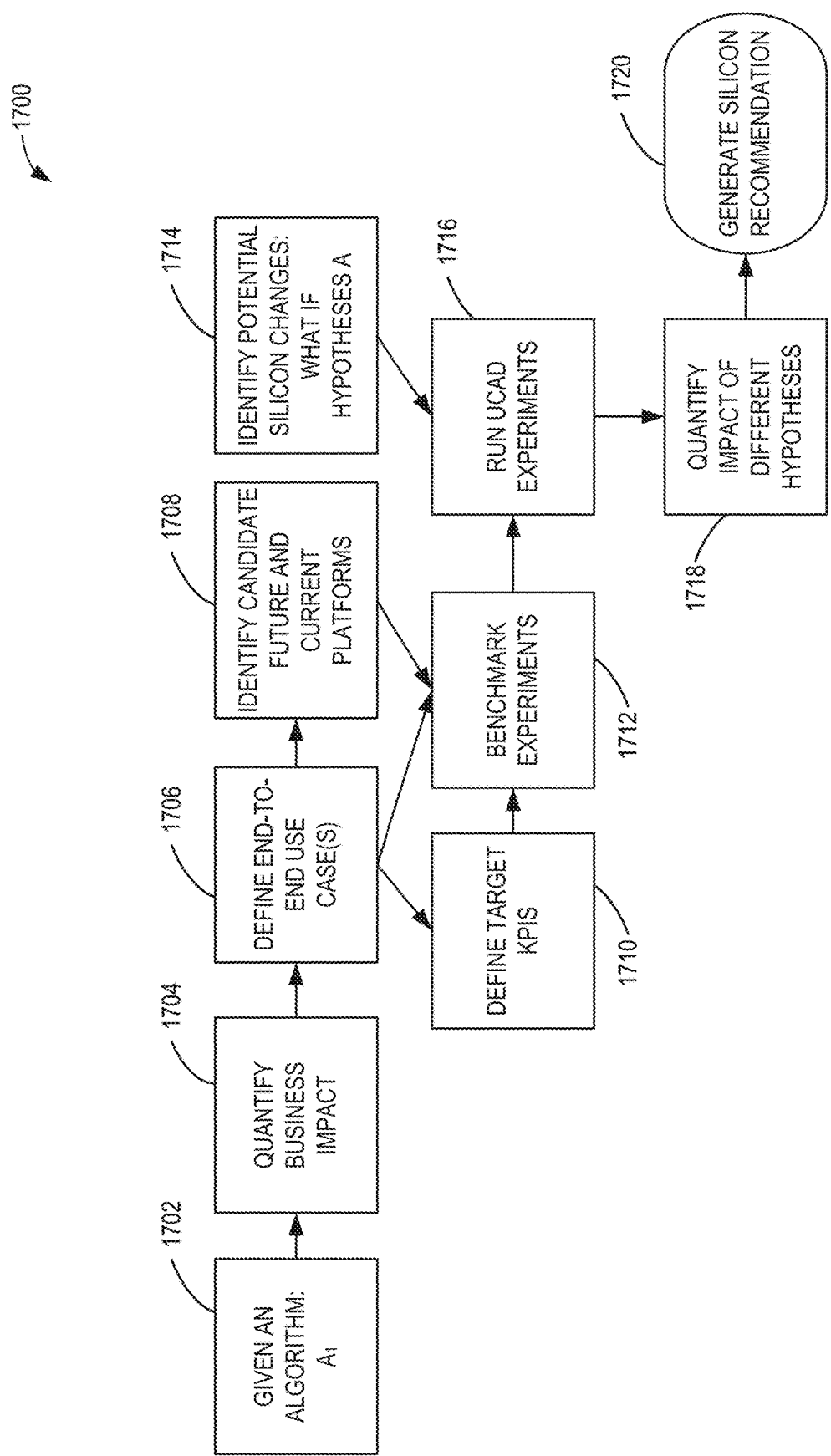
FIG. 17 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to generate an example recommendation to integrate a hardware, software, and/or firmware feature in a semiconductor-based device (e.g., a silicon-based device).

FIG. 17 is a flowchart representative of example machine-readable instructions and/or example operations 1700 that may be executed and/or instantiated by processor circuitry to implement the ADM system 100 of FIG. 1, the data routing manager 302A-I of FIG. 3, and/or the data routing management circuitry 400 of FIG. 4 to generate an example recommendation to integrate a hardware, software, and/or firmware feature in a semiconductor-based device (e.g., a silicon-based device). For example, the machine-readable instructions and/or the operations 1700 of FIG. 17 can be executed by the ADM system 100 of FIG. 1, or portion(s) thereof, the data routing manager 302A-I of FIG. 3, the example data routing management circuitry 400 of FIG. 4, and/or any other hardware, software, and/or firmware disclosed herein.

The example machine-readable instructions and/or the example operations 1700 of FIG. 17 begin at block 1702, at which a candidate algorithm (e.g., an AI/ML algorithm) is identified. At block 1704, a business impact of the candidate algorithm may be quantified. At block 1706, end-to-end use case(s) that may utilize the candidate algorithm are defined. At block 1708, current and future candidate platforms that may be utilized for the end-to-end use case(s) may be identified. At block 1710, target key performance indicators (KPIs) may be defined and technical benchmarking may be implemented at block 1712. At block 1714, potential changes to a semiconductor-based device may be identified and computer-aided design (e.g., CAD, UCAD, etc.) experiments may be conducted at block 1716. At block 1718, an impact of different hypotheses are quantified, which may result in generating a semiconductor-device based recommendation at block 1720. For example, a recommendation to change (e.g., add, remove, and/or modify) hardware, software, and/or firmware associated with a semiconductor-based device may be generated at block 1720. In some examples, the semiconductor-based device may be manufactured based on the recommendation. In some examples, the manufactured semiconductor-based device may execute and/or otherwise implement the candidate algorithm identified at block 1702 using hardware, software, and/or firmware of the manufactured semiconductor-based device.

Figure 18:
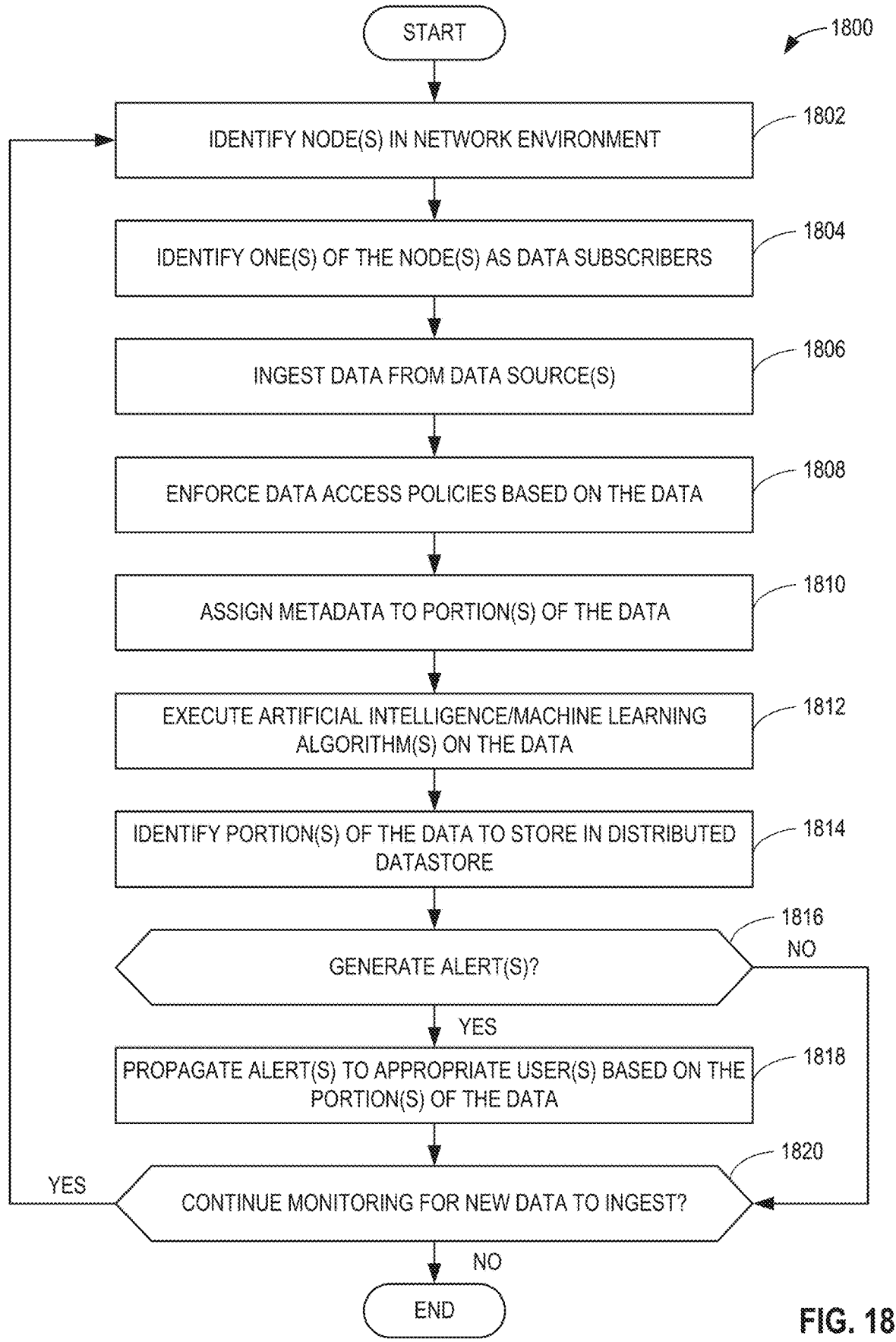
FIG. 18 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to analyze ingested data in a network.

FIG. 18 is a flowchart representative of example machine-readable instructions and/or example operations 1800 that may be executed and/or instantiated by processor circuitry to implement the ADM system 100 of FIG. 1, the data routing manager 302A-I of FIG. 3, and/or the data routing management circuitry 400 of FIG. 4 to analyze ingested data in a network. The example machine-readable instructions and/or the example operations 1800 of FIG. 18 begin at block 1802, at which the ADM system 100 of FIG. 1 identifies node(s) in a network environment.

At block 1804, the ADM system 100 identifies one(s) of the node(s) as data subscribers. For example, the node manager 122 can identify one or more nodes based on the preferred nodes table 124. In some examples, the data publishing manager 118 can identify one(s) of the one or more nodes as subscribing for data updates, alerts, indications, etc. In some examples, the data publishing manager 118 can consult the scheduler 120 to determine which one(s) of the one or more nodes are data subscribers.

At block 1806, the ADM system 100 ingests data from data source(s). For example, the data ingestion manager 106 can obtain data from the data sources 104. In some examples, the pre-processing manager 108 can pre-process the ingested data.

At block 1808, the ADM system 100 enforces data access policies based on the data. For example, the data security manager 132 can enforce the access policies. In some examples, the data security manager 132 can implement one or more security operations in connection with a data requester, data that is being requested, access to components of the ADM system 100, etc., and/or combination(s) thereof based on the access policies.

At block 1810, the ADM system 100 assigns metadata to portion(s) of the data. For example, the metadata/data enrichment manager 140 can add, remove, and/or modify metadata associated with portion(s) of the data. In some examples, the metadata/data enrichment manager 140 can store the metadata in the metadata datastore 146.

At block 1812, the ADM system 100 executes Artificial Intelligence/Machine-Learning algorithm(s) on the data. For example, the AMR 134 can identify one(s) of the algorithms 138 to apply to the data. In some examples, the analytics manager 136 can execute the identified one(s) of the algorithms 138 on the data, or portion(s) thereof, to implement data classification, clustering, etc., operation(s) to generate recommendations, identify action(s) to carry out, generate alert(s), etc., and/or any combination(s) thereof.

At block 1814, the ADM system 100 identifies portion(s) of the data to store in a distributed datastore. For example, the data ingestion manager 106 can identify portion(s) of the ingested data to be stored in the raw datastore 148 (e.g., record in cold storage, hot storage, etc.). In some examples, the data ingestion manager 106 can consult the data query manager 110 and/or the analytics manager 136 to determine whether portion(s) of the data is/are to be stored in the distributed datastore 144.

At block 1816, the ADM system 100 determines whether to generate alert(s). For example, the AMR 134 can invoke the analytics manager 136 to execute one(s) of the algorithms 138 to determine whether an alert is to be generated. In some examples, the alert can be a predictive alert associated with an event yet to occur, an immediate alert associated with an imminent or ongoing event, etc., and/or combination(s) thereof.

If, at block 1816, the ADM system 100 determines not to generate an alert, control proceeds to block 1820 to determine whether to continue monitoring for new data to ingest. Otherwise, control proceeds to block 1818. At block 1808, the ADM system 100 propagates alert(s) to appropriate user(s) based on the portion(s) of the data. For example, the data publishing manager 118 can identify one or more users, one or more devices associated with the one or more users, etc., to which alert(s) is/are to be propagated, distributed, and/or otherwise provided to.

At block 1820, the ADM system 100 determines whether to continue monitoring for new data to ingest. If, at block 1820, the ADM system 100 determines to continue monitoring for new data to ingest, control returns to block 1802. Otherwise, the example machine-readable instructions and/or the example operations 1800 of FIG. 18 conclude.

Figure 19:
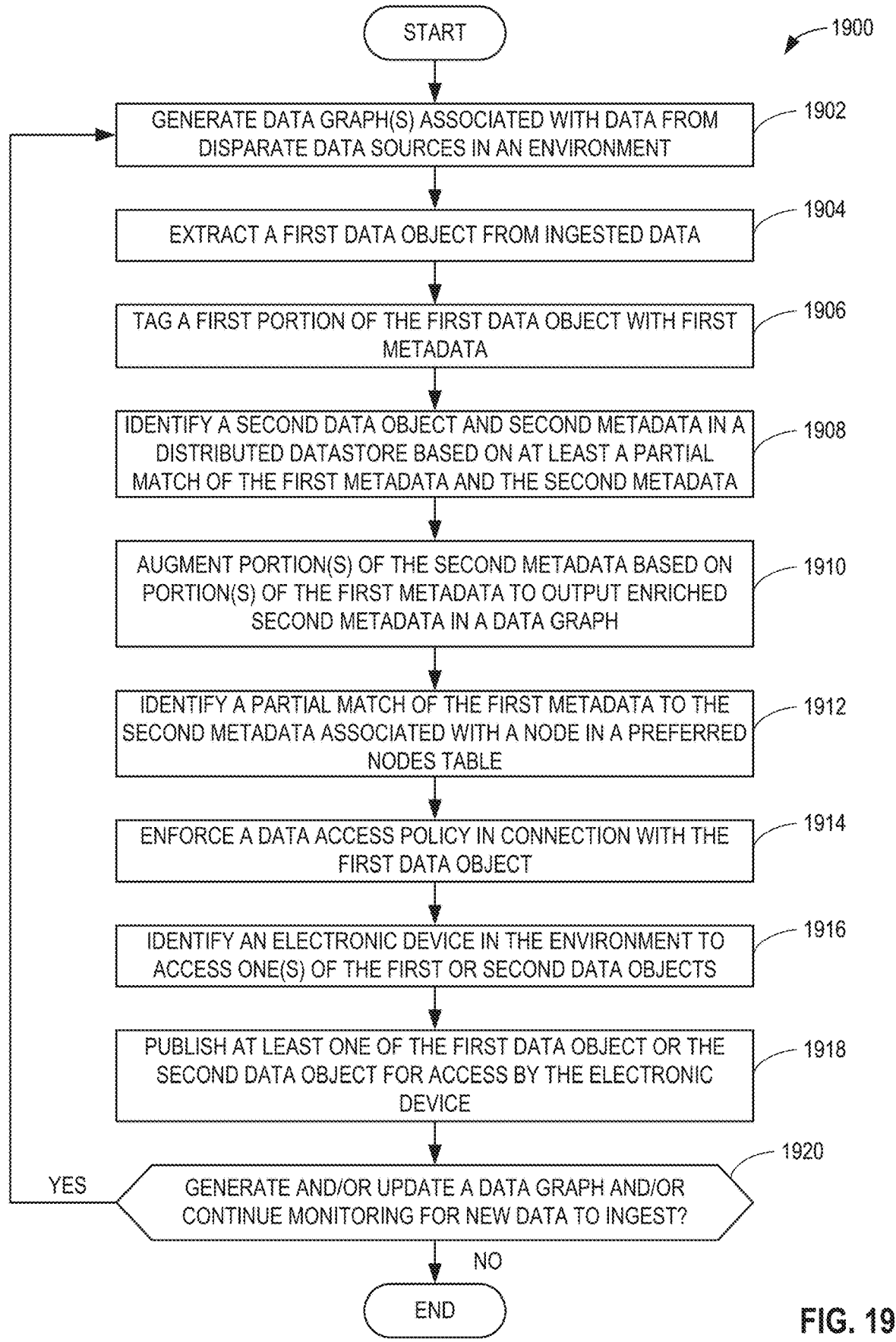
FIG. 19 is another flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to analyze ingested data in a network.

FIG. 19 is a flowchart representative of example machine-readable instructions and/or example operations 1900 that may be executed and/or instantiated by processor circuitry to implement the ADM system 100 of FIG. 1, the data routing manager 302A-I of FIG. 3, and/or the data routing management circuitry 400 of FIG. 4 to analyze ingested data in a network. The example machine-readable instructions and/or the example operations 1900 of FIG. 19 begin at block 1902, at which the ADM system 100 of FIG. 1 generates data graph(s) associated with data from disparate data sources in an environment. For example, the analytics manager 136 can instantiate, invoke, etc., the one(s) of the algorithms 138 to generate a new data graph (e.g., a data graph model, a contextual data graph model, etc.) based on data (e.g., control data, sensor data, corporate and/or organizational data, etc., from one(s) of the data sources 104 of FIG. 1 that may be of different types) in an environment (e.g., the environment 200 of FIG. 2) and/or identify an existing data graph based on the data as described herein. In some examples, the analytics manager 136 can instantiate, invoke, etc., one(s) of the algorithms 138 to identify one or more portions of the data to be stored in a datastore, such as the distributed datastore 144, as described herein. For example, the analytics manager 136 can determine to store the one or more portions of the data in hot storage, warm storage, or cold storage based on a data retention policy, which may be implemented using output(s) from the one(s) of the algorithms 138, as described herein. For example, the analytics manager 136 can use the one(s) of the algorithms 138 to predict at least one of an access frequency or a use frequency of the first data object by user(s) of the environment based on a data retention policy. In some examples, the analytics manager 136 can cause storage of the first data object in hot storage, warm storage, or cold storage based on the data retention policy.

In some examples, the analytics manager 136 obtains metadata from the metadata datastore 146 using the data plane 128 to be utilized in a generation of a data graph. The metadata can include one or more second portions of second metadata associated with a second data object and one or more third portions of third metadata associated with a third data object. In some examples, the third metadata includes one or more of the portion(s) of the second metadata. In some examples, the second metadata and the third metadata are associated with each other based on the portion(s) of the second metadata that are included in the second metadata and the third metadata. In some examples, the analytics manager 136 obtains the second data object from the raw datastore 148 using the data plane 128. In some examples, the analytics manager 136 generates a primary data graph node based on the second data object. For example, the second data object, or an identifier or reference to the second data object, can be the primary data graph node. In some examples, the analytics manager 136 generates a first strength vector to connect the primary data graph node to portion(s) of the second metadata. In some examples, the analytics manager 136 generates a second strength vector to connect the primary data graph node to portion(s) of the third metadata. In some examples, the analytics manager 136 generates the data graph based on at least one of the primary data graph node, the first strength vector, and the second strength vector. In some examples, the analytics manager 136 stores the data graph in the distributed datastore 144.

In some examples, the first data object includes a first lexical term and the second data object includes a second lexical term. In some examples, the analytics manager 136 is to, in response to a determination that a strength of a vector (e.g., the first strength vector, the second strength vector, etc.) in the data graph to connect a first portion of the first metadata to a second portion of the second metadata satisfies a threshold, generate an association of the first lexical term and the second lexical term. In some examples, the analytics manager 136 can cause storage of the association in the distributed datastore 144. For example, the association can be accessed by electronic devices in the environment or a different environment.

At block 1904, the ADM system 100 extracts a first data object from ingested data. For example, the data ingestion manager 106 can ingest data, which can include one or more data objects, from one(s) of the data sources 104 as described herein. In some examples, the data object can be a data file (e.g., a manufacturing report associated with a completion of an assembly, a supply chain purchase order, a spreadsheet, etc.), a sensor data object (e.g., data describing a controller that generated data, data representative of a sensor and a sensor measurement sensed by the sensor, etc.), audio data, text data, image data, video data, etc., and/or any combination(s) thereof as described herein.

In some examples, the first data object is a first instance of the data object. In some examples, the data ingestion manager 106 and/or the data query manager 110 locate a second instance of the first data object in the raw datastore 148 of the distributed datastore 144. In some examples, the first instance has one or more first values and the second instance to have one or more second values. In some examples, the analytics manager 136 can determine whether a correlation error based on a comparison of the one or more first values and the one or more second values satisfies a threshold. In some examples, the analytics manager 136, in response to a determination that the correlation error satisfies the threshold, can apply an error correction value to the first instance to reduce the correlation error, and expire the second instance. For example, the raw datastore 148 can age, expire, and/or otherwise cause the second instance to be removed from the environment immediately or over a period of time.

At block 1906, the ADM system 100 tags a first portion of the first data object with first metadata. For example, the data ingestion manager 106 and/or the data query manager 110 can tag a portion of the first data object with first metadata based on an environment of the one(s) of the data sources 104 and/or a type of one(s) of the data sources 104 that generated the first data object as described herein.

At block 1908, the ADM system 100 identifies a second data object and second metadata in a distributed datastore based on at least a partial match of the first metadata and the second metadata. For example, the data query manager 110 and/or the analytics manager 136 can identify a match (e.g., a partial match, a complete match, a substantial match, etc.) of first portion(s) of the first metadata to second portion(s) of second metadata. In some examples, the metadata datastore 146 can store the second metadata and association(s) of the second metadata with a second data object. In some examples, the raw datastore 148 can store the second data object. In some examples, the first portion and the second portion may be coupled and/or otherwise graphically connected or linked in a data graph as described herein.

In some examples, the first strength vector has a vector length and an angle with respect to a reference axis. For example, the vector length can be representative of a strength of association between the one of the one or more second portions of the second metadata and the second data object. In some examples, the first angle can be representative of a first probability that a first event associated with the one of the one or more second portions of the second metadata is to precede or follow a second event associated with the second data object.

At block 1910, the ADM system 100 augments portion(s) of the second metadata based on portion(s) of the first metadata to output enriched second metadata in a data graph. For example, the analytics manager 136 can direct, instruct, and/or otherwise cause the metadata/data enrichment manager 140 to augment the second metadata by adding and/or otherwise connecting one(s) of the first portion(s) of the first metadata to one(s) of the second portion(s) of the second metadata in a data graph (e.g., a data graph including connection(s) to link the first metadata and the second metadata). In some examples, the metadata/data enrichment manager 140 can augment the second metadata by writing and/or otherwise including the one(s) of the first portion(s) of the first metadata into one or more data entries of the second metadata. In some examples, the metadata/data enrichment manger 140 can enrich the second metadata in response to execution of one or more machine-learning models with the first data object, the second data object, the first metadata, and/or the second metadata as data input(s) to the one or more machine-learning models. In some examples, the metadata/data enrichment manager 140 can enrich the second metadata by removing and/or otherwise deleting portion(s) of the first metadata from the second metadata. In some examples, the metadata/data enrichment manager 140 can enrich the second metadata by removing and/or otherwise deleting portion(s) of the second metadata that is/are determined to not be as relevant as once determined and/or observed, not useful for determining decisions, outputs, etc., and/or any combination(s) thereof. Advantageously, the metadata/data enrichment manager 140 can make subsequent queries for the first data object, the second data object, etc., more enriching and/or otherwise more relevant or useful to a data requester by identifying other data object(s) that have strong or substantially relevant association(s) to the first data object, the second data object, etc., by linking the one(s) of the first portion(s) of the first metadata to one(s) of the second portion(s) of the second metadata.

At block 1912, the ADM system 100 identifies a partial match of the first metadata to the second metadata associated with a node in a preferred nodes table. For example, the analytics manager 136 can identify a match, such as a partial match, of the first metadata to second metadata associated with a node, such as the first endpoint device 832, or a user associated thereof. In some examples, the analytics manager 136 can provide the identification of the node to the node manager 122. In some examples, the node manager 122 can search and/or query the preferred nodes table 124 to determine whether the node is included in the preferred nodes table 124.

At block 1914, the ADM system 100 enforces a data access policy in connection with the first data object. For example, the data security manager 132 can determine that the second metadata includes a description of, a pointer to, a reference to, etc., a data access policy as described herein. In some examples, the data security manager 132 can determine whether the node identified by the second metadata is allowed access to the first data object (and/or similar or other relevant data to the first data object) based on the data access policy as described herein. In response to a determination by the data security manager 132 that the node does not have access to the first data object based on the data access policy, the data security manager 132 can enforce the data access policy by denying the node access to the first data object. For example, the data security manager 132 can instruct the data query manager 110 to deny the node access to the first data object as described herein. In some examples, the data security manager 132 can direct the data publishing manager 118 to not publish the first data object for access by the node. In some examples, in response to a determination that the node has access to the first data object based on the data access policy, the data security manager 132 can enforce the data access policy causing the first data object to be published for access by the node. For example, the data security manager 132 can instruct the data query manager 110 to grant the node access to the first data object as described herein. In some examples, the data publishing manager 118 can publish the first data object for access by the node as described herein. For example, the data publishing manager 118 can encrypt the first data object using an encryption key that the node possesses as described herein.

At block 1916, the ADM system 100 identifies an electronic device in the environment to access one(s) of the first or second data objects. For example, the node manager 122 can search the metadata datastore 146 using the second metadata as search input(s) to identify one or more electronic devices as search output(s) or result(s). In some examples, the node manager 122 can search the preferred nodes table 124 using the second metadata as search input(s) to identify one or more electronic devices as search output(s) or result(s). For example, the node manager 122 can identify an electronic device, such as the first endpoint device 832, referenced by the second metadata.

At block 1918, the ADM system 100 publishes at least one of the first data object or a second data object for access by the electronic device. For example, the data publishing manager 118 can publish at least one of the first data object or the second data object for access by the first endpoint device 832.

In some examples, the analytics manager 136 can identify one or more nodes representative of logical entities in the environment based on the data graph. For example, the analytics manager 136 can identify the one or more nodes based on a relevancy score associated with the one or more nodes and the first data object. In some examples, the node manager 122 can determine whether the one or more nodes are included in the preferred nodes table 124. In some examples, the data publishing manager 118 can publish the first data object for access by the one or more nodes in response to a determination that the one or more nodes are included in the preferred nodes table 124. In some examples, a score can be implemented using data. For example, the score may itself be data. For example, the score can be implemented using a value (e.g., a binary value, an alphanumeric value, etc.) that may be stored in a mass storage device, memory, etc. In some examples, a score can be implemented using any type of mathematical representation. For example, a score can be a probability or likelihood having a value in a particular range, such as from 0 to 1 (or any other range of values). In some examples, a score can be a value from a distribution, such as a probability distribution, a normal distribution, a logarithmic distribution, etc., or any other type of distribution. In some examples, a score can be a mathematical representation such as a ratio, a proportion, a percentage, a fraction, etc., or any other type of mathematical representation to describe a relationship between two components, elements, etc.

At block 1920, the ADM system 100 determines whether to generate and/or update a data graph and/or continue monitoring for new data to ingest. For example, the data ingestion manager 106 can determine whether to continue monitoring for data (e.g., new data including one or more data objects) that is created, generated, and/or otherwise made available by the one(s) of the data sources 104 as described herein. In some examples, the analytics manager 136 can determine whether to generate a new data graph and/or update an existing data graph based on feedback data (e.g., a user acknowledging a relevancy of the first and/or second data object presented to the user, an event that occurred after a publishing of the first and/or second data object, etc., and/or any combination(s) thereof. If, at block 1920, the ADM system 100 determines to generate and/or update a data graph and/or continue monitoring for new data to ingest at block 1920, control returns to block 1902. Otherwise, the example machine-readable instructions and/or the example operations 1900 of FIG. 19 conclude.

Figure 20:
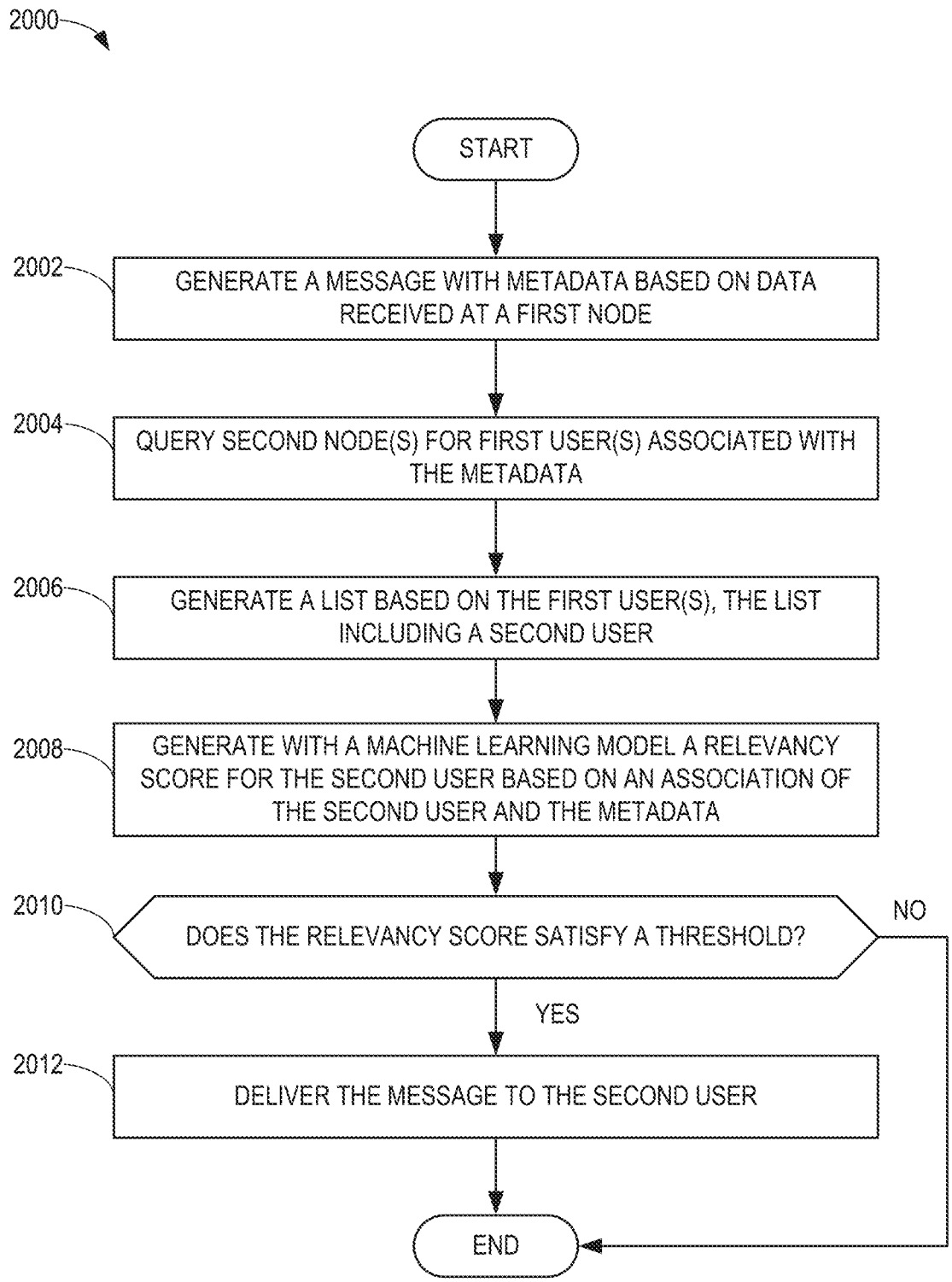
FIG. 20 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to route a message to user(s).

FIG. 20 is a flowchart representative of example machine-readable instructions and/or example operations 2000 that may be executed and/or instantiated by processor circuitry to implement the ADM system 100 of FIG. 1, the data routing manager 302A-I of FIG. 3, and/or the data routing management circuitry 400 of FIG. 4 to route a message to user(s). The example machine-readable instructions and/or the example operations 2000 of FIG. 20 begin at block 2002, at which the data routing management circuitry 400 generates a message with metadata based on data received at a first node. For example, the data query management circuitry 430 can generate a message including the metadata 464 that describes data received (or generated) at a first node, such as the first data routing manager 302A. In some examples, the data can be patient data (e.g., in a medical facility) such as a medical test result (e.g., an X-ray scan, a blood test, etc.), vehicle data (e.g., in an automotive manufacturing factory) such as a completion of a vehicle part, etc. In some examples, the metadata 464 can be a patient name, a doctor, a wing of a hospital in which the patient is being treated, etc. In some examples, the metadata 464 can be a serial number of a vehicle being manufactured, a location of the vehicle, etc.

At block 2004, the data routing management circuitry 400 queries second node(s) for first user(s) associated with the metadata. For example, the data publishing circuitry 450 can query one(s) of the data routing managers 302A-I for one(s) of the users 310, 312, 314, 316, 318, 320 associated with the metadata.

At block 2006, the data routing management circuitry 400 generates a list based on the first user(s), the list including a second user. For example, the node management circuitry 440 can generate a list of users including the first user 310 and the second user 312 that are associated with the metadata. For example, the first user 310 can be the nurse, doctor, surgeon, etc., treating the patient. In some examples, the second user 312 can be an oncologist, an X-ray technician, etc., treating the patient. In some examples, the first user 310 can be a supervisor on a factory floor, a technician on the factory floor, etc. In some examples, the second user 312 can be a supply chain engineer, a sales representative, etc., associated with the vehicle.

At block 2008, the data routing management circuitry 400 generates with a machine-learning model a relevancy score for the second user based on an association of the second user and the metadata. For example, the machine-learning circuitry 420 can execute and/or instantiate the machine-learning models 470 using the list of the users as model inputs to generate model outputs. In some examples, the model outputs can include a relevancy score for a respective one of the first user 310 and the second user 312. For example, the relevancy score for the first user 310 and the second user 312 can be correlated to a strength of association of the metadata with respective metadata of the first user 310 and the second user 312.

At block 2010, the data routing management circuitry 400 determines whether the relevancy score satisfies a threshold. For example, the machine-learning circuitry 420 can determine that a first relevancy score of 0.9 (e.g., a probability of 0.9, a 90% likelihood, etc.) for the first user 310 satisfies a relevancy score threshold of 0.8 because the first relevancy score of 0.9 is greater than or equal to 0.8. In some examples, the machine-learning circuitry 420 can determine that a second relevancy score of 0.4 (e.g., a probability of 0.4, a 40% likelihood, etc.) for the second user 312 does not satisfy the relevancy score threshold of 0.8 because the second relevancy score of 0.4 is less than 0.8.

If, at block 2010, the data routing management circuitry 400 determines that the relevancy score does not satisfy the threshold, the example machine-readable instructions and/or the example operations 2000 of FIG. 20 conclude. If, at block 2010, the data routing management circuitry 400 determines that the relevancy score satisfies the threshold, then, at block 2012, the data routing management circuitry 400 delivers the message to the second user. For example, the data publishing circuitry 450 can transmit the message to the first user 310 by way of the network 322. In some examples, the first electronic device 324 can present the message to the first user 310 by speaking the message through a speaker of the first electronic device 324. In some examples, the data routing management circuitry 400 can publish the message to a server from which data subscribers, such as the fourth data routing manager 302D, can identify the message as being addressed to the first user 310 and thereby retrieving the message for presenting to the first user 310 by way of the first electronic device 324. In response to delivering the message to the second user at block 2012, the example machine-readable instructions and/or the example operations 2000 of FIG. 20 conclude.

Figure 21:
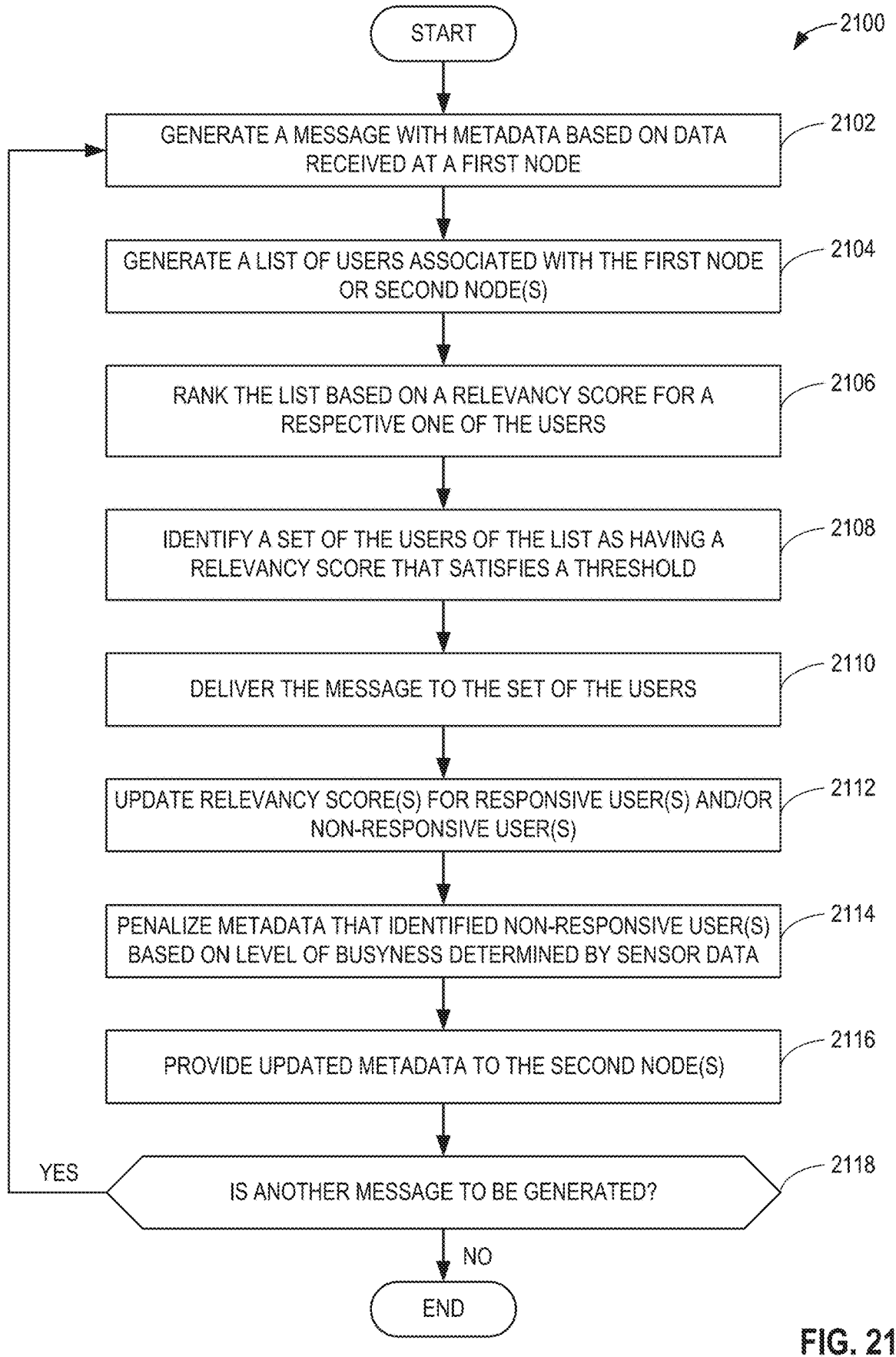
FIG. 21 is another flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to route a message to user(s).

FIG. 21 is another flowchart representative of example machine-readable instructions and/or example operations 2100 that may be executed and/or instantiated by processor circuitry to implement the ADM system 100 of FIG. 1, the data routing manager 302A-I of FIG. 3, and/or the data routing management circuitry 400 of FIG. 4 to route a message to user(s). The example machine-readable instructions and/or the example operations 2100 of FIG. 21 begin at block 2102, at which the data routing management circuitry 400 generates a message with metadata based on data received at a first node. For example, the data query management circuitry 430 can generate a message including the metadata 464 that describes data received (or generated) at a first node, such as the ninth data routing manager 302I. In some examples, the metadata included in or with the message can be first metadata. In some examples, the data can be financial data (e.g., the network environment 304 is a corporate or commercial office) such as invoices (e.g., sale invoices, service invoices, expense receipts, etc.), inventory data (e.g., the network environment 304 is a warehouse) such as shipping manifests, bills of lading, etc. In some examples, the metadata 464 can describe and/or include an identifier of a corporate officer, an accountant, a floor of an office building in which the financial data is generated, etc. In some examples, the metadata 464 can reference and/or include a license plate of a truck to transport a pallet of goods, a location of the pallet of goods, a truck driver associated with the license plate or the truck, etc.

At block 2104, the data routing management circuitry 400 generates a list of users associated with the first node or second node(s). For example, the node management circuitry 440 can generate a list of users including the third user 314, the fourth user 316, and the fifth user 318 that are associated with the metadata. For example, the third user 314 can be the corporate officer associated with the financial data, the fourth user 316 can be an accountant associated with the financial data, and the fifth user 318 can be an IT professional on the floor of the corporate office on which the financial data is generated. In some examples, the corporate officer can be associated with second metadata, the accountant can be associated with third metadata, and/or the IT professional can be associated with fourth metadata. In some examples, the third user 314 can be a warehouse supervisor, the fourth user 316 can be a forklift operator, and the fifth user 318 can be a truck driver associated with the warehouse. For example, the warehouse supervisor can be associated with fifth metadata, the forklift operator can be associated with sixth metadata, and/or the truck driver can be associated with seventh metadata. In some examples, one(s) of the second through seventh metadata can be implemented using the metadata 1002.

At block 2106, the data routing management circuitry 400 ranks the list based on a relevancy score for a respective one of the users. For the node management circuitry 440 can rank the third user 314, the fourth user 316, and the fifth user 318 based on their respective relevancy score for the metadata. In some examples, a first relevancy score of the third user 314 can be based on matching portion(s) of the first metadata and the second metadata (or the fifth metadata). In some examples, a second relevancy score of the fourth user 316 can be based on matching portion(s) of the first metadata and the third metadata (or the sixth metadata). In some examples, a third relevancy score of the fifth user 318 can be based on matching portion(s) of the first metadata and the fourth metadata (or the seventh metadata).

At block 2108, the data routing management circuitry 400 identifies a set of the users of the list as having a relevancy score that satisfies a threshold. For example, the node management circuitry 440 can determine that the third user 314 has a relevancy score of 0.85, the fourth user 316 has a relevancy score of 0.92, and the fifth user 318 has a relevancy score of 0.18. In some examples, the node management circuitry 440 can identify the third user 314 and the fourth user 316 as having a relevancy score that satisfies a threshold of 0.75 because 0.85 and 0.92 are greater than or equal to the threshold.

At block 2110, the data routing management circuitry 400 delivers the message to the set of the users. For example, the data publishing circuitry 450 can deliver, transmit, and/or otherwise provide the message to the third user 314 and the fourth user 316 by way of the network 322. In some examples, the sixth data routing manager 302F and the seventh data routing manager 302G can apply local node customization data to the message to improve and/or otherwise optimize the presentation of the message. For example, the sixth data routing manager 302F can apply local node customization data by removing graphics from the message to emphasize text-based data on the third electronic device 328. In some examples, the seventh data routing manager 302G can resize and/or reorient graphics of the message to surround a current application window that the fourth user 316 is using on the fourth electronic device 330. In some examples, the local node customization data can be implemented using portion(s) of one(s) of the second through seventh metadata.

At block 2112, the data routing management circuitry 400 updates relevancy score(s) for responsive user(s) and/or non-responsive user(s). For example, the third user 314 may ignore the message while the fourth user 316 responds to the message (e.g., the fourth user 316 taps the message on the fourth electronic device 330 to increase the size of the message, electronically engaging with the message by editing the message, copying the message, saving the message, responding with a reply message, etc.). In some examples, the machine-learning circuitry 420 can decrease the relevancy score of the third user 314. For example, the machine-learning circuitry 420 can decrease the relevancy score associated with portion(s) of the second metadata (or the fifth metadata) that matched portion(s) of the first metadata because the third user 314 ignored the message. In some examples, the machine-learning circuitry 420 can increase or maintain the relevancy score of the fourth user 316 because the fourth user 316 engaged with and/or responded to the message. For example, the machine-learning circuitry 420 can increase the relevancy score associated with portion(s) of the third metadata (or the sixth metadata) that matched portion(s) of the first metadata because the fourth user 316 acknowledged in some manner that the message is relevant to the fourth user 316 (e.g., relevant to interest(s) of the fourth user 316.

At block 2114, the data routing management circuitry 400 penalizes metadata that identified non-responsive user(s) based on a level of busyness determined by sensor data. For example, the machine-learning circuitry 420 can analyze sensor data (e.g., video data from a video camera that has the third user 314 in a field of view of the video camera), activity information (e.g., hardware, software, and/or firmware utilization of the third electronic device 328), etc., and/or any combination(s) thereof. In some examples, in response to determining that the third user 314 is not busy based on the sensor data and/or the activity information, the machine-learning circuitry 420 can penalize (e.g., remove, modify, alter, change, etc.) the second metadata (or the fifth metadata) associated with the third user 314 that matched a portion of the first metadata of the message. In some examples, in response to determining that the third user 314 is busy based on the sensor data and/or the activity information, the machine-learning circuitry 420 may not penalize the second metadata (or the fifth metadata) associated with the third user 314 that matched a portion of the first metadata of the message.

At block 2116, the data routing management circuitry 400 provides updated metadata to the second node(s). For example, the data publishing circuitry 450 can provide updated metadata (e.g., updated version(s) of the second (or fifth) metadata that has been penalized) associated with the third user 314 to neighboring nodes of the ninth data routing manager 302I, such as one(s) of the other data routing managers 302A-I. In some examples, the data publishing circuitry 450 provides the updated metadata to the neighboring nodes to synchronize the updated metadata with metadata associated with the third user 314 that is stored at the neighboring nodes (e.g., to improve AI/ML learning capabilities at the neighboring nodes by using updated metadata).

At block 2118, the data routing management circuitry 400 determines whether there is another message to be generated. If, at block 2118, the data routing management circuitry 400 determines that another message is to be generated, control returns to block 2102. Otherwise, the example machine-readable instructions and/or the example operations 2100 of FIG. 21 conclude.

Figure 22:
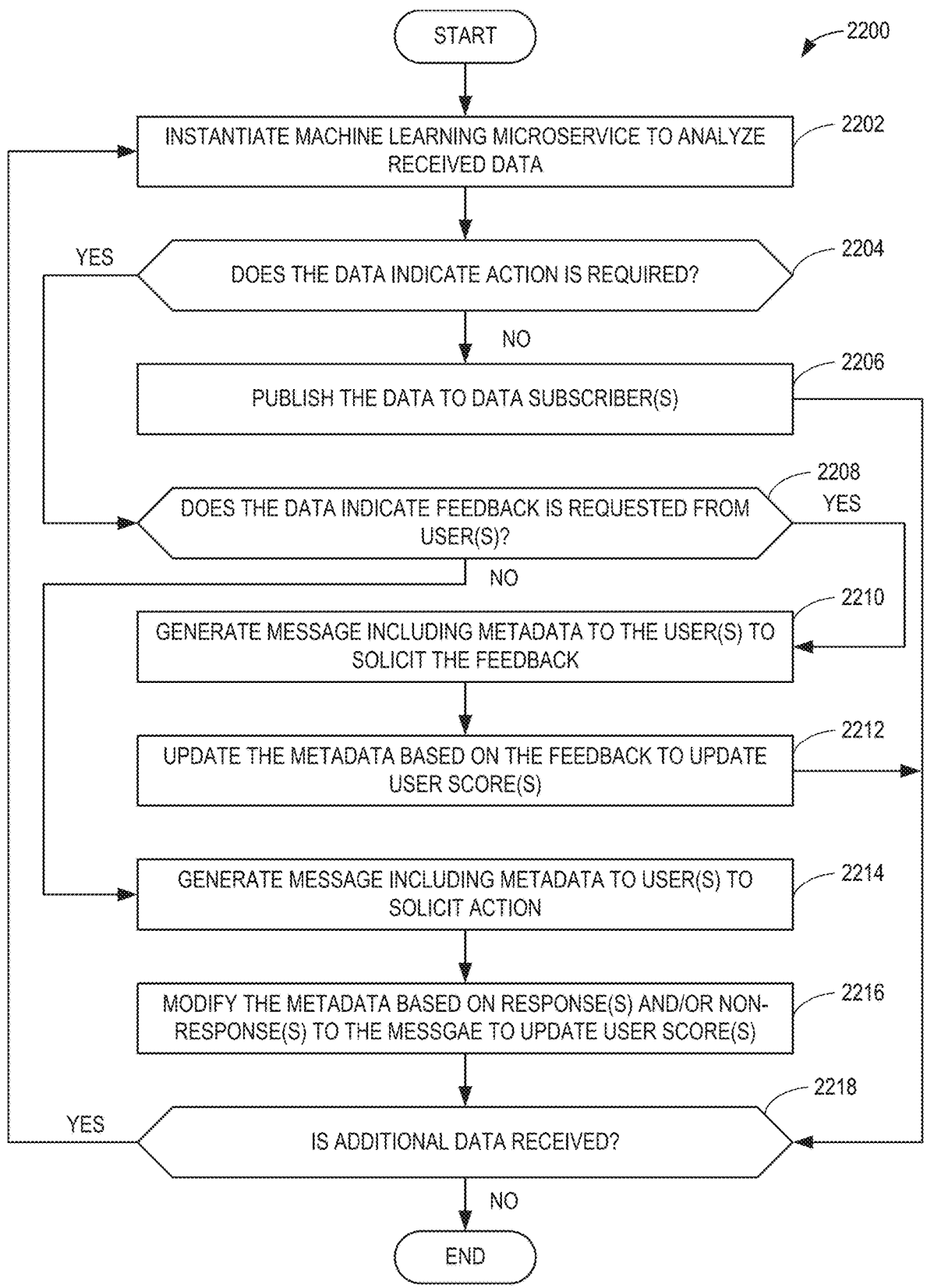
FIG. 22 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to present a message to user(s).

FIG. 22 is a flowchart representative of example machine-readable instructions and/or example operations 2200 that may be executed and/or instantiated by processor circuitry to implement the ADM system 100 of FIG. 1, the data routing manager 302A-I of FIG. 3, and/or the data routing management circuitry 400 of FIG. 4 to present a message to user(s). The example machine-readable instructions and/or the example operations 2200 of FIG. 22 begin at block 2202, at which the data routing management circuitry 400 instantiates a machine-learning microservice to analyze received data. For example, the machine-learning circuitry 420 can execute and/or instantiate a machine-learning microservice based on one(s) of the machine-learning models 470. In some examples, the machine-learning circuitry 420 can provide ingested data at a node as input(s) to the machine-learning microservice.

At block 2204, the data routing management circuitry 400 determines whether the data indicates action is required. For example, the machine-learning circuitry 420 can determine, based on output(s) from the machine-learning microservice, that the received data is associated with an event, such as the first event 924 of FIGS. 9B-9C.

If, at block 2204, the data routing management circuitry 400 determines that the data does not indicate action is required, control proceeds to block 2206. At block 2206, the data routing management circuitry 400 publishes the data to data subscriber(s). For example, the data publishing circuitry 450 can publish the ingested data to one or more nodes associated with metadata of the ingested data. After publishing the data to data subscriber(s) at block 2206, control proceeds to block 2218.

If, at block 2204, the data routing management circuitry 400 determines that the data indicates action is required, control proceeds to block 2208. At block 2208, the data routing management circuitry 400 determines whether the data indicates feedback is requested from user(s). For example, the machine-learning circuitry 420 can determine, based on the outputs from the machine-learning microservice, that the ingested data requires feedback from one or more nodes, users, devices, etc.

If, at block 2208, the data routing management circuitry 400 determines that the data indicates feedback is requested from user(s), control proceeds to block 2210. At block 2210, the data routing management circuitry 400 generates a message including metadata to the user(s) to solicit the feedback. For example, the data query management circuitry 430 can generate a message, which can include the metadata 464. In some examples, the data query management circuitry 430 can generate the message to be routed to one or more users, nodes, etc.

After generating the message at block 2210, control proceeds to block 2212. At block 2212, the data routing management circuitry 400 updates the metadata based on the feedback to update user score(s). For example, the machine-learning circuitry 420 can update the metadata 464 based on the feedback (e.g., indications of whether the message is relevant) from the one or more users, nodes, etc. After updating the metadata at block 2212, control proceeds to block 2218.

If, at block 2208, the data routing management circuitry 400 determines that the data indicates feedback is not requested from user(s), control proceeds to block 2214. At block 2214, the data routing management circuitry 400 generates a message including metadata to user(s) to solicit action. For example, the data query management circuitry 430 can generate a message, which can include the metadata 464. In some examples, the data query management circuitry 430 can generate the message to be routed to one or more users, nodes, etc., to cause the one or more users, nodes, etc., to perform an activity, action, operation, task, etc., associated with the received data.

After generating the message at block 2214, control proceeds to block 2216. At block 2216, the data routing management circuitry 400 modifies the metadata based on response(s) and/or non-response(s) to update user score(s). For example, the machine-learning circuitry 420 can increase a user score associated with a user, node, etc., based on a determination that the feedback from the user, node, etc., indicates that the message is relevant to the user, node, etc.

At block 2218, the data routing management circuitry 400 determines whether additional data is received. For example, the data ingestion circuitry 410 can determine whether to continue monitoring a network environment for data to ingest, analyze, etc.

If, at block 2218, the data routing management circuitry 400 determines that additional data is received, control returns to block 2202. Otherwise, the example machine-readable instructions and/or the example operations 2200 of FIG. 22 conclude.

Figure 23:
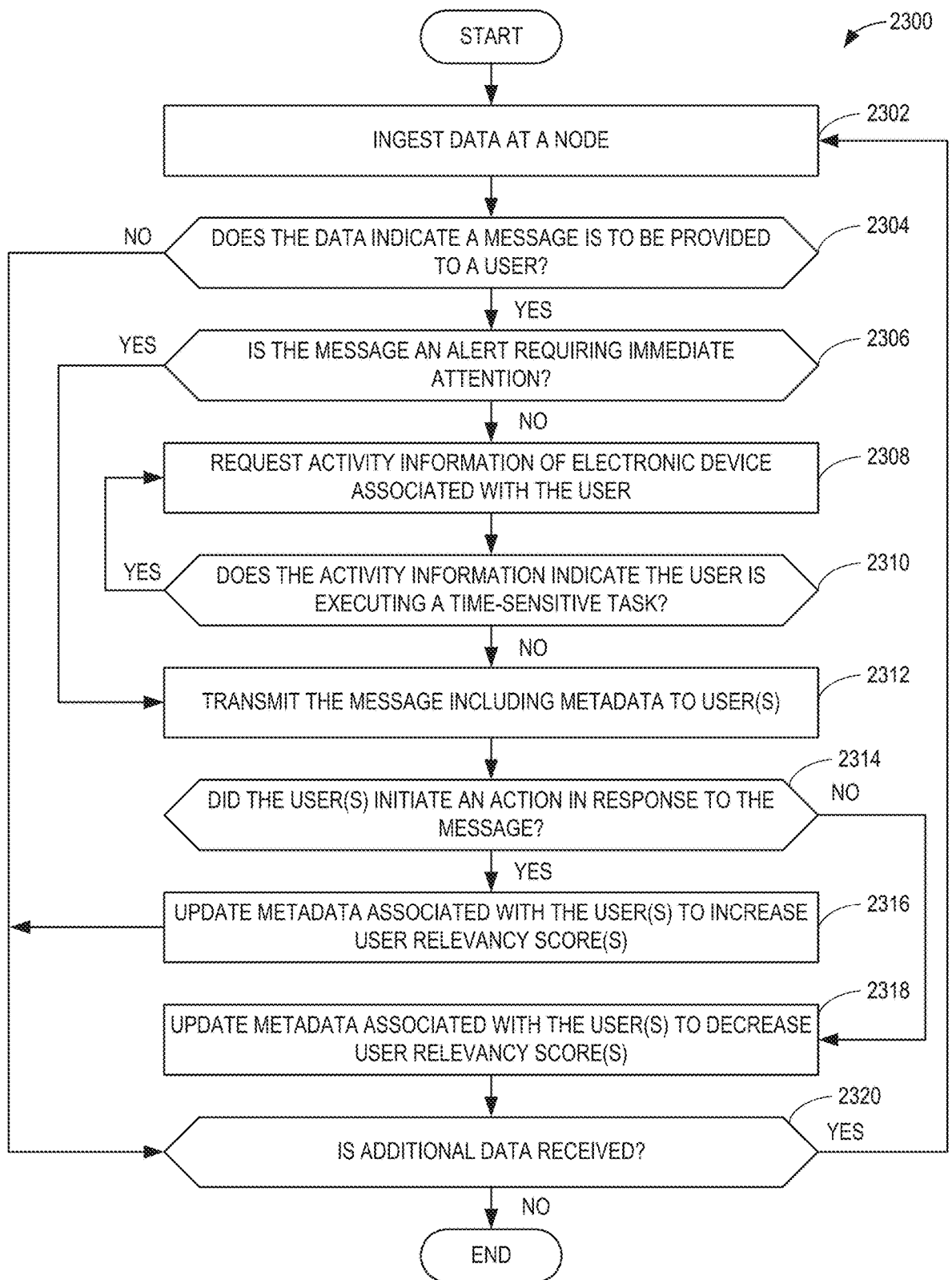
FIG. 23 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to present a message to user(s) based on activity information associated with the user(s).

FIG. 23 is a flowchart representative of example machine-readable instructions and/or example operations 2300 that may be executed and/or instantiated by processor circuitry to implement the ADM system 100 of FIG. 1, the data routing manager 302A-I of FIG. 3, and/or the data routing management circuitry 400 of FIG. 4 to present a message to user(s) based on activity information associated with the user(s). The example machine-readable instructions and/or the example operations 2300 of FIG. 23 begin at block 2302, at which the data routing management circuitry 400 ingests data at a node. For example, the data ingestion circuitry 410 can ingest data generated by one(s) of the data producers 306.

At block 2304, the data routing management circuitry 400 determines whether the data indicates a message is to be provided to a user. For example, the machine-learning circuitry 420 can determine, based on one or more data objects, portions, etc., included in the message, that the one or more data objects, portions, etc., is/are to be presented and/or otherwise provided to a user, such as the second user 312. In some examples, the machine-learning circuitry 420 can determine to present the one or more data objects, portions, etc., to the second user 312 based on first metadata associated with the one or more data objects, portions, etc., that correlate with second metadata associated with the second user 312.

If, at block 2304, the data routing management circuitry 400 determines that the data does not indicate that a message is to be provided to a user, control proceeds to block 2320. Otherwise, control proceeds to block 2306. At block 2306, the data routing management circuitry 400 determines whether the message is an alert requiring immediate attention. For example, the machine-learning circuitry 420 can determine that the message is an alert generated by a programmable logic controller (PLC) controlling and/or otherwise monitoring heavy machinery (e.g., a robotic arm, a crane, an electric motor drive, etc.) in the network environment 304. In some examples, the heavy machinery can be associated with the second user 314 (e.g., the second user 314 is a technician whose job function is to maintain the heavy machinery that caused the alarm).

If, at block 2306, data routing management circuitry 400 determines that the message is an alert requiring immediate attention control proceeds to block 2312. Otherwise, control proceeds to block 2308. At block 2308, the data routing management circuitry 400 requests activity information of an electronic device associated with the user. For example, the data query management circuitry 430 can ping the fifth data routing manager 302E for activity information of the second electronic device 326, which can include resource utilization data, an identification of application(s) and/or service(s) in operation on the second electronic device 326, etc.

At block 2310, the data routing management circuitry 400 determines whether the activity information indicates that the user is executing a time-sensitive task. For example, the machine-learning circuitry 420 can provide the activity information to the machine-learning model 470 to generate model output(s), which can include a determination of whether the second user 312 is busy executing a time-sensitive task (e.g., mitigating an alarm from different heavy machinery).

If, at block 2310, the data routing management circuitry 400 determines that the activity information indicates that the user is executing a time-sensitive task, control returns to block 2308 to request (e.g., periodically or iteratively request) activity information of the electronic device associated with the user in an effort to determine when the second user 312 is no longer busy and/or otherwise available to be presented with the message.

If, at block 2310, the data routing management circuitry 400 determines that the activity information indicates that the user is not executing a time-sensitive task, control proceeds to block 2312. At block 2312, the data routing management circuitry 400 transmits the message including metadata to user(s). For example, the data publishing circuitry 450 can deliver, via the network 322, the message including metadata associated with the message.

At block 2314, the data routing management circuitry 400 determines whether the user(s) initiated an action in response to the message. For example, the data ingestion circuitry 410 can receive an acknowledgement that the message is relevant to the second user 312, a response message indicating that an action is being carried out (or has been carried out) by the second user 312. In some examples, the response message can be generated by the PLC indicating that a fault of the heavy machinery that caused the alarm has been resolved, mitigated, fixed, etc.

If, at block 2314, the data routing management circuitry 400 determines that the user(s) initiated an action in response to the message, control proceeds to block 2316. At block 2316, the data routing management circuitry 400 updates metadata associated with the user(s) to increase user relevancy score(s). For example, the machine-learning circuitry 420 can provide the acknowledgment, the response message, etc., to the machine-learning models 470 to generate model output(s), which can include an increase in a relevancy score representative of the relevancy of the metadata of the message with metadata associated with the second user 312. In response to updating the metadata associated with the user(s) to increase user relevancy score(s) at block 2316, control proceeds to block 2320.

If, at block 2314, the data routing management circuitry 400 determines that the user(s) did not initiate an action in response to the message, control proceeds to block 2318. At block 2318, the data routing management circuitry 400 updates metadata associated with the user(s) to decrease user relevancy score(s). For example, the machine-learning circuitry 420 can provide data to the machine-learning model 470 indicative of the second user 312 ignoring the message, acknowledging that the message is not relevant to the second user 312 (e.g., the heavy machinery is in a different department than the department the second user 312 belongs to, etc.) to generate model output(s), which can include a decrease in a relevancy score representative of the relevancy of the metadata of the message with metadata associated with the second user 312. In response to updating the metadata associated with the user(s) to decrease user relevancy score(s) at block 2318, control proceeds to block 2320.

At block 2320, the data routing management circuitry 400 determines whether additional data is received. For example, the data ingestion circuitry 410 can determine that there is additional data to ingest from one(s) of the data producers 306. If, at block 2320, the data routing management circuitry 400 determines that additional data is received, control returns to block 2302. Otherwise, the example machine-readable instructions and/or the example operations 2300 of FIG. 23 conclude.

Figure 24:
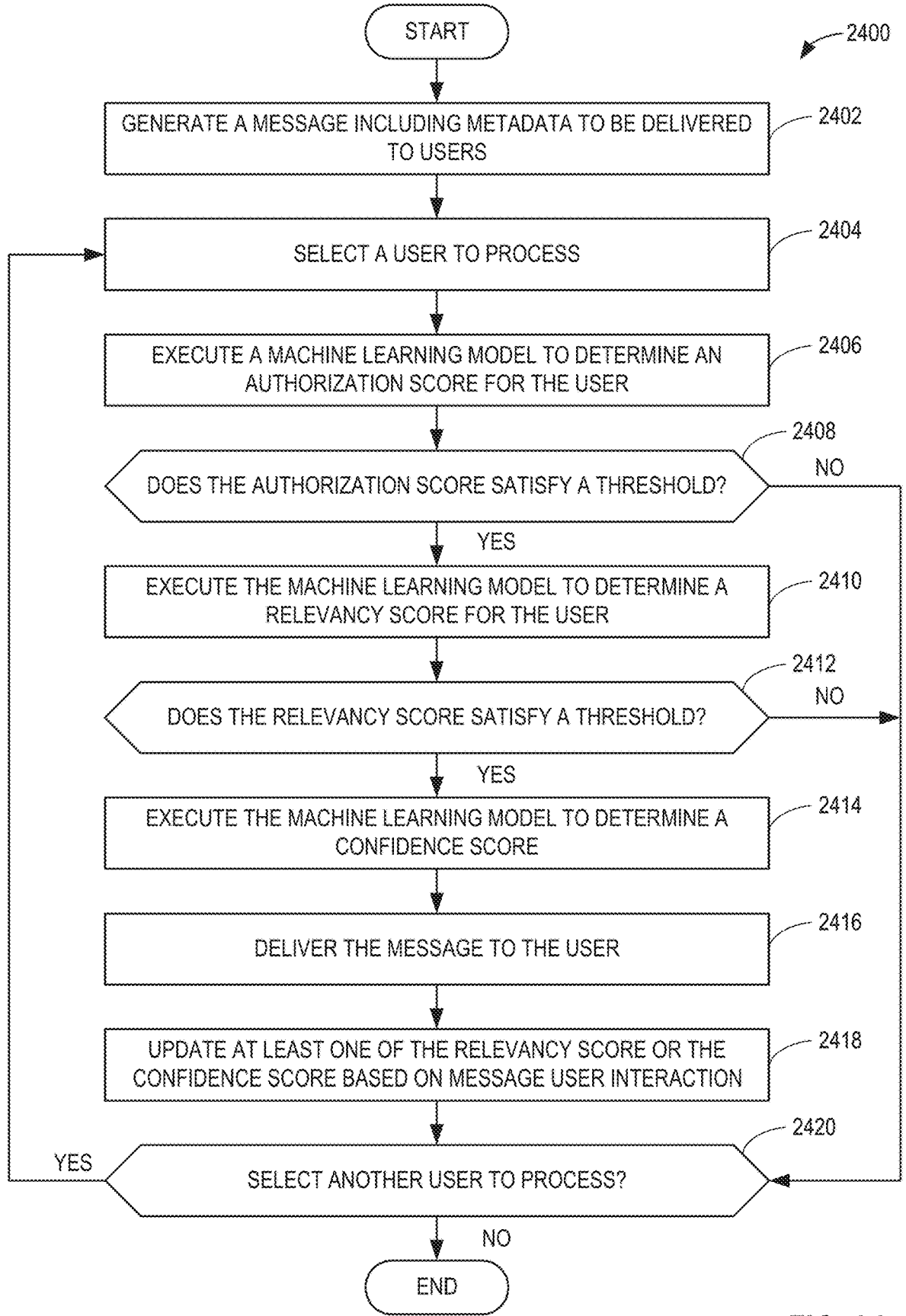
FIG. 24 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to escalate presentation of a message to user(s).

FIG. 24 is a flowchart representative of example machine-readable instructions and/or example operations 2400 that may be executed and/or instantiated by processor circuitry to implement the ADM system 100 of FIG. 1, the data routing manager 302A-I of FIG. 3, and/or the data routing management circuitry 400 of FIG. 4 to escalate presentation of a message to user(s). The example machine-readable instructions and/or the example operations 2400 begin at block 2402, at which the data routing management circuitry 400 generates a message including metadata to be delivered to users. For example, the data query management circuitry 430 can generate a message (e.g., one or more data packets) associated with a medical patient in a medical facility (e.g., a hospital). In some examples, the message includes and/or otherwise is representative of medical test results (e.g., a magnetic resonance imaging (MRI) scan, a blood test result, etc.) associated with the medical patient. In some examples, the message is intended to be delivered to a medical doctor treating the medical patient.

At block 2404, the data routing management circuitry 400 selects a user to process. For example, the node management circuitry 440 can select the first user 310 to process. In some examples, the first user 310 is a medical doctor treating the medical patient.

At block 2406, the data routing management circuitry 400 executes a machine-learning model to determine an authorization score for the user. For example, the machine-learning circuitry 420 can execute and/or instantiate the machine-learning models 470 to determine an authorization score for the first user 310. In some examples, the machine-learning circuitry 420 can provide portion(s) of the message to the machine-learning models 470 as model input(s) to generate model output(s), which can include an authorization score of 0.9 for the first user 310. For example, the first user 310 can have an authorization score of 0.9 because the message is highly likely (e.g., a 90% likelihood) to be relevant to the medical doctor treating the medical patient.

At block 2408, the data routing management circuitry 400 determines whether the authorization score satisfies a threshold. For example, the machine-learning circuitry 420 can determine that the authorization score of 0.9 for the first user 310 satisfies an authorization score threshold of 0.85 because the authorization score of 0.9 is greater than or equal to the authorization score threshold of 0.85.

If, at block 2408, the data routing management circuitry 400 determines that the authorization score does not satisfy a threshold, control proceeds to block 2420. For example, the first user 310 may not be authorized based on the authorization score of the first user 310 to access the message (e.g., the medical patient is not being treated by the first user 310).

If, at block 2408, the data routing management circuitry 400 determines that the authorization score satisfies a threshold, control proceeds to block 2410. At block 2410, the data routing management circuitry 400 executes the machine-learning model to determine a relevancy score for the user. For example, the machine-learning circuitry 420 can execute and/or instantiate the machine-learning models 470 to determine a relevancy score associated with the first user 310 for the message. In some examples, the machine-learning model 470 can output a relevancy score of 0.95 associated with the first user 310 for the message because the first user 310 is substantially likely to find the medical test result for the medical patient being treated by the first user 310 as substantially or materially relevant.

At block 2412, the data routing management circuitry 400 determines whether the relevancy score satisfies a threshold. For example, the machine-learning circuitry 420 can determine that the relevancy score of 0.95 for the first user 310 for the message satisfies a relevancy score threshold of 0.80 because the relevancy score of 0.95 is greater than or equal to the relevancy score threshold of 0.80.

If, at block 2412, the data routing management circuitry 400 determines that the relevancy score does not satisfy a threshold, control proceeds to block 2420. For example, the machine-learning circuitry 420 can determine that the first user 310 may not find the medical test result relevant (e.g., the medical patient is not being treated by the first user 310).

If, at block 2412, the data routing management circuitry 400 determines that the relevancy score satisfies a threshold, control proceeds to block 2414. At block 2414, the data routing management circuitry 400 executes the machine-learning model to determine a confidence score. For example, the machine-learning circuitry 420 can invoke the machine-learning models 470 to generate model output(s) based on at least one of the authorization score or the relevancy score as model input(s). In some examples, the model output(s) can include a confidence score representative of a likelihood, probability, etc., that at least one of the authorization score or the relevancy score are accurate or are likely to cause a satisfactory result.

At block 2416, the data routing management circuitry 400 delivers the message to the user. For example, the data publishing circuitry 450 can provide, deliver, and/or otherwise cause transmission of the message to the first user 310 by way of the network 322.

At block 2418, the data routing management circuitry 400 updates at least one of the relevancy score or the confidence score based on message user interaction. For example, in response to the first user 310 engaging with the message (e.g., by reviewing the medical test result, executing an action such as scheduling another medical test or discharging the patient in response to the message, etc.), the machine-learning circuitry 420 can provide feedback to the machine-learning models 470 to affirm the confidence score (or increase the confidence score). In some examples, in response to the first user 310 engaging with the message, the machine-learning circuitry 420 can provide feedback from the first user 310 to the machine-learning models 470 to increase (or maintain) the relevancy score associated with the first user 310 for the message (or portion(s) thereof). In some examples, in response to the first user 310 ignoring the message, the machine-learning circuitry 420 can provide feedback (e.g., the ignoring of the message) to the machine-learning models 470 to decrease at least one of the authorization score or the relevancy score because the first user 310 ignored the message.

At block 2420, the data routing management circuitry 400 determines whether to select another user to process. For example, the node management circuitry 440 can determine to select the second user 312 (or a different user) to process. If, at block 2420, the data routing management circuitry 400 determines to select another user to process, control returns to block 2404. Otherwise, the example machine-readable instructions and/or the example operations 2400 of FIG. 24 conclude.

Figure 25:
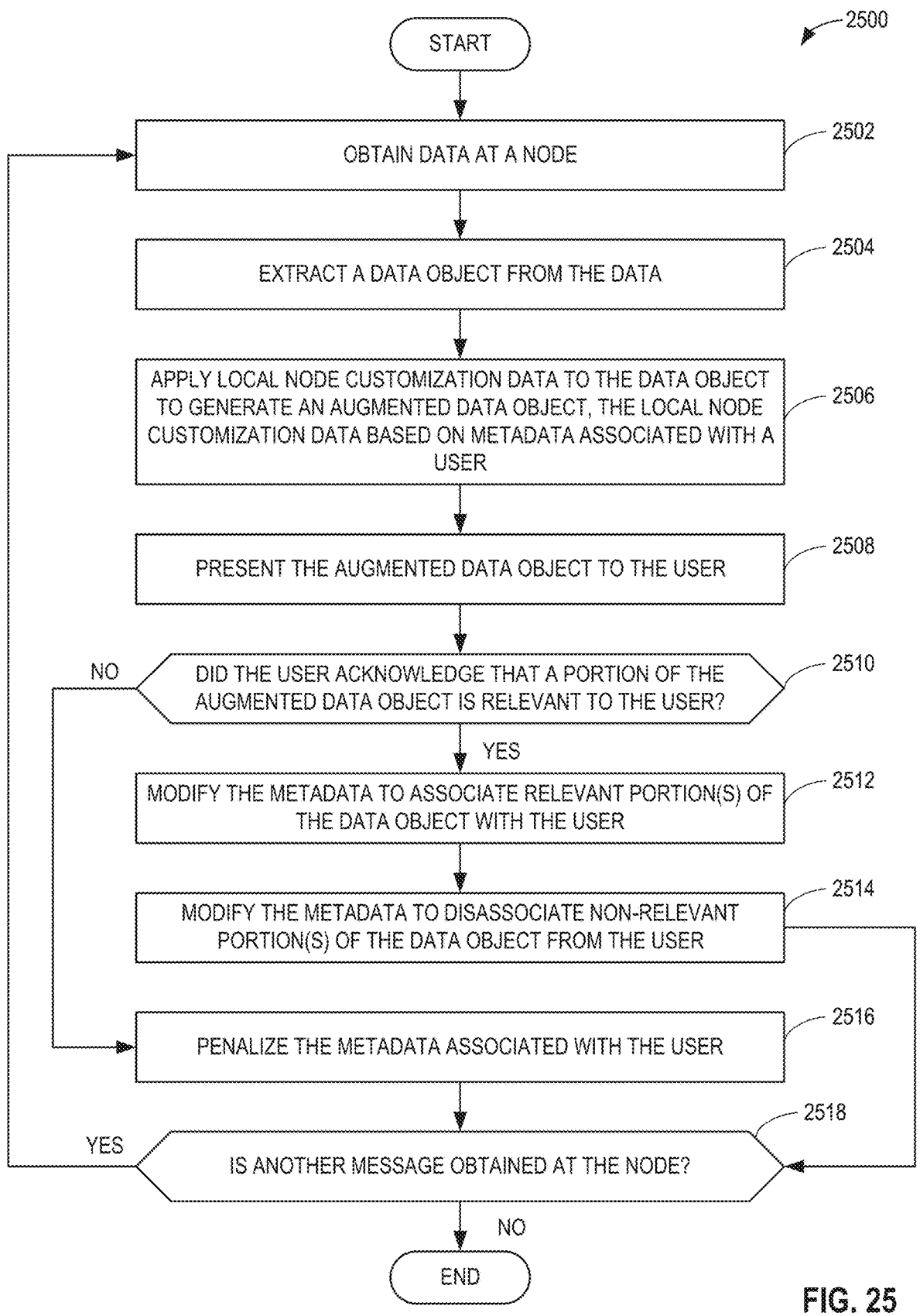
FIG. 25 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to augment a data object to present to a user based on metadata associated with the user.

FIG. 25 is a flowchart representative of example machine-readable instructions and/or example operations 2500 that may be executed and/or instantiated by processor circuitry to implement the ADM system 100 of FIG. 1, the data routing manager 302A-I of FIG. 3, and/or the data routing management circuitry 400 of FIG. 4 to augment a data object to present to a user based on metadata associated with the user. The example machine-readable instructions and/or example operations 2500 of FIG. 25 begin at block 2502, at which the data routing management circuitry 400 obtains data at a node. For example, the data ingestion circuitry 410 can obtain a data packet, a message (e.g., a data message), or any other implementation of data generation from one(s) of the data producers 306. In some examples, the data ingestion circuitry 410 can be part of the fifth data routing manager 302E.

At block 2504, the data routing management circuitry 400 extracts a data object from the data. For example, the data ingestion circuitry 410 can determine that an obtained data packet includes a header (e.g., a data header, a packet header, a data packet header, etc.) and a payload (e.g., a data payload, a packet payload, a data packet payload, etc.), which can include one or more portions of data, such as audio, image, text, and/or video data. In some examples, the data ingestion circuitry 410 can extract a portion of data from the payload as a data object.

At block 2506, the data routing management circuitry 400 applies local node customization data to the data object to generate an augmented data object, and the local node customization data based on metadata associated with a user. For example, the data query management circuitry 430 can identify the data object as data to be used to render and/or otherwise generate a graphic (e.g., a graph, a plot, an image, etc.). In some examples, the data query management circuitry 430 can be part of the fifth data routing manager 302E. For example, the data query management circuitry 430 can optimize display of the graphic on the second electronic device 326 based on metadata associated with the second user 312. In some examples, the metadata associated with the second user 312 can indicate that the second user 312 prefers to view bar graphs rather than scatter plots. For example, the data query management circuitry 430 can instantiate the graphic as a bar graph to increase a likelihood that the second user 312 will engage with the graphic and/or otherwise find the graphic relevant.

At block 2508, the data routing management circuitry 400 presents the augmented data object to the user. For example, the data publishing circuitry 450 can present the data object as a bar graph to the second user 312 on the second electronic device 326.

At block 2510, the data routing management circuitry 400 determines whether the user acknowledged that a portion of the augmented data object is relevant to the user. For example, the data ingestion circuitry 410 can determine whether the second user 312 identified one or more portions of the data object as relevant. In some examples, the data ingestion circuitry 410 can receive data indicative that the second user 312 identified a first portion of the data object as relevant, a second portion of the data object as not relevant, etc., and/or any combination(s) thereof.

If, at block 2510, the data routing management circuitry 400 determines that the user did acknowledge that a portion of the augmented data object is relevant to the user, control proceeds to block 2512. At block 2512, the data routing management circuitry 400 modifies the metadata to associate relevant portion(s) of the data object with the user. For example, the machine-learning circuitry 420 can provide an acknowledgement from the second user 312 that the first portion of the data object is relevant to the machine-learning models 470 as model input(s) to generate model output(s). In some examples, the model output(s) can include an increased relevancy score associated with the second user 312 for the first portion of the data object.

At block 2514, the data routing management circuitry 400 modifies the metadata to disassociate non-relevant portion(s) of the data object with the user. For example, the machine-learning circuitry 420 can provide an acknowledgement from the second user 312 that the second portion of the data object is not relevant to the machine-learning model 470 as model input(s) to generate model output(s). In some examples, the model output(s) can include a decreased relevancy score associated with the second user 312 for the second portion of the data object. For example, the machine-learning models 470 can output modified metadata for the second user 312 that removes a portion of the metadata that correlated with the second portion of the data object. In response to modifying the metadata to disassociate non-relevant portion(s) of the data object from the user at block 2514, control proceeds to block 2518.

If, at block 2510, the data routing management circuitry 400 determines that the user did not acknowledge that a portion of the augmented data object is relevant to the user, control proceeds to block 2516. At block 2516, the data routing management circuitry 400 penalizes the metadata associated with the user. For example, the machine-learning circuitry 420 can obtain an acknowledgement from the second user 312 that portion(s) of the data object is/are not relevant. In some examples, the machine-learning circuitry 420 can provide the acknowledgment (or an indicia of a lack of acknowledgment because the second user 312 may have ignored the data object) to the machine-learning models 470 as model input(s) to generate model output(s). In some examples, the model output(s) can include revised or updated metadata for the second user 312 that removes a portion of the metadata that correlated with the portion(s) of the data object. In response to penalizing the metadata associated with the user at block 2516, control proceeds to block 2518.

At block 2518, the data routing management circuitry 400 determines whether another message is obtained at the node. For example, the data ingestion circuitry 410 can determine whether another data packet, message, or any other implementation of data generation is obtained from one(s) of the data producers 306. If, at block 2518, the data routing management circuitry 400 determines that another message is obtained at the node, control returns to block 2502. Otherwise, the example machine-readable instructions and/or the example operations 2500 of FIG. 25 conclude.

Figure 26:
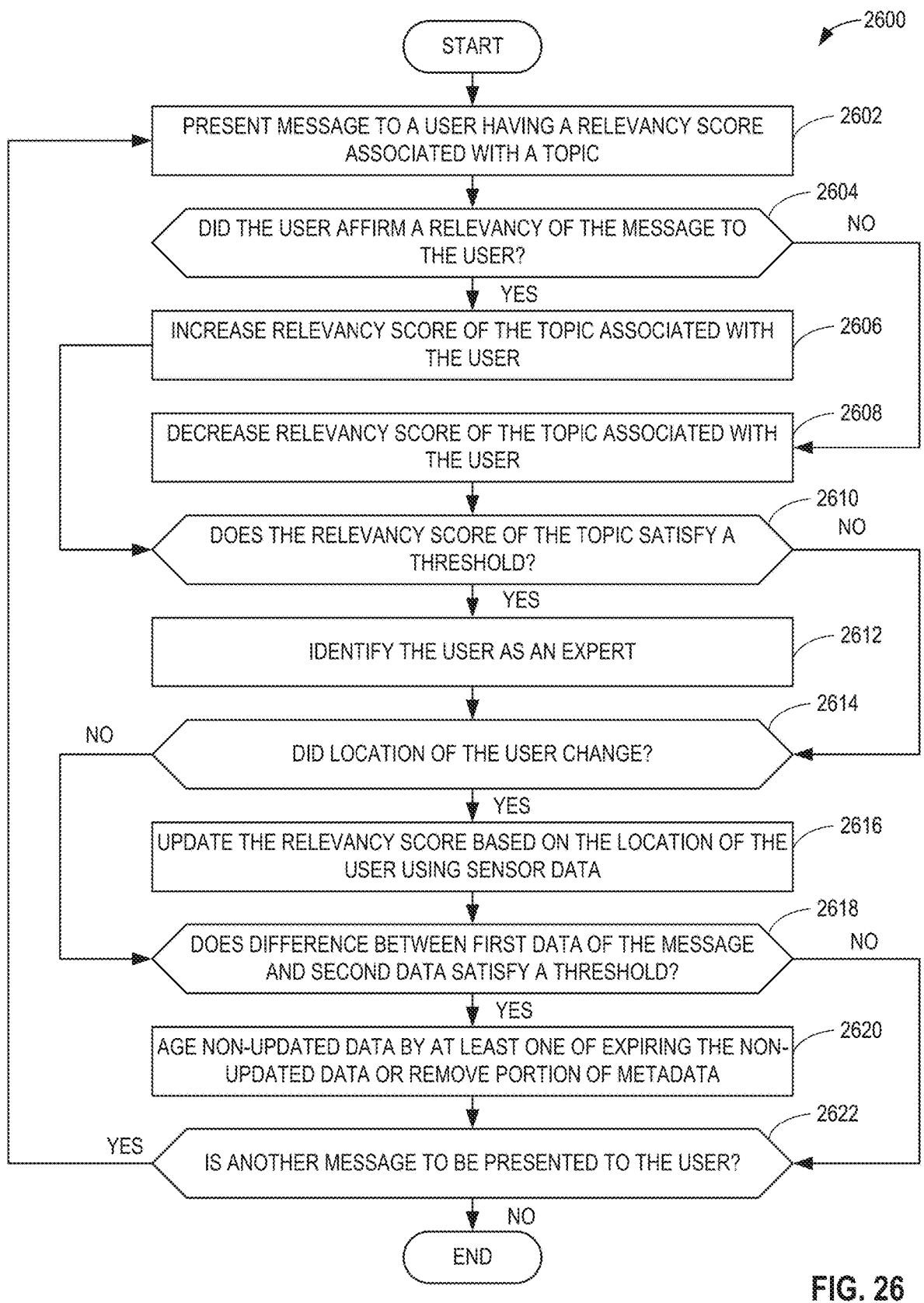
FIG. 26 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to adjust metadata associated with a user.

FIG. 26 is a flowchart representative of example machine-readable instructions and/or example operations 2600 that may be executed and/or instantiated by processor circuitry to implement the ADM system 100 of FIG. 1, the data routing manager 302A-I of FIG. 3, and/or the data routing management circuitry 400 of FIG. 4 to adjust metadata associated with a user. The example machine-readable instructions and/or example operations 2600 begin at block 2602, at which the data routing management circuitry 400 presents a message to a user having a relevancy score associated with a topic. For example, the data publishing circuitry 450 can present a message, which can include audio, visual (e.g., image and/or video data), and/or text data, to the fourth user 316 using the fourth electronic device 330. In some examples, the fourth user 316 is a supervisor for an automobile manufacturing assembly line and, more specifically, an engine assembly line. For example, the message can be associated with a topic of engine assembly.

At block 2604, the data routing management circuitry 400 determines whether the user affirmed a relevancy of the message to the user. For example, the fourth user 316 can acknowledge receipt of the message and/or acknowledge that the message includes data that the fourth user 316 finds relevant. In some examples, the data ingestion circuitry 410 can receive the acknowledgment(s) and provide the acknowledgement(s) (and/or associated data) to the machine-learning circuitry 420.

If, at block 2604, the data routing management circuitry 400 determines that the user did not affirm a relevancy of the message to the user, control proceeds to block 2608. At block 2608, the data routing management circuitry 400 decreases a relevancy score of the topic associated with the user. For example, if the message has a topic of automobile infotainment system and the fourth user 316 ignored the message, then the machine-learning circuitry 420 can determine that the relevancy score for the message having the topic of automobile infotainment system is to be reduced and/or otherwise decreased. Advantageously, by reducing the relevancy score for the message having the topic of automobile infotainment system, the fourth user 316 can receive subsequent messages that are more relevant to the fourth user 316, such as messages having the topic of engine assembly. In response to decreasing the relevancy score of the topic associated with the user at block 2608, control proceeds to block 2610.

If, at block 2604, the data routing management circuitry 400 determines that the user did affirm a relevancy of the message to the user, control proceeds to block 2606. At block 2606, the data routing management circuitry 400 increases a relevancy score of the topic associated with the user. For example, if the message has a topic of engine assembly and the fourth user 316 engaged with and/or otherwise acknowledged a relevancy of the message, then the machine-learning circuitry 420 can determine that the relevancy score for the message having the topic of engine assembly is to be increased (or maintained). Advantageously, by increasing the relevancy score for the message having the topic of engine assembly, the fourth user 316 can receive subsequent messages that are more relevant to the fourth user 316, such as messages having the topic of engine assembly, or related topics such as transmission assembly, radiator assembly, etc. In response to increasing the relevancy score of the topic associated with the user at block 2606, control proceeds to block 2610.

At block 2610, the data routing management circuitry 400 determines whether the relevancy score of the topic satisfies a threshold. For example, the machine-learning circuitry 420 can determine whether the fourth user 316 is an expert, such as a stakeholder, a technical lead or expert, a subject matter expert, etc., based on a relevancy score of the topic for the fourth user 316. In some examples, the machine-learning circuitry 420 can determine that a relevancy score of 0.92 of the topic of engine assembly for the fourth user 316 is greater than a threshold (e.g., a relevancy score threshold) of 0.8, which can be indicative of the fourth user 316 being an expert on the topic of engine assembly.

If, at block 2610, the data routing management circuitry 400 determines that the relevancy score of the topic does not satisfy a threshold, control proceeds to block 2614. If, at block 2610, the data routing management circuitry 400 determines that the relevancy score of the topic satisfies a threshold, control proceeds to block 2612. At block 2612, the data routing management circuitry 400 identifies the user as an expert. For example, the node management circuitry 440 can identify the fourth user 316 as an expert on the topic of engine assembly based on the relevancy score of 0.92 satisfying the threshold of 0.8. Advantageously, the node management circuitry 440 can identify the fourth user 316 to be part of a list of users whom messages having the topic of engine assembly are to be routed for presentation. Advantageously, the node management circuitry 440 can identify the fourth user 316 to be part of the list of users in response to a determination the fourth user 316 is an expert in connection with the topic of engine assembly.

At block 2614, the data routing management circuitry 400 determines whether a location of the user changed. For example, the data ingestion circuitry 410 can ingest video data from a video camera. In some examples, the data ingestion circuitry 410 can invoke the machine-learning circuitry 420 to execute the machine-learning models 470 to identify users in a location (e.g., Zone 1, Floor 1 of a factory). For example, the data ingestion circuitry 410 can determine whether the fourth user 316 is in the location, has left the location, or has not been in the location longer than a specified time duration (e.g., a day, a week, a month, etc.) based on output(s) from the machine-learning model 470.

If, at block 2614, the data routing management circuitry 400 determines that the location of the user did not change, control proceeds to block 2618. If, at block 2614, the data routing management circuitry 400 determines that the location of the user did change, control proceeds to block 2616. At block 2616, the data routing management circuitry 400 updates the relevancy score based on the location of the user using sensor data. For example, the machine-learning circuitry 420 can determine that the location of Zone 1, Floor 1 of the factory is for engine assembly. In some examples, the machine-learning circuitry 420 can increase a relevancy score of the topic of engine assembly for the fourth user 316 in response to determining that the fourth user 316 is identified (e.g., based on sensor data such as video data from a video camera) as being in the location proximate the engine assembly area. In response to updating the relevancy score based on the location of the user using sensor data at block 2616, control proceeds to block 2618.

At block 2618, the data routing management circuitry 400 determines whether a difference between first data of the message and second data satisfies a threshold. For example, the data query management circuitry 430 can determine whether first data of the message is different from second data, which may be stored on the fourth electronic device 330 or elsewhere (e.g., different one(s) of the electronic devices 324, 326, 328, 330, 332, 334, one(s) of the data producers 306, one(s) of the data consumers 308, a datastore associated with the network environment 304, etc., and/or any combination(s) thereof). In some examples, the data query management circuitry 430 can proceed with the determination in an effort to determine whether the first data of the message is cumulative, repetitive, redundant, etc., with respect to the second data.

If, at block 2618, the data routing management circuitry 400 determines that a difference between first data of the message and second data does not satisfy a threshold, control proceeds to block 2622. If, at block 2618, the data routing management circuitry 400 determines that a difference between first data of the message and second data satisfies a threshold, control proceeds to block 2620. At block 2620, the data routing management circuitry 400 ages non-updated data by at least one of expiring the non-updated data or remove portion of metadata. For example, the data query management circuitry 430 can age the second data by expiring the second data (e.g., delete the second data from one or more datastores, reduce an availability or storage redundancy of the second data, etc.). In some examples, the data query management circuitry 430 can age the second data by removing portion(s) of metadata of the second data that correlate to, correspond to, match etc., portion(s) of metadata associated with the fourth user 316.

At block 2622, the data routing management circuitry 400 determines whether another message is to be presented to the user. For example, the data publishing circuitry 450 can determine that another message is to be presented to the fourth user 316. If, at block 2622, the data routing management circuitry 400 determines that another message is to be presented to the user, control returns to block 2602. Otherwise, the example machine-readable instructions and/or the example operations 2600 of FIG. 26 conclude.

Figure 27:
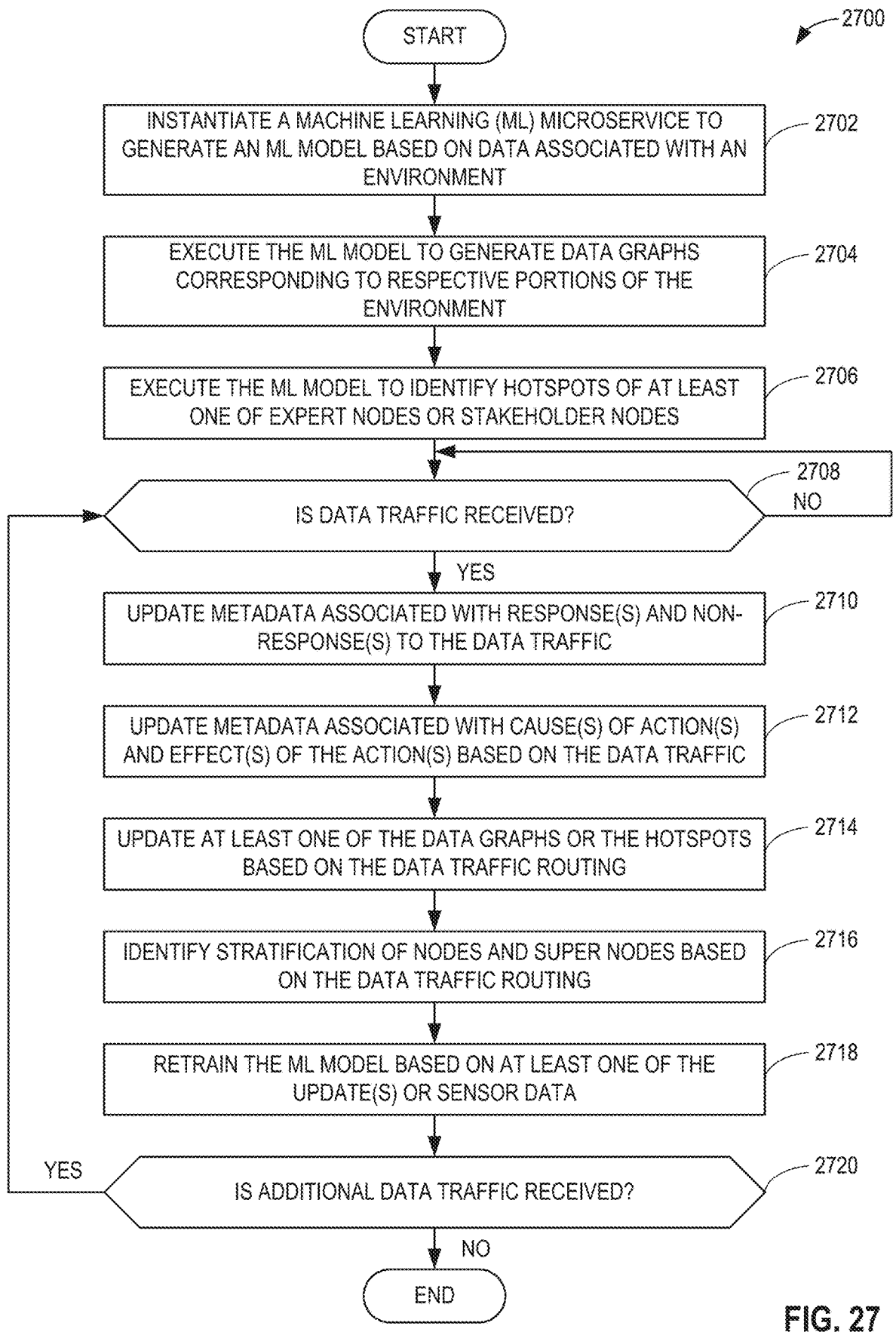
FIG. 27 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to train and/or retrain a machine-learning model.

FIG. 27 is a flowchart representative of example machine-readable instructions and/or example operations 2700 that may be executed and/or instantiated by processor circuitry to implement the ADM system 100 of FIG. 1, the data routing manager 302A-I of FIG. 3, and/or the data routing management circuitry 400 of FIG. 4 to train and/or retrain a machine-learning model. The example machine-readable instructions and/or example operations 2700 begin at block 2702, at which the data routing management circuitry 400 instantiates a machine-learning microservice to generate a machine-learning model based on data associated with an environment. For example, the machine-learning circuitry 420 can instantiate a microservice to generate one of the machine-learning models 470, which can be a neural network or any other type of AI/ML model, based on data associated with the network environment 304.

At block 2704, the data routing management circuitry 400 executes the machine-learning model to generate data graphs corresponding to respective portions of the environment. For example, the machine-learning circuitry 420 can cause the machine-learning model 470 to generate one(s) of the data graphs 802, 804, 806, 808, which can correspond to portions of the network environment 304.

At block 2706, the data routing management circuitry 400 executes the machine-learning model to identify hotspots of at least one of expert nodes or stakeholder nodes. For example, the machine-learning circuitry 420 can cause the machine-learning model 470 to identify hotspot(s) of at least one of expert nodes (e.g., expert data graph nodes) or stakeholder nodes (e.g., stakeholder data graph nodes) of the data graphs 802, 804, 806, 808.

At block 2708, the data routing management circuitry 400 determines whether data traffic is received. For example, the data ingestion circuitry 410 can determine whether one or more messages is received at a node, which may be implemented using the first data routing manager 302A, and/or, more generally, one(s) of the data producers 306. If, at block 2708, the data routing management circuitry 400 determines that data traffic is not received, control waits at block 2708 to make another determination whether data traffic is received.

If, at block 2708, the data routing management circuitry 400 determines that data traffic is received, control proceeds to block 2710. At block 2710, the data routing management circuitry 400 updates metadata associated with response(s) and non-response(s) to the data traffic. For example, the machine-learning circuitry 420 can update (e.g., add, delete, modify, etc.) metadata associated with the first user 310 in response to whether the first user 310 responded, ignored, and/or acknowledged the data traffic.

At block 2712, the data routing management circuitry 400 updates metadata associated with cause(s) of action(s) and effect(s) of the action(s) based on the data traffic. For example, the data ingestion circuitry 410 can receive data representative of one or more actions carried out by the first user 310 after the first user 310 received the data traffic. In some examples, the machine-learning circuitry 420 can provide the data representative of the one or more actions to the machine-learning model 470 as model input(s) to determine model output(s). For example, the model output(s) can include update(s) (e.g., addition(s), deletion(s), modification(s), etc.) to metadata associated with the first user 310 in response to whether the first user 310 performed one or more actions in response to being presented with the data traffic.

At block 2714, the data routing management circuitry 400 updates at least one of the data graphs or the hotspots based on the data traffic routing. For example, the machine-learning circuitry 420 can update one(s) of the data graphs 802, 804, 806, 808, hotspot(s) associated thereof, etc., and/or any combination(s) thereof, based on a routing of the data traffic. In some examples in which the user 810 of FIG. 8 is presented with data, the routing of the data traffic can include the user 810 forwarding and/or otherwise providing the data to USER B, who then may forward the data to USER E. In some examples, the machine-learning circuitry 420 can receive indications of the data forwarding and correspondingly update metadata associated with USER B and USER E to increase an association and/or relevancy of the data with USER B and USER E. Advantageously, in response to new data being generated that is related to the previous data, the machine-learning circuitry 420 can cause the new data to be delivered to USER B and/or USER E in addition to and/or alternatively to the user 810.

At block 2716, the data routing management circuitry 400 identifies a stratification of nodes and super nodes based on the data traffic routing. For example, the machine-learning circuitry 420 can identify USER B as a node and USER F as a super node because USER F receives an increasing number of data forwards with respect to USER B and/or other one(s) of the users of FIG. 8. Advantageously, in some examples, the node management circuitry 440 can identify super node(s), such as USER F, to receive a higher priority when determining who to present data to with respect to non-super nodes.

At block 2718, the data routing management circuitry 400 retrains the machine-learning model based on at least one of the update(s) or sensor data. For example, the machine-learning circuitry 420 can retrain and/or otherwise cause a retraining of the machine-learning model 470 based on the update(s) in connection with at least one of block 2710, 2712, 2714, 2716. In some examples, the machine-learning circuitry 420 can retrain and/or otherwise cause a retraining of the machine-learning model 470 based on sensor data associated with the first user 310, such as video camera data, RFID pings, electronic terminal logins, etc., and/or any combination(s) thereof.

At block 2720, the data routing management circuitry 400 determines whether additional data traffic is received. For example, the data ingestion circuitry 410 can determine whether additional data traffic is received. If, at block 2720, the data routing management circuitry 400 determines that additional data traffic is received, control returns to block 2708. Otherwise, the example machine-readable instructions and/or the example operations 2700 of FIG. 27 conclude.

Figure 28:
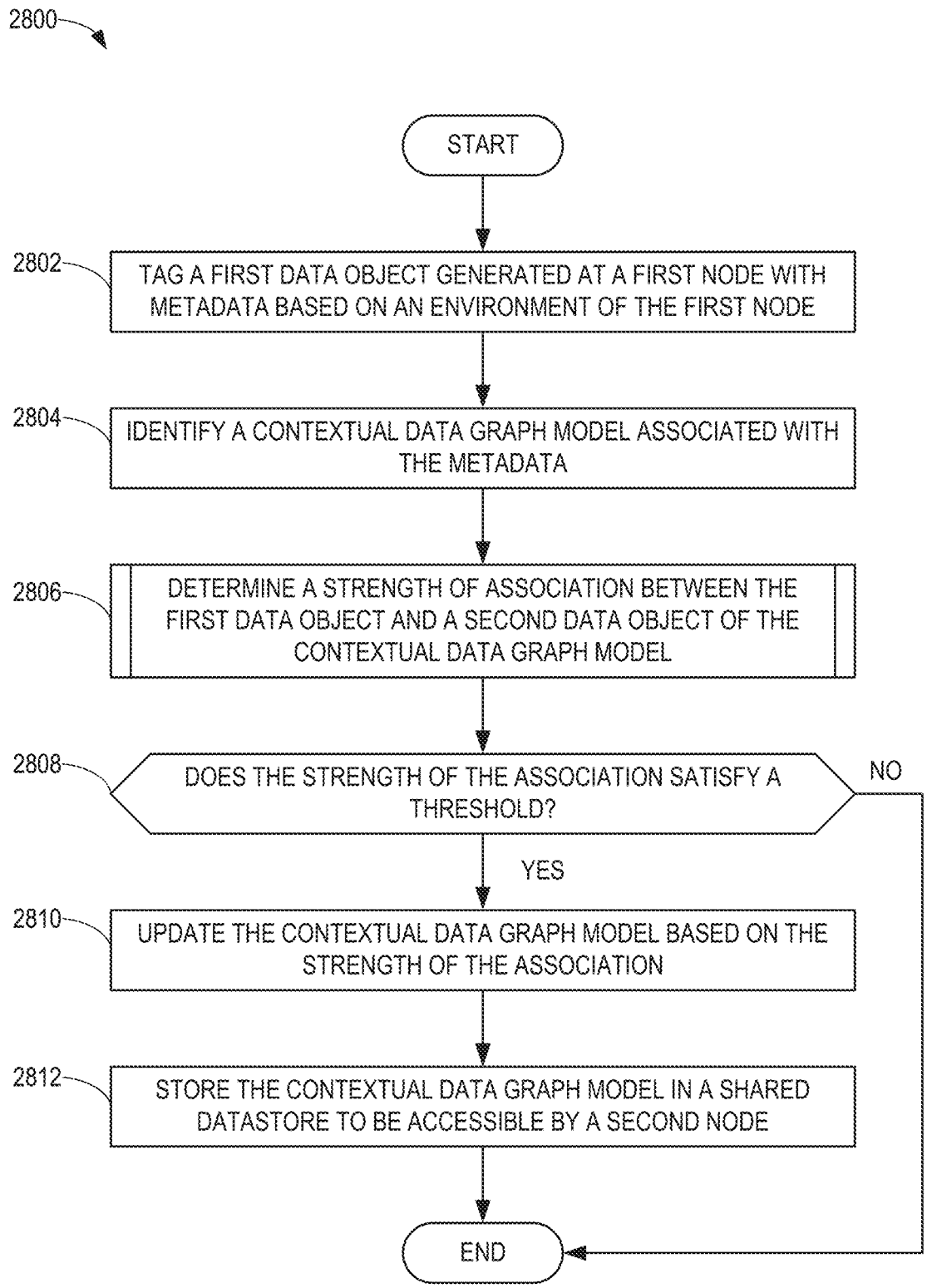
FIG. 28 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to persist a contextual data graph model in a shared datastore to be accessible by a node.

FIG. 28 is a flowchart representative of example machine-readable instructions and/or example operations 2800 that may be executed and/or instantiated by processor circuitry to implement the ADM system 100 of FIG. 1, the data routing manager 302A-I of FIG. 3, and/or the data routing management circuitry 400 of FIG. 4 to persist a contextual data graph model in a shared datastore to be accessible by a node. The example machine-readable instructions and/or the example operations 2800 of FIG. 28 begin at block 2802, at which the data routing management circuitry 400 tags a first data object generated at a first node with metadata based on an environment of the first node. For example, the data query management circuitry 430 can tag a first data object, which can be sensor data, generated by a first one of the robots 214. In some examples, the data query management circuitry 430 can tag the first data object with the metadata 464 (e.g., generate an association of the first data object with the metadata 464), which can include a make, model, vendor, manufacturer, serial number, etc., of the first one of the robots 214.

At block 2804, the data routing management circuitry 400 identifies a contextual data graph model associated with the metadata. For example, the machine-learning circuitry 420 can identify (e.g., by executing one(s) of the machine-learning models 470) a first one of the contextual data graph models 474 that corresponds to the first one of the robots 214. In some examples, the machine-learning circuitry 420 can identify at least one of the first contextual data graph model 502 or the second contextual data graph model 504 that corresponds to the first one of the robots 214.

At block 2806, the data routing management circuitry 400 determines a strength of association between the first data object and a second data object of the contextual data graph model. For example, the machine-learning circuitry 420 can determine (e.g., by executing the machine-learning model 470) a strength of association of the primary node 506 of the first contextual data graph model 502 and a first node connected to the primary node 506 of the first contextual data graph model 502. In some examples, the first node can be implemented with and/or otherwise representative of the first data object (and/or associated metadata) and the primary node 506 can be implemented with and/or otherwise representative of a second data object, such as sensor data generated by a second one of the robots 214 that may be co-located (and/or communicatively coupled) with the first one of the robots 214. Example machine-readable instructions and/or the example operations that may be executed and/or instantiated by processor circuitry to implement block 2806 is described below in connection with FIG. 29.

At block 2808, the data routing management circuitry 400 determines whether the strength of the association satisfies a threshold. For example, the machine-learning circuitry 420 can determine (e.g., by executing the one(s) of the machine-learning models 470) whether a vector angle, length, placement, location, etc., satisfies a threshold (e.g., a similarity threshold, a strength or strength of association threshold, etc.). If, at block 2808, the data routing management circuitry 400 determines that the strength of the association does not satisfy a threshold, the example machine-readable instructions and/or the example operations 2800 of FIG. 28 conclude. Otherwise, control proceeds to block 2810.

At block 2810, the data routing management circuitry 400 updates the contextual data graph model based on the strength of the association. For example, the machine-learning circuitry 420 can modify or update (e.g., by executing the one(s) of the machine-learning models 470) an angle, a length, a placement, a location, etc., of a vector connecting the first data object and the second data object or a different vector connecting the first data object to the first contextual data graph model 502 based on the strength of the association.

At block 2812, the data routing management circuitry 400 stores the contextual data graph model in a shared datastore to be accessible by a second node. For example, the data publishing circuitry 450 can push and/or otherwise publish update(s) to the first contextual data graph model 502 to be stored in a shared datastore, such as the distributed datastore 144 of FIG. 1, to be accessible by another node of the environment 200 of FIG. 2, such as one of the industrial machines 216, 218, 220, 222. In response to persisting the contextual data graph model in a shared datastore to be accessible by a second node at block 2812, the example machine-readable instructions and/or example operations 2800 of FIG. 28 conclude.

Figure 29:
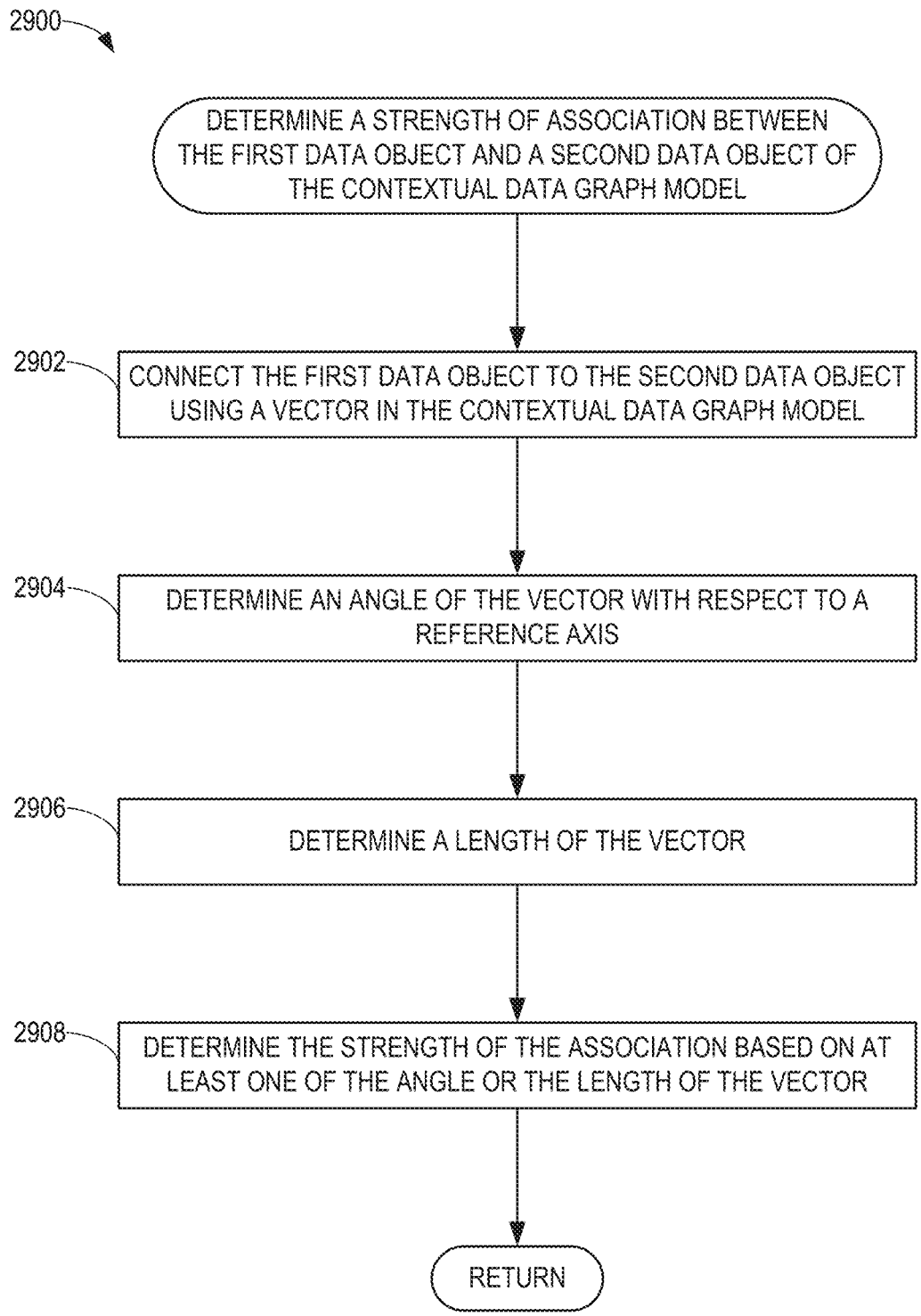
FIG. 29 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to determine a strength of association between a first data object and a second data object of a contextual data graph model.

FIG. 29 is a flowchart representative of example machine-readable instructions and/or example operations 2900 that may be executed and/or instantiated by processor circuitry to implement the ADM system 100 of FIG. 1, the data routing manager 302A-I of FIG. 3, and/or the data routing management circuitry 400 of FIG. 4 to determine a strength of association between a first data object and a second data object of a contextual data graph model. In some examples, the machine-readable instructions and/or the operations 2900 of FIG. 29 can be executed and/or instantiated by processor circuitry to implement block 2806 of the machine-readable instructions and/or the operations 2800 of FIG. 28.

The example machine-readable instructions and/or the example operations 2900 of FIG. 29 begin at block 2902, at which the data routing management circuitry 400 connects the first data object to the second data object using a vector in the contextual data graph model. For example, the machine-learning circuitry 420 can connect and/or otherwise identify a placement and/or orientation of a vector to be connected from a first data object to a second data object in the first contextual data graph model 502. In some examples, the second data object can be implemented by the primary node 506 and the first data object can be implemented by the first adjacent node 510.

At block 2904, the data routing management circuitry 400 determines an angle of the vector with respect to a reference axis. For example, the first contextual data graph model 502 can have one or more axes, such as an x-axis, a y-axis, a z-axis (in the case of a three-dimensional implementation), etc. In some examples, the machine-learning circuitry 420 can determine an angle of the vector connecting the primary node 506 and the first adjacent node 510.

At block 2906, the data routing management circuitry 400 determines a length of the vector. For example, the machine-learning circuitry 420 can determine a length of the vector connecting the primary node 506 and the first adjacent node 510.

At block 2908, the data routing management circuitry 400 determines the strength of the association based on at least one of the angle or the length of the vector. For example, the machine-learning circuitry 420 can determine the strength of the association between the first and second data objects based on quantifications of their relationship to each other in the first contextual data graph model 502, which can include at least one of the angle or the length of the vector connecting the primary node 506 and the first adjacent node 510. In response to determining the strength of the association based on at least one of the angle or the length of the vector at block 2908, the example machine-readable instructions and/or the example operations 2900 of FIG. 29 conclude. For example, the machine-readable instructions and/or the example operations 2900 of FIG. 29 can return to block 2808 of the machine-readable instructions and/or the example operations 2800 of FIG. 28 to determine whether the strength of the association satisfies a threshold.

Figure 30:
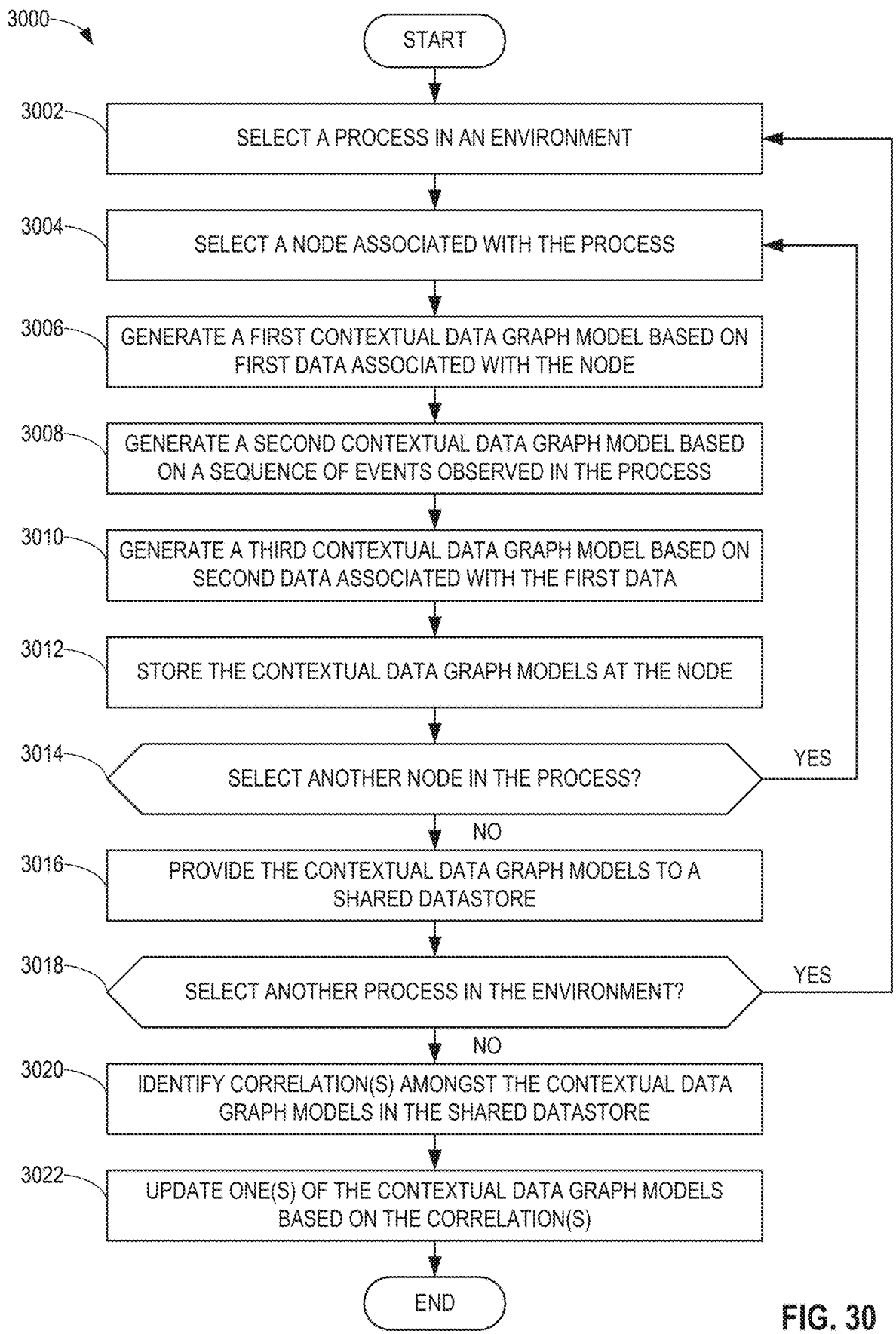
FIG. 30 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to update one(s) of contextual data graph models based on correlation(s).

FIG. 30 is a flowchart representative of example machine-readable instructions and/or example operations 3000 that may be executed and/or instantiated by processor circuitry to implement the ADM system 100 of FIG. 1, the data routing manager 302A-I of FIG. 3, and/or the data routing management circuitry 400 of FIG. 4 to update one(s) of contextual data graph models based on correlation(s). The example machine-readable instructions and/or the example operations 3000 of FIG. 30 begin at block 3002, at which the data routing management circuitry 400 selects a process in an environment. For example, the node management circuitry 440 can select the first process 602 in an environment, such as the environment 200 of FIG. 2.

At block 3004, the data routing management circuitry 400 selects a node associated with the process. For example, the node management circuitry 440 can select a node, such as the first industrial machine 216 that is associated with the first process 602.

At block 3006, the data routing management circuitry 400 generates a first contextual data graph model based on first data associated with the node. For example, the machine-learning circuitry 420 can generate (e.g., by executing one(s) of the machine-learning models 470) the first contextual data graph model 610 based on first data generated, ingested, and/or published by the first industrial machine 216 (e.g., a controller and/or sensor associated with the first industrial machine 216).

At block 3008, the data routing management circuitry 400 generates a second contextual data graph model based on a sequence of events observed in the process. For example, the machine-learning circuitry 420 can generate (e.g., by executing the one(s) of the machine-learning models 470) the second contextual data graph model 612 based on a sequence of events observed in the first process 602, the second process 604, etc., and/or, more generally, the event chain 600.

At block 3010, the data routing management circuitry 400 generates a third contextual data graph model based on second data associated with the first data. For example, the machine-learning circuitry 420 can generate (e.g., by executing and/or instantiating the one(s) of the machine-learning models 470) the third contextual data graph model 614 based on associated data objects (e.g., ancillary, auxiliary, etc., types of data objects) that can be frequently associated with or used in conjunction with the first data associated with the first industrial machine 216.

At block 3012, the data routing management circuitry 400 stores the contextual data graph models at the node. For example, the data query management circuitry 430 can store at least one of the first contextual data graph model 610, the second contextual data graph model 612, or the third contextual data graph model 614 as one(s) of the contextual data graph models 474 of the datastore 460. In some examples, the datastore 460 can be implemented using memory, one or more mass storage devices, etc., of the first industrial machine 216 (e.g., a controller and/or sensor associated with the first industrial machine 216).

At block 3014, the data routing management circuitry 400 determines whether to select another node in the process. For example, the node management circuitry 440 can select the second industrial machine 218 to process. If, at block 3014, the data routing management circuitry 400 determines to select another node in the process, control returns to block 3004. Otherwise, control proceeds to block 3016.

At block 3016, the data routing management circuitry 400 provides the contextual data graph models to a shared datastore. For example, the data publishing circuitry 450 can push and/or otherwise provide the at least one of the first contextual data graph model 610, the second contextual data graph model 612, or the third contextual data graph model 614 to memory, one or more mass storage devices, etc., of the edge cloud 210, which can be accessed by different nodes of the environment 200.

At block 3018, the data routing management circuitry 400 determines whether to select another process in the environment. For example, the node management circuitry 440 can select the second process 604 to analyze and/or otherwise process for generation of one(s) of the contextual data graph models 474. If, at block 3018, the data routing management circuitry 400 determines to select another process in the environment, control returns to block 3002. Otherwise, control proceeds to block 3020.

At block 3020, the data routing management circuitry 400 identifies correlation(s) amongst the contextual data graph models in the shared datastore. For example, the machine-learning circuitry 420 can identify correlation(s), association(s), relationship(s), etc., amongst at least one of the first contextual data graph model 610, the second contextual data graph model 612, or the third contextual data graph model 614, and/or, more generally, the contextual data graph models 474, based on placements, locations, positions, angles, lengths, etc., of node connecting vectors. In some examples, the machine-learning circuitry 420 can couple the first contextual data graph model 610 to the second contextual data graph model 612 to identify whether first node(s) of the first contextual data graph model 610 can be coupled to second node(s) of the second contextual data graph model 612 based on relatedness between the first node(s) and the second node(s). In some examples, the machine-learning circuitry 420 can identify correlation(s) between the first contextual data graph model 610 and the second contextual data graph model 612 based on the coupling(s) of the first node(s) and the second node(s).

At block 3022, the data routing management circuitry 400 updates one(s) of the contextual data graph models based on the correlation(s). For example, the machine-learning circuitry 420 can update at least one of the one of the first contextual data graph model 610, the second contextual data graph model 612, or the third contextual data graph model 614, and/or, more generally, the contextual data graph models 474, based on placements, locations, positions, angles, lengths, etc., of node connecting vectors indicative of correlation(s) amongst them. In response to updating one(s) of the contextual data graph models based on the correlation(s) at block 3022, the example machine-readable instructions and/or example operations 3000 of FIG. 30 conclude.

Figure 31:
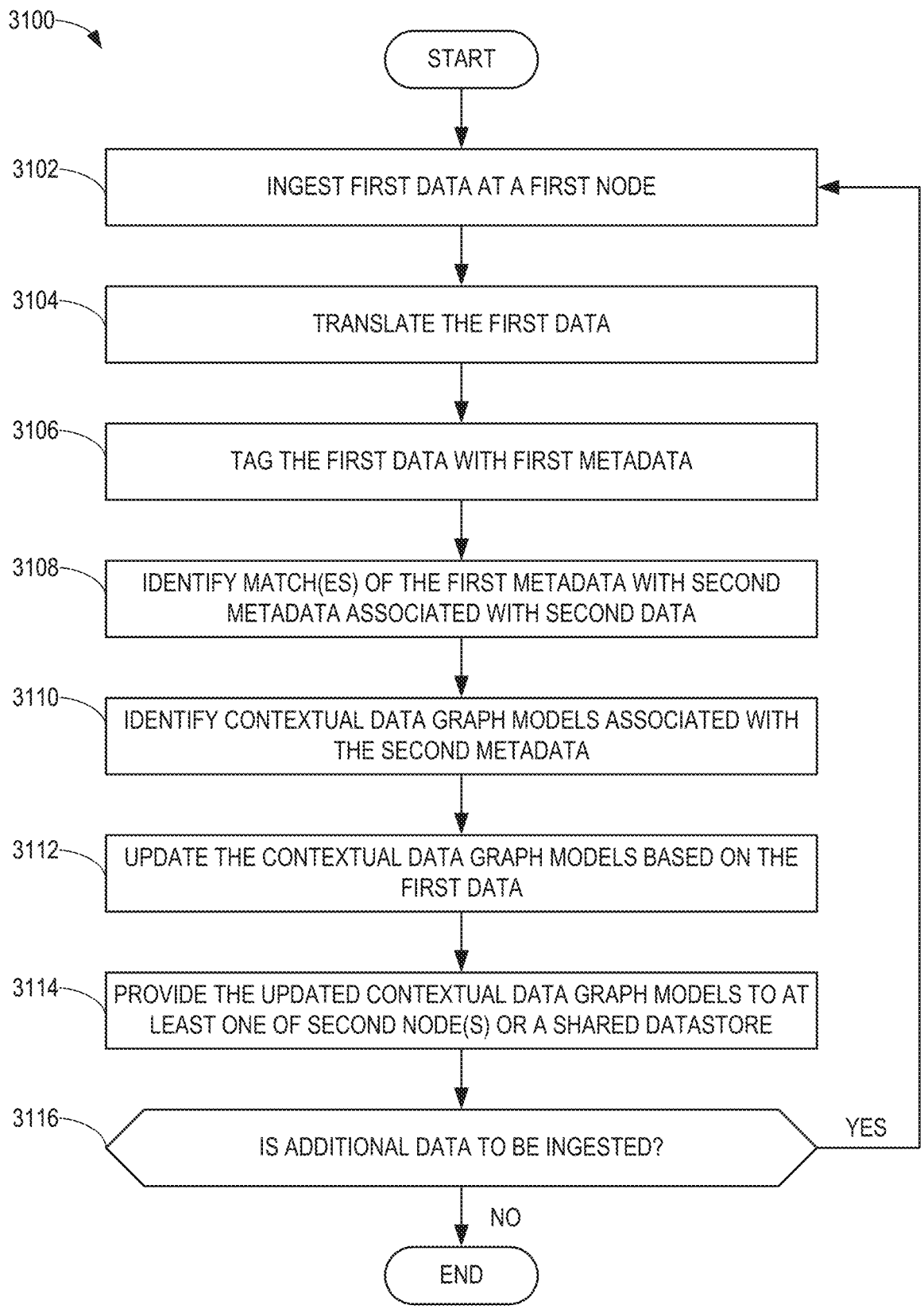
FIG. 31 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to provide updated contextual data graph models to at least one of node(s) or a shared datastore.

FIG. 31 is a flowchart representative of example machine-readable instructions and/or example operations 3100 that may be executed and/or instantiated by processor circuitry to implement the ADM system 100 of FIG. 1, the data routing manager 302A-I of FIG. 3, and/or the data routing management circuitry 400 of FIG. 4 to provide updated contextual data graph models to at least one of node(s) or a shared datastore. The example machine-readable instructions and/or the example operations 3100 of FIG. 31 begin at block 3102, at which the data routing management circuitry 400 ingests first data at a first node. For example, the data ingestion circuitry 410 can receive and/or otherwise ingest first data generated by a node, such as a first one of the robots 214.

At block 3104, the data routing management circuitry 400 translates the first data. For example, the data ingestion circuitry 410 can convert, reformat, decrypt/encrypt, etc., the first data from a first data format to a second data format.

At block 3106, the data routing management circuitry 400 tags the first data with first metadata. For example, the first data can be an operating amperage measurement of the first one of the robots 214, and the data query management circuitry 430 can tag the amperage measurement with first metadata, such as a user, make, model, vendor, manufacturer, serial number, etc., of the first one of the robots 214.

At block 3108, the data routing management circuitry 400 identifies match(es) of the first metadata with second metadata associated with second data. For example, the machine-learning circuitry 420 can determine whether a first portion of the first metadata matches a second portion of second metadata associated with second data, such as an operating amperage measurement of a second one of the robots 214.

At block 3110, the data routing management circuitry 400 identifies contextual data graph models associated with the second metadata. For example, the machine-learning circuitry 420 can identify one(s) of the contextual data graph models 474 that includes the second metadata.

At block 3112, the data routing management circuitry 400 updates the contextual data graph models based on the first data. For example, the machine-learning circuitry 420 can update the one(s) of the contextual data graph models 474 by adding and/or removing the first portion of the first metadata to node(s) of the one(s) of the contextual data graph models 474.

At block 3114, the data routing management circuitry 400 provides the updated contextual data graph models to at least one of second node(s) or a shared datastore. For example, the data publishing circuitry 450 can push and/or otherwise provide the one(s) of the contextual data graph models 474 to memory, one or more mass storage devices, etc., of the edge cloud 210, which can be accessed by different nodes of the environment 200. In some examples, the data publishing circuitry 450 can provide the one(s) of the contextual data graph models 474 to the different nodes of the environment 200, such as the second one of the robots 214, the predictive maintenance system 224, etc.

At block 3116, the data routing management circuitry 400 determines whether additional data is to be ingested. For example, the data ingestion circuitry 410 can determine whether another measurement is available from the first one of the robots 214 to be ingested for updating the contextual data graph models 474. If, at block 3116, the data routing management circuitry 400 determines that additional data is to be ingested, control returns to block 3102. Otherwise, the example machine-readable instructions and/or the example operations 3100 of FIG. 31 conclude.

Figure 32:
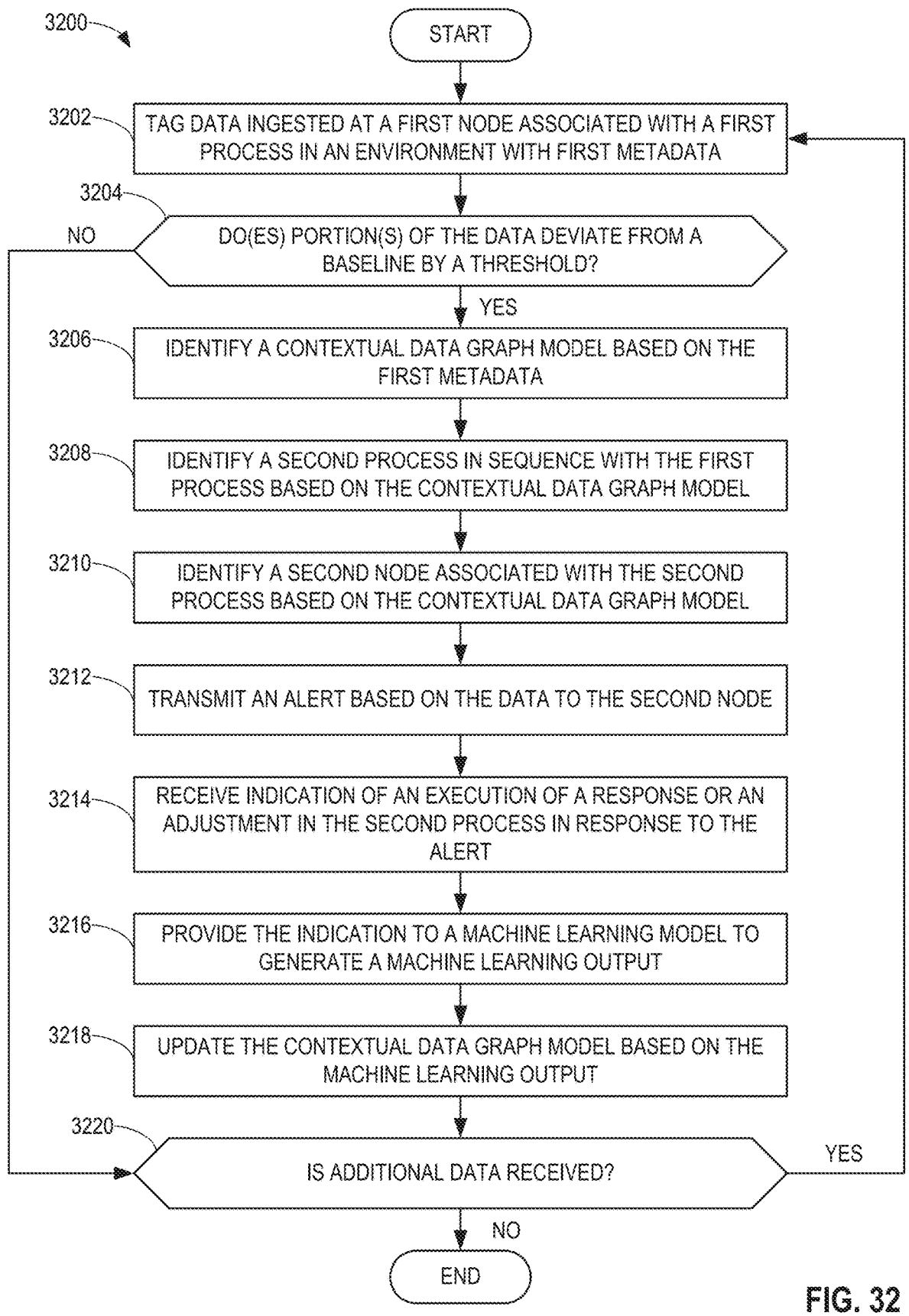
FIG. 32 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to update a contextual data graph model based on a machine-learning output.

FIG. 32 is a flowchart representative of example machine-readable instructions and/or example operations 3200 that may be executed and/or instantiated by processor circuitry to implement the ADM system 100 of FIG. 1, the data routing manager 302A-I of FIG. 3, and/or the data routing management circuitry 400 of FIG. 4 to update a contextual data graph model based on a machine-learning output. The example machine-readable instructions and/or the example operations 3200 of FIG. 32 begin at block 3202, at which the data routing management circuitry 400 tags data ingested at a first node associated with a first process in an environment with first metadata. For example, the data query management circuitry 430 can tag first data, which can be sensor data, generated by the first industrial machine 216. In some examples, the data query management circuitry 430 can tag the first data with the metadata 464 (e.g., generate an association of the first data with the metadata 464), which can include a make, model, vendor, manufacturer, serial number, etc., of the first industrial machine 216. In some examples, the first industrial machine 216 can be included in and/or otherwise part of the first process 602 of FIG. 6.

At block 3204, the data routing management circuitry 400 determines whether portion(s) of the data deviate from a baseline by a threshold. For example, the machine-learning circuitry 420 can determine whether a value of the sensor data is different from an average value of the sensor data by more than a threshold value, which can be indicative of an abnormal, anomalous, or irregular event in connection with the first industrial machine 216.

If, at block 3204, the data routing management circuitry 400 determines that portion(s) of the data do not deviate from a baseline by a threshold, control proceeds to block 3220. Otherwise, control proceeds to block 3206. At block 3206, the data routing management circuitry 400 identifies a contextual data graph model based on the first metadata. For example, the machine-learning circuitry 420 can search the contextual data graph models 474 for one(s) that include portion(s) of the first metadata, and/or, more generally, the first metadata. In some examples, the search can result in the second contextual data graph model 612 of FIG. 6.

At block 3208, the data routing management circuitry 400 identifies a second process in sequence with the first process based on the contextual data graph model. For example, the machine-learning circuitry 420 can identify that the second process 604 is in sequence with the first process 602 based on connections of the second contextual data graph model 612.

At block 3210, the data routing management circuitry 400 identifies a second node associated with the second process based on the contextual data graph model. For example, the node management circuitry 440 can identify the vehicle 226 as a part of the second process 604. In some examples, the identification of the vehicle 226 is based on connections of the second contextual data graph model 612.

At block 3212, the data routing management circuitry 400 transmits an alert based on the data to the second node. For example, the data publishing circuitry 450 can transmit an alert, based on the sensor data, from the first industrial machine 216 to the vehicle 226 in response to a determination that output(s) from the first industrial machine 216 can affect input(s) of the vehicle 226.

At block 3214, the data routing management circuitry 400 receives an indication of an execution of a response or an adjustment in the second process in response to the alert. For example, the vehicle 226 can be halted and/or otherwise cease operation in response to the alert (e.g., loading of the vehicle 226 can be paused). In some examples, a user may carry out an activity in connection with the vehicle 226 in response to the alert. In some examples, the data ingestion circuitry 410 can receive data indicative of the halting/ceasing operation of the vehicle 226, the carrying out of the activity, etc., and/or any combination(s) thereof.

At block 3216, the data routing management circuitry 400 provides the indication to a machine-learning model to generate a machine-learning output. For example, the data ingestion circuitry 410 can provide the data to the machine-learning model 470 as model input(s) to generate model output(s). In some examples, the model output(s) can include change(s) to one(s) of the contextual data graph models 474, such as one of the contextual data graph models 474 that is associated with the vehicle 226 and/or another one of the contextual data graph models 474 that is associated with the first industrial machine 216.

At block 3218, the data routing management circuitry 400 updates the contextual data graph model based on the machine-learning output. For example, the machine-learning circuitry 420 can update the one of the contextual data graph models 474 that is associated with the vehicle 226 and/or the one of the contextual data graph models 474 that is associated with the first industrial machine 216 based on the model output(s) from the machine-learning model 470.

At block 3220, the data routing management circuitry 400 determines whether additional data is received. For example, the data ingestion circuitry 410 can determine whether additional data is received from the first industrial machine 216 (and/or the vehicle 226). If, at block 3220, the data routing management circuitry 400 determines that additional data is received, control returns to block 3202. Otherwise, the example machine-readable instructions and/or the example operations 3200 of FIG. 32 conclude.

Figure 33:
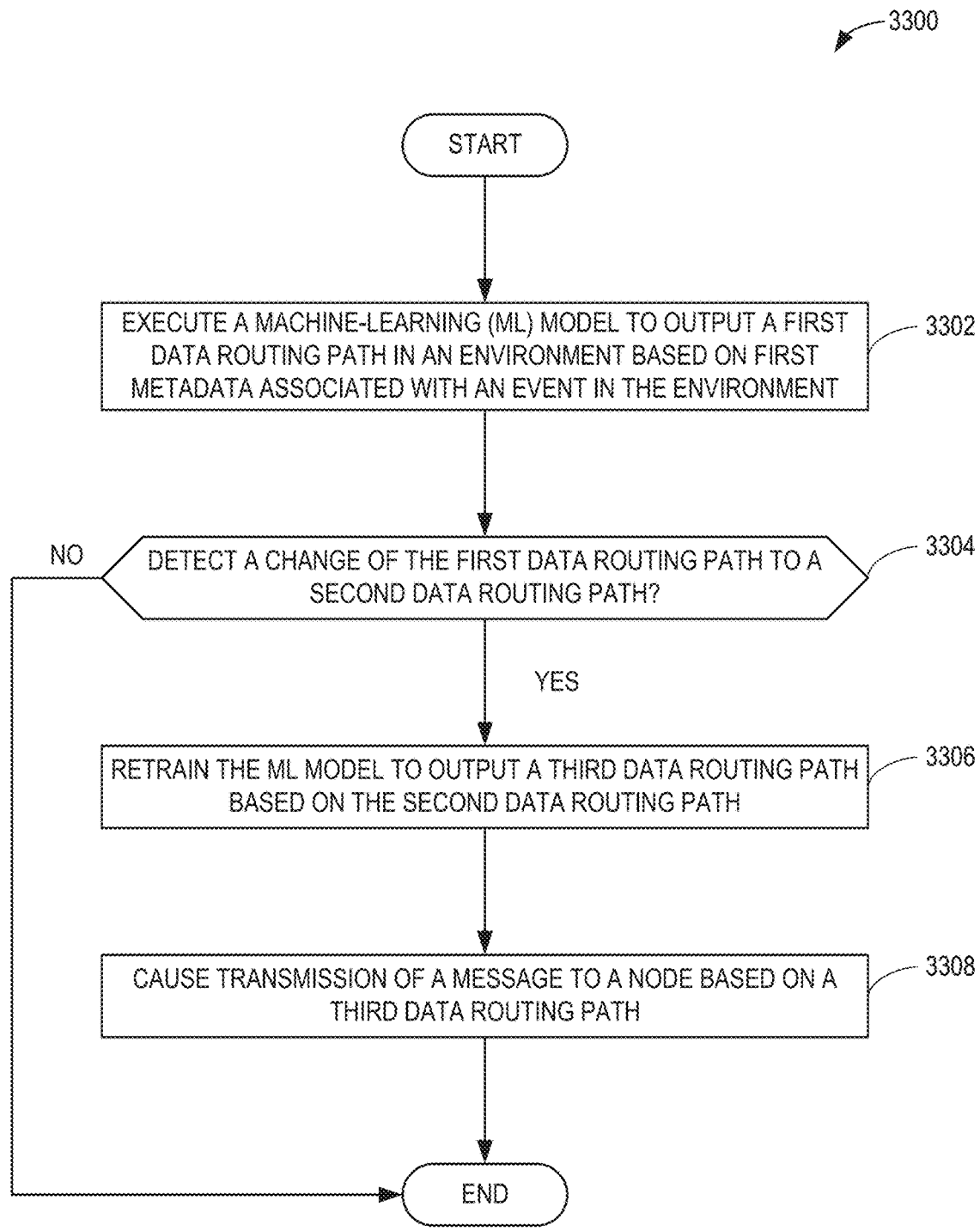
FIG. 33 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to cause transmission of a message to a node based on a data routing path.

FIG. 33 is a flowchart representative of example machine-readable instructions and/or example operations 3300 that may be executed and/or instantiated by processor circuitry to implement the ADM system 100 of FIG. 1, the data routing manager 302A-I of FIG. 3, and/or the data routing management circuitry 400 of FIG. 4 to cause transmission of a message to a node based on a data routing path. The example machine-readable instructions and/or the example operations 3300 of FIG. 33 begin at block 3302, at which the data routing management circuitry 400 executes a machine-learning (ML) model to output a first data routing path in an environment based on first metadata associated with an event in the environment. For example, the machine-learning circuitry 420 can execute and/or instantiate one(s) of the machine-learning models 470 to output the first data routing path 1108. In some examples, the first data routing path 1108 can correspond to a data routing path from a first node, such as a first one of the robots 214, to a second node, such as the first endpoint device 232. For example, the machine-learning circuitry 420 can execute and/or instantiate one(s) of the machine-learning models 470 with the metadata 464 associated with an event generated by and/or associated with the first one of the robots 214 as input(s) to generate output(s), which can include the first data routing path 1108.

At block 3304, the data routing management circuitry 400 detects whether there is a change of the first data routing path to a second data routing path. For example, the machine-learning circuitry 420 can determine that the first data routing path 1108 included one or more first intervening nodes, such as the switch 204. In some examples, the machine-learning circuitry 420 can determine that the actual data routing path taken by a message associated with the event included one or more second intervening nodes, such as the second endpoint device 234. In some examples, the machine-learning circuitry 420 can detect the deviation and/or difference between the first data routing path and the second data routing path based on telemetry data associated with the one or more second intervening nodes, such as an identification of the second endpoint device 234.

If, at block 3304, the data routing management circuitry 400 does not detect a change of the first data routing path to a second data routing path, the example machine-readable instructions and/or the example operations 3300 of FIG. 33 conclude. Otherwise, control proceeds to block 3306.

At block 3306, the data routing management circuitry 400 retrains the ML model to output a third data routing path based on the second data routing path. For example, the machine-learning circuitry 420 can retrain the one(s) of the machine-learning models 470 using the second data routing path, the one or more second intervening nodes, the telemetry data, etc., as training data (or retraining data). In some examples, based on the retraining, the machine-learning circuitry 420 can execute and/or instantiate the machine-learning models 470 to output one(s) of the other data routing paths 1114 of FIG. 11.

At block 3308, the data routing management circuitry 400 causes transmission of a message to a node based on a third data routing path. For example, the data publishing circuitry 450 can cause transmission from the first one of the robots 214 to the first endpoint device 232 based on the one(s) of the other data routing paths 1114 of FIG. 11, such as the data routing path from Node 1 (e.g., the first one of the robots 214) to Node 4 (e.g., the first endpoint device 232). After causing transmission of a message to a node based on a third data routing path at block 3308, the example machine-readable instructions and/or the example operations 3300 of FIG. 33 conclude.

Figure 34:
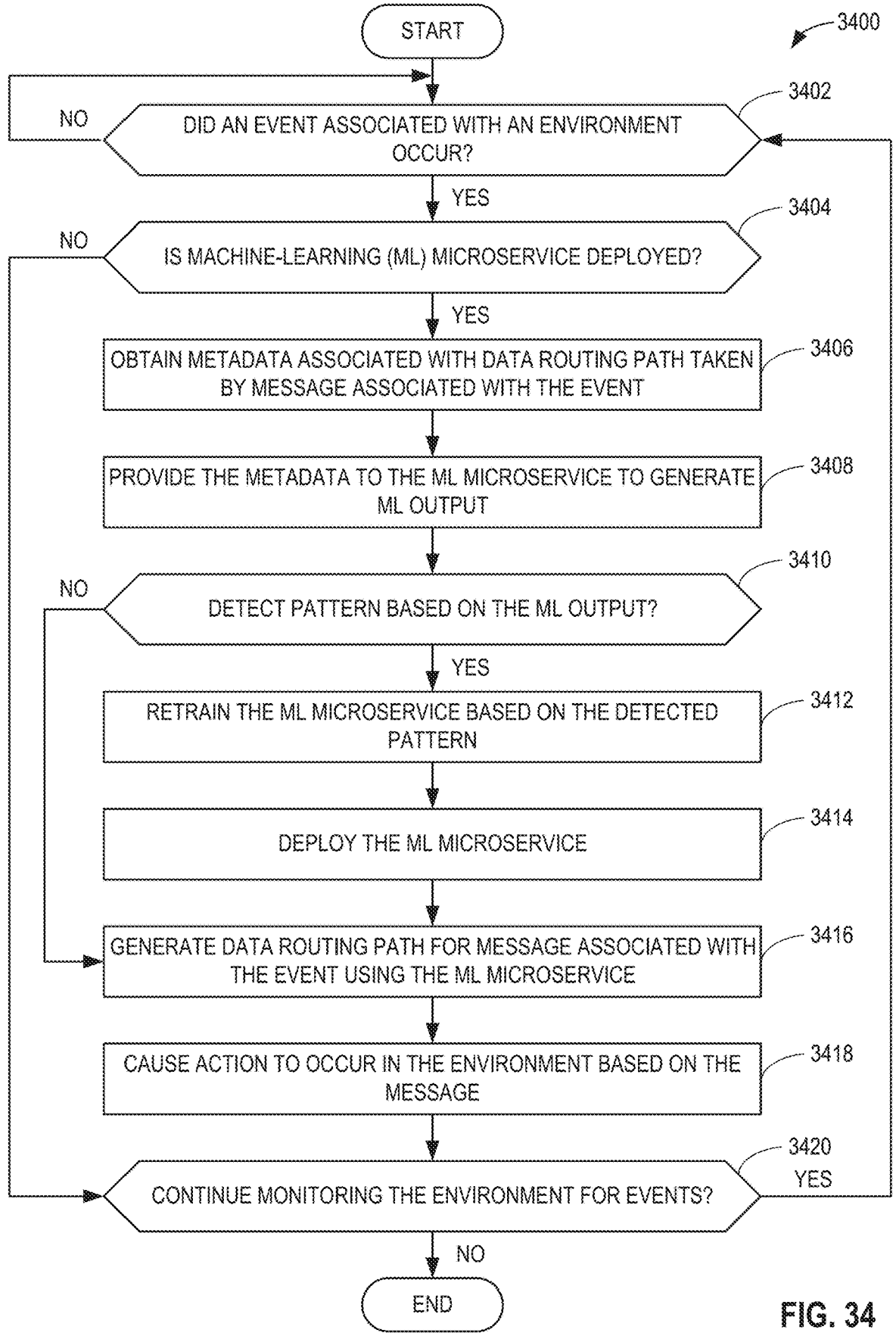
FIG. 34 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to cause an action to occur in an environment based on a message.

FIG. 34 is a flowchart representative of example machine-readable instructions and/or example operations 3400 that may be executed and/or instantiated by processor circuitry to implement the ADM system 100 of FIG. 1, the data routing manager 302A-I of FIG. 3, and/or the data routing management circuitry 400 of FIG. 4 to cause an action to occur in an environment based on a message.

At block 3402, the data routing management circuitry 400 determines whether an event associated with an environment occurred. For example, the data ingestion circuitry 410 can detect that the first event 924 is generated in the first zone 904 of the environment 900 of FIGS. 9A-9C.

If, at block 3402, the data routing management circuitry 400 did not determine that an event associated with an environment occurred, control waits at block 3402, such as waiting for new data to be ingested, analyzed, etc. If, at block 3402, the data routing management circuitry 400 did not determine that an event associated with an environment occurred, control proceeds to block 3404.

At block 3404, the data routing management circuitry 400 determines whether a machine-learning (ML) microservice is deployed. For example, the machine-learning circuitry 420 can determine whether one(s) of the machine-learning models 470 is/are deployed for use in connection with the first zone 904, and/or, more generally, the environment 902.

If, at block 3404, the data routing management circuitry 400 determines that a machine-learning (ML) microservice is not deployed, control proceeds to block 3420. Otherwise, control proceeds to block 3406.

At block 3406, the data routing management circuitry 400 obtains metadata associated with a data routing path taken by message associated with the event. For example, the data query management circuitry 430 can obtain the metadata 464 associated with a first message transmitted from the first node 908 to the ninth node 928. In some examples, the metadata 464 can be based on feedback from the ninth node 928, telemetry data associated with the ninth node 928, etc.

At block 3408, the data routing management circuitry 400 provides the metadata to the ML microservice to generate a ML output. For example, the data query management circuitry 430 can provide the metadata to the machine-learning microservice as model input(s) to generate model output(s).

At block 3410, the data routing management circuitry 400 determines whether a pattern is detected based on the ML output. For example, the machine-learning circuitry 420 can detect a pattern utilizing the workflow 1100 of FIG. 11.

If, at block 3410, the data routing management circuitry 400 determines that a pattern is not detected based on the ML output, control proceeds to block 3416. Otherwise, control proceeds to block 3412.

At block 3412, the data routing management circuitry 400 retrains the ML microservice based on the detected pattern. For example, the machine-learning circuitry 420 can retrain the machine-learning microservice based on the detected pattern to strengthen and/or reinforce associations of previously identified data routing paths and the first event 924.

At block 3414, the data routing management circuitry 400 deploys the ML microservice. For example, the machine-learning circuitry 420 can deploy the retrained machine-learning microservice for use in connection with the first zone 904, and/or, more generally, the environment 902.

At block 3416, the data routing management circuitry 400 generates a data routing path for a message associated with the event using the ML microservice. For example, the machine-learning circuitry 420 can generate and/or output a data routing path for a second message associated with the first event 924, or another instance of the first event 924, using the retrained machine-learning services.

At block 3418, the data routing management circuitry 400 causes an action to occur in the environment based on the message. For example, the data publishing circuitry 450 can cause transmission of the second message from the first node 908 to the ninth node 928 based on the data routing path output from the retrained machine-learning microservice. In some examples, the data publishing circuitry 450 can cause an action, such as a repair and/or maintenance action on the first node 908, by causing transmission of the second message to a relevant node, such as the ninth node 928.

At block 3402, the data routing management circuitry 400 determines whether to continue monitoring the environment for events. For example, the data ingestion circuitry 410 can determine whether to continue monitoring the first zone 904, and/or, more generally, the environment 902, for generation of events. If, at block 3402, the data routing management circuitry 400 determines to continue monitoring the environment for events, control returns to block 3402. Otherwise, the example machine-readable instructions and/or example operations 3400 of FIG. 34 conclude.

Figure 35:
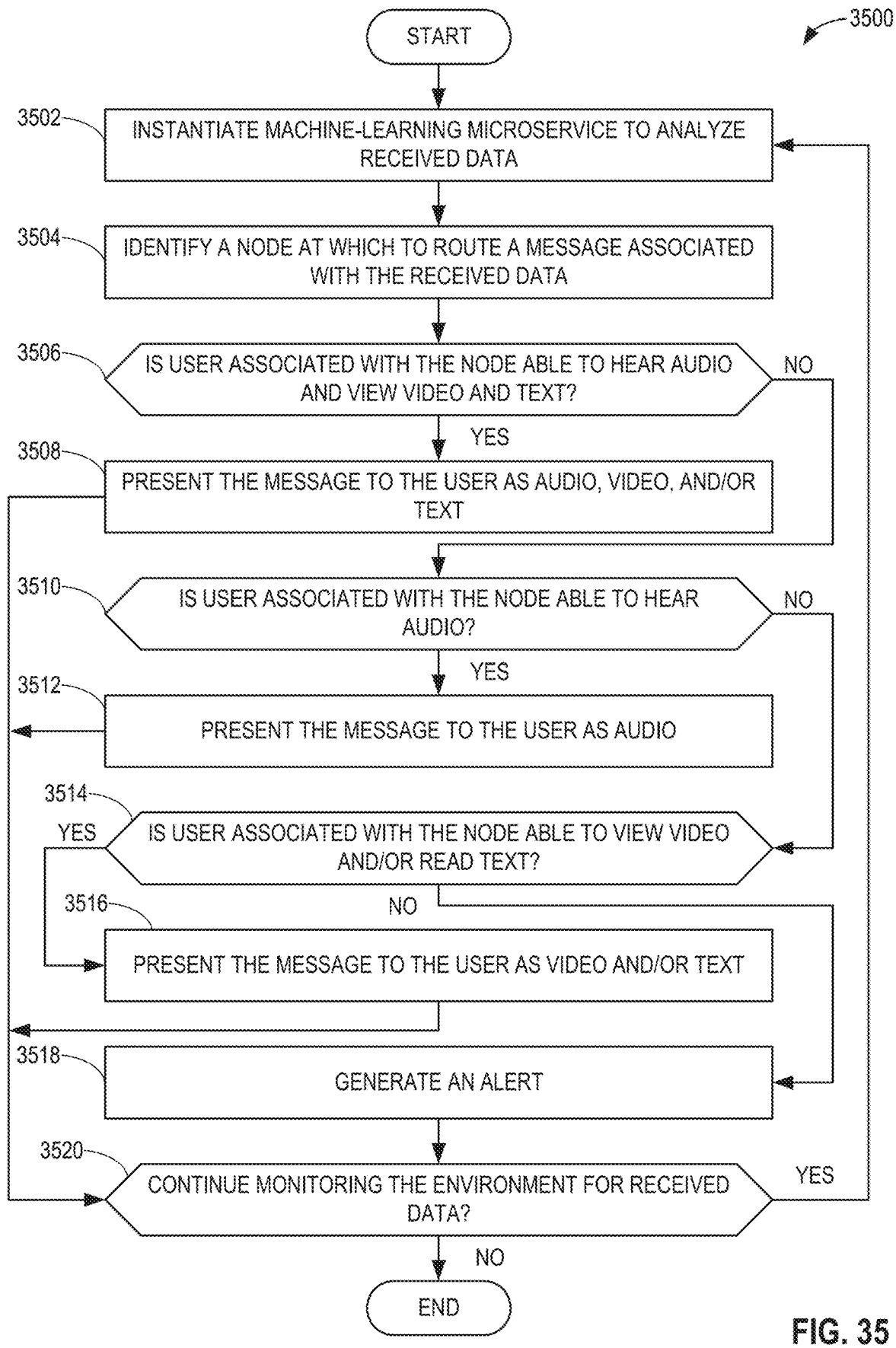
FIG. 35 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to present a message to a user.

FIG. 35 is a flowchart representative of example machine-readable instructions and/or example operations 3500 that may be executed and/or instantiated by processor circuitry to implement the ADM system 100 of FIG. 1, the data routing manager 302A-I of FIG. 3, and/or the data routing management circuitry 400 of FIG. 4 to present a message to a user.

At block 3502, the data routing management circuitry 400 instantiates a machine-learning microservice to analyze received data. For example, the machine-learning circuitry 420 can compile, generate, and/or output a machine-learning microservice based on execution and/or instantiation of one(s) of the machine-learning models 470. For example, one of the data routing managers 302A-I can execute and/or instantiate the machine-learning service locally on respective one of the devices 324, 326, 328, 330, 332, 334, remotely by accessing a cloud-hosted application, etc., and/or any combination(s) thereof.

At block 3504, the data routing management circuitry 400 identifies a node at which to route a message associated with the received data. For example, the node management circuitry 440 can identify a first node implemented by the fourth device 330 and/or the fourth user 316 at which to route a message associated with received and/or ingested data (e.g., an alarm or alert condition from a first one of the robots 214, the first event 924, etc.).

At block 3506, the data routing management circuitry 400 determines whether a user associated with the node is able to hear audio and view video and text. For example, the node management circuitry 440 can obtain utilization data from the fourth device 330, which can include biometric data associated with the fourth user 316, configuration data and/or settings of the fourth device 330, etc. In some examples, the node management circuitry 440 can determine that the user is unable to hear audio because the fourth user 316 muted and/or disabled audio of the fourth device 330. In some examples, the node management circuitry 440 can determine that the user is able to view text and/or video because eye-tracking data from an eye-tracking sensor indicates that the fourth user 316 is looking at a display of the fourth device 330.

If, at block 3506, the data routing management circuitry 400 determines that a user associated with the node is able to hear audio and view video and text, control proceeds to block 3508. For example, after a determination that the fourth user 316 can hear audio as well as view text and/or video(s), control proceeds to block 3508.

At block 3508, the data routing management circuitry 400 presents the message to the user as audio, video, and/or text. For example, the data publishing circuitry 450 can generate the message to include audio, video, and/or text data. In some examples, the data publishing circuitry 450 can cause transmission of the message to the fourth device 330 via the network 322. Upon receipt of the message by the fourth device 330, the fourth device 330 can present audio data via a speaker of the fourth device 330 and/or text and/or video data via a display of the fourth device 330. After presenting the message at block 3508, control proceeds to block 3520.

If, at block 3506, the data routing management circuitry 400 determines that a user associated with the node is not able to hear audio and view video and text, control proceeds to block 3510.

At block 3510, the data routing management circuitry 400 determines whether a user associated with the node is able to hear audio. For example, the node management circuitry 440 can determine that the fourth user 316 is holding the fourth device 330 based on accelerometer data from an accelerometer of the fourth device 330, but the fourth user 416 is not looking at the fourth device 330 based on eye-tracking data from an eye-tracking sensor of the fourth device 330, a human-presence sensor of the fourth device 330, etc. In some examples, the node management circuitry 440 can determine that the fourth user 316 can hear audio but may not be able to view video and/or text. In some examples, the node management circuitry 440 can determine that the fourth user 316 is unable to hear audio because a speaker of the fourth device 330 is broken, muted, and/or disabled. In some examples, the node management circuitry 440 can determine that the fourth user 316 is unable to hear audio because the fourth device 330 does not have audio output (e.g., does not have a speaker or other transducer).

If, at block 3510, the data routing management circuitry 400 determines that a user associated with the node is able to hear audio, control proceeds to block 3512. At block 3512, the data routing management circuitry 400 presents the message to the user as audio. For example, the data publishing circuitry 450 can generate the message to include audio data. In some examples, the data publishing circuitry 450 can cause transmission of the message to the fourth device 330 via the network 322. In response to receiving the message at the fourth device 330, the fourth device 330 can present audio data via a speaker of the fourth device 330. After presenting the message at block 3512, control proceeds to block 3520.

If, at block 3510, the data routing management circuitry 400 determines that a user associated with the node is unable to hear audio, control proceeds to block 3514. At block 3514, the data routing management circuitry 400 determines whether a user associated with the node is able to view video and/or read text. For example, the node management circuitry 440 can determine that the fourth user 316 is unable to view text and/or video because the fourth user 316 is not holding the fourth device 330 and/or otherwise near or proximate the fourth device 330 based on accelerometer data from an accelerometer of the fourth device 330, eye-tracking data from an eye-tracking sensor of the fourth device 330, a human-presence sensor of the fourth device 330, etc. In some examples, the node management circuitry 440 can determine that the fourth user 316 can view text and/or video because the fourth device 330 is powered on and/or the fourth device 330 includes a display to present a text and/or video-based message.

If, at block 3514, the data routing management circuitry 400 determines that a user associated with the node is able to view video and/or read text, control proceeds to block 3516. For example, the data publishing circuitry 450 can generate the message to include text and/or video data. In some examples, the data publishing circuitry 450 can cause transmission of the message to the fourth device 330 via the network 322. After receiving the message at the fourth device 330, the fourth device 330 can present text and/or video data via a display of the fourth device 330. After presenting the message at block 3516, control proceeds to block 3520.

If, at block 3514, the data routing management circuitry 400 determines that a user associated with the node is not able to view video and/or read text, control proceeds to block 3518. At block 3518, the data routing management circuitry 400 generates an alert. For example, the data publishing circuitry 450 can generate an alert that the fourth user 316 is unable to be presented with an audio, text, and/or video-based message. In some examples, the alert can be surfaced to and/or routed to a supervisor of the fourth user 316, another one of the users 310, 312, 314, 316, 318, 320 that may be related to the received and/or ingested data, etc. After generating the alert at block 3518, control proceeds to block 3520.

At block 3520, the data routing management circuitry 400 determines whether to continue monitoring the environment for received data. For example, the data ingestion circuitry 410 can determine whether another event is generated, additional data is received, etc. If, at block 3520, the data routing management circuitry 400 determines to continue monitoring the environment for received data, control returns to block 3502. Otherwise, the example machine-readable instructions and/or the example operations 3500 of FIG. 35 conclude.

Figure 36:
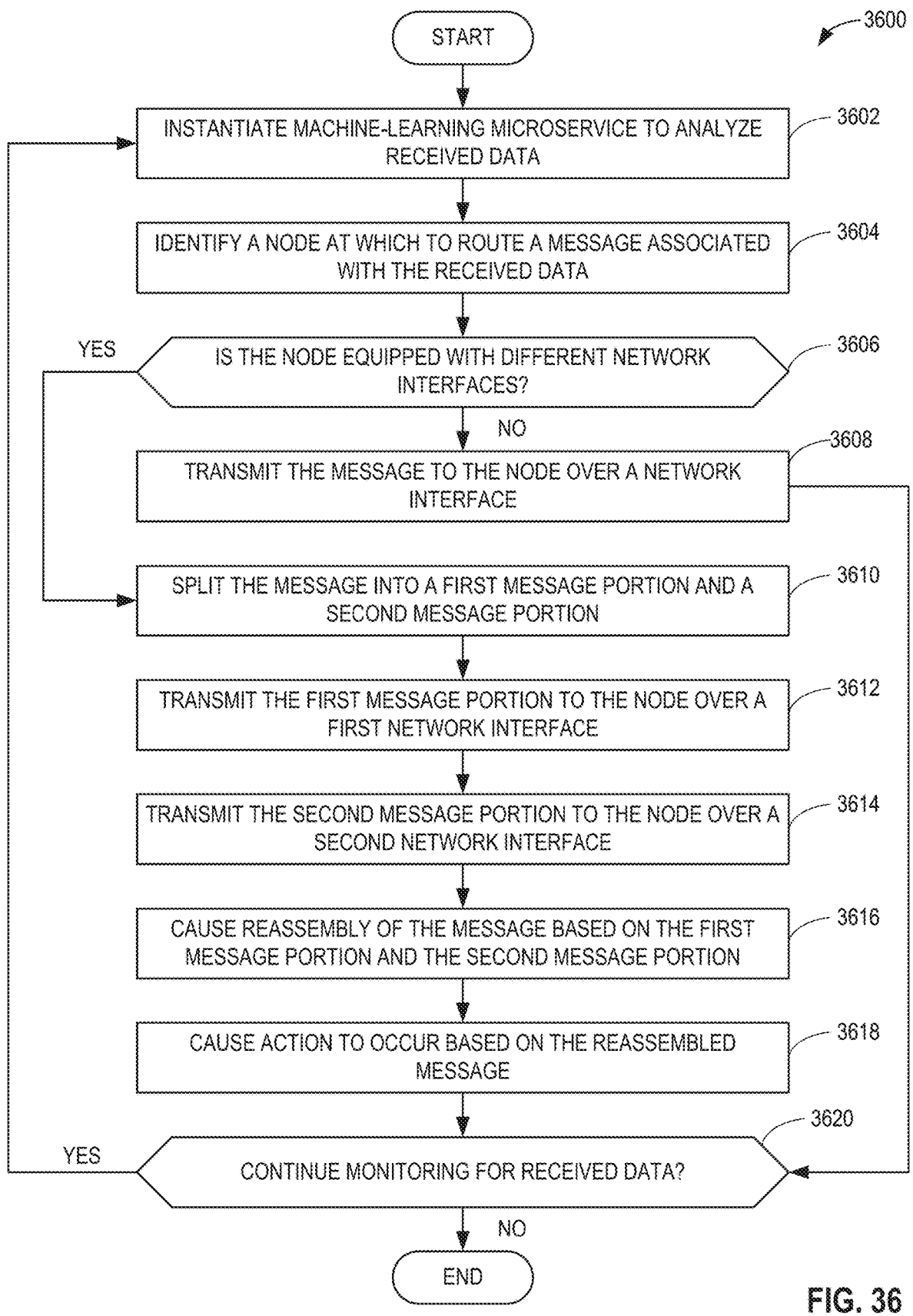
FIG. 36 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to present data to a user based on one or more communication mediums.

FIG. 36 is a flowchart representative of example machine-readable instructions and/or example operations 3600 that may be executed and/or instantiated by processor circuitry to implement the ADM system 100 of FIG. 1, the data routing manager 302A-I of FIG. 3, and/or the data routing management circuitry 400 of FIG. 4 to present data to a user based on one or more communication mediums. The example machine-readable instructions and/or the example operations 3600 of FIG. 36 begin at block 3602, at which the data routing management circuitry 400 instantiates a machine-learning microservice to analyze received data. For example, the machine-learning circuitry 420 can assemble, compile, generate, and/or output a machine-learning microservice based on execution and/or instantiation of one(s) of the machine-learning models 470. For example, one of the data routing managers 302A-I can execute and/or instantiate the machine-learning service locally on respective one of the devices 324, 326, 328, 330, 332, 334, remotely by accessing a cloud-hosted application, etc., and/or any combination(s) thereof.

At block 3604, the data routing management circuitry 400 identifies a node at which to route a message associated with the received data. For example, the node management circuitry 440 can identify a first node implemented by the second device 326 and/or the second user 312 at which to route a message associated with received and/or ingested data (e.g., an alarm or alert condition from the first industrial machine 216, the first event 924, etc.).

At block 3606, the data routing management circuitry 400 determines whether the node is equipped with different network interfaces. For example, the node management circuitry 440 can determine based on utilization data of the second device 326, such as a listing of hardware, software, and/or firmware associated with the second device 326, that the second device 326 includes at least a first network interface and a second network interface. In some examples, the first network interface can be based on a first type of communication medium, such as Wi-Fi. In some examples, the second network interface can be based on a second type of communication medium, such as Bluetooth or 5G cellular. Alternatively, the node management circuitry 440 can determine that the second device 326 only has a single type of network interface, such as Wi-Fi.

If, at block 3606, the data routing management circuitry 400 determines that the node is not equipped with different network interfaces, control proceeds to block 3608. At block 3608, the data routing management circuitry 400 transmits the message to the node over a network interface. For example, the data publishing circuitry 450 can transmit a message to the second device 326 via Wi-Fi. After transmitting the message at block 3608, control proceeds to block 3620.

If, at block 3606, the data routing management circuitry 400 determines that the node is equipped with different network interfaces, control proceeds to block 3610. At block 3610, the data routing management circuitry 400 splits the message into a first message portion and a second message portion. For example, the data publishing circuitry 450 can divide, segment, split, etc., the message into one or more first data objects and one or more second data objects. In some examples, the one or more first data objects are the same type (e.g., audio data objects) as the one or more second data objects. In some examples, the one or more first data objects have a first type (e.g., audio) and the one or more second data objects have a second type (e.g., text, video, etc.) different from the first type.

At block 3612, the data routing management circuitry 400 transmits the first message portion to the node over a first network interface. For example, the data publishing circuitry 450 can cause transmission of the one or more first data objects to the second device 326 via the network 322 using Wi-Fi.

At block 3614, the data routing management circuitry 400 transmits the second message portion to the node over a second network interface. For example, the data publishing circuitry 450 can cause transmission of the one or more second data objects to the second device 326 via the network 322 using 5G cellular.

At block 3616, the data routing management circuitry 400 causes reassembly of the message based on the first message portion and the second message portion. For example, the one or more first data objects and/or the one or more second data objects can be transmitted with metadata, such as respective sequence numbers or identifiers, that can instruct the second device 326 on how to reassemble the message (e.g., by arranging the data objects based on their associated sequence numbers/identifiers).

At block 3618, the data routing management circuitry 400 causes an action to occur based on the reassembled message. For example, the second device 326 can present the reassembled message to the second user 312. In some examples, the reassembled message can be an alert indicating that a first one of the robots 214 generated an error code and shut down (e.g., ceased operation, became inoperable, etc.). In some examples, the second user 312 can carry out an action, such as fixing the first one of the robots 214 and/or clearing the error code to resume operation of the first one of the robots 214, based on the presented message.

At block 3620, the data routing management circuitry 400 determines whether to continue monitoring for received data. For example, the data ingestion circuitry 410 can determine whether another event is generated, additional data is received, etc. If, at block 3620, the data routing management circuitry 400 determines to continue monitoring the environment for received data, control returns to block 3602. Otherwise, the example machine-readable instructions and/or the example operations 3600 of FIG. 36 conclude.

Figure 37:
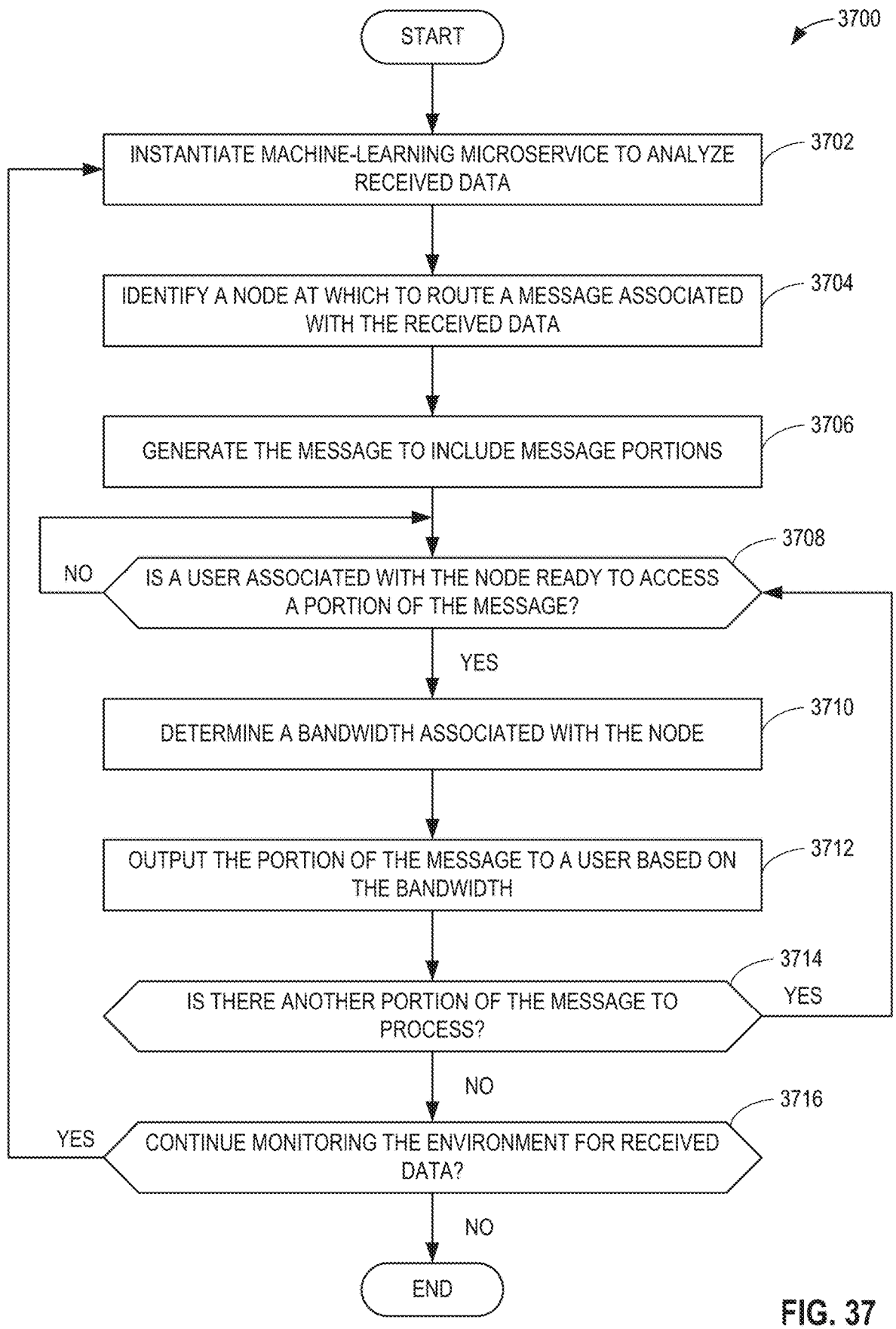
FIG. 37 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to output a message to a user based on bandwidth associated with the user.

FIG. 37 is a flowchart representative of example machine-readable instructions and/or example operations 3700 that may be executed and/or instantiated by processor circuitry to implement the ADM system 100 of FIG. 1, the data routing manager 302A-I of FIG. 3, and/or the data routing management circuitry 400 of FIG. 4 to output a message to a user based on bandwidth associated with the user. The example machine-readable instructions and/or example operations 3700 begin at block 3702, at which the data routing management circuitry 400 instantiates a machine-learning microservice to analyze received data. For example, the machine-learning circuitry 420 can assemble, compile, generate, output, and/or deploy a machine-learning microservice based on execution and/or instantiation of one(s) of the machine-learning models 470. For example, one of the data routing managers 302A-I can execute and/or instantiate the machine-learning service locally on respective one of the devices 324, 326, 328, 330, 332, 334, remotely by accessing a cloud-hosted application, etc., and/or any combination(s) thereof.

At block 3704, the data routing management circuitry 400 identifies a node at which to route a message associated with the received data. For example, the node management circuitry 440 can identify a node implemented by the fifth user 318 and/or the fifth device 332 at which to route a message associated with received and/or ingested data (e.g., an alarm or alert condition from the first industrial machine 216, the first event 924, etc.).

At block 3706, the data routing management circuitry 400 generates the message to include message portions. For example, the data publishing circuitry 450 can divide, segment, split, etc., the message into one or more first data objects and one or more second data objects. In some examples, the one or more first data objects are the same type (e.g., audio data objects) as the one or more second data objects. In some examples, the one or more first data objects have a first type (e.g., audio) and the one or more second data objects have a second type (e.g., text, video, etc.) different from the first type.

At block 3708, the data routing management circuitry 400 determines whether a user associated with the node is ready to access a portion of the message. For example, the node management circuitry 440 can obtain an acknowledgement from the fifth user 318, such as an audible command or instruction, a hand gesture interpreted by the fifth device 332, an input received by a touchscreen display of the fifth device 332, etc.

If, at block 3708, the data routing management circuitry 400 determines that a user associated with the node is not ready to access a portion of the message, control waits at block 3708 until the user is ready and/or an acknowledgement is received indicating that the user is ready.

If, at block 3708, the data routing management circuitry 400 determines that a user associated with the node is ready to access a portion of the message, control proceeds to block 3710. At block 3710, the data routing management circuitry 400 determines a bandwidth associated with the node. For example, the node management circuitry 440 can determine that the second device 326 has relatively low network bandwidth (e.g., weak Wi-Fi signal, low 5G cellular connection, etc.) based on utilization data associated with the second device 326.

At block 3712, the data routing management circuitry 400 outputs the portion of the message to a user based on the bandwidth. For example, the data publishing circuitry 450 can output the one or more first data objects to the second device 326 via Wi-Fi based on a determination that the Wi-Fi bandwidth associated with the second device 326 is greater than a 5G cellular bandwidth.

At block 3714, the data routing management circuitry 400 determines whether is there another portion of the message to process. For example, the data publishing circuitry 450 can determine that the one or more second data objects are to be output and/or transmitted to the second device 326.

If, at block 3714, the data routing management circuitry 400 determines that there is there another portion of the message to process, control returns to block 3708. Otherwise, control proceeds to block 3716. At block 3716, the data routing management circuitry 400 determines whether to continue monitoring the environment for received data. For example, the data ingestion circuitry 410 can determine whether another event is generated, additional data is received, etc. If, at block 3716, the data routing management circuitry 400 determines to continue monitoring the environment for received data, control returns to block 3702. Otherwise, the example machine-readable instructions and/or the example operations 3700 of FIG. 37 conclude.

Figure 38:
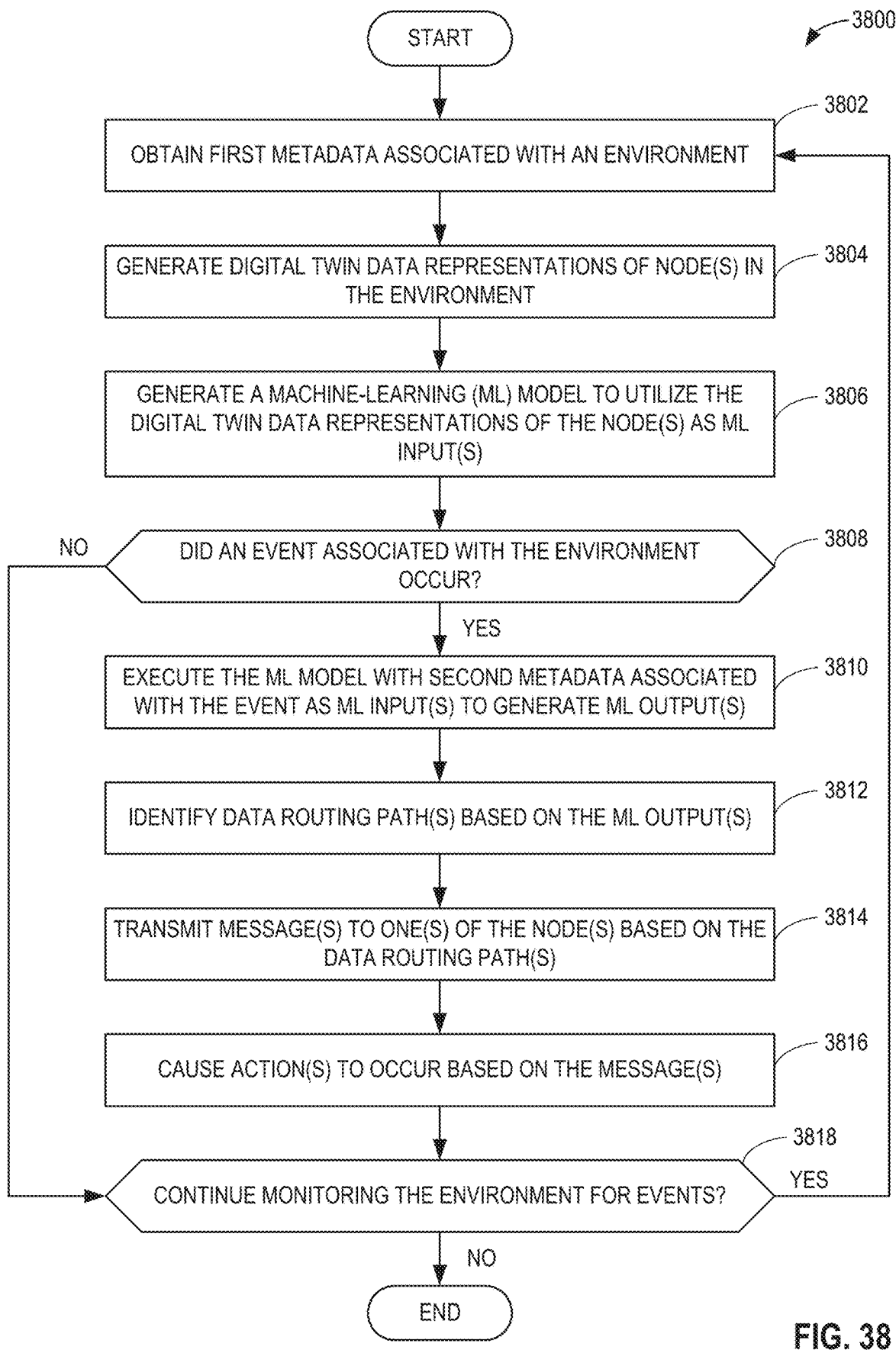
FIG. 38 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to cause an action to occur in an environment based on a digital twin associated with the environment.

FIG. 38 is a flowchart representative of example machine-readable instructions and/or example operations 3800 that may be executed and/or instantiated by processor circuitry to implement the ADM system 100 of FIG. 1, the data routing manager 302A-I of FIG. 3, and/or the data routing management circuitry 400 of FIG. 4 to cause an action to occur in an environment based on a digital twin associated with the environment.

At block 3802, the data routing management circuitry 400 obtains first metadata associated with an environment. For example, the data ingestion circuitry 410 can obtain first metadata, such as portion(s) of the metadata 464, associated with the first zone 904, and/or, more generally, the environment 902, of FIGS. 9A-9C.

At block 3804, the data routing management circuitry 400 generates digital twin data representations of node(s) in the environment. For example, the machine-learning circuitry 420 can generate a first one of the digital twins 476 based on a digital and/or virtual representation of a first one of the robots 214 of FIG. 2. In some examples, the first one of the digital twins 476 can be implemented by the first node 908 of FIGS. 9A-9C.

At block 3806, the data routing management circuitry 400 generates a machine-learning (ML) model to utilize the digital twin data representations of the node(s) as ML input(s). For example, the machine-learning circuitry 420 can generate and/or output a first one of the machine-learning models 470 to utilize the first one of the digital twins 476 as machine-learning input(s).

At block 3808, the data routing management circuitry 400 determines whether an event associated with the environment occurred. For example, the data ingestion circuitry 410 can determine that the first event 924 is generated and/or otherwise present. If, at block 3808, the data routing management circuitry 400 determines that an event associated with the environment did not occur, control proceeds to block 3818. Otherwise control proceeds to block 3810.

At block 3810, the data routing management circuitry 400 executes the ML model with second metadata associated with the event as ML input(s) to generate ML output(s). For example, the machine-learning circuitry 420 can execute and/or instantiate the first one of the machine-learning models 470 using second metadata, such as portion(s) of the metadata 464, associated with the first event 924 as machine-learning input(s) to the first one of the machine-learning models 470.

At block 3812, the data routing management circuitry 400 identifies data routing path(s) based on the ML output(s). For example, the machine-learning circuitry 420 can execute the first one of the machine-learning models 470 to generate machine-learning output(s), which can include a data routing path for a message based on the first event 924 to be transmitted from the first node 908 to different node(s) of the environment 902, such as the ninth node 928 of FIG. 9C.

At block 3814, the data routing management circuitry 400 transmits message(s) to one(s) of the node(s) based on the data routing path(s). For example, the data publishing circuitry 450 can cause transmission of the message from the first node to the different node(s) based on the data routing path indicated by the machine-learning output(s).

At block 3816, the data routing management circuitry 400 causes action(s) to occur based on the message(s). For example, after transmission of the message, the ninth node 928 can be invoked to act in connection with the first node 908, which can include a repair and/or maintenance action on the physical counterpart to the first node 908, which can be the first one of the robots 214.

At block 3818, the data routing management circuitry 400 determines whether to continue monitoring the environment for events. For example, the data ingestion circuitry 410 can determine whether another event is generated, additional data is received, etc. If, at block 3818, the data routing management circuitry 400 determines to continue monitoring the environment for events, control returns to block 3802. Otherwise, the example machine-readable instructions and/or the example operations 3800 of FIG. 38 conclude.

Figure 39:
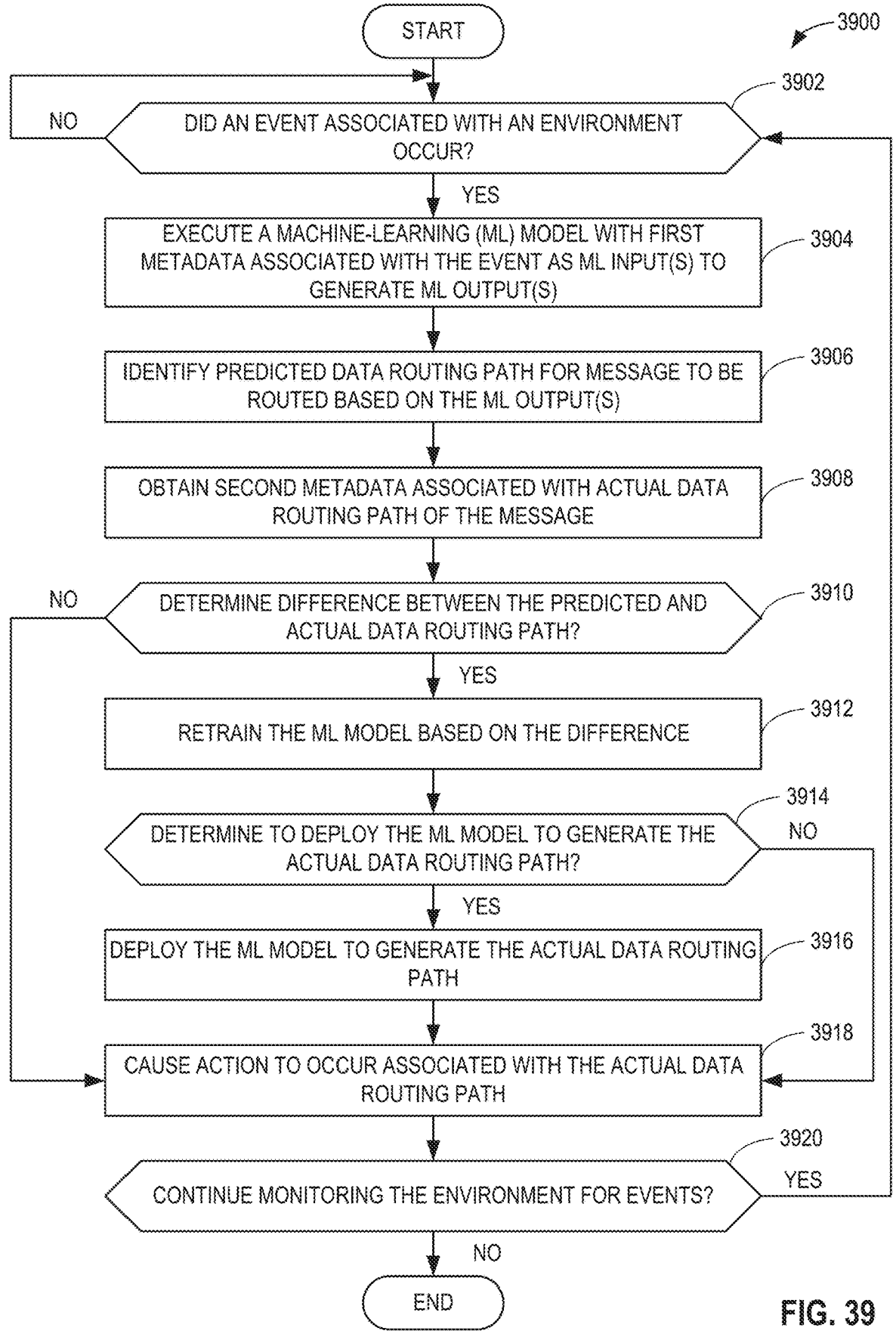
FIG. 39 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to train and/or retrain a machine-learning model associated with a digital twin.

FIG. 39 is a flowchart representative of example machine-readable instructions and/or example operations 3900 that may be executed and/or instantiated by processor circuitry to implement the ADM system 100 of FIG. 1, the data routing manager 302A-I of FIG. 3, and/or the data routing management circuitry 400 of FIG. 4 to train and/or retrain a machine-learning model associated with a digital twin. The example machine-readable instructions and/or the example operations 3900 of FIG. 39 begin at block 3902, at which the data routing management circuitry 400 determines whether an event associated with an environment occurred. For example, the data ingestion circuitry 410 can determine that the first event 924 is generated and/or otherwise present. If, at block 3902, the data routing management circuitry 400 determines that an event associated with the environment did not occur, control waits at block 3902 (e.g., waits for an event to occur and/or be generated). Otherwise control proceeds to block 3904.

At block 3904, the data routing management circuitry 400 executes a machine-learning (ML) model with first metadata associated with the event as ML input(s) to generate ML output(s). For example, during the first operation(s) 1106 of FIG. 11, the machine-learning circuitry 420 can execute and/or instantiate one(s) of the machine-learning models 470 with first metadata associated with the first event 924 as machine-learning input(s) to the one(s) of the machine-learning models 470 to generate machine-learning output(s).

At block 3906, the data routing management circuitry 400 identifies a predicted data routing path for message to be routed based on the ML output(s). For example, the machine-learning circuitry 420 can identify a first data routing path from Node 1 to Node 4 via Nodes 7, 3, 5, and 4 of FIG. 11.

At block 3908, the data routing management circuitry 400 obtains second metadata associated with an actual data routing path of the message. For example, during the first operation(s) 1106 of FIG. 11, the machine-learning circuitry 420 can obtain second metadata associated with the actual data routing path of the message, which can be the first data routing path 1108 of FIG. 11. In some examples, the second metadata corresponds to and/or is representative of an actual data routing path of a message from Node 1 to Node 4 via Nodes 6, 5, 2, and 4 of FIG. 11, which can be the first data routing path 1108 of FIG. 11.

At block 3910, the data routing management circuitry 400 determines whether there is a difference between the predicted and actual data routing path. For example, the machine-learning circuitry 420 can determine that the actual data routing path used Nodes 7, 3, and 5 instead of Nodes 6, 5, and 2 based on the second metadata and/or comparison(s) of the first metadata to the second metadata, comparison(s) of the predicted data routing path (e.g., Node 1-Node 7-Node 3-Node 5-Node 4) to the actual data routing path (e.g., Node 1-Node 6-Node 5-Node 2-Node 4), etc., and/or any combination(s) thereof.

If, at block 3910, the data routing management circuitry 400 determines that there is not a difference between the predicted and actual data routing path, control proceeds to block 3918. Otherwise, control proceeds to block 3912. At block 3912, the data routing management circuitry 400 retrains the ML model based on the difference. For example, during the second operation(s) 1110, the machine-learning circuitry 420 can retrain the one(s) of the machine-learning models 470 using the difference(s) as training data (or retraining data).

At block 3914, the data routing management circuitry 400 determines whether to deploy the ML model to generate the actual data routing path. For example, the machine-learning circuitry 420 can determine that an accuracy of the output(s) of the one(s) of the machine-learning models 470 does not satisfy an accuracy threshold, and therefore needs further training before deployment. In some examples, the machine-learning circuitry 420 can determine that an accuracy of the output(s) of the one(s) of the machine-learning models 470 is greater than an accuracy threshold and thereby can satisfy an accuracy threshold, and therefore can be deployed to generate actual data routing paths.

If, at block 3914, the data routing management circuitry 400 determines not to deploy the ML model to generate the actual data routing path, control proceeds to block 3918. Otherwise control proceeds to block 3916.

At block 3916, the data routing management circuitry 400 deploys the ML model to generate the actual data routing path. For example, in response to detection of another event that has metadata associated with the first event 924, the machine-learning circuitry 420 can execute and/or instantiate the one(s) of the machine-learning models 470 to generate and/or output actual data routing paths of message(s) based on the detected event.

At block 3918, the data routing management circuitry 400 causes an action to occur associated with the actual data routing path. For example, user(s) associated with Nodes 2, 3, and/or 4 can be presented with a message based on the detected event. In some examples, the user(s) can carry out actions, activities, operations, tasks, etc., based on the message. In some examples, the message presented to the user(s) are routed from an origin node to Nodes 2, 3, and/or 4 based on an actual data routing path output from the one(s) of the machine-learning models 470.

At block 3920, the data routing management circuitry 400 continue monitoring the environment for events. For example, the data ingestion circuitry 410 can determine whether another event is generated, additional data is received, etc. If, at block 3920, the data routing management circuitry 400 determines to continue monitoring the environment for events, control returns to block 3902. Otherwise, the example machine-readable instructions and/or the example operations 3900 of FIG. 39 conclude.

Figure 40:
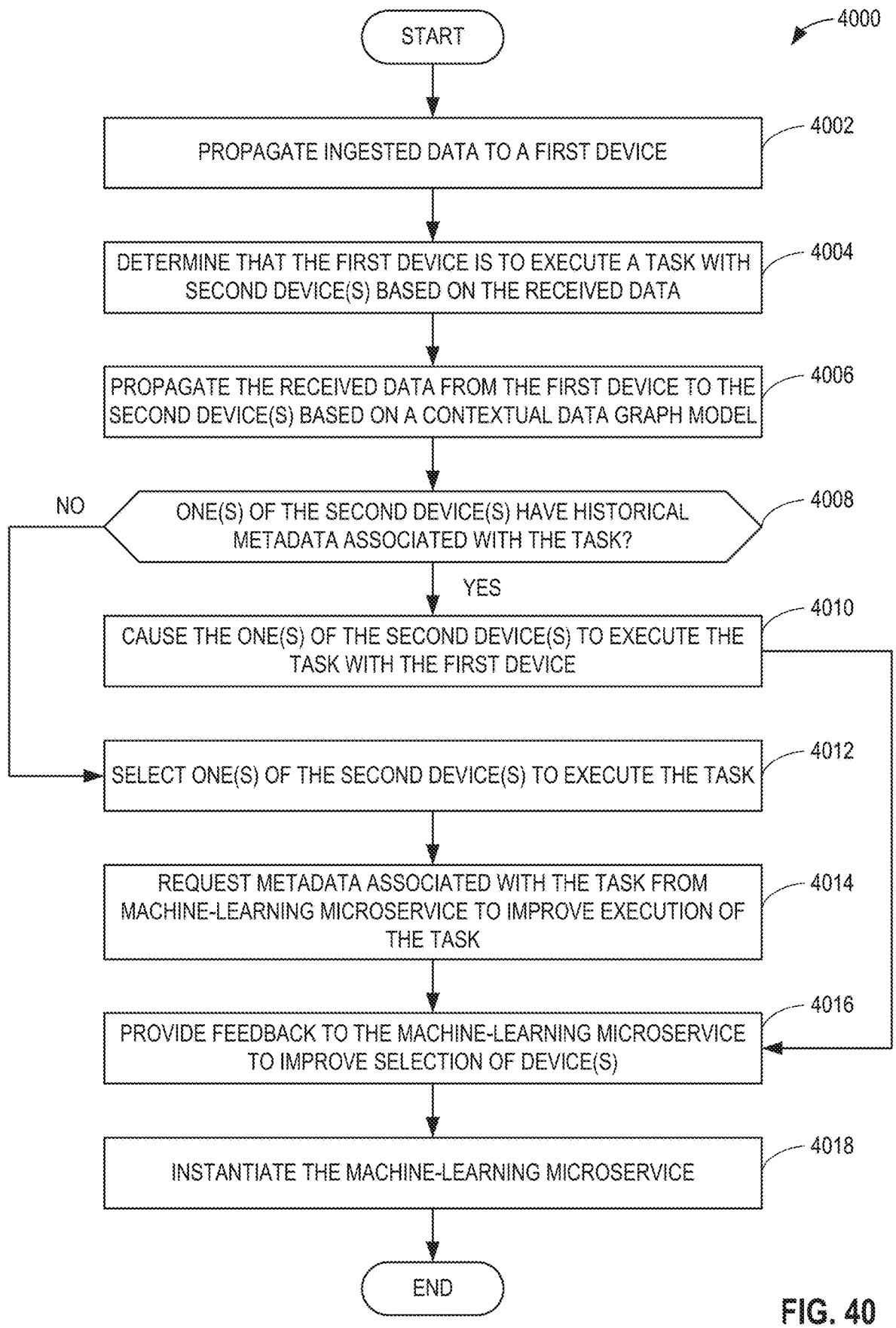
FIG. 40 is a flowchart representative of example machine-readable instructions and/or example operations that may be executed and/or instantiated by processor circuitry to implement the example ADM system of FIG. 1, the example data routing manager of FIG. 3, and/or the example data routing management circuitry of FIG. 4 to cause device(s) to select one(s) of the device(s) to execute task(s).

FIG. 40 is a flowchart representative of example machine-readable instructions and/or example operations 4000 that may be executed and/or instantiated by processor circuitry to implement the ADM system 100 of FIG. 1, the data routing manager 302A-I of FIG. 3, and/or the data routing management circuitry 400 of FIG. 4 to cause device(s) to select one(s) of the device(s) to execute task(s). The example machine-readable instructions and/or example operations 4000 of FIG. 40 begin at block 4002, at which the data routing management circuitry 400 propagates ingested data to a first device. For example, the data publishing circuitry 450 can cause transmission of a first message with first metadata to a first one of the robots 214. In some examples, the first message can be representative of an event generated by the third endpoint device 236. For example, the event can be generated by a human user associated with the third endpoint device 236. In some examples, the event can be representative of a failed inspection of an assembly manufactured by the first one of the robots 214. For example, the first message can include instructions to the first one of the robots 214 to disassemble the assembly and to re-assemble the assembly. In some examples, the first message can be routed to the first industrial machine 216 to move the identified assembly for reassembly from one of the shelves to the first one of the robots 214.

At block 4004, the data routing management circuitry 400 determines that the first device is to execute a task with second device(s) based on the received data. For example, the data query management circuitry 430 can determine, based on the first metadata, that a second one of the robots 214 partially assembled the assembly. In some examples, the data query management circuitry 430 can identify the first one of the robots 214 and/or the second one of the robots 214 to carry out a reassembly operation based on the first metadata.

At block 4006, the data routing management circuitry 400 propagates the received data from the first device to the second device(s) based on a contextual data graph model. For example, the data publishing circuitry 450 can cause transmission of the message to the first one and the second one of the robots 214.

At block 4008, the data routing management circuitry 400 determines whether one(s) of the second device(s) have historical metadata associated with the task. For example, the data publishing circuitry 450 can determine that the first metadata is partially included and/or entirely included in second metadata associated with the first one and the second one of the robots 214.

If, at block 4008, the data routing management circuitry 400 determines that one(s) of the second device(s) have historical metadata associated with the task, control proceeds to block 4010. At block 4010, the data routing management circuitry 400 causes the one(s) of the second device(s) to execute the task with the first device. For example, the data publishing circuitry 450 can cause, based on the transmission of the message, the first and second ones of the robots 214 to disassemble the assembly and put it back together in the correct manner (e.g., so not to fail another inspection) based on technical specifications, an autonomous workflow, etc., associated with the assembly. After causing the one(s) of the second device(s) to execute the task with the first device, control proceeds to block 4016.

If, at block 4008, the data routing management circuitry 400 determines that one(s) of the second device(s) do not have historical metadata associated with the task, control proceeds to block 4012. For example, the node management circuitry 440 can determine that the first and second ones of the robots 214 did not produce the assembly based on the first metadata not being associated with portion(s) of the second metadata of the first and second ones of the robots 214.

At block 4012, the data routing management circuitry 400 selects one(s) of the second device(s) to execute the task. For example, the node management circuitry 440 can invoke the first and second ones of the robots 214 to choose amongst each other who is to fix the assembly. In some examples, the node management circuitry 440 can select one of the first and second ones of the robots 214 to redo the assembly.

At block 4014, the data routing management circuitry 400 requests metadata associated with the task from machine-learning microservice to improve execution of the task. For example, in response to the first one of the robots 214 being selected (either from the robots themselves and/or from the node management circuitry 440), the first one of the robots 214 can request the metadata 464, one(s) of the machine-learning models 470, and/or one(s) of the digital twins 476 in connection with the assembly. For example, the data query management circuitry 430 can obtain a request from the first one of the robots 214 for more information that the first one of the robots 214 can utilize to carry out the task. In some examples, the data query management circuitry 430 can map metadata associated with the request to one(s) of the contextual data graph models 474. For example, based on the mapping, the data query management circuitry 430 can identify the one(s) of the machine-learning models 470, and/or the one(s) of the digital twins 476 in connection with the assembly. In some examples, the data publishing circuitry 450 can output and/or cause transmission of the one(s) of the machine-learning models 470 and/or one(s) of the digital twins 476 in connection with the assembly to the first one of the robots 214 for consumption.

At block 4016, the data routing management circuitry 400 provides feedback to the machine-learning microservice to improve selection of device(s). For example, the data query management circuitry 430 can obtain feedback from the first one of the robots that one of the provided machine-learning models was not relevant to the assembly. In some examples, the data query management circuitry 430 can obtain feedback in the form of an acknowledgment of successful completion of the task and thereby determine that the provided one(s) of the machine-learning models 470 and/or one(s) of the digital twins 476 is/are relevant to the assembly.

At block 4018, the data routing management circuitry 400 instantiates the machine-learning microservice. For example, the machine-learning circuitry 420 can retrain the one(s) of the machine-learning models 470 based on the feedback and instantiate (or reinstantiate) the one(s) of the machine-learning models 470 for deployment to process AI/ML workloads. After instantiating the machine-learning microservice at block 4018, the example machine-readable instructions and/or the example operations 4000 of FIG. 40 conclude.

Figure 41:
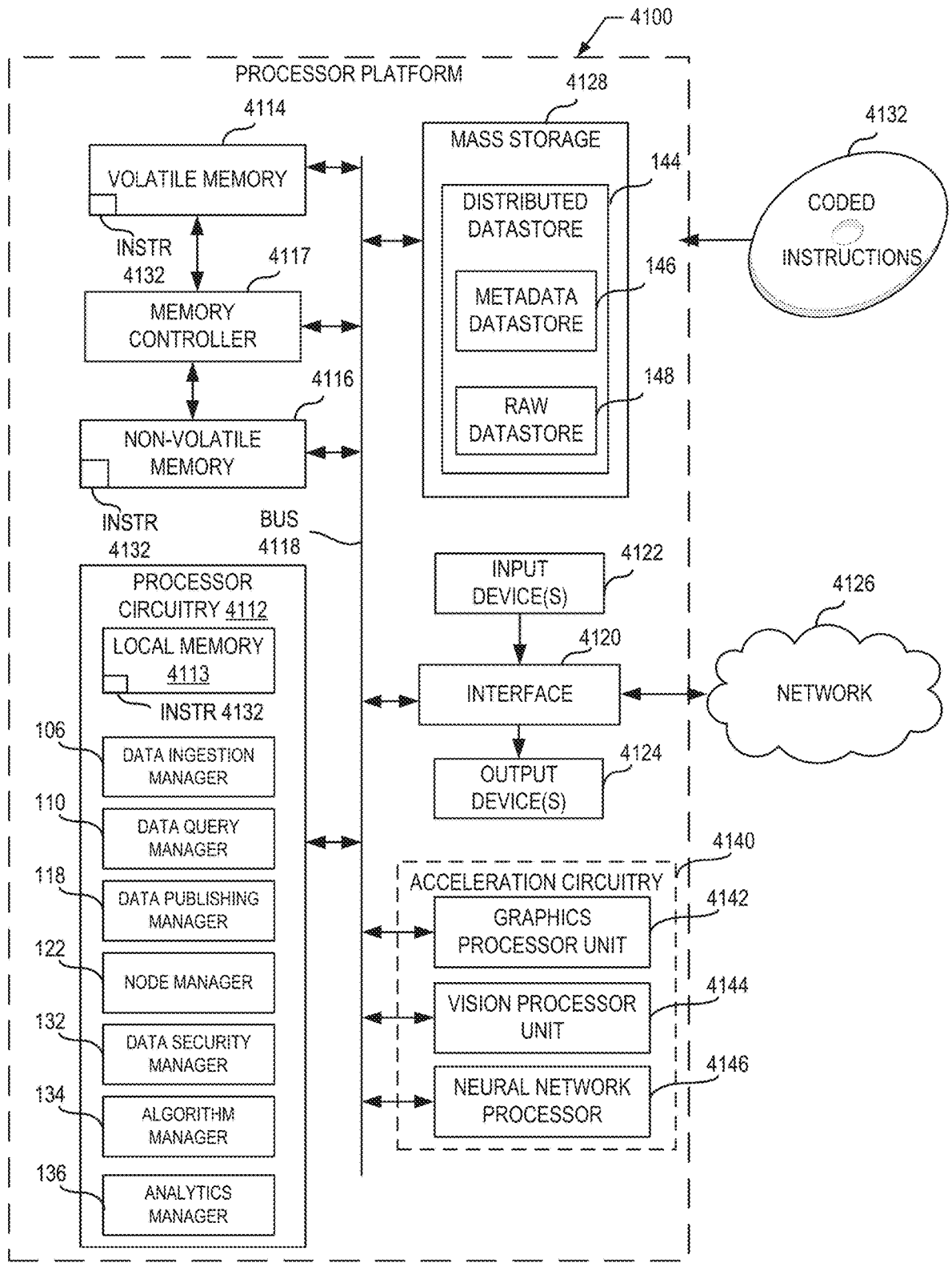
FIG. 41 is a block diagram of an example processing platform including processor circuitry structured to execute the example machine-readable instructions and/or the example operations of one(s) of FIGS. 17-40 to implement the ADM system of FIG. 1.

FIG. 41 is a block diagram of an example processor platform 4100 structured to execute and/or instantiate the example machine readable instructions and/or the example operations of one(s) of FIGS. 17-40 to implement the ADM system 100 of FIG. 1. The processor platform 4100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, an IoT device, an IPU, or any other type of computing and/or electronic device.

The processor platform 4100 of the illustrated example includes processor circuitry 4112. The processor circuitry 4112 of the illustrated example is hardware. For example, the processor circuitry 4112 can be implemented by one or more integrated circuits, logic circuits, FPGAs microprocessors, CPUs, GPUs, DSPs, and/or microcontrollers from any desired family or manufacturer. The processor circuitry 4112 may be implemented by one or more semiconductor based (e.g., silicon based) devices. In this example, the processor circuitry 4112 implements the example data ingestion manager 106, the example data query manager 110, the example data publishing manager 118, the example node manager 122, the example data security manager 132, the example algorithm manager 134, and the example analytics manager 136.

The processor circuitry 4112 of the illustrated example includes a local memory 4113 (e.g., a cache, registers, etc.). The processor circuitry 4112 of the illustrated example is in communication with a main memory including a volatile memory 4114 and a non-volatile memory 4116 by a bus 4118. In some examples, the bus 4118 can implement the data plane 128, the control plane 130, and/or, more generally, the network plane 126, of FIG. 1. The volatile memory 4114 may be implemented by SDRAM, DRAM, RDRAM®, and/or any other type of RAM device. The non-volatile memory 4116 may be implemented by flash memory and/or any other desired type of memory device. Access to the main memory 4114, 4116 of the illustrated example is controlled by a memory controller 4117.

The processor platform 4100 of the illustrated example also includes interface circuitry 4120. The interface circuitry 4120 may be implemented by hardware in accordance with any type of interface standard, such as an Ethernet interface, a USB interface, a Bluetooth® interface, an NFC interface, a PCI interface, and/or a PCIe interface.

In the illustrated example, one or more input devices 4122 are connected to the interface circuitry 4120. The input device(s) 4122 permit(s) a user to enter data and/or commands into the processor circuitry 4112. The input device(s) 4122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 4124 are also connected to the interface circuitry 4120 of the illustrated example. The output device(s) 4124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 4120 of the illustrated example, thus, typically includes a graphics driver card, a graphics driver chip, and/or graphics processor circuitry such as a GPU.

The interface circuitry 4120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 4126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 4100 of the illustrated example also includes one or more mass storage devices 4128 to store software and/or data. Examples of such mass storage devices 4128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 4128 implement the distributed datastore 144, which includes the example metadata datastore 146 and the example raw datastore 148 of FIG. 1.

The machine executable instructions 4132, which may be implemented by the machine-readable instructions of one(s) of FIGS. 17-40, may be stored in the mass storage device 4128, in the volatile memory 4114, in the non-volatile memory 4116, and/or on a removable non-transitory computer readable storage medium such as a CD or DVD.

The processor platform 4100 of the illustrated example of FIG. 41 includes example acceleration circuitry 4140, which includes an example GPU 4142, an example vision processor unit (VPU) 4144, and an example neural network processor 4146. In this example, the GPU 4142, the VPU 4144, the neural network processor 4146, and/or, more generally, the acceleration circuitry 4140, are in communication with different hardware of the processor platform 4100, such as the volatile memory 4114, the non-volatile memory 4116, etc., via the bus 4118. In this example, the neural network processor 4146 may be implemented by one or more integrated circuits, logic circuits, microprocessors, GPUs, DSPs, or controllers from any desired family or manufacturer that can be used to execute an AI/ML model, such as a neural network. In some examples, one or more of the example data ingestion manager 106, the example data query manager 110, the example data publishing manager 118, the example node manager 122, the example data security manager 132, the example algorithm manager 134, and/or the example analytics manager 136 can be implemented in or with at least one of the GPU 4142, the VPU 4144, the neural network processor 4146, and/or, more generally, the acceleration circuitry 4140, instead of or in addition to the processor circuitry 4112.

Figure 42:
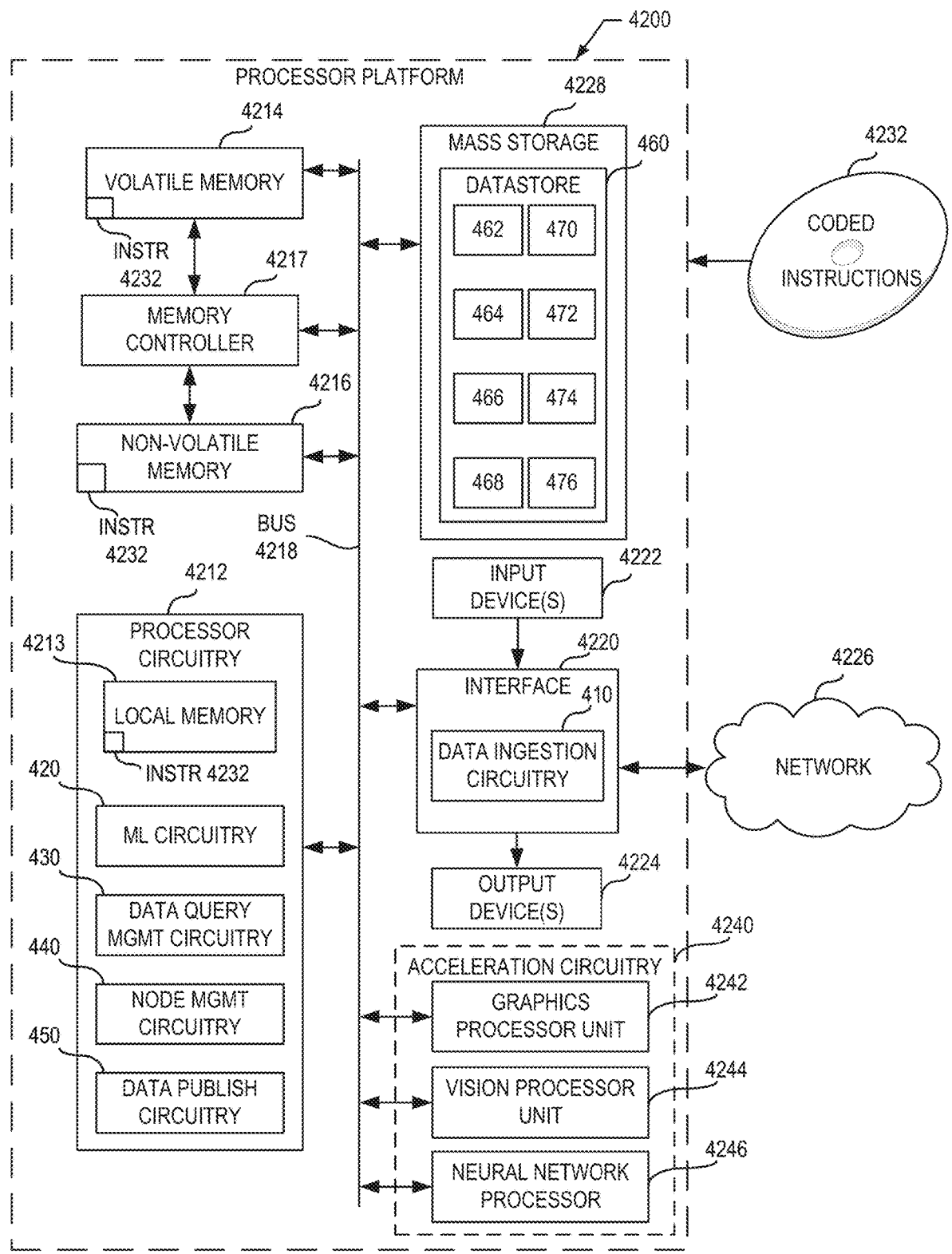
FIG. 42 is a block diagram of an example processing platform including processor circuitry structured to execute the example machine-readable instructions and/or the example operations of one(s) of FIGS. 17-40 to implement the example data routing manager of FIG. 3 and/or the example data routing management circuitry system of FIG. 4.

FIG. 42 is a block diagram of an example processor platform 4200 structured to execute and/or instantiate the example machine readable instructions and/or the example operations of one(s) of FIGS. 17-40 to implement the data routing management circuitry 400 of FIG. 4. The processor platform 4200 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a headset (e.g., an AR headset, a VR headset, etc.) or other wearable device, or any other type of computing device.

The processor platform 4200 of the illustrated example includes processor circuitry 4212. The processor circuitry 4212 of the illustrated example is hardware. For example, the processor circuitry 4212 can be implemented by one or more integrated circuits, logic circuits, FPGAs, microprocessors, CPUs, GPUs, DSPs, and/or microcontrollers from any desired family or manufacturer. The processor circuitry 4212 may be implemented by one or more semiconductor based (e.g., silicon based) devices. In this example, the processor circuitry 4212 implements the example machine-learning circuitry 420 (identified by ML CIRCUITRY), the example data query management circuitry 430 (identified by DATA QUERY MGMT CIRCUITRY), the example node management circuitry 440 (identified by NODE MGMT CIRCUITRY), and the example data publishing circuitry 450 (identified by DATA PUBLISH CIRCUITRY) of FIG. 4.

The processor circuitry 4212 of the illustrated example includes a local memory 4213 (e.g., a cache, registers, etc.). The processor circuitry 4212 of the illustrated example is in communication with a main memory including a volatile memory 4214 and a non-volatile memory 4216 by a bus 4218. In some examples, the bus 4218 can implement the bus 480 of FIG. 4. The volatile memory 4214 may be implemented by SDRAM, DRAM, RDRAM®, and/or any other type of RAM device. The non-volatile memory 4216 may be implemented by flash memory and/or any other desired type of memory device. Access to the main memory 4214, 4216 of the illustrated example is controlled by a memory controller 4217.

The processor platform 4200 of the illustrated example also includes interface circuitry 4220. The interface circuitry 4220 may be implemented by hardware in accordance with any type of interface standard, such as an Ethernet interface, a USB interface, a Bluetooth® interface, an NFC interface, a PCI interface, and/or a PCIe interface. In this example, the interface circuitry 4220 implements the example data ingestion circuitry 410 of FIG. 4.

In the illustrated example, one or more input devices 4222 are connected to the interface circuitry 4220. The input device(s) 4222 permit(s) a user to enter data and/or commands into the processor circuitry 4212. The input device(s) 4222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 4224 are also connected to the interface circuitry 4220 of the illustrated example. The output device(s) 4224 can be implemented, for example, by display devices (e.g., an LED, an OLED, an LCD, a CRT display, an IPS display, a touchscreen, etc.), a tactile output device, a printer, and/or speaker. The interface circuitry 4220 of the illustrated example, thus, typically includes a graphics driver card, a graphics driver chip, and/or graphics processor circuitry such as a GPU.

The interface circuitry 4220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 4226. The communication can be by, for example, an Ethernet connection, a DSL connection, a telephone line connection, a coaxial cable system, a satellite system, a line-of-site wireless system, a cellular telephone system, an optical connection, etc.

The processor platform 4200 of the illustrated example also includes one or more mass storage devices 4228 to store software and/or data. Examples of such mass storage devices 4228 include magnetic storage devices, optical storage devices, floppy disk drives, HDDs, CDs, Blu-ray disk drives, RAID systems, solid state storage devices such as flash memory devices and/or SSDs, and DVD drives. In this example, the one or more mass storage devices 4228 implement the example datastore 460, the example raw data 462 (identified by reference numeral 462), the example metadata 464 (identified by reference numeral 464), the example users 466 (identified by reference numeral 466), the example nodes 468 (identified by reference numeral 468), the example machine-learning models 470 (identified by reference numeral 470), the example environment topology 472 (identified by reference numeral 472), the example contextual data graph models 474 (identified by reference numeral 474), and the example digital twins 476 (identified by reference numeral 476) of FIG. 4.

The machine executable instructions 4232, which can be implemented by the example machine readable instructions of one(s) of FIGS. 17-40, may be stored in the mass storage device 4228, in the volatile memory 4214, in the non-volatile memory 4216, and/or on a removable non-transitory computer readable storage medium such as a CD or DVD.

The processor platform 4200 of the illustrated example of FIG. 42 includes example acceleration circuitry 4240, which includes an example GPU 4242, an example VPU 4244, and an example neural network processor 4246. In this example, the GPU 4242, the VPU 4244, the neural network processor 4246, and/or, more generally, the acceleration circuitry 4240, are in communication with different hardware of the processor platform 4200, such as the volatile memory 4214, the non-volatile memory 4216, etc., via the bus 4218. In this example, the neural network processor 4246 may be implemented by one or more integrated circuits, logic circuits, microprocessors, GPUs, DSPs, or controllers from any desired family or manufacturer that can be used to execute an AI/ML model, such as a neural network, which may be implemented by the machine-learning model 470. In some examples, one or more of the example data ingestion circuitry 410, the example machine-learning circuitry 420, the example data query management circuitry 430, the example node management circuitry 440, and/or the example data publishing circuitry 450 can be implemented in or with at least one of the GPU 4242, the VPU 4244, the neural network processor 4246, and/or, more generally, the acceleration circuitry 4240, instead of or in addition to the processor circuitry 4212 and/or the interface circuitry 4220.

Figure 43:
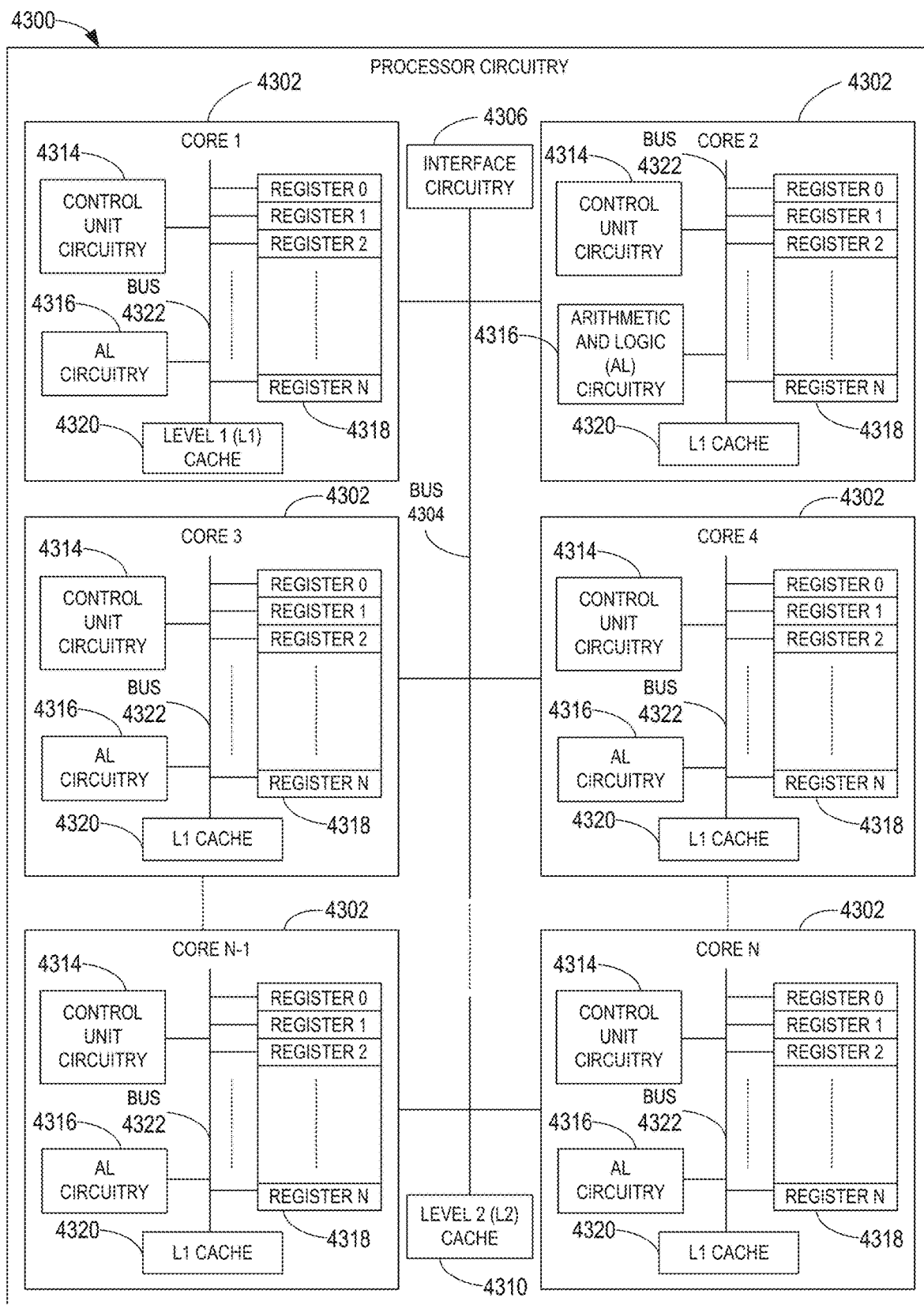
FIG. 43 is a block diagram of an example implementation of the processor circuitry of FIGS. 41 and/or 42.

FIG. 43 is a block diagram of an example implementation of the processor circuitry 4112 of FIG. 41 and/or the processor circuitry 4212 of FIG. 42. In this example, the processor circuitry 4112 of FIG. 41 and/or the processor circuitry 4212 of FIG. 42 is implemented by a microprocessor 4300. For example, the microprocessor 4300 may be a general purpose microprocessor (e.g., general purpose microprocessor circuitry). The microprocessor 4300 executes some or all of the machine-readable instructions of the flowcharts of FIGS. 17-40 to effectively instantiate the example data routing management circuitry 400 of FIG. 4 as logic circuits to perform the operations corresponding to those machine-readable instructions. In some such examples, the example data routing management circuitry 400 of FIG. 4 is instantiated by the hardware circuits of the microprocessor 4300 in combination with the instructions. For example, the microprocessor 4300 may be implemented by multi-core hardware circuitry such as a CPU, a DSP, a GPU, an XPU, etc. Although it may include any number of example cores 4302 (e.g., 1 core), the microprocessor 4300 of this example is a multi-core semiconductor device including N cores. The cores 4302 of the microprocessor 4300 may operate independently or may cooperate to execute machine-readable instructions. For example, machine code corresponding to a firmware program, an embedded software program, or a software program may be executed by one of the cores 4302 or may be executed by multiple ones of the cores 4302 at the same or different times. In some examples, the machine code corresponding to the firmware program, the embedded software program, or the software program is split into threads and executed in parallel by two or more of the cores 4302. The software program may correspond to a portion or all of the machine-readable instructions and/or operations represented by the flowcharts of FIGS. 17-40.

The cores 4302 may communicate by a first example bus 4304. In some examples, the first bus 4304 may be implemented by a communication bus to effectuate communication associated with one(s) of the cores 4302. For example, the first bus 4304 may be implemented by at least one of an Inter-Integrated Circuit (I2C) bus, a Serial Peripheral Interface (SPI) bus, a PCI bus, or a PCIe bus. Additionally or alternatively, the first bus 4304 may be implemented by any other type of computing or electrical bus. The cores 4302 may obtain data, instructions, and/or signals from one or more external devices by example interface circuitry 4306. The cores 4302 may output data, instructions, and/or signals to the one or more external devices by the interface circuitry 4306. Although the cores 4302 of this example include example local memory 4320 (e.g., Level 1 (L1) cache that may be split into an L1 data cache and an L1 instruction cache), the microprocessor 4300 also includes example shared memory 4310 that may be shared by the cores (e.g., Level 2 (L2 cache)) for high-speed access to data and/or instructions. Data and/or instructions may be transferred (e.g., shared) by writing to and/or reading from the shared memory 4310. The local memory 4320 of each of the cores 4302 and the shared memory 4310 may be part of a hierarchy of storage devices including multiple levels of cache memory and the main memory (e.g., the main memory 4114, 4116 of FIG. 41, the main memory 4214, 4216 of FIG. 42, etc.). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 4302 may be referred to as a CPU, DSP, GPU, etc., or any other type of hardware circuitry. Each core 4302 includes control unit circuitry 4314, arithmetic and logic (AL) circuitry (sometimes referred to as an ALU) 4316, a plurality of registers 4318, the local memory 4320, and a second example bus 4322. Other structures may be present. For example, each core 4302 may include vector unit circuitry, single instruction multiple data (SIMD) unit circuitry, load/store unit (LSU) circuitry, branch/jump unit circuitry, floating-point unit (FPU) circuitry, etc. The control unit circuitry 4314 includes semiconductor-based circuits structured to control (e.g., coordinate) data movement within the corresponding core 4302. The AL circuitry 4316 includes semiconductor-based circuits structured to perform one or more mathematic and/or logic operations on the data within the corresponding core 4302. The AL circuitry 4316 of some examples performs integer based operations. In other examples, the AL circuitry 4316 also performs floating point operations. In yet other examples, the AL circuitry 4316 may include first AL circuitry that performs integer based operations and second AL circuitry that performs floating point operations. In some examples, the AL circuitry 4316 may be referred to as an Arithmetic Logic Unit (ALU). The registers 4318 are semiconductor-based structures to store data and/or instructions such as results of one or more of the operations performed by the AL circuitry 4316 of the corresponding core 4302. For example, the registers 4318 may include vector register(s), SIMD register(s), general purpose register(s), flag register(s), segment register(s), machine specific register(s), instruction pointer register(s), control register(s), debug register(s), memory management register(s), machine check register(s), etc. The registers 4318 may be arranged in a bank as shown in FIG. 43. Alternatively, the registers 4318 may be organized in any other arrangement, format, or structure including distributed throughout the core 4302 to shorten access time. The second bus 4322 may be implemented by at least one of an I2C bus, a SPI bus, a PCI bus, or a PCIe bus Each core 4302 and/or, more generally, the microprocessor 4300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 4300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 44:
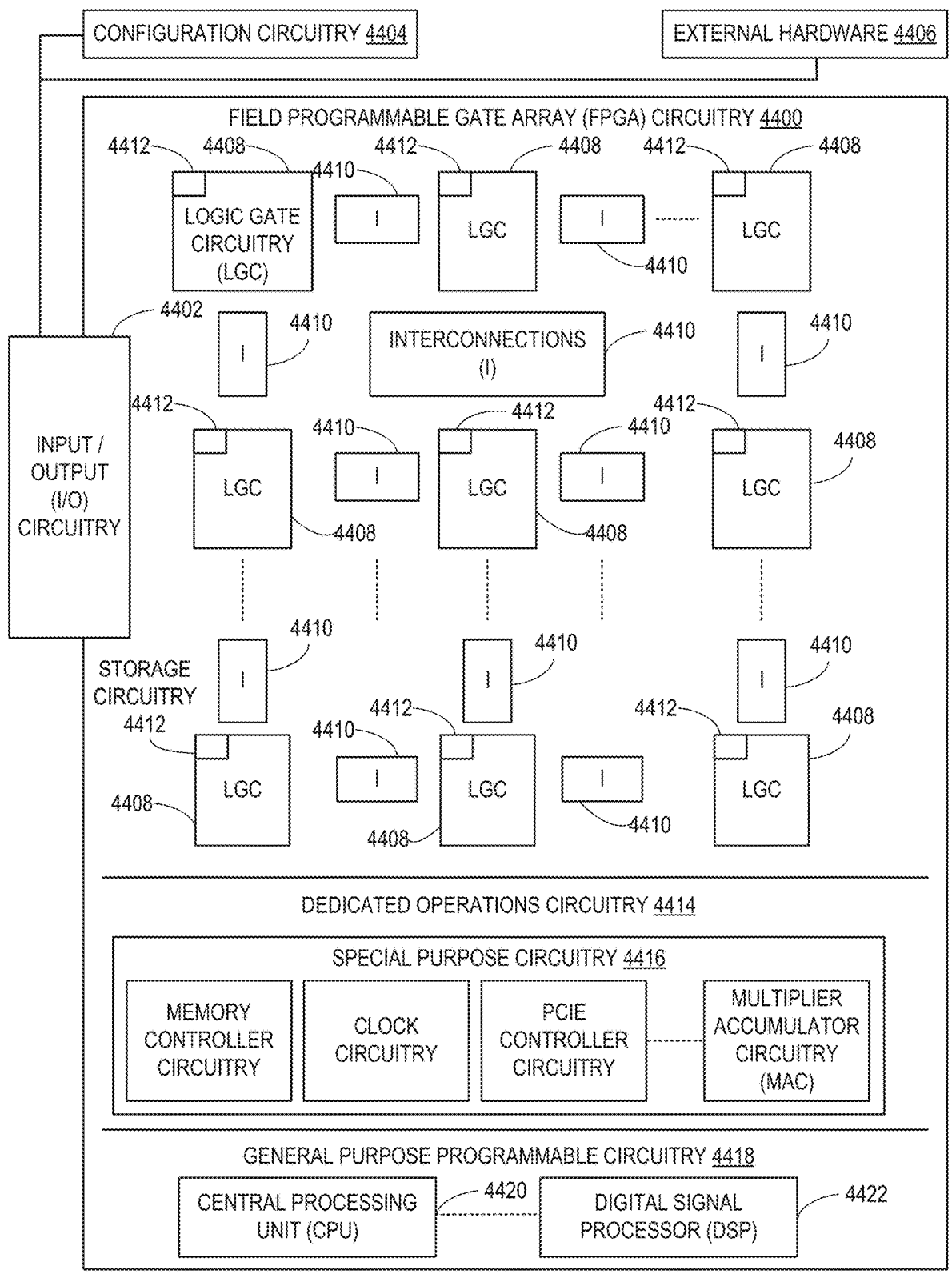
FIG. 44 is a block diagram of another example implementation of the processor circuitry of FIG. 4.

FIG. 44 is a block diagram of another example implementation of the processor circuitry 4112 of FIG. 41 and/or the processor circuitry 4212 of FIG. 42. In this example, the processor circuitry 4112 of FIG. 41 and/or the processor circuitry 4212 of FIG. 42 is implemented by FPGA circuitry 4400. For example, the FPGA circuitry 4400 may be implemented by an FPGA. The FPGA circuitry 4400 can be used, for example, to perform operations that could otherwise be performed by the example microprocessor 4300 of FIG. 43 executing corresponding machine-readable instructions. However, once configured, the FPGA circuitry 4400 instantiates the machine-readable instructions in hardware and, thus, can often execute the operations faster than they could be performed by a general purpose microprocessor executing the corresponding software.

More specifically, in contrast to the microprocessor 4300 of FIG. 43 described above (which is a general purpose device that may be programmed to execute some or all of the machine-readable instructions represented by the flowcharts of FIGS. 17-40 but whose interconnections and logic circuitry are fixed once fabricated), the FPGA circuitry 4400 of the example of FIG. 44 includes interconnections and logic circuitry that may be configured and/or interconnected in different ways after fabrication to instantiate, for example, some or all of the machine-readable instructions represented by the flowcharts of FIGS. 17-40. In particular, the FPGA circuitry 4400 may be thought of as an array of logic gates, interconnections, and switches. The switches can be programmed to change how the logic gates are interconnected by the interconnections, effectively forming one or more dedicated logic circuits (unless and until the FPGA circuitry 4400 is reprogrammed). The configured logic circuits enable the logic gates to cooperate in different ways to perform different operations on data received by input circuitry. Those operations may correspond to some or all of the software represented by the flowcharts of FIGS. 17-40. As such, the FPGA circuitry 4400 may be structured to effectively instantiate some or all of the machine-readable instructions of the flowcharts of FIGS. 17-40 as dedicated logic circuits to perform the operations corresponding to those software instructions in a dedicated manner analogous to an ASIC. Therefore, the FPGA circuitry 4400 may perform the operations corresponding to the some or all of the machine-readable instructions of FIGS. 17-40 faster than the general purpose microprocessor can execute the same.

In the example of FIG. 44, the FPGA circuitry 4400 is structured to be programmed (and/or reprogrammed one or more times) by an end user by a hardware description language (HDL) such as Verilog. The FPGA circuitry 4400 of FIG. 44, includes example input/output (I/O) circuitry 4402 to obtain and/or output data to/from example configuration circuitry 4404 and/or external hardware 4406. For example, the configuration circuitry 4404 may be implemented by interface circuitry that may obtain machine-readable instructions to configure the FPGA circuitry 4400, or portion(s) thereof. In some such examples, the configuration circuitry 4404 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 4406 may be implemented by external hardware circuitry. For example, the external hardware 4406 may be implemented by the microprocessor 4300 of FIG. 43. The FPGA circuitry 4400 also includes an array of example logic gate circuitry 4408, a plurality of example configurable interconnections 4410, and example storage circuitry 4412. The logic gate circuitry 4408 and the configurable interconnections 4410 are configurable to instantiate one or more operations that may correspond to at least some of the machine-readable instructions of FIGS. 17-40 and/or other desired operations. The logic gate circuitry 4408 shown in FIG. 44 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 4408 to enable configuration of the electrical structures and/or the logic gates to form circuits to perform desired operations. The logic gate circuitry 4408 may include other electrical structures such as look-up tables (LUTs), registers (e.g., flip-flops or latches), multiplexers, etc.

The configurable interconnections 4410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 4408 to program desired logic circuits.

The storage circuitry 4412 of the illustrated example is structured to store result(s) of the one or more of the operations performed by corresponding logic gates. The storage circuitry 4412 may be implemented by registers or the like. In the illustrated example, the storage circuitry 4412 is distributed amongst the logic gate circuitry 4408 to facilitate access and increase execution speed.

The example FPGA circuitry 4400 of FIG. 44 also includes example Dedicated Operations Circuitry 4414. In this example, the Dedicated Operations Circuitry 4414 includes special purpose circuitry 4416 that may be invoked to implement commonly used functions to avoid the need to program those functions in the field. Examples of such special purpose circuitry 4416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 4400 may also include example general purpose programmable circuitry 4418 such as an example CPU 4420 and/or an example DSP 4422. Other general purpose programmable circuitry 4418 may additionally or alternatively be present such as a GPU, an XPU, etc., that can be programmed to perform other operations.

Although FIGS. 43 and 44 illustrate two example implementations of the processor circuitry 4112 of FIG. 41 and/or the processor circuitry 4212 of FIG. 42, many other approaches are contemplated. For example, as mentioned above, modern FPGA circuitry may include an on-board CPU, such as one or more of the example CPU 4420 of FIG. 44. Therefore, the processor circuitry 4112 of FIG. 41 and/or the processor circuitry 4212 of FIG. 42 may additionally be implemented by combining the example microprocessor 4300 of FIG. 43 and the example FPGA circuitry 4400 of FIG. 44. In some such hybrid examples, a first portion of the machine-readable instructions represented by the flowcharts of FIGS. 17-40 may be executed by one or more of the cores 4302 of FIG. 43, a second portion of the machine-readable instructions represented by the flowcharts of FIGS. 17-40 may be executed by the FPGA circuitry 4400 of FIG. 44, and/or a third portion of the machine-readable instructions represented by the flowcharts of FIGS. 17-40 may be executed by an ASIC. It should be understood that some or all of the example data routing management circuitry 400 of FIG. 4 may, thus, be instantiated at the same or different times. Some or all of the circuitry may be instantiated, for example, in one or more threads executing concurrently and/or in series. Moreover, in some examples, some or all of the example data routing management circuitry 400 of FIG. 4 may be implemented within one or more virtual machines and/or containers executing on the microprocessor.

In some examples, the processor circuitry 4112 of FIG. 41 and/or the processor circuitry 4212 of FIG. 42 may be in one or more packages. For example, the microprocessor 4300 of FIG. 43 and/or the FPGA circuitry 4400 of FIG. 44 may be in one or more packages. In some examples, an XPU may be implemented by the processor circuitry 4112 of FIG. 41 and/or the processor circuitry 4212 of FIG. 42, which may be in one or more packages. For example, the XPU may include a CPU in one package, a DSP in another package, a GPU in yet another package, and an FPGA in still yet another package.

Figure 45:
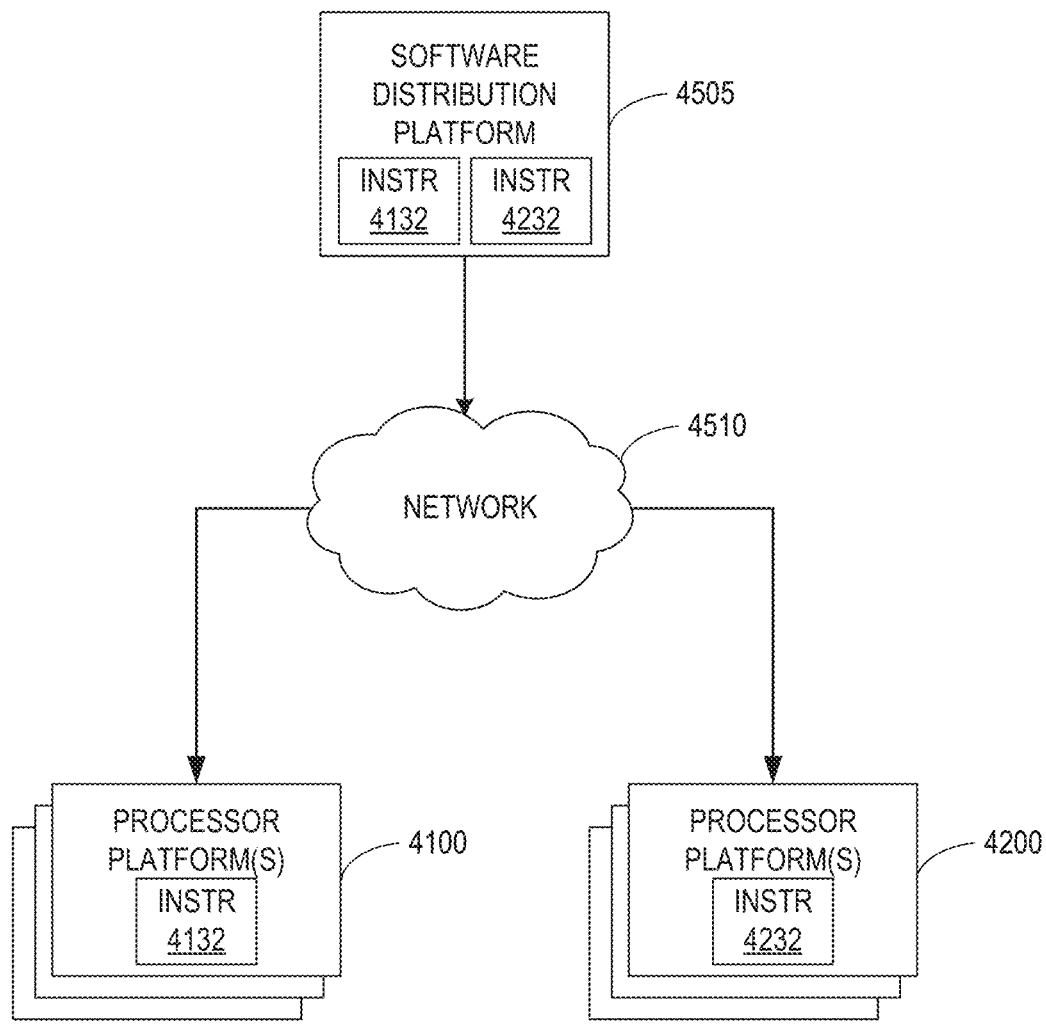
FIG. 45 is a block diagram of an example software distribution platform (e.g., one or more servers) to distribute software (e.g., software corresponding to the example machine-readable instructions of FIGS. 17-40) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 4505 to distribute software such as the example machine-readable instructions 4132 of FIG. 41 and/or the example machine-readable instructions 4232 of FIG. 42 to hardware devices owned and/or operated by third parties is illustrated in FIG. 45. The example software distribution platform 4505 may be implemented by any computer server, data facility, cloud service, etc., capable of storing and transmitting software to other computing devices. The third parties may be customers of the entity owning and/or operating the software distribution platform 4505. For example, the entity that owns and/or operates the software distribution platform 4505 may be a developer, a seller, and/or a licensor of software such as the example machine-readable instructions 4132 of FIG. 41 and/or the example machine-readable instructions 4232 of FIG. 42. The third parties may be consumers, users, retailers, OEMs, etc., who purchase and/or license the software for use and/or re-sale and/or sub-licensing. In the illustrated example, the software distribution platform 4505 includes one or more servers and one or more storage devices. The storage devices store the example machine-readable instructions 4132 of FIG. 41 and/or the example machine-readable instructions 4232 of FIG. 42, which may correspond to the example machine-readable instructions 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000 of FIGS. 17-40, as described above. The one or more servers of the example software distribution platform 4505 are in communication with an example network 4510, which may correspond to any one or more of the Internet and/or any of the example networks 126, 128, 130, 206, 208, 210, 322, 1210, 4126, 4226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the example machine-readable instructions 4132 of FIG. 41 and/or the example machine-readable instructions 4232 of FIG. 42 from the software distribution platform 4505. For example, the software, which may correspond to the example machine-readable instructions 4132 of FIG. 41, may be downloaded to the example processor platform 4100, which is to execute the example machine-readable instructions 4132 to implement the example ADM system 100 of FIG. 1. In some examples, the software, which may correspond to the example machine-readable instructions 4232 of FIG. 42, may be downloaded to the example processor platform 4200, which is to execute the example machine-readable instructions 4232 to implement the example data routing management circuitry 400 of FIG. 4. In some examples, one or more servers of the software distribution platform 4505 periodically offer, transmit, and/or force updates to the software (e.g., the example machine-readable instructions 4132 of FIG. 41 and/or the example machine-readable instructions 4232 of FIG. 42) to ensure improvements, patches, updates, etc., are distributed and applied to the software at the end user devices.

From the foregoing, it will be appreciated that example systems, methods, apparatus, and articles of manufacture have been disclosed for proactive data routing. Disclosed systems, methods, apparatus, and articles of manufacture improve the efficiency of using a computing device by routing data, messages, alerts, and the like to pertinent users rather than broadcasting to an entire network, which can reduce the computational, memory, and network resources needed to convey data to the pertinent users. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for proactive data routing are disclosed herein. Further examples and combinations thereof include the following:

Example 1 includes an apparatus for data routing, the apparatus comprising at least one memory, machine-readable instructions, and processor circuitry to execute the machine-readable instructions to at least execute a machine-learning model to output a first data routing path in a network environment based on metadata associated with an event in the network environment, a first message based on the event to be transmitted to a first node based on the first data routing path, the first data routing path to have a first strength of association with at least one of the metadata or the event, after a detection of a change of the first data routing path to a second data routing path, retrain the machine-learning model to output a third data routing path based on the second data routing path, the third data routing path to have a second strength of association with the at least one of the metadata or the event, the second strength of association to be greater than the first strength of association, and cause transmission of a second message to the first node based on the third data routing path after an identification of the event.

Example 2 includes the apparatus of example 1, wherein the processor circuitry is to be instantiated after receiving the machine-readable instructions.

Example 3 includes the apparatus of example 1, wherein the metadata is first metadata, the identification is a first identification, and the processor circuitry is to cause transmission of a third message after a second identification of a second event, the second event associated with second metadata, the second metadata to include a portion of the first metadata.

Example 4 includes the apparatus of example 1, wherein the processor circuitry is to generate the third data routing path to be representative of the transmission of the second message to the first node via one or more second nodes.

Example 5 includes the apparatus of example 1, wherein the first data routing path is representative of transmission of the first message to the first node via one or more second nodes, and the processor circuitry is to detect the change to be representative of the transmission of the first message to the first node via one or more third nodes.

Example 6 includes the apparatus of example 1, wherein the processor circuitry is to, after a determination that a user associated with the first node is unable to view video data, generate the second message to include audio data to be output to the user.

Example 7 includes the apparatus of example 1, wherein the processor circuitry is to, after a determination that the first node has a bandwidth less than a threshold, generate the second message to include at least one of audio data or text data.

Example 8 includes the apparatus of example 7, wherein the processor circuitry is to cause transmission of the at least one of audio data or text data via a first network interface, and cause transmission of video data via a second network interface, the second network interface different from the first network interface.

Example 9 includes the apparatus of example 1, wherein the processor circuitry is to, after a determination that the first node has a bandwidth that satisfies a threshold, generate the second message to include at least one of audio data, text data, or video data.

Example 10 includes the apparatus of example 1, wherein the processor circuitry is to multicast the second message to the first node and one or more second nodes, the one or more second nodes associated with the metadata.

Example 11 includes the apparatus of example 1, wherein the metadata is first metadata, the processor circuitry is to generate the second message to include first data, second data, and second metadata, the first data associated with a time duration, and the second metadata to cause the first node to access the second data after the time duration has elapsed.

Example 12 includes the apparatus of example 1, wherein the processor circuitry is to generate the second message to include first data and second data, the first data associated with a time duration, and after transmission of the first data to the first node, cause the transmission of the second data to the first node after the time duration has elapsed.

Example 13 includes the apparatus of example 1, wherein the processor circuitry is to, after a determination that the first node is associated with a first network interface and a second network interface, cause transmission of a first portion of the second message to the first network interface and a second portion of the second message to the second network interface.

Example 14 includes the apparatus of example 13, wherein the first network interface is a Wi-Fi network interface and the second network interface is a cellular network interface.

Example 15 includes the apparatus of example 1, wherein the processor circuitry is to execute a machine-learning microservice to cause execution of the machine-learning model.

Example 16 includes the apparatus of example 1, wherein the machine-learning model is a digital twin associated with the network environment.

Example 17 includes the apparatus of example 16, wherein the processor circuitry is to predict the first data routing path based on simulation of the transmission of the first message in the network environment, the simulation based on the digital twin.

Example 18 includes the apparatus of example 1, wherein the metadata is first metadata, the first node is a first device, the network environment includes a second device and a third device, the processor circuitry is to generate the second message to include second metadata, the first device is not associated with an operation indicated by the second metadata, and the first device to cause at least one of the second device or the third device to perform the operation based on the second metadata.

Example 19 includes the apparatus of example 18, wherein the processor circuitry is to cause transmission of data associated with the operation to the at least one of the second device or the third device to effectuate performance of the operation by the at least one of the second device or the third device.

Example 20 includes an apparatus for data routing, the apparatus comprising means for executing a machine-learning model, the means for executing to output a first data routing path in a network environment based on metadata associated with an event in the network environment, a first message based on the event to be transmitted to a first node based on the first data routing path, the first data routing path to have a first strength of association with at least one of the metadata or the event, and after a detection of a change of the first data routing path to a second data routing path, retrain the machine-learning model to output a third data routing path based on the second data routing path, the third data routing path to have a second strength of association with the at least one of the metadata or the event, the second strength of association to be greater than the first strength of association, and means for causing transmission of a second message to the first node based on the third data routing path after an identification of the event.

Example 21 includes the apparatus of example 20, wherein the metadata is first metadata, the identification is a first identification, and the means for causing is to cause transmission of a third message after a second identification of a second event, the second event associated with second metadata, the second metadata to include a portion of the first metadata.

Example 22 includes the apparatus of example 20, wherein the means for executing is to generate the third data routing path to be representative of the transmission of the second message to the first node via one or more second nodes.

Example 23 includes the apparatus of example 20, wherein the first data routing path is representative of transmission of the first message to the first node via one or more second nodes, and further including means for detecting the change to be representative of the transmission of the first message to the first node via one or more third nodes.

Example 24 includes the apparatus of example 20, wherein the means for causing is to, after a determination that a user associated with the first node is unable to view video data, generate the second message to include audio data to be output to the user.

Example 25 includes the apparatus of example 20, wherein the means for causing is to, after a determination that the first node has a bandwidth less than a threshold, generate the second message to include at least one of audio data or text data.

Example 26 includes the apparatus of example 25, wherein the means for causing is to cause transmission of the at least one of audio data or text data via a first network interface, and cause transmission of video data via a second network interface, the second network interface different from the first network interface.

Example 27 includes the apparatus of example 20, wherein the means for causing is to, after a determination that the first node has a bandwidth that satisfies a threshold, generate the second message to include at least one of audio data, text data, or video data.

Example 28 includes the apparatus of example 20, wherein the means for causing is to multicast the second message to the first node and one or more second nodes, the one or more second nodes associated with the metadata.

Example 29 includes the apparatus of example 20, wherein the metadata is first metadata, the means for causing is to generate the second message to include first data, second data, and second metadata, the first data associated with a time duration, and the second metadata to cause the first node to access the second data after the time duration has elapsed.

Example 30 includes the apparatus of example 20, wherein the means for causing is to generate the second message to include first data and second data, the first data associated with a time duration, and after transmission of the first data to the first node, cause the transmission of the second data to the first node after the time duration has elapsed.

Example 31 includes the apparatus of example 20, wherein the means for causing is to, after a determination that the first node is associated with a first network interface and a second network interface, cause transmission of a first portion of the second message to the first network interface and a second portion of the second message to the second network interface.

Example 32 includes the apparatus of example 31, wherein the first network interface is a Wi-Fi network interface and the second network interface is a cellular network interface.

Example 33 includes the apparatus of example 20, wherein the means for executing is to execute a machine-learning microservice to cause execution of the machine-learning model.

Example 34 includes the apparatus of example 20, wherein the machine-learning model is a digital twin associated with the network environment.

Example 35 includes the apparatus of example 34, wherein the means for executing is to predict the first data routing path based on simulation of the transmission of the first message in the network environment, the simulation based on the digital twin.

Example 36 includes the apparatus of example 19, wherein the metadata is first metadata, the first node is a first device, the network environment includes a second device and a third device, the means for causing is to generate the second message to include second metadata, the first device is not associated with an operation indicated by the second metadata, and the first device to cause at least one of the second device or the third device to perform the operation based on the second metadata.

Example 37 includes the apparatus of example 36, wherein the means for causing is to cause transmission of data associated with the operation to the at least one of the second device or the third device to effectuate performance of the operation by the at least one of the second device or the third device.

Example 38 includes at least one non-transitory computer readable storage medium comprising instructions that, when executed, cause programmable circuitry to at least execute a machine-learning model to output a first data routing path in a network environment based on metadata associated with an event in the network environment, a first message based on the event to be transmitted to a first node based on the first data routing path, the first data routing path to have a first strength of association with at least one of the metadata or the event, after a detection of a change of the first data routing path to a second data routing path, retrain the machine-learning model to output a third data routing path based on the second data routing path, the third data routing path to have a second strength of association with the at least one of the metadata or the event, the second strength of association to be greater than the first strength of association, and cause transmission of a second message to the first node based on the third data routing path after an identification of the event.

Example 39 includes the at least one non-transitory computer readable storage medium of example 38, wherein the metadata is first metadata, the identification is a first identification, and the instructions are to cause the programmable circuitry to cause transmission of a third message after a second identification of a second event, the second event associated with second metadata, the second metadata to include a portion of the first metadata.

Example 40 includes the at least one non-transitory computer readable storage medium of example 38, wherein the instructions are to cause the programmable circuitry to generate the third data routing path to be representative of the transmission of the second message to the first node via one or more second nodes.

Example 41 includes the at least one non-transitory computer readable storage medium of example 38, wherein the first data routing path is representative of transmission of the first message to the first node via one or more second nodes, and the instructions are to cause the programmable circuitry to detect the change to be representative of the transmission of the first message to the first node via one or more third nodes.

Example 42 includes the at least one non-transitory computer readable storage medium of example 38, wherein the instructions are to cause the programmable circuitry to, after a determination that a user associated with the first node is unable to view video data, generate the second message to include audio data to be output to the user.

Example 43 includes the at least one non-transitory computer readable storage medium of example 38, wherein the instructions are to cause the programmable circuitry to, after a determination that the first node has a bandwidth less than a threshold, generate the second message to include at least one of audio data or text data.

Example 44 includes the at least one non-transitory computer readable storage medium of example 43, wherein the instructions are to cause the programmable circuitry to cause transmission of the at least one of audio data or text data via a first network interface, and cause transmission of video data via a second network interface, the second network interface different from the first network interface.

Example 45 includes the at least one non-transitory computer readable storage medium of example 38, wherein the instructions are to cause the programmable circuitry to, after a determination that the first node has a bandwidth that satisfies a threshold, generate the second message to include at least one of audio data, text data, or video data.

Example 46 includes the at least one non-transitory computer readable storage medium of example 38, wherein the instructions are to cause the programmable circuitry to multicast the second message to the first node and one or more second nodes, the one or more second nodes associated with the metadata.

Example 47 includes the at least one non-transitory computer readable storage medium of example 38, wherein the metadata is first metadata, the instructions are to cause the programmable circuitry to generate the second message to include first data, second data, and second metadata, the first data associated with a time duration, and the second metadata to cause the first node to access the second data after the time duration has elapsed.

Example 48 includes the at least one non-transitory computer readable storage medium of example 38, wherein the instructions are to cause the programmable circuitry to generate the second message to include first data and second data, the first data associated with a time duration, and after transmission of the first data to the first node, cause the transmission of the second data to the first node after the time duration has elapsed.

Example 49 includes the at least one non-transitory computer readable storage medium of example 38, wherein the instructions are to cause the programmable circuitry to, after a determination that the first node is associated with a first network interface and a second network interface, cause transmission of a first portion of the second message to the first network interface and a second portion of the second message to the second network interface.

Example 50 includes the at least one non-transitory computer readable storage medium of example 49, wherein the first network interface is a Wi-Fi network interface and the second network interface is a cellular network interface.

Example 51 includes the at least one non-transitory computer readable storage medium of example 38, wherein the instructions are to cause the programmable circuitry to execute a machine-learning microservice to cause execution of the machine-learning model.

Example 52 includes the at least one non-transitory computer readable storage medium of example 38, wherein the machine-learning model is a digital twin associated with the network environment.

Example 53 includes the at least one non-transitory computer readable storage medium of example 52, wherein the instructions are to cause the programmable circuitry to predict the first data routing path based on emulation of the transmission of the first message in the network environment, the emulation based on the digital twin.

Example 54 includes the at least one non-transitory computer readable storage medium of example 38, wherein the metadata is first metadata, the first node is a first device, the network environment includes a second device and a third device, the instructions are to cause the programmable circuitry to generate the second message to include second metadata, the first device is not associated with an operation indicated by the second metadata, and the first device to cause at least one of the second device or the third device to perform the operation based on the second metadata.

Example 55 includes the at least one non-transitory computer readable storage medium of example 54, wherein the instructions are to cause the programmable circuitry to cause transmission of data associated with the operation to the at least one of the second device or the third device to effectuate performance of the operation by the at least one of the second device or the third device.

Example 56 includes a method for data routing, the method comprising executing a machine-learning model to output a first data routing path in a network environment based on metadata associated with event data in the network environment, a first message based on the event data to be transmitted to a first node based on the first data routing path, the first data routing path to have a first strength of association with at least one of the metadata or the event data, after detecting a change of the first data routing path to a second data routing path, retraining the machine-learning model to output a third data routing path based on the second data routing path, the third data routing path to have a second strength of association with the at least one of the metadata or the event data, the second strength of association to be greater than the first strength of association, and transmitting a second message to the first node based on the third data routing path after an identification of the event data.

Example 57 includes the method of example 56, wherein the metadata is first metadata, the identification is a first identification, and further including transmitting a third message after a second identification of second event data, the second event data associated with second metadata, the second metadata to include a portion of the first metadata.

Example 58 includes method of example 57, wherein the third message includes at least one of data or the second metadata directly associated with the data.

Example 59 includes the method of example 56, further including generating the third data routing path to be representative of the transmitting of the second message to the first node via one or more second nodes.

Example 60 includes the method of example 56, wherein the first data routing path is representative of transmission of the first message to the first node via one or more second nodes, and further including detecting the change to be representative of the transmission of the first message to the first node via one or more third nodes.

Example 61 includes the method of example 56, further including, after a determination that a user associated with the first node is unable to view video data, generating the second message to include audio data to be output to the user.

Example 62 includes the method of example 56, further including, after a determination that the first node has a bandwidth less than a threshold, generating the second message to include at least one of audio data or text data.

Example 63 includes the method of example 62, further including transmitting the at least one of audio data or text data via a first network interface, and transmitting video data via a second network interface, the second network interface different from the first network interface.

Example 64 includes the method of example 56, further including, after a determination that the first node has a bandwidth that satisfies a threshold, generating the second message to include at least one of audio data, text data, or video data.

Example 65 includes the method of example 56, further including multicasting the second message to the first node and one or more second nodes, the one or more second nodes associated with the metadata.

Example 66 includes the method of example 56, wherein the metadata is first metadata, and further including generating the second message to include first data, second data, and second metadata, the first data associated with a time duration, and the second metadata to cause the first node to access the second data after the time duration has elapsed.

Example 67 includes the method of example 56, further including generating the second message to include first data and second data, the first data associated with a time duration, and after transmitting the first data to the first node, transmitting the second data to the first node after the time duration has elapsed.

Example 68 includes the method of example 56, further including, after a determination that the first node is associated with a first network interface and a second network interface, transmitting a first portion of the second message to the first network interface and a second portion of the second message to the second network interface.

Example 69 includes the method of example 68, wherein the first network interface is a Wi-Fi network interface and the second network interface is a cellular network interface.

Example 70 includes the method of example 56, further including executing a machine-learning microservice to cause execution of the machine-learning model.

Example 71 includes the method of example 56, wherein the machine-learning model is a digital twin associated with the network environment.

Example 72 includes the method of example 71, further including predicting the first data routing path based on simulating the transmitting of the first message in the network environment, the simulating based on the digital twin.

Example 73 includes the method of example 56, wherein the metadata is first metadata, the first node is a first device, the network environment includes a second device and a third device, and further including generating the second message to include second metadata, the first device is not associated with an operation indicated by the second metadata, and the first device to cause at least one of the second device or the third device to perform the operation based on the second metadata.

Example 74 includes the method of example 73, further including transmitting data associated with the operation to the at least one of the second device or the third device to effectuate performance of the operation by the at least one of the second device or the third device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
machine-readable instructions; and
at least one processor circuit to utilize the machine-readable instructions to at least:
execute a machine-learning model to output a first data routing path in a network environment based on metadata associated with an event in the network environment, a first message based on the event to be transmitted to a first node based on the first data routing path, the first data routing path representative of transmission of the first message to the first node via one or more second nodes, the first data routing path to have a first strength of association with at least one of the metadata or the event;
detect a change of the first data routing path to a second data routing path, the second data routing path representative of transmission of the first message to the first node via one or more third nodes;
after detection of the change, retrain the machine-learning model to output a third data routing path based on the second data routing path, the third data routing path to have a second strength of association with the at least one of the metadata or the event, the second strength of association to be greater than the first strength of association; and
cause transmission of a second message to the first node based on the third data routing path after an identification of the event.

2. The apparatus of claim 1, wherein one or more of the at least one processor circuit is to be instantiated after receiving the machine-readable instructions.

3. The apparatus of claim 1, wherein the event is a first event, the metadata is first metadata, the identification is a first identification, and one or more of the at least one processor circuit is to cause transmission of a third message after a second identification of a second event, the second event associated with second metadata, the second metadata to include a portion of the first metadata.

4. The apparatus of claim 1, wherein the first data routing path is representative of predicted transmission of the first message to the first node via the one or more second nodes, and the second data routing path is representative of actual transmission of the first message to the first node via the one or more third nodes.

5. The apparatus of claim 1, wherein one or more of the at least one processor circuit is to multicast the second message to the first node and one or more fourth nodes, the one or more fourth nodes associated with the metadata.

6. An apparatus comprising:
at least one memory;
machine-readable instructions; and
at least one processor circuit to utilize the machine-readable instruction to at least:
execute a machine-learning model to output a first data routing path in a network environment based on metadata associated with an event in the network environment, a first message based on the event to be transmitted to a first node based on the first data routing path, the first data routing path to have a first strength of association with at least one of the metadata or the event;

after a detection of a change of the first data routing path to a second data routing path, retrain the machine-learning model to output a third data routing path based on the second data routing path, the third data routing path to have a second strength of association with the at least one of the metadata or the event, the second strength of association to be greater than the first strength of association;

cause transmission of a second message to the first node based on the third data routing path after an identification of the event; and after a determination that the first node is associated with a first network interface and a second network interface, cause transmission of a first portion of the second message to the first network interface and a second portion of the second message to the second network interface.

7. The apparatus of claim 6, wherein the first network interface is a Wi-Fi network interface and the second network interface is a cellular network interface.

8. At least one non-transitory computer readable storage medium comprising instructions to cause at least one processor circuit to at least:

execute a machine-learning model to output a first data routing path in a network environment based on metadata associated with an event in the network environment, a first message based on the event to be transmitted to a first node based on the first data routing path, the first data routing path to have a first strength of association with at least one of the metadata or the event;

after a detection of a change of the first data routing path to a second data routing path, retrain the machine-learning model to output a third data routing path based on the second data routing path, the third data routing path to have a second strength of association with the at least one of the metadata or the event, the second strength of association to be greater than the first strength of association; and cause transmission of a second message to the first node based on the third data routing path after an identification of the event, the third data routing path representative of transmission of the second message to the first node via one or more second nodes.

9. The at least one non-transitory computer readable storage medium of claim 8, wherein the first data routing path is representative of transmission of the first message to the first node via one or more third nodes, and the instructions cause one or more of the at least one processor circuit to detect the change to be representative of transmission of the first message to the first node via one or more fourth nodes.

10. The at least one non-transitory computer readable storage medium of claim 8, wherein the instructions cause one or more of the at least one processor circuit to, after a determination that a user associated with the first node is unable to view video data, generate the second message to include audio data to be output to the user.

11. The at least one non-transitory computer readable storage medium of claim 8, wherein the instructions cause one or more of the at least one processor circuit to, after a determination that the first node has a bandwidth less than a threshold, generate the second message to include at least one of audio data or text data.

12. At least one non-transitory computer readable storage medium comprising instructions to cause at least one processor circuit to at least:

execute a machine-learning model to output a first data routing path in a network environment based on metadata associated with an event in the network environment, a first message based on the event to be transmitted to a first node based on the first data routing path, the first data routing path to have a first strength of association with at least one of the metadata or the event;

after a detection of a change of the first data routing path to a second data routing path, retrain the machine-learning model to output a third data routing path based on the second data routing path, the third data routing path to have a second strength of association with the at least one of the metadata or the event, the second strength of association to be greater than the first strength of association;

after a determination that the first node has a bandwidth that satisfies a threshold, generate a second message to include at least one of audio data, text data, or video data; and cause transmission of the second message to the first node based on the third data routing path after an identification of the event.

13. The at least one non-transitory computer readable storage medium of claim 8, wherein the metadata is first metadata, the instructions cause one or more of the at least one processor circuit to generate the second message to include first data, second data, and second metadata, the first data associated with a time duration, and the second metadata to cause the first node to access the second data after the time duration has elapsed.

14. The at least one non-transitory computer readable storage medium of claim 8, wherein the instructions cause one or more of the at least one processor circuit to:

generate the second message to include first data and second data, the first data associated with a time duration; and after transmission of the first data to the first node, cause the transmission of the second data to the first node after the time duration has elapsed.

15. A method comprising:

executing a machine-learning model to output a first data routing path in a network environment based on first metadata associated with event data in the network environment, a first message based on the event data to be transmitted to a first node based on the first data routing path, the first data routing path to have a first strength of association with at least one of the first metadata or the event data;

after detecting a change of the first data routing path to a second data routing path, retraining the machine-learning model to output a third data routing path based on the second data routing path, the third data routing path to have a second strength of association with the at least one of the first metadata or the event data, the second strength of association to be greater than the first strength of association;

generating a second message to include first data, second data, and second metadata, the first data associated with a time duration; and transmitting the second message to the first node based on the third data routing path after an identification of the event data, the second metadata to cause the first node to access the second data after the time duration has elapsed.

16. The method of claim 15, wherein the event data is first event data, the identification is a first identification, and the method includes transmitting a third message after a second identification of second event data, the second event data associated with third metadata, the third metadata to include a portion of the first metadata.

17. The method of claim 16, wherein the third message includes at least one of data or the third metadata directly associated with the data.

18. The method of claim 15, including, after a determination that the first node is associated with a first network interface and a second network interface, transmitting a first portion of the second message to the first network interface and a second portion of the second message to the second network interface.

19. The method of claim 15, including executing a machine-learning microservice to cause execution of the machine-learning model.

20. The method of claim 15, wherein the machine-learning model is a digital twin associated with the network environment.

21. A method comprising:
executing a machine-learning model to predict a first data routing path in a network environment based on metadata associated with event data in the network environment, the machine-learning model being a digital twin associated with the network environment, a first message based on the event data to be transmitted to a first node based on the first data routing path, prediction of the first data routing path based on simulating transmission of the first message in the network environment, the simulating based on the digital twin, the first data routing path to have a first strength of association with at least one of the metadata or the event data;
after detecting a change of the first data routing path to a second data routing path, retraining the machine-learning model to output a third data routing path based on the second data routing path, the third data routing path to have a second strength of association with the at least one of the metadata or the event data, the second strength of association to be greater than the first strength of association; and
transmitting a second message to the first node based on the third data routing path after an identification of the event data.

22. The method of claim 21, wherein the metadata is first metadata, the first node is a first device, the network environment includes a second device and a third device, and including generating the second message to include second metadata, the first device is not associated with an operation indicated by the second metadata, and the first device is to cause at least one of the second device or the third device to perform the operation based on the second metadata.

23. The apparatus of claim 6, wherein the determination is a first determination, and one or more of the at least one processor circuit is to, after a second determination that the first node has a bandwidth that satisfies a threshold, generate the second message to include at least one of audio data, text data, or video data.

24. The at least one non-transitory computer readable storage medium of claim 12, wherein the instructions cause one or more of the at least one processor circuit to multicast the second message to the first node and one or more second nodes associated with the metadata.

* * * * *